United States Patent
Yoshimi et al.

(10) Patent No.: US 6,562,474 B1
(45) Date of Patent: May 13, 2003

(54) COATED STEEL SHEET HAVING EXCELLENT CORROSION RESISTANCE AND METHOD FOR PRODUCING THE SAME

(75) Inventors: Naoto Yoshimi, Fukuyama (JP); Satoru Ando, Fukuyama (JP); Masaru Sagiyama, Fukuyama (JP); Akihiko Furuta, Tokyo (JP); Masaaki Yamashita, Fukuyama (JP); Akira Matsuzaki, Fukuyama (JP); Takafumi Yamaji, Kawasaki (JP); Tatsuya Miyoshi, Fukuyama (JP); Takahiro Kubota, Fukuyama (JP); Yasuhiko Haruta, Hiratuka (JP); Hiroyasu Matsuki, Hiratuka (JP); Kenichi Tomita, Hiratuka (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/603,889

(22) Filed: Jun. 26, 2000

Related U.S. Application Data

(63) Continuation of application No. PCT/JP99/06169, filed on Nov. 5, 1999.

(30) Foreign Application Priority Data

Nov. 8, 1998 (JP) .......................................... 10-332049
Apr. 30, 1999 (JP) .......................................... 11-123600

(51) Int. Cl.$^7$ ................................................. B32B 9/00
(52) U.S. Cl. ................. 428/472.3; 428/328; 428/425.9; 428/469; 428/699; 428/701
(58) Field of Search ................................. 428/328, 323, 428/469, 457, 423.1, 425.8, 425.9, 472.3, 688, 689, 690, 699, 701, 458, 460, 461, 462

(56) References Cited

U.S. PATENT DOCUMENTS

| 5,397,638 A | * | 3/1995 | Miki et al. ................... 428/328 |
| 5,496,652 A | * | 3/1996 | Sasaki et al. ................ 428/623 |
| 5,525,431 A | * | 6/1996 | Kanamaru et al. .......... 428/623 |

FOREIGN PATENT DOCUMENTS

| EP | 0122781 A1 | * | 10/1984 |
| JP | 51-71233 A | | 6/1976 |
| JP | 53-27694 B | | 8/1978 |
| JP | 56-10386 B | | 3/1981 |
| JP | 57-198267 A | | 12/1982 |
| JP | 58-130284 A | | 8/1983 |
| JP | 62-7883 A | | 1/1987 |
| JP | 63-90581 A | | 4/1988 |
| JP | 8-151358 A | | 6/1996 |
| JP | 8-325760 A | | 12/1996 |

* cited by examiner

Primary Examiner—Paul Thibodeau
Assistant Examiner—Christopher Paulraj
(74) Attorney, Agent, or Firm—Frishauf, Holtz, Goodman & Chick, P.C.

(57) ABSTRACT

A coated steel sheet having excellent corrosion resistance comprises: a zinc or a zinc alloy plated steel sheet or an aluminum or an aluminum alloy plated steel sheet; a composite oxide coating formed on the surface of the plated steel sheet; and an organic coating formed on the composite oxide coating. The composite oxide coating contains a fine particle oxide and a phosphoric acid and/or a phosphoric acid compound. The organic coating has thickness of from 0.1 to 5 μm.

12 Claims, 1 Drawing Sheet

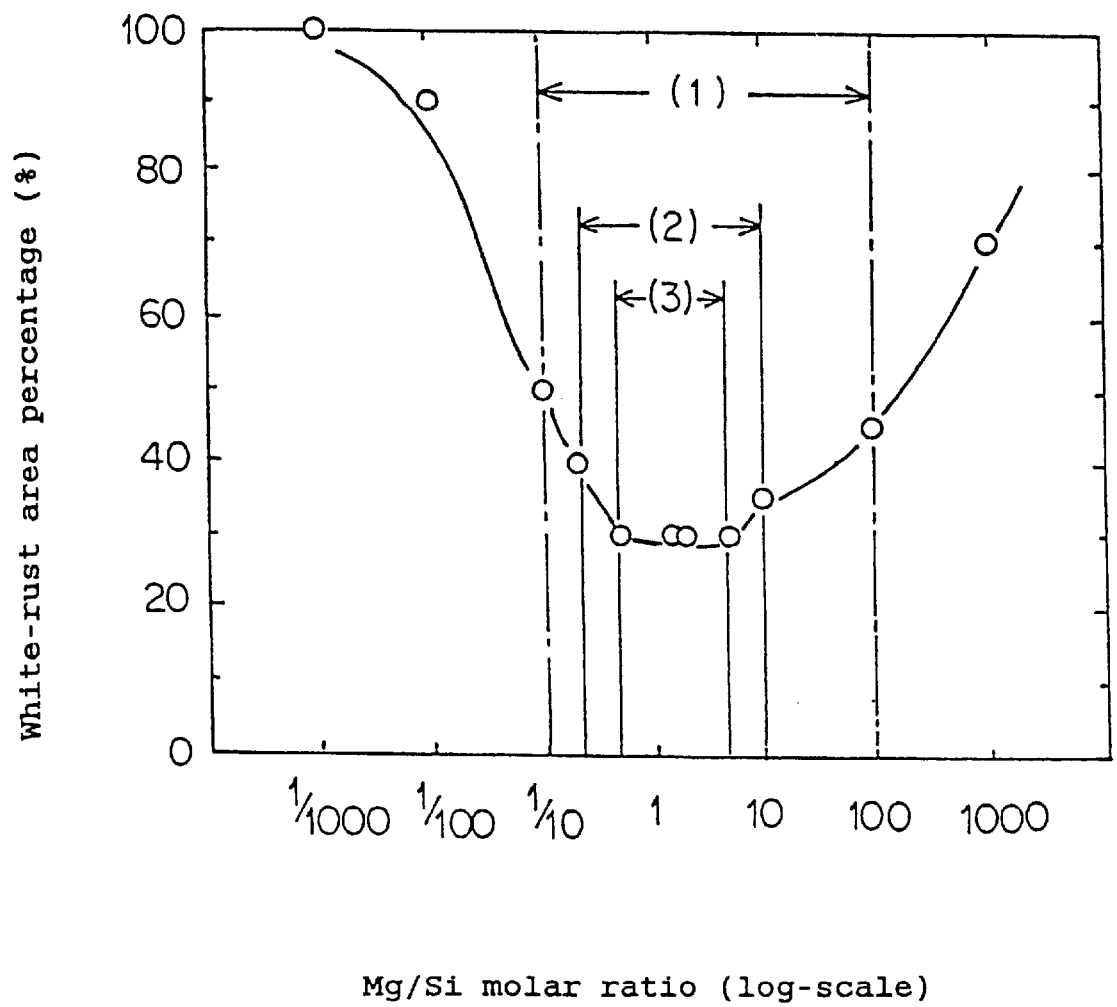

COATED STEEL SHEET HAVING EXCELLENT CORROSION RESISTANCE AND METHOD FOR PRODUCING THE SAME

This application is a continuation application of International application PCT/JP99/06169 filed Nov. 5, 1999.

TECHNICAL FIELD

The present invention relates to a coated steel sheet having excellent corrosion resistance and a method for producing the same.

BACKGROUND ART

Steel sheets for household electric appliances, for buildings, and for automobiles have widely used zinc based or aluminum based plated steel sheets treated on their surface with chromating using a solution consisting mainly of chromic acid, bichromic acid, or their salts in order to improve the corrosion resistance (white-rust resistance and rust resistance). The chromate treatment is an economical treatment method providing excellent corrosion resistance under a relatively simple procedure.

The chromate treatment uses hexavalent chromium which is a substance under regulation of pollution control laws. The hexavalent chromate substantially does not pollute environment nor attack human bodies, because it is perfectly handled in a closed system over the whole treatment process, thus it is completely reduced and recovered within the process. Therefore, it is never emitted to natural environment, and the sealing function of organic coatings reduces the chromium elution from the chromate coatings to nearly zero. Nevertheless, recent concern about global environment increases the independent movements to diminish the use of heavy metals including hexavalent chromium. In addition, there has begun a movement to eliminate or minimize the heavy metals in products to avoid contamination of environment when shredder scrap of wasted products is discarded.

Responding to those movements, many non-polluting treatment technologies without applying chromating have been introduced to prevent generation of rust and white-rust on zinc base plated steel sheets. Among them, several methods using organic compounds and organic resins have been proposed. Examples of these methods are the following.

(1) A method using tannic acid, (for example, JP-A-51-71233), (the term "JP-A" referred to herein signifies "Unexamined Japanese Patent Publication").

(2) A method using a thermosetting paint prepared by blending an epoxy resin, an amino-resin, and tannic acid, (for example, JP-A-63-90581).

(3) A method using chelation force of tannic acid, such as a method using a mixed composition of a water-type resin and a polyhydric phenol carboxylic acid, (for example, JP-A-8-325760).

(4) A method using surface treatment to coat an aqueous solution of a hydrazine derivative onto the surface of tin plate or zinc plate, (for example, JP-B-53-27694 and JP-B-56-10386), (the term "JP-B" referred to herein signifies "Examined Japanese Patent Publication").

(5) A method using an inhibitor containing an amine-added salt which is prepared by adding amine to a mixture of acylsarcosine and benzotriazole, (for example, JP-A-58-130284).

(6) A method using a treatment agent prepared by blending tannic acid with a heterocyclic compound such as benzothiazole compound, (for example, JP-A-57-198267).

These conventional technologies, however, have problems described below.

The methods (1) through (4) have a problem in corrosion resistance and other characteristics. That is, the method (1) gives insufficient corrosion resistance, and fails to give uniform appearance after the treatment. The method (2) does not aim to form a rust-preventive coating in a thin film form (having thicknesses of from 0.1 to 5 $\mu$m) directly on the surface of zinc base or aluminum base plating, thus the method fails to attain sufficient corrosion-protective effect even it is applied in a thin film form onto the surface of zinc base or aluminum base plating. The method (3) also gives insufficient corrosion resistance.

The method (4) is not applied to a zinc base or aluminum base plated steel sheet. Even if the method (4) is applied to those types of steel sheets, the formed coating has no network structure so that it has no satisfactory barrier performance, which results in insufficient corrosion resistance. JP-B-23772 (1978) and JP-B-10386 (1081) disclose blending of an aqueous solution of hydrazine derivative with a water-soluble polymer (such as polyvinylalcohol, a maleic acid ester copolymer, an acrylic acid ester copolymer) aiming to improve the uniformity of coating. However, that kind of mixture which simply blends an aqueous solution of hydrazine derivative with a water-soluble polymer compound cannot give satisfactory corrosion resistance.

Also the methods (5) and (6) do not aim to form a rust-preventive coating on the surface of a zinc base or aluminum base plated steel sheet in a short time. And, even when a treatment agent is applied onto the surface of the plated steel sheet, lack of barrier performance against corrosive causes such as oxygen and water fails to provide excellent corrosion resistance. The method (6) describes also about the additives in terms of mixing with resins (such as epoxy resin, acrylic resin, urethane resin, nitrocellulose resin, and polyvynilchloride resin). However, simple mixture of resin with a heterocyclic compound such as a benzothiazole compound cannot give sufficient corrosion resistance.

Under a practical condition that alkaline degreasing is applied at a pH range of from about 9 to about 11 using spray method or the like to remove oil which was applied onto the surface during press-working or other steps, all of the methods (1) through (6) have a problem that the alkaline degreasing induces peeling or damaging the coating, thus failing to sustain corrosion resistance. Therefore, all of these methods referred above are not suitable for practical uses as a method for forming rust-preventive coatings.

DISCLOSURE OF THE INVENTION

It is an object of the present invention to provide a coated steel sheet which does not contain heavy metals such as hexavalent chromium within the coating, and which is safe and non-toxic in manufacturing process and on using thereof, while attaining excellent corrosion resistance, and to provide a method for manufacturing thereof.

To attain the object, firstly, the present invention provides a coated steel sheet having excellent corrosion resistance, which comprises a zinc or a zinc alloy plated steel sheet or an aluminum or an aluminum alloy plated steel sheet, a composite oxide coating formed on the surface of the plated steel sheet, and an organic coating having a thickness in a range of from 0.1 to 5 $\mu$m formed on the composite oxide coating.

The composite oxide coating contains:

($\alpha$) fine particles of oxide;

(β) at least one metal selected from the group consisting of Mg, Ca, Sr, and Ba (including the case that the metal is in a form of compound and/or composite compound); and (γ) phosphoric acid and/or phosphoric acid compound.

The composite oxide coating has a thickness in a range of from 0.005 to 3 μm, or has a total coating weight of the component (α), the component (β) converted to metal concerned, and the component (γ) converted to $P_2O_5$, in a range of from 6 to 3,600 Mg/m².

The organic coating contains a product of reaction between a film-forming organic resin (A) and an active-hydrogen-laden compound (B), a part or whole of which compound (B) comprises a hydrazine derivative (C) containing active hydrogen.

Secondly, the present invention provides a coated steel sheet having excellent corrosion resistance, which comprises a zinc or a zinc alloy plated steel sheet or an aluminum or an aluminum alloy plated steel sheet, a composite oxide coating formed on the surface of the plated steel sheet, and an organic coating having a thickness in a range of from 0.1 to 5 μm formed on the composite oxide coating.

The composite oxide coating contains:

(α) fine particles of oxide; and (β) phosphoric acid and/or phosphoric acid compound.

The composite oxide coating has a total coating weight of the component (α) and the component (β) converted to $P_2O_5$, in a range of from 5 to 4,000 mg/m².

The organic coating contains a product of reaction between a film-forming organic resin (A) and an active hydrogen-laden compound (B), a part or whole of which compound (B) comprises a hydrazine derivative (C) containing active hydrogen.

Thirdly, the present invention provides a coated steel sheet having excellent corrosion resistance, which comprises a zinc or a zinc alloy plated steel sheet or an aluminum or an aluminum alloy plated steel sheet, a chemical conversion treatment coating formed on the surface of the plated steel sheet, and an organic coating having a thickness in a range of from 0.1 to 5 μm on the chemical conversion treatment coating.

The organic coating contains a product of reaction between a film-forming organic resin (A) and an active-hydrogen-laden compound (B), a part or whole of which compound (B) comprises a hydrazine derivative (C) containing active hydrogen.

Fourthly, the present invention provides a coated steel sheet having excellent corrosion resistance, which comprises a zinc or a zinc alloy plated steel sheet or an aluminum or an aluminum alloy plated steel sheet, and an organic coating having a thickness in a range of from 0.1 to 5 μm on the surface of the plated steel sheet.

The organic coating contains a product of reaction between a film-forming organic resin (A) and an active-hydrogen-laden compound (B), a part or whole of which compound (B) comprises a hydrazine derivative (C) containing active hydrogen.

Fifthly, the present invention provides a coated steel sheet having excellent corrosion resistance, which comprises a zinc or a zinc alloy plated steel sheet or an aluminum or an aluminum alloy plated steel sheet, a composite oxide coating formed on the surface of the plated steel sheet, and an organic coating having a thickness in a range of from 0.1 to 5 μm formed on the composite oxide coating.

The composite oxide coating contains:

(α) fine particles of oxide;

(β) at least one metal selected from the group consisting of Mg, Ca, Sr, and Ba (including the case that the metal is in a form of compound and/or composite compound); and (γ) phosphoric acid and/or phosphoric acid compound.

The composite oxide coating has a thickness in a range of from 0.005 to 3 μm, or has a total coating weight of the component (α), the component (β) converted to metal concerned, and the component (γ) converted to $P_2O_5$, in a range of from 6 to 3,600 mg/m².

The organic coating contains, as a base resin, an organic polymer resin (A) having OH group and/or COOH group.

Sixthly, the present invention provides a coated steel sheet having excellent corrosion resistance, which comprises a zinc or a zinc alloy plated steel sheet or an aluminum or an aluminum alloy plated steel sheet, a composite oxide coating formed on the surface of the plated steel sheet, and an organic coating having a thickness in a range of from 0.1 to 5 μm formed on the composite oxide coating.

The composite oxide coating comprises (α) fine particles of oxide and (β) phosphoric acid and/or a phosphoric acid compound.

The composite oxide coating has a total coating weight of the component (α) and the component (β) converted to $P_2O_5$, in a range of from 5 to 4,000 mg/m².

The organic coating contains, as a base resin, an organic polymer resin (A) having OH group and/or COOH group.

Seventhly, the present invention provides a method for manufacturing a coated steel sheet having excellent corrosion resistance, which comprises the steps of:

preparing a zinc or a zinc alloy plated steel sheet or an aluminum or an aluminum alloy plated steel sheet; treating the prepared plated steel sheet in an acidic aqueous solution within a pH range of from 0.5 to 5, which acidic aqueous solution contains (a) silica and/or silica sol in a range of from 0.001 to 3 mole/liter as $SiO_2$, (b) phosphoric acid ion and/or phosphoric acid compound in a range of from 0.001 to 6 mole/liter as $P_2O_5$, and (c) at least one substance selected from the group consisting of: either one metallic ion selected from the group consisting of Al, Mg, Ca, Sr, Ba, Hf, Ti, Y, Sc, Ce, La, Pr, Nd, Sm, Eu, Gd, Tb, Dy, Ho, Er, Yb, Lu, Ni, Co, Fe, and Mn; a water-soluble ion containing at least one of the above-given metals; an oxide containing at least one of the above-given metals; an oxide containing at least one of the above-described metals; and a hydroxide containing at least one of the above-given metals, in a range of from 0.001 to 3 mole/liter as the total of above-given metals converted to the metal concerned; and forming a chemical conversion treatment coating having a thickness in a range of from 0.005 to 2 μm on the surface of the plated steel sheet by heating and drying the processed plated steel sheet.

BRIEF DESCRIPTION OF THE DRAWINGS

FIG. 1 is a graph showing the relation between molar ratio [Mg/Si] and white-rust resistance in an acidic aqueous solution.

BEST MODE FOR CARRYING OUT THE INVENTION

Best Mode 1

According to a finding of the inventors of the present invention, an organic coating steel sheet inducing no pollution problem and providing excellent corrosion resistance is obtained without applying chromate treatment which may give bad influence to environment and human body, through the steps of: forming a specific composite oxide coating as the primary layer coating on the surface of a zinc base plated steel sheet or an aluminum base plated steel sheet; then forming a specific chelating resin coating as the secondary layer coating on the primary layer coating; further preferably blending an adequate amount of a specific rust-preventive agent into the chelating resin coating.

The organic coating steel according to the present invention is basically characterized in that a composite oxide coating as the primary layer coating comprising (α) fine particles of oxide, (β) one or more of metal selected from the group consisting of Mg, Ca, Sr, and Ba (including the case that the metal is in a form of compound and/or composite compound), and (γ) phosphoric acid and/or phosphoric acid compound, is formed on the surface of a zinc base plated steel sheet or an aluminum base plated steel sheet, that, further on the primary coating layer, an organic coating containing a chelating resin is formed as the secondary coating layer as the product of reaction between a film-forming organic resin (A) and an active-hydrogen-laden compound (B), a part or whole of which compound (B) consists of a hydrazine derivative (C) containing active hydrogen, thus applying the hydrazine derivative (C) as a chelating group to the film-forming resin (A).

Preferably the above-described composite oxide coating as the primary layer coating contains: $SiO_2$ fine particles as the component (α) at a specific coating weight; one or more substance (magnesium component) selected from the group consisting of Mg, a compound containing Mg, a composite compound containing Mg, as the component (α) at a specific coating weight; and phosphoric acid and/or phosphoric acid compound as the component (γ) at a specific coating weight.

The above-described primary layer coating and the secondary layer coating provide excellent rust-preventive effect even when they are used independently from each other compared with conventional chromate base coatings. Nevertheless, according to the present invention, a thin coating provides corrosion resistance equivalent to that of chromate coating by adopting dual layer coating structure consisting of primary and secondary layers to give a synergy effect.

Although the mechanism of corrosion resistance in the dual layer coating structure consisting of a specific composite oxide coating and a specific organic coating is not fully analyzed, the corrosion-preventive effect of the dual layer coating structure presumably comes from the combination of corrosion-suppression actions of individual coatings, which is described below.

The corrosion preventive mechanism of the composite oxide coating as the primary layer coating is not fully understood. The excellent corrosion-preventive performance, supposedly, owes to that the dense and slightly soluble composite oxide coating acts as a barrier coating to shut off corrosion causes, that the fine particles of oxide such as silicon oxide ($SiO_2$) form a stable and dense barrier coating along with an alkali earth metal such as Mg and phosphoric acid and/or phosphoric acid compound, and that, when the fine particles of oxide are those of silicon oxide ($SiO_2$), the silicic acid ion emitted from the silicon oxide forms basic zinc chloride under a corrosive environment to improve the barrier performance. Even when defects occur on the coating, it is supposed that a cathodic reaction generates OH ion to bring the interface to alkali side, and Mg ion and Ca ion, which are soluble matter in alkali earth metal, precipitates as $Mg(OH)_2$ and $Ca(OH)_2$, respectively, which act as the dense and slightly soluble reaction products to seal the defects, thus resulting in suppressing the corrosion reactions. Also it is assumed that phosphoric acid and/or phosphoric acid compound contributes to the improvement of denseness of the composite oxide coating, further that the phosphoric acid component catches the zinc ion which is eluted during an anodic reaction as a corrosion reaction in the coating-defect section, then the phosphoric acid component is converted to a slightly soluble zinc phosphate compound to form a precipitate at that place. As described above, alkali earth metals and phosphoric acid and/or phosphoric acid compounds should perform self-repair action in the coating-defect section.

That kind of work effect appears particularly when the composite oxide coating contains, as described before, $SiO_2$ fine particles as the component (α) at a specific coating weight; a magnesium component as the component (β) at a specific coating weight; and phosphoric acid and/or phosphoric acid compound as the component (γ) at a specific coating weight.

The corrosion-preventive mechanism of the organic coating as the above-described secondary layer coating is also not fully analyzed. The mechanism is, however, presumably the following. By adding a hydrazine derivative, not applying a simple low molecular weight chelating agent, to the film-forming organic resin, (1) the dense organic polymer coating gives an effect to shut-off corrosion causes such as oxygen and chlorine ions, (2) the hydrazine derivative is able to form a stable passive layer by strongly bonding with the surface of the primary layer coating, and (3) the free hydrazine derivative in the coating traps the zinc ion which is eluted by a corrosion reaction, thus forming a stable insoluble chelated compound layer, which suppresses the formation of an ion conduction layer at interface to suppress the progress of corrosion. These work effects should effectively suppress the development of corrosion, thus giving excellent corrosion resistance.

Particularly when a resin containing epoxy group is used as the film-forming organic resin (A), a dense barrier coating is formed by the reaction between the epoxy-group-laden resin and a cross-linking agent. Thus, the formed barrier coating has excellent penetration-suppression performance against the corrosion causes such as oxygen, and gains excellent bonding force with the base material owing to the hydroxyl group in the molecule, which results in particularly superior corrosion resistance.

Further excellent corrosion resistance is obtained by using an active-hydrogen-laden pyrazole compound and/or an active-hydrogen-laden triazole compound as the hydrazine derivative (C) containing active hydrogen.

As in the case of prior art, blending simply a hydrazine derivative with the film-forming organic resin gives very little improvement in corrosion-suppression. The reason is presumably that the hydrazine derivative which does not enter the molecules of the film-forming organic resin forms a chelate compound with zinc which is eluted under a corrosive environment, and the chelate compound cannot form a dense barrier layer because of low molecular weight. To the contrary, introduction of a hydrazine derivative into the molecules of film-forming organic resin, as in the case of present invention, provides markedly high corrosion-suppression effect.

According to the organic coating steel sheet of the present invention, further high anti-corrosive performance (self-repair work at coating-defect section) is attained by blending adequate amount of ion-exchanged silica (α) with an organic coating consisting of above-described specific reaction products. The corrosion-preventive mechanism which is obtained by blending the ion exchanged silica (α) with the specific organic coating is speculated as follows. First, under a corrosion environment, the zinc ion which is eluted from the plating coating is trapped by the above-described hydrazine derivative, thus suppressing the anode reaction. On the other hand, when cation such as Na ion enters under the corrosion environment, the iron exchange action emits Ca ion and Mg ion from the surface of silica. Furthermore, when OH ion is generated by the cathode reaction under the corrosive environment to increase pH value near the plating interface, the Ca ion (or Mg ion) emitted from the ion-exchanged silica precipitates in the vicinity of the plating interface in a form of $Ca(OH)_2$ or $Mg(OH)_2$, respectively. The precipitate seals defects as a dense and slightly soluble product to suppress the corrosion reactions.

There may given an effect that the eluted zinc ion is exchanged with Ca ion (or Mg ion) and is fixed onto the surface of silica. By combining both the anti-corrosive actions of hydrazine derivative and ion exchanged silica, particularly strong corrosion-preventive effect would appear.

Also in the case that an ion-exchanged silica is blended with a general organic coating, corrosion-preventive effect is obtained to some extent. Nevertheless, when an ion exchanged silica is blended with an organic coating consisting of a specific chelate-modified resin, as in the case of present invention, the corrosion-preventive effect at anode reaction section owing to the chelate-modified resin and the corrosion-preventive effect at cathode reaction section owing to the ion-exchanged silica are combined to suppress both the anode and the cathode corrosion reactions, which should provide markedly strong corrosion-preventive effect. Furthermore, that kind of combined corrosion-preventive effect is effective in suppressing corrosion at flaws and defects on coatings, and is able to give excellent self-repair work to the coating.

According to the organic coating steel sheet of the present invention, the corrosion resistance can also be increased by blending an adequate amount of silica fine particles (b) with an organic coating consisting of a specific reaction product as described above. That is, by blending silica fine particles such as fumed silica and .colloidal silica (having average primary particle sizes of from 5 to 50 nm, preferably from 5 to 20 nm, more preferably from 5 to 15 nm) having large specific surface area into a specific organic coating, the generation of dense and stable corrosion products such as basic zinc chloride is enhanced, thus suppressing the generation of zinc oxide (white-rust).

Furthermore, according to the organic coating steel sheet of the present invention, the corrosion resistance can further be increased by blending an ion-exchanged silica (a) and silica fine particles (b) together into the organic coating consisting of a specific reaction product as described above. The ion-exchanged silica consists mainly of porous silica, and generally has a relatively large particle size, 1 $\mu$m or more. Accordingly, after releasing Ca ion, the rust-preventive effect as silica is not much expectable. Consequently, by accompanying fine particle silica having a relatively large specific surface area, such as fumed silica and colloidal silica, (with primary particle sizes of from 5 to 50 nm, preferably from 5 to 20 nm, more preferably from 5 to 15 nm), the generation of dense and stable corrosion products such as basic zinc chloride may be enhanced, thus suppressing the generation of zinc oxide (white rust). Through the combined rust-preventive mechanisms of ion exchanged silica and fine particle silica, particularly strong corrosion-preventive effect would appear.

Examples of the zinc base plated steel sheet as the base of the organic coating steel sheet according to the present invention are, galvanized steel sheet, Zn—Ni alloy plated steel sheet, Zn—Fe alloy plated steel sheet (electroplated steel sheet and alloyed hot dip galvanized steel sheet), Zn—Cr alloy plated steel sheet, Zn—Mn alloy plated steel sheet, Zn—Co alloy plated steel sheet, Zn—Co—Cr alloy plated steel sheet, Zn—Cr—Ni alloy plated steel sheet, Zn—Cr—Fe alloy plated steel sheet, Zn—Al alloy plated steel sheet (for example, Zn-5%Al alloy plated steel sheet and Zn-55%Al alloy plated steel sheet), Zn—Mg alloy plated steel sheet, Zn—Al—Mg plated steel sheet, zinc base composite plated steel sheet (for example, Zn—$SiO_2$ dispersion plated steel sheet) which is prepared by dispersing a metallic oxide, a polymer, or the like in the plating film of these plated steel sheets.

Among the platings described above, the same kind or different kinds of them may be plated into two or more layers to form a multi-layered plated steel sheet.

The aluminum base plated steel sheet which is a base of the organic coating steel sheet of the present invention may be an aluminum plated steel sheet, an Al—Si alloy plated steel sheet, or the like.

The plated steel sheet may be prepared from a steel sheet is applied on the surface of which a plating of Ni or the like at a small coating weight in advance, followed by the above-described various kinds of platings.

The plating method may be either applicable one of electrolytic method (electrolysis in an aqueous solution or in a non-aqueous solvent) and vapor phase method.

To prevent occurrence of coating defects and nonuniformity during the step for forming the dual layer coating on the surface of the plating film, there may be applied alkaline degreasing, solvent degreasing, surface-adjustment treatment (alkaline surface-adjustment treatment or acidic surface-adjustment treatment) and the like to the surface of plating film in advance.

To prevent blackening (a kind of oxidization on the plating surface) of organic coating steel sheet under the use conditions, the surface of plating film may be subjected to surface-adjustment treatment using acidic or alkaline aqueous solution containing iron group metal ion(s) (Ni ion, Co ion, Fe ion) in advance. When an electrolytically galvanized steel sheet is used as the base steel sheet, the electroplating bath may contain 1 ppm or more of iron group metal ion(s) (Ni ion, Co ion, Fe ion), thus letting these metals in the plating film prevent blackening. In that case, there is no specific limitation on the upper limit of iron group metal concentration in the plating film.

The following is the description of the composite oxide coating as the primary layer coating which is formed on the surface of zinc base plated steel sheet or aluminum base plated steel sheet.

Quite different from conventional alkali silicate treatment coating which is represented by the coating composition consisting of lithium oxide and silicon oxide, the composite oxide coating according to the present invention comprises:

(α) fine particles of oxide (preferably $SiO_2$ fine particles);

(β) one or more of metal selected from the group consisting of Mg, Ca, Sr, and Ba (including the case that the metal is in a form of compound and/or composite compound); and (γ) phosphoric acid and/or phosphoric acid compound.

Particularly preferable oxide fine particles as the above-described component (α) are those of silicon oxide (fine particles of $SiO_2$), and most preferable one among the silicon oxides is colloidal silica.

Examples of the colloidal silica are: SNOWTEX O, SNOWTEX OS, SNOWTEX OXS, SNOWTEX OUP, SNOWTEX AK, SNOWTEX O40, SNOWTEX OL, SNOWTEX OL40, SNOWTEX OZL, SNOWTEX XS, SNOWTEX S, SNOWTEX NXS, SNOWTEX NS, SNOWTEX N, SNOWTEX QAS-25, (these are trade names) manufactured by Nissan Chemical Industries, Ltd.; CATALOID S, CATALOID SI-350, CATALOID SI-40, CATALOID SA, CATALOID SN, (trade names) manufactured by Catalysts & Industries Co., Ltd.; ADERITE AT-20–50, ADERITE AT-20N, ADERITE AT-300, ADERITE AT-300S, ADERITE AT20Q, (trade names) manufactured by Asahi Denka Kogyo, K.K.

Among these silica oxides ($SiO_2$ fine particles), the ones having particle sizes of 14 nm or less, more preferably 8 nm or less are preferred from the viewpoint of corrosion resistance.

The silica oxide may be used by dispersing dry silica fine particles in a coating composition solution. Examples of the dry silica are AEROSIL 200, AEROSIL 3000, AEROSIL 300CF, AEROSIL 380, (these are trade names) manufactured by Japan Aerosil Co., and particularly the ones having particle sizes of 12 nm or less, more preferably 7 nm or less are preferred.

Other than above-described silica oxides, the oxide fine particles may be colloidal liquid and fine particles of aluminum oxide, zirconium oxide, titanium oxide, cerium oxide, and antimony oxide.

From the viewpoint of corrosion resistance and weldability, a preferred range of coating weight of the above-described component ($\alpha$) is from 0.01 to 3,000 $mg/m^2$, more preferably from 0.1 to 1,000 $mg/m^2$, and most preferably from 1 to 500 $mg/m^2$.

As for the specific alkali earth metal components (Mg, Ca, Sr, Ba), which are the above-described component ($\beta$), one or more of these alkali earth metals are necessary to be contained in the coating. The form of these alkali earth metals existing in the coating is not specifically limited, and they may exist in a form of metal, or compound or composite compound of their oxide, hydroxide, hydrated oxide, phosphoric acid compound, coordination compound, or the like. The ionicity and solubility of these compound, hydroxide, hydrated oxide, phosphoric acid compound, coordination compound, or the like are not specifically limited.

Among those alkali earth metals, it is most preferable to use Mg to obtain particularly superior corrosion resistance. The presumable reason of significant increase in corrosion resistance by the addition of Mg is that Mg shows lower solubility of its hydroxide than other alkali earth metals, thus likely forming slightly soluble salt.

The method to introduce the component ($\beta$) into coating may be the addition of phosphate, sulfate, nitrate, chloride, or the like of Mg, Ca, Sr, Ba to the coating composition.

From the standpoint of prevention of degradation in corrosion resistance and in coating appearance, a preferred range of coating weight of the above-described ($\beta$) is from 0.01 to 1,000 $Mg/m^2$ as metal, more preferably from 0.1 to 500 $mg/m^2$, and most preferably from 1 to 100 $mg/m^2$.

The phosphoric acid and/or phosphoric acid compound as the above-described component ($\gamma$) may be blended by adding orthophosphoric acid, pyrophosphoric acid, polyphosphoric acid, or metallic salt or compound of them to the coating composition.

There is no specific limitation on the form of existing phosphoric acid and phosphoric acid compound in the coating, and they may be crystals or non-crystals. Also there is no specific limitation on the ionicity and solubility of phosphoric acid and phosphoric acid compound in the coating.

From the viewpoint of corrosion resistance and weldability, a preferred range of coating weight of the above-described component ($\gamma$) is from 0.01 to 3,000 $mg/m^2$ as $P_2O_5$, more preferably from 0.1 to 1,000 $mg/m^2$, and most preferably from 1 to 500 $mg/m^2$.

The composite oxide coating may further contain an organic resin for improving workability and corrosion resistance of the coating. Examples of the organic resin are epoxy resin, polyurethane resin, polyacrylic resin, acrylic-ethylene copolymer, acrylic-styrene copolymer, alkyd resin, polyester resin, polyethylene resin. These resins may be introduced into the coating in a form of water-soluble resin or water-dispersible resin.

Adding to these water type resins, it is effective to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

For further improving the corrosion resistance, the composite oxide coating may further contain polyphosphate, phosphate (for example, zinc phosphate, aluminum dihydrogen phosphate, and zinc phosphate), molybdate, phospo molybdate (for example, aluminum phosphomolybdate), organic phosphate and its salt (for example, phytic acid, phytiate, phosphonic acid, phosphonate, their metal salt and alkali metal salt), organic inhibitor (for example, hydrazine derivative, thiol compound, dithiocarbamate), organic compound (polyethyleneglycol), and the like.

Other applicable additives include organic coloring pigments (for example, condensing polycyclic organic pigments, phthalocyanine base organic pigments), coloring dyes (for example, azo dye soluble inorganic solvent, azo metal dye soluble in water), inorganic pigments (titaniumoxide), chelating agents (for example, thiol), conductive pigments (for example, metallic powder of zinc, aluminum, nickel, or the like, iron phosphide, antimonydope type tin oxide), coupling agents (for example, silane coupling agent and titanium coupling agent), melaminecyanuric acid additives.

The composite oxide coating may contain one or more of iron group metallic ions (Ni ion, Co ion, Fe ion) to prevent blackening (an oxidizing phenomenon appeared on plating surface) under a use environment of organic coating steel sheets. As of these ions, addition of Ni ion is most preferable. In that case, concentration of the iron base metallic ion of 1/10,000 mole per 1 mole of the component ($\beta$), converted to the metal amount in the target composition, gives satisfactory effect. Although the upper limit of the iron group ion is not specifically limited, it is preferable to select a concentration level thereof not to give influence to the corrosion resistance.

A preferable range of the thickness of the composite oxide coating is from 0.005 to 3 $\mu m$, more preferably from 0.01 to 2 $\mu m$, further preferably from 0.1 to 1 $\mu m$, and most preferably from 0.2 to 0.5 $\mu m$. If the thickness of the composite oxide coating is less than 0.005 $\mu m$, the corrosion resistance degrades. If the thickness of the composite oxide coating exceeds 3 $\mu m$, conductive performance such as weldability degrades. When the composite oxide coating is specified in terms of coating weight, it is adequate to specify the sum of coating weight of the above-described component ($\alpha$), the above-described component ($\beta$) converted to metal amount, and the above-described component ($\gamma$) converted to $P_2O_5$, to a range of from 6 to 3,600 mg/m², more preferably from 10 to 1,000 mg/m², and most preferably from 50 to 500 mg/m². If the total coating weight is less than 6 mg/m², the corrosion resistance degrades. If the total coating weight exceeds 3,600 mg/m, the conductive performance such as weldability degrades.

To attain particularly superior performance of the present invention, it is preferable that the above-described oxide coating comprises: $SiO_2$ fine particles as the component (α) at a specific coating weight; one or more of magnesium components selected from the group consisting of Mg, a compound containing Mg, and a composite compound containing Mg, as the component (β) at a specific coating weight; and phosphoric acid and/or phosphoric acid compound as the component (γ) at a specific coating weight.

The preferred condition for $SiO_2$ fine particles as the above-described component (α) was described before.

A preferred range of the coating weight of the $SiO_2$ fine particles in the coating is from 0.01 to 3,000 mg/m² as $SiO_2$, more preferably from 0.1 to 1,000 mg/m², further preferably from 1 to 500 mg/m², and most preferably from 5 to 100 mg/m².

If the coating weight of $SiO_2$ fine particles is less than 0.01 mg/m² as $SiO_2$, the contribution of the silicon component emitted from silicon oxide to the corrosion resistance becomes small to fail in attaining sufficient corrosion resistance. If the coating weight of $SiO_2$ fine particles exceeds 3,000 mg/m² as $SiO_2$, the conductive performance such as weldability degrades.

Introduction of the above-described component (α) into the coating may be done by adding a silicic acid sol such as colloidal silica to the film-forming composition. Examples of preferred colloidal silica are described before.

The form of magnesium component as the above-described component (β) existing in the coating is not specifically limited, and it may be metal, or compound or composite compound such as oxide, hydroxide, hydrated oxide, phosphoric acid compound, coordination compound. The ionicity and solubility of these compound, hydroxide, hydrated oxide, phosphoric acid compound, coordination compound, or the like are not specifically limited.

A preferable range of the coating weight of the magnesium component in the coating is from 0.01 to 1,000 mg/m² as Mg, more preferably from 0.1 to 500 mg/m², and most preferably from 1 to 100 mg/m².

If the coating weight of magnesium component is less than 0.01 mg/m² as Mg, the contribution of the magnesium component to the corrosion resistance becomes small to fail in attaining sufficient corrosion resistance. If the coating weight of magnesium component exceeds 1,000 mg/m² as Mg, the excess amount of magnesium exists as a soluble component, which degrades the appearance of the coating.

Introduction of the above-described component (β) into the coating may be done by adding phosphate, sulfate, nitrate, chloride of magnesium, or magnesium oxide fine particles, to the film-forming composition.

In particular, the composite oxide according to the present invention contains phosphoric acid as a constitution component, it is preferable to add a phosphate such as magnesium phosphate to the target composition. In that case, the form of magnesium phosphate is not specifically limited, and it may be orthophosphate, pyrophosphate, tripolyphosphate, phosphate, hypophosphate.

For the methods and the forms in the coating of phosphoric acid and/or phosphoric acid compound as the above-described component (γ), there is no specific limitation as described before.

In the composite oxide coating, since the phosphoric acid component coexists with a magnesium component, the form of phosphoric acid compound in the coating may be phosphate or condensing phosphate of magnesium phosphate. Methods to introduce those phosphoric acid compounds into the coating may be the addition of phosphate or organic phosphoric acid or its salt (for example, phytic acid, phytiate, phosphonic acid, phosphonate, their metal salt) to the target composition.

A preferable range of coating weight of phosphoric acid and/or phosphoric acid compound in the coating is from 0.01 to 3,000 mg/m² as $P_2O_5$, more preferably from 0.1 to 1,000 mg/m², and most preferably from 1 to 500 mg/m².

If the coating weight of phosphoric acid and/or phosphoric acid compound is less than 0.01 mg/m² as $P_2O_5$, the corrosion resistance degrades. If the coating weight of phosphoric acid and/or phosphoric acid compound exceeds 3,000 mg/m² as $P_2O_5$, the conductive performance degrades and the weldability degrades.

To attain particularly superior corrosion resistance, it is preferred to select the ratio of the magnesium component as the component (β) to the $SiO_2$ fine particles as the component (α) in the composite oxide coating to a range of from 1/100 to 100/1 the molar ratio of the component(β)as Mg to the component (α) as $SiO_2$, or [Mg/$SiO_2$], more preferably from 1/10 to 10/1, and most preferably from 1/2 to 5/1.

The reason of giving particularly superior corrosion resistance when the ratio of coating weight of magnesium to $SiO_2$ fine particles is selected to the range given above is not fully analyzed. It is, however, speculated that, when the ratio of the magnesium component to the $SiO_2$ fine particles falls in the range given above, the synergy effect of the corrosion-suppressing actions of each of the silicon component emitted from the $SiO_2$ fine particles and the magnesium component markedly appears.

From the similar viewpoint, it is preferred to select the ratio of the phosphoric acid and/or phosphoric acid compound as the component (γ) to the magnesium component as the component (β) in the composite oxide coating to a range of from 1/100 to 100/1 as the molar ratio of the component (α) as $P_2O_5$ to the component (β) as Mg, or [$P_2O_5$/Mg], more preferably from 1/10 to 10/1, and most preferably from 1/2 to 2/1.

The reason of giving particularly superior corrosion resistance when the ratio of coating weight of phosphoric acid and/or phosphoric acid compound to magnesium is selected to the range given above is not fully analyzed. It is, however, speculated that, when the ratio of the phosphoric acid and/or phosphoric acid compound to the magnesium component falls in the range given above, the synergy effect of the corrosion-suppressing actions of each of the phosphoric acid and/or phosphoric acid compound and the magnesium component markedly appears.

To obtain most excellent corrosion resistance, it is preferred to select the ratio of the magnesium component as the component (β) and the $SiO_2$ fine particles as the component (α) in the composite oxide coating to a range of from 1/100 to 100/1 as the molar ratio of the component (β) as Mg to the component (α) as $SiO_2$, or [Mg/$SiO_2$], more preferably from 1/10 to 10/1, and most preferably from 1/2 to 5/1, further to select the ratio of the phosphoric acid and/or phosphoric acid compound as the component (γ) to the magnesium component as the component (β) in the composite oxide coating to a range of from 1/100 to 100/1 as the molar ratio of the component (γ) as $P_2O_5$ to the component (β) as Mg, or [$P_2O_5$/Mg], more preferably from 1/10 to 10/1, and most preferably from 1/2 to 2/1.

The reason of giving most excellent corrosion resistance when the ratio of magnesium component, $SiO_2$ fine particles, and phosphoric acid and/or phosphoric acid compound is selected to the range given above is presumably explained by the significant synergy effect of corrosion-suppressing actions of each component, as described above, and by the optimization of coating mode resulted from the reaction with base material for plating during the film-forming period.

A preferred range of the total coating weight in the composite oxide coating, or the sum of the coating weight of the above-described component ($\alpha$) as $SiO_2$, the coating weight of the above-described component ($\beta$) as Mg, and the coating weight of the above-described component ($\gamma$) as $P_2O_5$, is from 6 to 3,600 $mg/m^2$, more preferably from 10 to 1,000 $mg/m^2$, and most preferably from 50 to 500 $mg/m^2$. If the total coating weight is less than 6 $mg/m^2$, the corrosion resistance becomes insufficient. If the total coating weight exceeds 3,600 $mg/m^2$, the conductive performance such as weldability degrades.

The following is the description about the organic coating formed as the secondary layer coating on the above-described oxide coating.

According to the present invention, the organic coating formed on the above-described composite oxide coating contains a product of reaction between a film-forming organic resin (A) and an active-hydrogen-laden compound (B), a part or whole of which compound (B) consists of a hydrazine derivative (C) containing active hydrogen, and at need, further contains additives such as rust-preventive agent at an adequate amount, which organic coating has a thickness in a range of from 0.1 to 5 $\mu$m.

The kinds of film-forming organic resin (A) are not specifically limited if only the resin reacts with the active-hydrogen-laden compound (B), a part or whole of which compound (B) consists of a hydrazine derivative (C) containing active hydrogen, to bind the active-hydrogen-laden compound (B) with the film-forming organic resin by addition or condensation reaction, and adequately form the coating.

Examples of the film-forming organic resin (A) are epoxy resin, modified epoxy resin, polyurethane resin, polyester resin, alkyd resin, acrylic base copolymer resin, polybutadiene resin, phenol resin, and adduct or condensate thereof. These resins may be applied separately or blending two or more of them.

From the standpoint of reactivity, readiness of reaction, and corrosion-prevention, an epoxy-group-laden resin (D) in the resin is particularly preferred as the film-forming organic resin (A). The epoxy-group-laden resin (D) has no specific limitation if only the resin reacts with an active-hydrogen-laden compound (B), a part or whole of which compound (B) consists of a hydrazine derivative (C) containing active hydrogen, to bind with the active hydrogen-laden compound (B) by addition or condensation reaction, and adequately form the coating. Examples of the epoxy-group-laden resin (D) are epoxy resin, modified epoxy resin, acrylic base copolymer resin copolymerized with an epoxy-group-laden monomer, polybutadiene resin containing epoxy group, polyurethane resin containing epoxy group, and adduct or condensate of these resins. These resins may be applied separately or blending two or more of them together.

From the point of adhesiveness with plating surface and of corrosion resistance, epoxy resin and modified epoxy resin are particularly preferred among these epoxy-group-laden resins (D).

Examples of the above-described epoxy resins are: aromatic epoxy resins prepared by reacting a polyphenol such as bisphenol A, bisphenol F, and novorak type phenol with epihalohydrin such as epychlorohydrin followed by introducing glycidyl group thereinto, or further by reacting a polyphenol with thus obtained product containing glycidyl group to increase the molecular weight; aliphatic epoxy resin, and alicyclic epoxy resin. These resins may be applied separately or blending two or more of them together. If film-formation at a low temperature is required, the epoxy resins preferably have number-average molecular weights of 1500 or more.

The above-described modified epoxy resin may be a resin prepared by reacting epoxy group or hydroxyl group in one of the above-given epoxy resins with various kinds of modifying agents. Examples of the modified epoxy resin are epoxy-ester resin prepared by reacting with a drying oil fatty acid, epoxy-acrylate resin prepared by modifying with a polymerizable unsaturated monomer component containing acrylic acid or methacrylic acid, and urethane-modified epoxy resin prepared by reacting with an isocyanate compound.

Examples of the above-described acrylic base copolymer resin which is copolymerized with the above-described epoxy-group-laden monomer are the resins which are prepared by solution polymerization, emulsion polymerization, or suspension polymerization of an unsaturated monomer containing epoxy group with a polymerizable unsaturated monomer component containing acrylic acid ester or methacrylic acid ester as the essential ingredient.

Examples of the above-described unsaturated monomer component are: C1–24 alkylester of acrylic acid or methacrylic acid, such as methyl(meth)acrylate, ethyl(meth)acrylate, propyl(meth)acrylate, n-iso- or tert-butyl(meth)acrylate, hexyl(meth)acrylate, 2-ethylhexyl(meth)acrylate, decyl(meth)acrylate, lauryl(meth)acrylate; C1–4 alkylether compound of acrylic acid, methacrylic acid, styrene, vinyltoluene, acrylamide, acrylonitrile, N-methylol(meth)acrylamide; and N,N-diethylaminoethylmethacryiate.

The unsaturated monomer having epoxy group has no special limitation if only the monomer has epoxy group and polymerizable unsaturated group, such as glycidylmethacrylate, glycidylacrylate, 3,4-epoxycyclohexylmethyl(meth)acrylate.

The acrylic base copolymer resin which was copolymerized with the epoxy-group-laden monomer may be a resin which is modified by polyester resin, epoxy resin, or phenol resin.

A particularly preferred epoxy resin described above is a resin having a chemical structure represented by formula (1) given below, which resin is a product of the reaction between bisphenol A and epihalohydrin. The epoxy resin is preferred because of superior corrosion resistance.

Chemical Formula

The method for manufacturing that kind of bisphenol A type epoxy resin is widely known in the industry concerned. In the above-given chemical formula, q value is in a range of from 0 to 50, preferably from 1 to 40, more preferably from 2 to 20.

The film-forming organic resin (A) may be either organic solvent dissolving type, organic solvent dispersing type, water dissolving type, or water dispersing type.

According to the present invention, a hydrazine derivative is introduced into the molecules of the film-forming organic resin (A). To do this, at least a part of the active-hydrogen-laden compound (B), (preferably whole thereof), is necessary to be a hydrazine derivative (C) containing active hydrogen.

When the film-forming organic resin (A) is an epoxy-group-laden resin, examples of the active-hydrogen-laden compound (B) reacting with the epoxy group are listed below. One or more of these compounds (B) may be applied. Also in that case, at least a part of the active-hydrogen-laden compound (B), (preferably whole thereof), is necessary to be a hydrazine derivative (C) containing active hydrogen.

A hydrazine derivative containing active hydrogen

A primary or secondary amine compound containing active hydrogen

An organic acid such as ammonia and carboxylic acid

A halogenated hydrogen such as hydrogen chloride

An alcohol, a thiol

A hydrazine derivative containing no active hydrogen or a quaternary chlorinating agent which is a mixture with a ternary amine.

Examples of the above-described hydrazine derivative (C) containing active hydrogen are the following.
1) hydrazide compound such as carbohydrazide, propionic acid hydrazide, salicylic acid hydrazide, adipic acid hydrazide, sebacic acid hydrazide, dodecanic acid hydrazide, isophtharic acid hydrazide, thiocarbohydrazide, 4,4'-oxy-bis-benzenesulfonyl hydrazide, benzophenone hydrazone, amino-polyacrylamide hydrazide;
2) pyrazole compound such as pyrazole, 3,5-dimethylpyrazole, 3-methyl-5-pyrazolone, 3-amino-5-methylpyrazole;
3) triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (mono hydrate), 6-methyl-8-hydroxytriazolopyridazine, 6-phenyl-8-hydroxytriazolopyrydazine, 5-hydroxy-7-methyl-1,3,8-triazaindolizine;
4) tetrazole compound such as 5-phenyl-1,2,3,4-tetrazole, 5-mercapto-1-phenyl-1,2,3,4-tetrazole;
5) thiadiazole compound such as 5-amino-2-merdapto-1,3,4-thiadiazole, 2,5-dimercapto-1,3,4-thiadiazole;
6) pyridazine compound such as maleic acid hydrazide, 6-methyl-3-pyridazone, 4,5-dichloro-3-pyridazone, 4,5-dibromo-3-pyridazone, 6-methyl-4,5-dihydro-3-pyridazone.

Among these compounds, particularly preferred ones are pyrazole compound and triazole compound which have cyclic structure of five- or six-membered ring and which have nitrogen atom in the cyclic structure.

These hydrazine derivatives may be applied separately or blending two or more of them together.

Examples of above-described amine compound having active hydrogen, which can be used as a part of the active-hydrogen-laden compound (B) are the following.
1) a compound prepared by heating to react a primary amino group of an amine compound containing a single secondary amino group of diethylenetriamine, hydroxylaminoethylamine, ethylaminoethylamine, methylaminopropylamine, or the like and one or more of primary amino group, with ketone, aldehyde, or carboxylic acid, at, for example, approximate temperatures of from 100 to 230° C. to modify them to aldimine, ketimine, oxazoline, or imidazoline;
2) a secondary monoamine such as diethylamine, diethanolamine, di-n- or -iso-propanolamine, N-methylethanolamine, N-ethylethanolamine;
3) a secondary-amine-laden compound prepared by Michael addition reaction through the addition of monoalkanolamine such as monoethanolamine to dialkyl(meth) acrylamide;
4) a compound prepared by modifying a primary amino group of alkanolamine such as monoethanolamine, neopentanolamine, 2-aminopropanol, 3-aminopropanol, 2-hydroxy-2'(aminopropoxy)ethylether to ketimine.

As for the above-described quaternary chlorinating agents which are able to be used as a part of the active-hydrogen-laden compound (B), the hydrazine derivative having active hydrogen or ternary amine has no reactivity with epoxy group as it is. Accordingly, they are mixed with an acid to make them reactive with epoxy group. The quaternary chlorinating agent reacts with epoxy group with the presence of water, at need, to form a quaternary salt with the epoxy-group-laden resin.

The acid used to obtain the quaternary chlorinating agent may be organic acid such as acetic acid and lactic acid, or inorganic acid such as hydrochloric acid. The hydrazine derivative containing no active hydrogen, which is used to obtain quaternary chlorinating agent may be 3,6-dichloropyridazine. The ternary amine may be dimethylethanolamine, triethylamine, trimethylamine, tri-isopropylamine, methyldiethanolamine.

The product of the reaction between the film-forming organic resin (A) and the active-hydrogen-laden compound (B) a part of or whole of which consists of a hydrazine derivative (C) containing active hydrogen, may be prepared by reacting the film-forming organic resin (A) with the active-hydrogen-laden compound (B) at temperatures of from 10 to 300° C., preferably from 50 to 15° C., for about 1 to about 8 hours.

The reaction may be carried out adding an organic solvent. The kind of adding organic solvent is not specifically limited. Examples of the organic solvent are: ketone such as acetone, methyethylketone, methylisobutylketone, dibutylketone, cyclohexanone; alcohol or ether having hydroxyl group, such as ethanol, butanol, 2-ethylhexylalcohol, benzylalcohol, ethyleneglycol, ethyleneglycol mono-isopropylether, ethyleneglycol monobutylether, ethyleneglycol monohexylether, propyleneglycol, propyleneglycol monomethylether, diethyleneglycol, diethyleneglycol monoethylether, diethyleneglycol monobutylether; ester such as ethylacetate,. butylacetate, ethyleneglycol monobutylether acetate; and aromatic hydrocarbon such as toluene and xylene. These compounds may be applied separately or blending two or more of them together. Among them, from the viewpoint of solubility and coating film-forming performance with epoxy resin, ketone group or ether group solvents are particularly preferred.

The blending ratio of the film-forming organic resin (A) and the active-hydrogen-laden compound (B), a part or whole of which compound consists of a hydrazine derivative (C) containing active hydrogen, is in a range of from 0.5 to 20 part by weight of the active-hydrogen-laden compound (B), more preferably from 1.0 to 10 parts by weight, to 100 parts by weight of the film-forming organic resin (A).

When the film-forming organic resin (A) is an epoxy-group-laden resin (D), the blending ratio of the epoxy-group-laden resin (D) to the active-hydrogen-laden compound (B) is preferably, from the viewpoint of corrosion resistance and other performance, in a range of from 0.01 to 10 as the ratio of the number of active hydrogen groups in the active-hydrogen-laden compound (B) to the number of epoxy groups in the epoxy-group-laden resin (D), or [the number of active hydrogen groups/the number of epoxy groups], more preferably from 0.1 to 8, most preferably from 0.2 to 4.

A preferred range of hydrazine derivative (C) containing active hydrogen in the active-hydrogen-laden compound (B)

is from 10 to 100 mole %, more preferably from 30 to 100 mole %, and most preferably from 40 to 100 mole %. If the rate of hydrazine derivative (C) containing active hydrogen is less than 10 mole %, the organic coating fails to have satisfactory rust-preventive function, thus the obtained rust-preventive effect becomes similar with the case of simple blending of a film-forming organic resin with a hydrazine derivative.

To form a dense barrier coating according to the present invention, it is preferable that a curing agent is blended into the resin composition, and that the organic coating is heated to cure.

Suitable methods for curing to form a resin composition coating include (1) a curing method utilizing a urethanation reaction between isocyanate and hydroxide group in the base resin, and (2) a curing method utilizing an ether reaction between hydroxide group in the base resin and an alkyletherified amino resin which is prepared by reacting between a part of or whole of a methylol compound which is prepared by reacting formaldehyde with one or more of melamine, urea, and benzoguanamine, and a C1–5 primary alcohol. As of these methods, particularly preferred one is to adopt a urethanation reaction between isocyanate and hydroxyl group in the base resin as the main reaction.

The polyisocyanate compound used in the curing method (1) described above is a compound prepared by partially reacting an aliphatic, alicyclic (including heterocyclic), or aromatic isocyanate compound, or a compound thereof using a polyhydric alcohol. Examples of that kind of polyisocyanate compound are the following.

1) m- or p-phenylene diisocyanate, 2,4- or 2,6-trilene diisocyanate, o- or p-xylylene diisocyanate, hexamethylene diisocyanate, dimer acid diisocyanate, isophorone diisocyanate;
2) a compound of product of reaction between separate or mixture of the compounds given in 1) with a polyhydric alcohol (for example, a dihydric alcohol such as ethyleneglycol and propyleneglycol, a trihydric alcohol such as glycerin and trimethylolpropane, a tetrahydric alcohol such as pentaerythritol, and hexahydric alcohol such as sorbitol and dipentaerythritol) leaving at least two isocyanate within a molecule.

These isocyanate compounds may be used separately or mixing two or more of them together.

Examples of protective agent (blocking agent) of the polyisocyanate compound are the following.
1) Aliphatic monoalcohol such as methanol, ethanol, propanol, butanol, octylalcohol;
2) Monoether of ethyleneglycol and/or diethyleneglycol, for example, monoether of methyl, ethyl, propyl (n-, iso-), butyl (n-, iso-, sec-);
3) Aromatic alcohol such as phenol and cresol;
4) Oxime such as acetoxime and methylethylketone oxime.
Through reaction between one or more of these compounds with above-described polyisocyanate compound, a polyisocyanate compound thus obtained is stably protected at least at normal temperature.

It is preferable to blend that kind of polyisocyanate compound (E) with a film-forming organic resin (A) as the curing agent at a range of (A)/(E)=95/5 to 55/45 (weight ratio of non-volatile matter), more preferably (A)/(E)=90/10 to 65/35. Since polyisocyanate compounds have water-absorbing property, blending of the compound at ratios above (A)/(E)=55/45 degrades the adhesiveness of the organic coating. If top coating is given on the organic coating, unreacted polyisocyanate compound migrates into the coating film to induce hindrance of curing or insufficient adhesiveness of the coating film. Accordingly, the blending ratio of the polyisocyanate compound (E) is preferably not more than (A)/(E)=55/45.

The film-forming organic resin (A) is fully cross-linked by the addition of above-described cross-linking agent (curing agent). For further increasing the cross-linking performance at a low temperature, it is preferable to use a known catalyst for enhancing curing. Examples of the curing-enhancing catalyst are N-ethylmorpholine, dibutyltin dilaurate, cobalt naphthenate, tin(II)chloride, zinc naphthenate, and bismuth nitrate.

When an epoxy-group-laden resin is used as the film-forming organic resin (A), the epoxy-group-laden resin may be blended with a known resin such as that of acrylic, alkyd, and polyester to improve the physical properties such as adhesiveness to some extent.

According to the present invention, the organic coating may be blended with ion-exchanged silica (a) and/or fine particle silica (b) as the rust-preventive additive.

The ion-exchanged silica is prepared by fixing metallic ion such as calcium and magnesium ions on the surface of porous silica gel powder. Under a corrosive environment, the metallic ion is released to form a deposit film. Among these ion-exchanged silicas, Ca ion-exchanged silica is most preferable.

Any type of Ca ion-exchanged silica may be applied. A preferred range of average particle size of Ca ion-exchanged silica is 6 $\mu$m or less, more preferably 4 $\mu$m or less. For example, Ca ion-exchanged silica having average particle sizes of from 2 to 4 $\mu$m may be used. If the average particle size of Ca ion-exchanged silica exceeds 6 $\mu$m, the corrosion resistance degrades and the dispersion stability in the coating composition degrades.

A preferred range of Ca concentration in the Ca ion-exchanged silica is 1 wt. % or more, more preferably from 2 to 8 wt. %. If the Ca concentration is below 1 wt. %, the rust-preventive effect by the Ca release becomes insufficient.

Surface area, pH, and oil-absorbance of the Ca ion-exchanged silica are not specifically limited.

Examples of the above-described Ca ion-exchanged silica are: SHIELDEX C303 (trade name) (average particle sizes of from 2.5 to 3.5 $\mu$m; Ca concentration of 3 wt. %; manufactured by W. R. Grace & Co.), SHIELDEX AC3 (trade name) (average particle sizes of from 2.3 to 3.1 $\mu$m; Ca concentration of 6 wt. %), SHIELDEX AC5 (trade name) (average particle sizes of from 3.8 to 5.2 $\mu$m; Ca concentration of 6 wt. %); SHIELDEX (trade name) (average particle size of 3 $\mu$m; Ca concentrations of from 6 to 8 wt. %), SHIELDEX SY710 (trade name) (average particle sizes of from 2.2 to 2.5 $\mu$m; Ca concentrations of from 6.6 to 7.5 wt. %, manufactured by Fuji Silisia Chemical Co., Ltd.)

The rust-preventive mechanism in the case of addition of ion-exchanged silica ($\alpha$) to organic coating is described above. Particularly according to the present invention, markedly excellent corrosion preventive effect is attained by combining a specific chelate-modified resin which is the film-forming organic resin with an ion-exchanged silica, thus inducing the combined effect of the corrosion-suppression effect of the chelate-modified resin at the anodic reaction section with the corrosion-suppression effect of the ion-exchanged silica at the cathodic reaction section.

A preferred range of blending ratio of the ion-exchanged silica (a) in the organic resin coating is 1 to 100 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 5 to 80 parts by weight (solid matter), and most preferably from 10 to 50 parts by weight (solid matter). If the blending ratio of the ion-exchanged silica (a) becomes less than 1 part by weight, the effect of improved corrosion resistance after alkaline degreasing becomes small. If the blending ratio of the ion-exchanged silica (a) exceeds 100 parts by weight, the corrosion resistance degrades, which is unfavorable.

The fine particle silica (b) may be either colloidal silica or fumed silica. When a water-type film-forming resin is used as the base resin, examples of applicable colloidal silica are: SNOWTEX O. SNOWTEX N, SNOWTEX 20, SNOWTEX 30, SNOWTEX 40, SNOWTEX C, SNOWTEX S (trade names) manufactured by Nissan Chemical Industries, Ltd.; CATALOID S. CATALOID SI-35, CATALOID SI-40, CATALOID SA, CATALOID SN (trade names) manufactured by Catalysts & Chemicals Industries Co., Ltd.; ADELITE AT-20-50, ADELITE AT-20N, ADELITE AT-300, ADELITE AT-300S, ADELITE AT-20Q (trade names) manufactured by Asahi Denka Kogyo, KK.

When a solvent-type film-forming resin is used as the base resin, examples of applicable colloidal silica are: ORGANOSILICA SOL MA-ST-M, ORGANOSILICA SOL IPA-ST, ORGANOSILICA SOL EG-ST, ORGANOSILICA SOL E-ST-ZL, ORGANOSILICA SOL NPC-ST, ORGANOSILICA SOL DMAC-ST, ORGANOSILICA SOL DMAC-ST-ZL, ORGANOSILICA SOL XBA-ST, ORGANOSILICA SOL MIBK-ST (trade names) manufactured by Nissan Chemical Industries, Ltd.; OSCAL-1132, OSCAL-1232, OSCAL-1332, OSCAL-1432, OSCAL-1532, OSCAL-1632, OSCAL-1722 (trade names) manufactured by Catalysts & Chemicals Industries Co., Ltd.

In particular, organic solvent dispersion silica sol is superior in corrosion resistance to fumed silica.

Examples of applicable fumed silica are: AEROSIL R971, AEROSIL R812, AEROSIL R811, AEROSIL R974, AEROSIL R202, AEROSIL R805, AEROSIL 130, AEROSIL 200, AEROSIL 300, AEROSIL 300CF (trade names) manufactured by Japan Aerosil Co., Ltd.

The fine particle silica contributes to forming dense and stable zinc corrosion products under a corrosive environment. Thus formed corrosion products cover the plating surface in a dense mode, thus presumably suppressing the development of corrosion.

From the viewpoint of corrosion resistance, the fine particle silica preferably has particle sizes of from 5 to 50 nm, more preferably from 5 to 20 nm, and most preferably from 5 to 15 nm.

A preferred range of blending ratio of the fine particle silica (b) in the organic resin coating is 1 to 100 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 5 to 80 parts by weight (solid matter), and most preferably from 10 to 30 parts by weight (solid matter). If the blending ratio of the fine particle silica (b) becomes less than 1 part by weight, the effect of improved corrosion resistance after alkaline degreasing becomes small. If the blending ratio of the fine particle silica (b) exceeds 100 parts by weight, the corrosion resistance and the workability degrade, which is unfavorable.

According to the present invention, markedly high corrosion resistance is attained by combined addition of an ion-exchanged silica (a) and a fine particle silica (b) to the organic coating. That is, the combined addition of ion-exchanged silica (a) and fine particle silica (b) induces above-described combined rust-preventive mechanism which gives markedly excellent corrosion-preventive effect.

The blending ratio of combined addition of ion-exchanged silica (a) and fine particle silica (b) to the organic coating is in a range of from 1 to 100 parts by weight (solid matter) of the sum of the ion-exchanged silica (a) and the fine particle silica (b), to 100 parts by weight (solid matter) of the reaction product as the resin composition for film-forming (that is, the product of reaction between the film-forming organic resin (A) and an active-hydrogen-laden compound (B) a part of or whole of which consists of a hydrazine derivative (C) containing active hydrogen), preferably from 5 to 80 parts b y weight (solid matter). Further the weight ratio of blending amount (solid matter) of the ion-exchanged silica (a) to the fine particle silica (b), (a)/(b), is selected to a range of from 99/1 to 1/99, preferably from 95/5 to 40/60, more preferably from 90/10 to 60/40.

If the weight ratio of the ion-exchanged silica (a) and the fine particle silica (b) is less than 1 part by weight, the effect of improved corrosion resistance after alkaline degreasing becomes small. If the blending ratio of sum of the ion-exchanged silica (a) and the fine particle silica (b) exceeds 100 parts by weight, the coatability and the weldability degrade, which is unfavorable.

If the weight ratio of the ion-exchanged silica (a) to the fine particle silica (b), (a)/(b), is less than 1/99, the corrosion resistance degrades. If the weight ratio of the ion-exchanged silica (a) to the fine particle silica (b), (a)/(b), exceeds 99/1, the effect of combined addition of the ion-exchanged silica (a) and the fine particle silica (b) cannot fully be attained.

Adding to the above-described rust-preventive agents, the organic coating may contain other corrosion-suppressing agent such as polyphosphate (for example, aluminum polyphosphate such as TEIKA K-WHITE 82, TEIKA K-WHITE 105, TEIKA K-WHITE G105, TEIKA K-WHITE Ca650 (trade marks) manufactured by TEIKOKU KAKO CO.), phosphate (for example, zinc phosphate, aluminum dihydrogenphosphate, zinc phosphate), molybdenate, phosphomolybdenate (for example, aluminum phosphomolybdenate), organic phosphoric acid and its salt (for example, phytic acid, phytiate, phosphonic acid, phosphonate, their metal salt and alkali metal salt, alkali earth metal salt), organic inhibitor (for example, hydrazine derivative, thiol compound).

The organic coating may, at need, further include a solid lubricant (c) to improve the workability of the coating.

Examples of applicable solid lubricant according to the present invention are the following.

(1) Polyolefin wax, paraffin wax: for example, polyethylene wax, synthetic paraffin, natural paraffin, microwax, chlorinated hydrocarbon;

(2) Fluororesin fine particles: for example, polyfluoroethylene resin (such as polytetrafluoroethylene resin), polyvinylfluoride resin, polyvinylidenefluoride resin.

In addition, there may be applied fatty acid amide base compound (such as stearic acid amide, palmitic acid amide, methylene bis-stearoamide, ethylene bis-stearoamide, oleic acid amide, ethyl acid amide, alkylene bis-fatty acid amide), metallic soap (such as calcium stearate, lead stearate, calcium laurate, calcium palmate), metallic sulfide (molybdenum disulfide, tungsten disulfide), graphite, graphite fluoride, boron nitride, polyalkyleneglycol, and alkali metal sulfate.

Among those solid lubricants, particularly preferred ones are polyethylene wax, fluororesin fine particles (particularly poly-tetrafluoroethylene resin fine particles).

Applicable polyethylene wax include: SHERIDUST 9615A, SHERIDUST 3715, SHERIDUST 3620, SHERIDUST 3910 (trade names) manufactured by Hoechst Co., Ltd.; SUNWAX 131-P, SUNWAX 161-P (trade names) manufactured by Sanyo Chemical Industries, Ltd.; CHEMIPEARL W-100, CHEMIPEARL W-200, CHEMIPEARL W-500, CHEMIPEARL W-800, CHEMIPEARL W-956 (trade names) manufactured by Mitsui Petrochemical Industries, Ltd.

A most preferred fluororesin fine particle is tetrafluoroethylene fine particle. Examples of the fine particles are LUBRON L-2, LUBRON L-5 (trade names) manufactured by Daikin Industries, Ltd.; MP 1100, MP 1200 (trade names; manufactured by Du Pont-Mitsui Company, Ltd.); FLUON DISPERSION AD1, FLUON DISPERSION AD2, FLUON L141J, FLUON L150J, FLUON L155J (trade names) manufactured by Asahi ICI Fluoropolymers Co., Ltd.

As of these compounds, combined use of polyolefin wax and tetrafluoroethylene fine particles is expected to provide particularly excellent lubrication effect.

A preferred range of blending ratio of the solid lubricant (c) in the organic resin coating is from 1 to 80 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 3 to 40 parts by weight (solid matter). If the blending ratio of the solid lubricant (c) becomes less than 1 part by weight, the effect of lubrication is small. If the blending ratio of the solid lubricant (c) exceeds 80 parts by weight, the painting performance degrade, which is unfavorable.

The organic coating of the organic coating steel sheet according to the present invention normally consists mainly of a product (resin composition) of reaction between a film-forming organic resin (A) and an active-hydrogen-laden compound (B) a part of or whole of which consists of a hydrazine derivative (C) containing active hydrogen). And, at need, an ion-exchanged silica (a), a fine particle silica (b), a solid lubricant (c), and a curing agent may further be added to the organic coating. Furthermore, at need, there may be added other additives such as organic coloring pigment (for example, condensing polycyclic organic pigment, phthalocyanine base organic pigment), coloring dye (for example, azo dye soluble in organic solvent, azo metal dye soluble in water), inorganic pigment (for example, titanium oxide), chelating agent (for example, thiol), conductive pigment (for example, metallic powder of zinc, aluminum, nickel, or the like, iron phosphide, antimony-dope type tin oxide), coupling agent (for example, silane coupling agent and titanium coupling agent), melamine-cyanuric acid additive.

The paint composition for film-formation containing above-described main component and additive components normally contains solvent (organic solvent and/or water), and, at need, further a neutralizer or the like is added.

Applicable organic solvent described above has no specific limitation if only it dissolves or disperses the product of reaction between the above-described film-forming organic resin (A) and the active-hydrogen-laden compound (B), and adjusts the product as the painting composition. Examples of the organic solvent are the organic solvents given above as examples.

The above-described neutralizers are blended, at need, to neutralize the film-forming organic resin (A) to bring it to water-type. When the film-forming organic resin (A) is a cationic resin, acid such as acetic acid, lactic acid, and formic acid may be used as the neutralizer.

The organic coatings described above are formed on the above-described composite oxide coating.

The dry thickness of the organic coating is in a range of from 0.1 to 5 $\mu$m, preferably from 0.3 to 3 $\mu$m, and most preferably from 0.5 to 2 $\mu$m. If the thickness of the organic coating is less than 0.1 $\mu$m, the corrosion resistance becomes insufficient. If the thickness of the organic coating exceeds 5 $\mu$m, the conductivity and the workability degrade.

The following is the description about the method for manufacturing an organic coating steel sheet according to the present invention.

The organic coating steel sheet according to the present invention is manufactured by the steps of: treating the surface (applying a treatment liquid to the surface) of a zinc base plated steel sheet or an aluminum base plated steel sheet using a treatment liquid containing the components of above-described composite oxide coating; heating and drying the plate; applying a paint composition which contains the product of reaction between above-described film-forming organic resin (A) and an active-hydrogen-laden compound (B) a part of or whole of which consists of ahydrazine derivative (C) containing active hydrogen, which product of reaction is preferably the main component, and at need, further contains an ion-exchanged silica (a), a fine particle silica (b), and a solid lubricant (c), and the like; heating to dry the product.

The surface of the plated steel sheet may be, at need, subjected to alkaline degreasing before applying the above-described treatment liquid, and may further be subjected to preliminary treatment such as surface adjustment treatment for further improving the adhesiveness and corrosion resistance.

For treating the surface of the zinc base plated steel sheet or the aluminum base plated steel sheet with a treatment liquid and for forming a composite oxide coating thereon, it is preferred that the plate is treated by an acidic aqueous solution, at pH ranging from 0.5 to 5, containing:

(aa) oxide fine particles ranging from 0.001 to 3.0 mole/liter;

(ab) one or more of the substances selected from the group consisting of either one metallic ion of Mg, Ca, Sr, Ba; a compound containing at least one metal given above; a composite compound containing at least one metal given above; ranging from 0.001 to 3.0 mole/liter as metal given above;

(ac) phosphoric acid and/or phosphoric acid compound ranging from 0.001 to 6.0 mole/liter as $P_2O_5$; further adding, at need, above-described additive components (organic resin components, iron group metal ions, corrosion-suppression agents, other additives); then heating and drying the product.

The added components (ab) in the treatment liquid is in a range of from 0.001 to 3.0 mole/liter as metal, preferably from 0.01 to 0.5 mole/liter. If the sum of the added amount of these components is less than 0.001 mole/liter, the effect of addition cannot be fully attained. If the sum of the added amount of these components exceeds 3.0 mole/liter, these components interfere the network of coating, thus failing in forming dense coating. Furthermore, excess amount of addition of these components makes the metallic components likely elute from the coating, which results in defects such as discoloration of appearance under some environmental conditions.

As of above-given additive components (ab), Mg most significantly increases the corrosion resistance. The form of Mg in the treatment liquid may be compound or composite compound. To attain particularly excellent corrosion resistance, however, a metallic ion or a water-soluble ion form containing Mg is particularly preferred.

For supplying ion of the additive components (ab) in a form of metallic salt, the treatment liquid may contain anion such as chlorine ion, nitric acid ion, sulfuric acid ion, acetic acid ion, and boric acid ion.

It should be emphasized that the treatment liquid is an acidic aqueous solution. That is, by bringing the treatment liquid to acidic, the plating components such as zinc are readily dissolved. As a result, at the interface between the chemical conversion treatment film and the plating, a phosphoric acid compound layer containing plating components such as zinc is presumably formed, which layer strengthens the interface bonding of both sides to structure a coating having excellent corrosion resistance.

As the oxide fine particles as an additive component (aa) silicon oxide ($SiO_2$) fine particles are most preferred. The silicon oxide may be commercially available silica sol and water-dispersion type silicic acid oligomer or the like if only the silicon oxide is water-dispersion type $SiO_2$ fine particles which are stable in an acidic aqueous solution. Since, however, fluoride such as hexafluoro silicic acid is strongly corrosive and gives strong effect to human body, that kind of compound should be avoided from the point of influence to work environment.

A preferred range of blending ratio of the fine particle oxide (the blending ratio as $SiO_2$ in the case of silicon oxide) in the treating liquid is from 0.001 to 3.0 mole/liter, more preferably from 0.05 to 1.0 mole/liter, and most preferably from 0.1 to 0.5 mole/liter. If the blending ratio of the fine particle oxide becomes less than 0.001 mole/liter, the effect of addition is not satisfactory. If the blending ratio of the fine particle oxide exceeds 3.0 mole/liter, the water-resistance of coating degrades, resulting in degradation of corrosion resistance.

The phosphoric acid and/or phosphoric acid compound as the additive component (ac) includes: a mode of aqueous solution in which a compound specific to phosphoric acid, such as polyphosphoric acid such as orthophosphoric acid, pyrophosphoric acid, and tripolyphosphoric acid, methaphosphoric acid, inorganic salt of these acids (for example, primary aluminum phosphate), phosphorous acid, phosphate, phosphinic acid, phosphinate, exists in a form of anion or complex ion combined with a metallic cation which are generated by dissolving the compound in the aqueous solution; and a mode of aqueous solution in which that kind of compound exists in a form of inorganic salt dispersed therein. The amount of phosphoric acid component according to the present invention is specified by the sum of all these modes of acidic aqueous solution thereof as converted to $P_2O_5$ amount.

A preferred range of blending ratio of the phosphoric acid and/or phosphoric acid compound as $P_2O_5$ is from 0.001 to 6.0 mole/liter, more preferably from 0.02 to 1.0 mole/liter, and most preferably from 0.1 to 0.8 mole/liter. If the blending ratio of the phosphoric acid and/or phosphoric acid compound becomes less than 0.001 mole/liter, the effect of addition is not satisfactory and the corrosion resistance degrades. If the blending ratio of the phosphoric acid and/or phosphoric acid compound exceeds 6.0 mole/liter, excess amount of phosphoric acid ion reacts with the plating film under a humid environment, which enhances the corrosion of plating base material to cause discoloration and stainrusting under some corrosive environments.

For obtaining a composite oxide coating providing particularly excellent corrosion resistance, or for preparing a composite oxide coating comprising components (α), (β), and (γ) given below, and having the coating weight of the sum of these components (α), (β), and (γ) in a range of from 6 to 3,600 mg/m², it is preferable that the above-described composite oxide coating contains the additive components (aa), (ab), and (ac) in the acidic aqueous solution, further, the composite oxide coating is treated by an acidic aqueous solution of pH of from 0.5 to containing, at need, above-described additive components (organic resin component, iron group metallic ion, corrosion-suppression agent, and other additives), followed by heating and drying. The above-given composite oxide coating components (α), (β), and (γ), and the above-given additive components (a), (b), and (c) are specified below. (α) $SiO_2$ fine particles in a range of from 0.01 to 3,000 mg/m² as $SiO_2$, (β) One or more of Mg, compound containing Mg, and composite compound containing Mg in a range of from 0.01 to 1,000 mg/m² as Mg, (γ) Phosphoric acid and/or phosphoric acid compound in a range of from 0.01 to 3,000 mg/m² as $P_2O_5$;

(aa) $SiO_2$ fine particles in a range of from 0.001 to 3.0 mole/liter as $SiO_2$, preferably from 0.05 to 1.0 mole/liter, more preferably from 0.1 to 0.5 mole/liter, (ab) One or more of the substances selected from the group consisting of Mg ion, water-soluble ion containing Mg, compound containing Mg, composite compound containing Mg in a range of from 0.001 to 3.0 mole/liter as Mg, preferably from 0.01 to 0.5 mole/liter, (ac) phosphoric acid and/or phosphoric acid compound in a range of from 0.001 to 6.0 mole/liter as $P_2O_5$, preferably from 0.02 to 1.0 mole/liter, more preferably from 0.1 to 0.8 mole/liter.

The reason to specify the conditions and amount of the above-given additives (aa), (ab), and (ac) is described before.

To prepare the range of the ratio of the component (β) to the component (α) in the composite oxide coating, molar ratio [Mg/$SiO_2$], or the component (β) as Mg to the component (α) as $SiO_2$, from 1/100 to 100/1, the ratio of the additive component (ab) to the additive component (aa) in the acidic aqueous solution for forming the composite oxide coating may be adjusted to a range of from 1/100 to 100/1 as the molar ratio [Mg/$SiO_2$], or the additive component (ab) as Mg to the additive component (aa) as $SiO_2$.

To adjust the ratio of the component (β) to the component (α) in the composite oxide coating to a preferred range of from 1/10 to 10/1, more preferably from 1/2 to 5/1, as the molar ratio [Mg/$SiO_2$], or the ratio of the component (β) as Mg to the component (α) as $SiO_2$, it is adequate to adjust the ratio of the additive component (ab) to the additive component (aa) in the acidic aqueous solution for forming the composite oxide coating to a range of from 1/10 to 10/1, more preferably from 1/2 to 5/1, as the molar ratio [Mg/$SiO_2$], or the ratio of the additive component (ab) as Mg to the additive component (aa) as $SiO_2$.

To adjust the ratio of the component (γ) to the component (β) in the composite oxide coating to a range of from 1/100 to 100/1 as the molar ratio [$P_2O_5$/Mg], or the ratio of the component (γ) as $P_2O_5$ to the component (β) as Mg, it is adequate to adjust the ratio of additive component (ac) to the additive component (ab) in the acidic aqueous solution for forming the composite oxide coating to a range of from 1/100 to 100/1 as the molar ratio [$P_2O_5$/Mg] represented by the ratio of the additive component (ac) as $P_2O_5$ to the additive component (ab) as Mg.

To adjust the ratio of the component (γ) to the component (β) in the composite oxide coating to a further preferable range of from 1/10 to 10/1 as the molar ratio [$P_2O_5$/Mg], or the ratio of the component ($\gamma$) as $P_2O_5$ to the component ($\beta$) as Mg, more preferably from 1/2 to 2/1, it is adequate to adjust the ratio of additive component (ac) to the additive component (ab) in the acidic aqueous solution for forming the composite oxide coating to a range of from 1/10 to 10/1, more preferably from 1/2 to 2/1, as the molar ratio [$P_2O_5$/Mg], or the ratio of the additive component (ac) as $P_2O_5$ to the additive component (ab) as Mg.

For adjusting the ratio of the additive component (ac) to the additive component (ab) in the acidic aqueous solution for forming the composite oxide coating, it is preferable to use an aqueous solution of primary magnesium phosphate or the like which is prepared by limiting the molar ratio of the magnesium component to the phosphoric acid component, in advance, because other anionic components are prevented from existing in the treatment liquid.

On applying the aqueous solution of primary magnesium phosphate, however, lowered molar ratio [$P_2O_5$/Mg] degrades the stability of the compound in the aqueous solution. Accordingly, a suitable molar ratio [$P_2O_5$/Mg] is not less than 1/2.

On the other hand, increased molar ratio [$P_2O_5$/Mg] in the aqueous solution of primary magnesium phosphate decreases the pH of treatment liquid, which increases the reactivity with the plating base material, which then induces irregular coating caused by non-uniform reaction to give an influence to corrosion resistance. Consequently, when an aqueous solution of primary magnesium phosphate which is prepared by limiting the molar ratio of the magnesium component to the phosphoric acid component, the molar ratio [$P_2O_5$/Mg] is preferably set to not more than 2/1.

To attain the most excellent corrosion resistance, it is preferred that the ratio of the component ($\beta$) to the component ($\alpha$) in the composite oxide coating is adjusted to a range of from 1/100 to 100/1 as the molar ratio [Mg/$SiO_2$], or the component ($\beta$) as Mg to the component ($\alpha$) as $SiO_2$, more preferably from 1/10 to 10/1, most preferably from 1/2 to 5/1. And, to adjust the ratio of the component ($\gamma$) to the component ($\beta$) in the composite oxide coating to a range of from 1/100 to 100/1 as the molar ratio [$P_2O_5$/Mg], or the component ($\gamma$) as $P_2O_5$ to the component ($\beta$) as Mg in the composite oxide coating, more preferably from 1/10 to 10/1, and most preferably from 1/2 to 2/1, it is preferred that the ratio of the additive component (ab) to the additive component (aa) in the acidic aqueous solution for forming the composite oxide coating is adjusted to a range of from 1/100 to 100/1 as the molar ratio [Mg/$SiO_2$], or the additive component (ab) as Mg to the additive component (aa) as $SiO_2$, more preferably from 1/10 to 10/1, and most preferably from 1/2 to 5/1, and further the ratio of the additive component (ac) to the additive component (ab) is adjusted to a range of from 1/100 to 100/1 as the molar ratio [$P_2O_5$/Mg], or the additive component (ac) as $P_2O_5$ to the additive component (ab) as Mg, preferably from 1/10 to 10/1, more preferably from 1/2 to 2/1.

The treatment liquid may further include an adequate amount of an additive component (ad) which is one or more ions selected from the group consisting of: either one metallic ion of Ni, Fe, and Co; and water-soluble ion containing at least one of the above-listed metals. By adding that kind of iron group metal, blackening phenomenon is avoided. The blackening phenomenon occurs in the case of non-addition of iron group metals caused from corrosion on the plating polar surface layer under a humid environment. Among these iron group metals, Ni provides particularly strong effect even with a slight amount thereof. Since, however, excessive addition of iron group metals such as Ni and Co induces degradation of corrosion resistance, the added amount should be kept at an adequate level.

A preferred range of the added amount of the above-described additive component (ad) is from 1/10,000 to 1 mole as metal per one mole of the additive component (ac), more preferably from 1/10,000 to 1/100. If the added amount of the additive component (ad) is less than 1/10,000 mole to one mole of the additive component (ac), the effect of the addition is not satisfactory. If the added amount of the additive component (ad) exceeds 1 mole, the corrosion resistance degrades as described above.

Adding to the above-described additive components (aa) through (ad), the treatment liquid may further contain an adequate amount of additive components to the coating, which are described before.

A preferable range of pH of the treatment liquid is from 0.5 to 5, more preferably from 2 to 4. If the pH of treatment liquid is less than 0.5, the reactivity of the treatment liquid becomes excessively strong so that micro-defects appear on the surface of the coating to degrade the corrosion resistance. If the pH of the treatment liquid exceeds 5, the reactivity of the treatment liquid becomes poor, and the bonding at interface between the plating face and the coating becomes insufficient, as described above, thus degrading the corrosion resistance.

The methods for applying the treatment liquid onto the plated steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

Although there is no specific limitation on the temperature of the treatment liquid, a preferable range thereof is from normal temperature to around 60° C. Below the normal temperature is uneconomical because a cooling unit or other additional facilities are required. On the other hand, temperatures above 60° C. enhances the vaporization of water, which makes the control of the treatment liquid difficult.

After the coating of treatment liquid as described above, generally the plate is heated to dry without rinsing with water. The treatment liquid according to the present invention forms a slightly soluble salt by a reaction with the substrate plated steel sheet, so that rinsing with water may be applied after the treatment.

Method for heating to dry the coated treatment liquid is not limited. For example, dryer, hot air oven, high frequency induction heating furnace, infrared heating furnace may be applied.

The heating and drying treatment is preferably conducted at reaching temperatures of from 50 to 300° C., more preferably from 80 to 200° C., and most preferably from 80 to 160° C. If the heating temperature is less than 50° C., excess amount of water is left in the coating, which results in insufficient corrosion resistance. If the heating temperature exceeds 300° C., the operation becomes uneconomical and defects likely appear in the coating to degrade the corrosion resistance.

After forming the composite oxide coating on the surface of the zinc base plated steel sheet or the aluminum base plated steel sheet, as described above, a paint composition for forming an organic coating is applied on the composite oxide coating. Method for applying the paint composition is not limited, and examples of the method are coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, generally the plate is heated to dry without rinsing with water. After applying the paint composition, however, water-rinse step may be given.

Method for heating to dry the paint composition is not limited. For example, dryer, hot air oven, high frequency induction heating furnace, infrared heating furnace may be applied. The heating treatment is preferably conducted at reaching temperatures of from 50 to 350° C., more preferably from 80 to 250° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

As described above, the present invention includes a steel sheet having an organic coating on both sides or on one side thereof. Accordingly, modes of the steel sheet according to the present invention include, for example, the followings.
(1) "Plating film—Composite oxide coating—Organic coating" on one side of the steel sheet, and "Plating film" on other side of the steel sheet;
(2) "Plating film—Composite oxide coating—Organic coating" on one side of the steel sheet, and "Plating film—Known coating treated by phosphoric acid, or the like" on other side of the steel sheet;
(3) "Plating film—Composite oxide coating—Organic coating" on both sides of the steel sheet;
(4) "Plating film—Composite oxide coating—Organic coating" on one side of the steel sheet, and "Plating film—Composite oxide coating" on other side of the steel sheet;
(5) "Plating film—Composite oxide coating—Organic coating" on one side of the steel sheet, and "Plating film—Organic coating" on other side of the steel sheet.

Embodiments

Treatment liquids (coating compositions) for forming the primary layer coating, which are listed in Tables 2 through 17, were prepared.

Resin compositions (reaction products) for forming the secondary layer coating were synthesized in the following-described procedure.

SYNTHESIS EXAMPLE 1

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylethylketone were charged in a flask with four necks, which mixture was then heated to 140° C. to let them react for 4 hours. Thus, an epoxy resin having an epoxy equivalent of 1391 and a solid content of 90% was obtained. A 1500 parts of ethyleneglycol monobutylether was added to the epoxy resin, which were then cooled to 100° C. A 96 parts of 3,5-dimethylpyrazole (molecular weight 96) and 129 parts of dibutylamine (molecular weight 129) were added to the cooled resin, and they were reacted for 6 hours to eliminate the epoxy group. Then, a 205 parts of methylisobutylketone was added while the mixture was cooling, to obtain a pyrazole-modified epoxy resin having 60% of solid matter. The epoxy resin is defined as the resin composition (1). The resin composition (1) is a product of the reaction between the film-forming organic resin (A) and the active-hydrogen-laden compound that contains 50 mole % of hydrazine derivative (C) containing active hydrogen.

SYNTHESIS EXAMPLE 2

A 4000 parts of EP1007 (epoxy equivalent 2000, manufactured by Yuka Shell Epoxy Co., Ltd.) and 2239 parts of ethyleneglycol monobutylether were charged into a flask with four necks, which mixture was then heated to 120° C. to let them react for 1 hour to fully dissolve the epoxy resin. The mixture was cooled to 100° C. A 168 parts of 3-amino-1,2,4-triazole (molecular weight 84) was added to the mixture, and they were reacted for 6 hours to eliminate the epoxy group. Then, a 540 parts of methylisobutylketone was added while the mixture was cooling, to obtain a triazole-modified epoxy resin having 60% of solid matter. The epoxy resin is defined as the resin composition (2). The resin composition (2) is a product of the reaction between the film-forming organic resin (A) and the active-hydrogen-laden compound that contains 100 mole % of hydrazine derivative (C) containing active hydrogen.

SYNTHESIS EXAMPLE 3

A 222 parts of isophorone diisocyanate (epoxy equivalent 111) and 34 parts of methylisobutylketone were charged into a flask with four necks. A 87 parts of methylethylketoxime (molecular weight 87) was added to the mixture dropwise for 3 hours while keeping the mixture at temperatures ranging from 30 to 40° C., then the mixture was kept to 40° C. for 2 hours. Thus, a block isocyanate having isocyanate equivalent of 309 and solid content of 90% was obtained.

A 1489 parts of EP828 (epoxy equivalent 187, manufactured by Yuka Shell Epoxy Co., Ltd.), 684 parts of bisphenol A, 1 part of tetraethylammonium bromide, and 241 parts of methylisobutylketone were charged into a flask with four necks, which mixture was then heated to 140° C. to let them react for 4 hours. Thus, an epoxy resin having epoxy equivalent of 1090 and solid content of 90% was obtained. To the epoxy resin, 1000 parts of methylisobutylketone was added, then the mixture was cooled to 100° C., and 202 parts of 3-mercapto-1,2,4-triazole (molecular weight 101) was added to the mixture, and let the mixture react for 6 hours to fully eliminate the epoxy group. After that, the part-block isocyanate of the above-described 90% solid portion was added to the reaction product to let the mixture react at 100° C. for 3 hours, and the vanish of isocyanate group was confirmed. Further, 461 parts of ethyleneglycol monobutylether was added to the product to obtain a triazole-modified epoxy resin having 60% solid content. The product is defined as the resin composition (3). The resin composition (3) is a product of the reaction between the film-forming organic resin (A) and the active-hydrogen-laden compound that contains 100 mole % of hydrazine derivative (C) containing active hydrogen.

SYNTHESIS EXAMPLE 4

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylisobutylketone were charged into a flask with four necks, which mixture was then heated to 140° C. to let them react for 4 hours. Thus, an epoxy resin having epoxy equivalent of 1391 and solid content of 90% was obtained. To the epoxy resin, 1500 parts of ethyleneglycol monobutylether was added, then the mixture was cooled to 100° C., and 258 parts of dibutylamine (molecular weight 129) was added to the mixture, and let the mixture react for 6 hours to fully eliminate the epoxy group. While cooling the mixture, 225 parts of methylisobutylketone was further added to the mixture to obtain an epoxyamine adduct having 60% solid content. The product is defined as the resin composition (4). The resin composition (4) is a product of the reaction between the film-forming organic resin (A) and the active-hydrogen-laden compound of hydrazine derivative (C) containing no active hydrogen.

A curing agent was blended to each of the synthesized resin compositions (1) through (4) to prepare the resin compositions (paint compositions) listed in Table 18. To each of these paint compositions, ion-exchanged silica, fine particle silica given in Table 19, and solid lubricant given in Table 20 were added at specified amounts, and they were dispersed in the composition using a paint dispersion machine (sand grinder) for a necessary time. For the above-described ion-exchanged silica, SHILDEX C303 (average particle sizes of from 2.5 to 3.5 $\mu$m and Ca concentration of 3 wt. %) manufactured by W.R. Grace & Co., which is a Ca-exchanged silica, was used.

To obtain organic coating steel sheets for household electric appliances, building materials, and automobile parts, the plated steel sheets shown in Table 1 were used as the target base plates, which plates were prepared by applying zinc base plating or aluminum base plating on the cold-rolled steel sheets having a plate thickness of 0.8 mm and a surface roughness Ra of 1.0 $\mu$m. The surface of the plated steel sheet was treated by alkaline degreasing and water washing, then the treatment liquids (coating compositions) shown in Tables 2 through 17 was applied to the surface using a roll coater, followed by heating to dry to form the first layer coating. The thickness of the first layer coating was adjusted by the solid content in the treatment liquid (heating residue) or applying conditions (roll pressing force, rotational speed, and other variables). Then, the paint composition given in Table 18 was applied using a roll coater, which was then heated to dry to form the secondary layer coating, thus manufactured the organic coating steel sheets as Examples and Comparative Examples. The thickness of the second layer coating was adjusted by the solid content in the treatment liquid (heating residue) or applying conditions (roll pressing force, rotational speed, and other variables).

To each of thus obtained organic coating steel sheets, evaluation was given in terms of quality performance (appearance of coating, white-rust resistance, white-rust resistance after alkaline degreasing, paint adhesiveness, and workability). The results are given in Tables 21 through 87 along with the structure of primary layer coating and of secondary layer coating.

The quality performance evaluation on the organic coating steel sheets was carried out in the following-described manner.

(1) Appearance of Coating

For each sample, visual observation was given on the uniformity of coating appearance (presence/absence of irregular appearance). The criteria for evaluation are the following.

○: Uniform appearance without no irregularity
Δ: Appearance showing some irregularity
X: Appearance showing significant irregularity

(2) White-rust Resistance

For each sample, the salt spray test (JIS Z2371) was applied, and the evaluation was given by the area percentage of white-rust.

The criteria for evaluation are the following.

| | |
|---|---|
| ⊚ | No white-rust appeared |
| ○+ | White-rust area less than 5% |
| ○ | White-rust area not less than 5% and less than 10% |
| ○− | White-rust area not less than 10% and less than 25% |
| Δ | White-rust area not less than 25% and less than 50% |
| X | White-rust area not less than 50% |

(3) White-rust Resistance After Alkaline Degreasing

For each sample, alkaline degreasing was applied using the alkali treatment liquid CLN-364S (60° C., spraying for 2 min) produced by Nihon Parkerizing Co., followed by salt spray test (JIS Z2371). The result was evaluated by the white-rust area percentage after a specified time has past.

The criteria for evaluation are the following.

| | |
|---|---|
| ⊚ | No white-rust appeared |
| ○+ | White-rust area less than 5% |
| ○ | White-rust area not less than 5% and less than 10% |
| ○− | White-rust area not less than 10% and less than 25% |
| Δ | White-rust area not less than 25% and less than 50% |
| X | White-rust area not less than 50% |

(4) Paint Adhesiveness

For each sample, a melamine base baking paint (film thickness of 30 $\mu$m) was applied, and the sample was dipped in a boiling water for 2 hours. Immediately after 2 hours of dipping, cross-cut (10×10 squares with 10 mm of spacing) was given to the surface of the sample. Then the test of attaching and peeling of adhesive tapes was given to the sample to evaluate the paint adhesiveness by the peeled paint film area percentage.

The criteria for evaluation are the following.

| | |
|---|---|
| ⊚ | No peeling occurred |
| ○ | Peeled area less than 5% |
| Δ | Peeled area not less than %% and less than 20% |
| X | Peeled area of less than 20% |

(5) Workability

For each sample, a deep-drawing test (under oil-free condition) was given using a blank diameter of 120 mm and a die diameter of 50 mm. The drawing height to generate crack on the sample was determined.

The criteria for evaluation are the following.

⊚: Draw-off occurred
○: Drawn height not less than 30 mm
Δ: Drawn height not less than 20 mm and less than 30 mm
X: Drawn height less than 20 mm In the following-given Tables 21 through 87, each of *1 through *13 appeared in the tables expresses the following.

*1: Corresponding to No. given in Table 1.
*2: Corresponding to No. given in Tables 2 through 17.
*3: Corresponding to No. given in Table 18.
*4: Coating weight of SiO$_2$ fine particles ($\alpha$)=Coating weight of one ore more substances selected from the group consisting of Mg, compound containing Mg, composite compound containing Mg, converted to Mg.

: Coating weight of $P_2O_5$ component ($\gamma$)=Coating weight of phosphoric acid and/or phosphoric acid compound, converted to $P_2O_5$.

: Total coating weight=($\alpha$)+($\beta$)+($\gamma$).

*5: Molar ratio of Mg component ($\beta$) as Mg to $SiO_2$ fine particles ($\alpha$) as $SiO_2$.

*6: Molar ratio of $P_2O_5$ component ($\gamma$) as $P_2O_5$ to Mg component ($\beta$) as Mg.

*7: Blending ratio (weight parts) of solid portion of ion-exchanged silica to 100 parts by weight of solid portion of resin composition.

*8: Corresponding to No. given in Table 19.

*9: Blending ratio (weight parts) of solid portion of fine particle silica to 100 parts by weight of solid portion of resin composition.

*10: Blending ratio (weight parts) of solid portion of the sum of ion-exchanged silica (a) and fine particle silica (b) to 100 parts by weight of solid portion of resin composition.

*11: Weight ratio of solid portion of ion-exchanged silica (a) to fine particle silica (b).

*12: Corresponding to No. given in Table 20.

*13: Blending ratio (weight parts) of solid portion of solid lubricant to 100 parts by weight of solid portion of resin composition.

As the conventional reaction type chromate steel sheet treatment liquid, a solution containing 30 g/l of anhydrous chromic acid, 10 g/l of phosphoric acid, 0.5 g/l of NaF, and 4 g/l of $K_2TiF_6$ was used. After spray treatment at a bath temperature of 40° C., the steel sheet was washed with water and was dried, thus a chromated steel sheet having a chromium coating weight of 20 mg/m² as metallic chromium as prepared. Thus obtained steel sheet was subjected to the salt spray test under the same condition that applied to Examples, and the plate generated white-rust within about 24 hours. Consequently, the results of Examples show that the organic coating steel sheets according to the present invention provide remarkably superior corrosion resistance to the conventional type chromate treated steel sheets.

TABLE 1

| No. | Kind | Coating weight (g/m²) |
|---|---|---|
| 1 | Electrolytically galvanized steel sheet | 20 |
| 2 | Hot dip galvanized steel sheet | 60 |
| 3 | Alloyed hot dip galvanized steel sheet (Fe: 10 wt. %) | 60 |
| 4 | Zn—Ni alloy plating steel sheet (Ni: 12 wt. %) | 20 |
| 5 | Zn—Co alloy plating steel plat (Co: 0.5 wt. %) | 20 |
| 6 | Zn—Cr alloy plating steel sheet (Cr: 12 wt. %) | 20 |
| 7 | Hot dip Zn—Al alloy plating steel sheet (Al: 55 wt. %) | 90 |
| 8 | Hot dip Zn-5 wt. % Al-0.5 wt. % Mg alloy plating steel sheet | 90 |
| 9 | Electrolytically Zn-SiO2 composite plating steel sheet | 20 |
| 10 | Hot dip aluminized steel sheet (Al-6 wt. % Si alloy plating) | 60 |
| 11 | Electrolytically Al—Mn alloy plating steel sheet (Mn: 30 wt. %) | 40 |
| 12 | Electrolytically aluminized steel sheet | 40 |
| 13 | Hot dip Zn—Mg alloy plating steel sheet (Mg: 0.5 wt. %) | 150 |

TABLE 2

[Composition for Primary Layer Coating]

| | Oxide fine particles (aa) | | | Alkali earth metal (ab) | | Phosphoric acid, phosphoric acid compound (ac) | | Organic resin | |
|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 1 | Colloidal silica | Nissan Chemical Industries, Ltd. SNOWTEX-O | 12 to 14 | 0.11 | $Mg^{2-}$ | 0.20 | Orthophosphoric acid | 0.42 | — | — |
| 2 | Colloidal silica | Nissan Chemical Industries, Ltd. SNOWTEX-O | 12 to 14 | 0.18 | $Mg^{2+}$ | 0.17 | Orthophosphoric acid | 0.36 | — | — |
| 3 | Colloidal silica | Nissan Chemical Industries, Ltd. SNOWTEX-O | 12 to 14 | 0.40 | $Mg^{2+}$ | 0.40 | Orthophosphoric acid | 0.80 | — | — |
| 4 | Colloidal silica | Nissan Chemical Industries, Ltd. SNOWTEX-OS | 8 to 10 | 0.18 | $Mg^{2+}$ | 0.17 | Orthophosphoric acid | 0.36 | — | — |
| 5 | Colloidal silica | Nissan Chemical Industries, Ltd. SNOWTEX-OXS | 6 to 8 | 0.11 | $Mg^{2-}$ | 0.20 | Orthophosphoric acid | 0.42 | — | — |
| 6 | Alumina sol | Nissan Chemical Industries, Ltd. SNOWTEX-OS | ✶ | 0.20 | $Mg^{2+}$ | 0.30 | Orthophosphoric acid | 0.60 | — | — |
| 7 | Zirconia sol | Nissan Chemical Industries, Ltd. NZS-30A | 60 to 70 | 0.40 | $Mg^{2+}$ | 0.40 | Orthophosphoric acid | 0.80 | — | — |
| 8 | Colloidal silica | Nissan Chemical Industries, Ltd. SNOWTEX-O | 12 to 14 | 0.30 | $Mg^{2+}$ | 0.10 | Orthophosphoric acid | 0.20 | Acrylic-ethylene base water-dispersible resin | 180 |

*1 Converted to $P_2O_5$
✶ feather-shape particle (10 nm × 100 nm)

TABLE 3

| No. | Molar Ratio (ab)/(aa) | Molar Ratio (ac)/(ab) | pH of composition | Adaptability to the condition of the invention*[2] |
|---|---|---|---|---|
| 1 | 1.82 | 2.10 | 3.1 | ○ |
| 2 | 0.94 | 2.12 | 3.1 | ○ |
| 3 | 1.00 | 2.00 | 2.7 | ○ |
| 4 | 0.94 | 2.12 | 3.1 | ○ |
| 5 | 1.82 | 2.10 | 3.0 | ○ |
| 6 | 1.50 | 2.00 | 3.5 | ○ |
| 7 | 1.00 | 2.00 | 3.2 | ○ |
| 8 | 0.33 | 2.00 | 2.5 | ○ |

*[2] ○: Satisfies the conditions of the invention
X: Dissatisfies the condition of the invention

TABLE 4

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *[1] | Type | Concentration (g/l) |
| 9 | Colloidal silica | Nissan Chemical Industries, Ltd. SNOWTEX-O | 12 to 14 | 0.20 | $Ca^{2+}$ | 0.20 | Orthophosphoric acid | 0.40 | — | — |
| 10 | Colloidal silica | Nissan Chemical Industries, Ltd. SNOWTEX-O | 12 to 14 | 0.10 | $Sr^{2+}$ | 0.10 | Orthophosphoric acid | 0.20 | — | — |
| 11 | Colloidal silica | Nissan Chemical Industries, Ltd. SNOWTEX-O | 12 to 14 | 0.05 | $Ba^{2+}$ | 0.10 | Orthophosphoric acid | 0.20 | — | — |
| 12 | — | — | — | — | $Mg^{2+}$ | 0.30 | Orthophosphoric acid | 0.60 | — | — |
| 13 | Colloidal silica | Nissan Chemical Industries, Ltd. SNOWTEX-O | 12 to 14 | 0.40 | — | — | Orthophosphoric acid | 0.30 | — | — |
| 14 | Colloidal silica | Nissan Chemical Industries, Ltd. SNOWTEX-O | 12 to 14 | 0.40 | $Mg^{2+}$ | 0.20 | — | — | — | — |
| 15 | Lithium silicate | Nissan Chemical Industries, Ltd. LSS-35 | — | 1.00 | — | — | — | — | — | — |

*[1] Converted to $P_2O_5$

TABLE 5

| No. | Molar Ratio (ab)/(aa) | Molar Ratio (ac)/(ab) | pH of composition | Adaptability to the condition of the invention*[2] |
|---|---|---|---|---|
| 9 | 1.00 | 2.00 | 3.0 | ○ |
| 10 | 1.00 | 2.00 | 3.1 | ○ |
| 11 | 2.00 | 2.00 | 3.2 | ○ |
| 12 | — | 2.00 | 2.8 | X |
| 13 | — | — | 3.0 | X |
| 14 | 0.50 | — | 2.1 | X |
| 15 | — | — | 11 | X |

*[2] ○: Satisfies the conditions of the invention
X: Dissatisfies the condition of the invention

TABLE 6

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 16 | Colloidal silica | Nissan Chemical Industries, Ltd. SNOWTEX-OS | 8 to 10 | 0.2 | $Mg^{2+}$ | 0.4 | Orthophosphoric acid | 0.46 | — | — |
| 17 | Colloidal silica | Nissan Chemical Industries, Ltd. SNOWTEX-OS | 8 to 10 | 0.1 | $Mg^{2-}$ | 0.2 | Orthophosphoric acid | 0.23 | — | — |
| 18 | Colloidal silica | Nissan Chemical Industries, Ltd. SNOWTEX-OS | 8 to 10 | 0.3 | $Mg^{2+}$ | 0.3 | Orthophosphoric acid | 0.31 | — | — |
| 19 | Colloidal silica | Nissan Chemical Industries, Ltd. SNOWTEX-OS | 8 to 10 | 0.15 | $Mg^{2+}$ | 0.2 | Orthophosphoric acid | 0.4 | — | — |
| 20 | Colloidal silica | Nissan Chemical Industries, Ltd. SNOWTEX-OS | 8 to 10 | 0.3 | $Mg^{2+}$ | 0.35 | Orthophosphoric acid | 0.4 | — | — |
| 21 | Alumina sol | Nissan Chemical Industries, Ltd. SNOWTEX-OS | 8 to 10 | 0.1 | $Mg^{2-}$ | 0.5 | Orthophosphoric acid | 0.5 | — | — |
| 22 | Zirconia sol | Nissan Chemical Industries, Ltd. SNOWTEX-OS | 8 to 10 | 0.3 | $Mg^{2-}$ | 0.15 | Orthophosphoric acid | 0.16 | — | — |
| 23 | Colloidal silica | Nissan Chemical Industries, Ltd. SNOWTEX-OS | 8 to 10 | 0.3 | $Mg^{2+}$ | 0.4 | Orthophosphoric acid | 0.2 | — | — |

*1 Converted to $P_2O_5$

TABLE 7

| No. | Molar Ratio (ab)/(aa) | Molar Ratio (ac)/(ab) | pH of composition | Adaptability to the condition of the invention*2 |
|---|---|---|---|---|
| 16 | 2.00 | 1.2 | 2.7 | ○ |
| 17 | 2.00 | 1.2 | 2.8 | ○ |
| 18 | 1.00 | 1.0 | 3.0 | ○ |
| 19 | 1.33 | 2.0 | 1.9 | ○ |
| 20 | 1.17 | 1.1 | 2.8 | ○ |
| 21 | 5.00 | 1.0 | 3.1 | ○ |
| 22 | 0.50 | 1.1 | 3.3 | ○ |
| 23 | 1.33 | 0.5 | 3.0 | ○ |

*2 ○: Satisfies the conditions of the invention
X: Dissatisfies the condition of the invention

TABLE 8

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 24 | Colloidal silica | Nissan Chemical Industries, Ltd. SNOWTEX-OXS | 6 to 8 | 0.2 | $Mg^{2+}$ | 0.4 | Orthophosphoric acid | 0.4 | — | — |
| 25 | Colloidal silica | Nissan Chemical Industries, Ltd. SNOWTEX-OXS | 6 to 8 | 0.2 | $Mg^{2-}$ | 0.4 | Orthophosphoric acid | 0.4 | — | — |
| 26 | Colloidal silica | Nissan Chemical Industries, Ltd. SNOWTEX-O | 12 to 14 | 0.2 | $Mg^{2+}$ | 0.4 | Orthophosphoric acid | 0.4 | — | — |

TABLE 8-continued

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 27 | Colloidal silica | Nissan Chemical Industries, Ltd. SNOWTEX-OS | 8 to 10 | 0.5 | $Mg^{2+}$ | 0.05 | Orthophosphoric acid | 0.1 | — | — |
| 28 | Colloidal silica | Nissan Chemical Industries, Ltd. SNOWTEX-OS | 8 to 10 | 0.05 | $Mg^{2-}$ | 0.5 | Orthophosphoric acid | 0.6 | — | — |
| 29 | Colloidal silica | Nissan Chemical Industries, Ltd. SNOWTEX-OS | 8 to 10 | 0.2 | $Mg^{2+}$ | 0.3 | Orthophosphoric acid | 0.03 | — | — |
| 30 | Colloidal silica | Nissan Chemical Industries, Ltd. SNOWTEX-OS | 8 to 10 | 0.1 | $Mg^{2+}$ | 0.1 | Orthophosphoric acid | 1.0 | — | — |
| 31 | Colloidal silica | Nissan Chemical Industries, Ltd. SNOWTEX-OS | 8 to 10 | 0.04 | $Mg^{2-}$ | 0.3 | Orthophosphoric acid | 0.32 | — | — |

*1 Converted to $P_2O_5$

TABLE 9

| No. | Molar Ratio (ab)/(aa) | Molar Ratio (ac)/(ab) | pH of composition | Adaptability to the condition of the invention*2 |
|---|---|---|---|---|
| 24 | 2.00 | 1.0 | 2.9 | ○ |
| 24 | 2.00 | 1.0 | 2.9 | ○ |
| 25 | 2.00 | 1.0 | 2.9 | ○ |
| 26 | 2.00 | 1.0 | 2.9 | ○ |
| 27 | 0.10 | 2.0 | 2.5 | ○ |
| 28 | 10.00 | 1.2 | 1.8 | ○ |
| 29 | 1.50 | 0.1 | 3.0 | ○ |
| 30 | 1.00 | 10.0 | 1.5 | ○ |
| 31 | 7.50 | 1.1 | 2.6 | ○ |

*2 ○: Satisfies the conditions of the invention
X: Dissatisfies the condition of the invention

TABLE 10

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 32 | Colloidal silica | Nissan Chemical Industries, Ltd. SNOWTEX-OS | 8 to 10 | 0.01 | $Mg^{2+}$ | 0.5 | Orthophosphoric acid | 0.51 | — | — |
| 33 | Colloidal silica | Nissan Chemical Industries, Ltd. SNOWTEX-OS | 8 to 10 | 0.5 | $Mg^{2+}$ | 0.01 | Orthophosphoric acid | 0.3 | — | — |
| 34 | Colloidal silica | Nissan Chemical Industries, Ltd. SNOWTEX-OS | 8 to 10 | 1.0 | $Mg^{2+}$ | 0.01 | Orthophosphoric acid | 0.5 | — | — |
| 35 | Colloidal silica | Nissan Chemical Industries, Ltd. SNOWTEX-OS | 8 to 10 | 0.02 | $Mg^{2-}$ | 2.0 | Orthophosphoric acid | 0.5 | — | — |
| 36 | Colloidal silica | Nissan Chemical Industries, Ltd. SNOWTEX-OS | 8 to 10 | 0.01 | $Mg^{2+}$ | 2.0 | Orthophosphoric acid | 0.5 | — | — |
| 37 | Colloidal silica | Nissan Chemical Industries, Ltd. SNOWTEX-OS | 8 to 10 | 2.0 | $Mg^{2+}$ | 0.01 | Orthophosphoric acid | 0.5 | — | — |

TABLE 10-continued

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 38 | Colloidal silica | Nissan Chemical Industries, Ltd. SNOWTEX-OS | 8 to 10 | 2.0 | $Mg^{2+}$ | 0.01 | Orthophosphoric acid | 2.5 | — | — |
| 39 | Colloidal silica | Nissan Chemical Industries, Ltd. SNOWTEX-OS | 8 to 10 | 0.02 | $Mg^{2+}$ | 2.5 | Orthophosphoric acid | 0.01 | — | — |

*1 Converted to $P_2O_5$

TABLE 11

| No. | Molar Ratio (ab)/(aa) | Molar Ratio (ac)/(ab) | pH of composition | Adaptability to the condition of the invention*2 |
|---|---|---|---|---|
| 32 | 50 | 1.0 | 2.0 | ○ |
| 33 | 0.02 | 30.0 | 2.5 | ○ |
| 34 | 0.01 | 50.0 | 2.2 | ○ |
| 35 | 100 | 0.3 | 2.0 | ○ |
| 36 | 200 | 0.3 | 1.9 | ○ |
| 37 | 0.005 | 50.0 | 2.1 | ○ |
| 38 | 0.005 | 250.0 | 1.6 | ○ |
| 39 | 125 | 0.004 | 2.5 | ○ |

*2 ○: Satisfies the conditions of the invention
X: Dissatisfies the condition of the invention

TABLE 12

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 40 | Colloidal silica | Nissan Chemical Industries, Ltd. SNOWTEX-OS | 8 to 10 | 0.001 | $Mg^{2+}$ | 2.0 | Orthophosphoric acid | 0.5 | — | — |
| 41 | Colloidal silica | Nissan Chemical Industries, Ltd. SNOWTEX-OS | 8 to 10 | 0.002 | $Mg^{2+}$ | 3.0 | Orthophosphoric acid | 0.5 | — | — |
| 42 | Colloidal silica | Nissan Chemical Industries, Ltd. SNOWTEX-OS | 8 to 10 | 2.5 | $Mg^{2+}$ | 0.02 | Orthophosphoric acid | 0.5 | — | — |
| 43 | Colloidal silica | Nissan Chemical Industries, Ltd. SNOWTEX-OS | 8 to 10 | 3.0 | $Mg^{2+}$ | 0.05 | Orthophosphoric acid | 0.3 | — | — |
| 44 | Colloidal silica | Nissan Chemical Industries, Ltd. SNOWTEX-OS | 8 to 10 | 0.5 | $Mg^{2+}$ | 0.001 | Orthophosphoric acid | 0.6 | — | — |
| 45 | Colloidal silica | Nissan Chemical Industries, Ltd. SNOWTEX-OS | 8 to 10 | 0.2 | $Mg^{2+}$ | 0.6 | Orthophosphoric acid | 0.001 | — | — |
| 46 | Colloidal silica | Nissan Chemical Industries, Ltd. SNOWTEX-OS | 8 to 10 | 0.5 | $Mg^{2+}$ | 2.0 | Orthophosphoric acid | 4.0 | — | — |
| 47 | Colloidal silica | Nissan Chemical Industries, Ltd. SNOWTEX-OS | 8 to 10 | 0.001 | $Mg^{2+}$ | 3.0 | Orthophosphoric acid | 6.0 | — | — |

*1 Converted to $P_2O_5$

TABLE 13

| No. | Molar Ratio (ab)/(aa) | Molar Ratio (ac)/(ab) | pH of composition | Adaptability to the condition of the invention*2 |
|---|---|---|---|---|
| 40 | 2000 | 0.3 | 1.9 | ◯ |
| 41 | 1500 | 0.2 | 1.9 | ◯ |
| 42 | 0.008 | 25.0 | 2.0 | ◯ |
| 43 | 0.017 | 6.0 | 2.2 | ◯ |
| 44 | 0.002 | 600.0 | 1.9 | ◯ |
| 45 | 3 | 0.002 | 3.2 | ◯ |
| 46 | 4 | 2.0 | 0.51 | ◯ |
| 47 | 3000 | 2.0 | 0.5 | ◯ |

*2 ◯: Satisfies the conditions of the invention
X: Dissatisfies the condition of the invention

TABLE 14

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 48 | Colloidal silica | Nissan Chemical Industries, Ltd. SNOWTEX-OS | 8 to 10 | 0.001 | $Mg^{2+}$ | 0.02 | Orthophosphoric acid | 0.02 | — | — |
| 49 | Colloidal silica | Nissan Chemical Industries, Ltd. SNOWTEX-OS | 8 to 10 | 0.05 | $Mg^{2+}$ | 0.1 | Orthophosphoric acid | 0.1 | — | — |
| 50 | Colloidal silica | Nissan Chemical Industries, Ltd. SNOWTEX-OS | 8 to 10 | 2.0 | $Mg^{2-}$ | 3.0 | Orthophosphoric acid | 4.2 | — | — |
| 51 | Colloidal silica | Nissan Chemical Industries, Ltd. SNOWTEX-OS | 8 to 10 | 0.3 | $Mg^{2+}$ | 0.001 | Orthophosphoric acid | 0.2 | Acrylic-ethylene base water-dispersible resin | 180 |
| 52 | Colloidal silica | Nissan Chemical Industries, Ltd. SNOWTEX-OS | 8 to 10 | 0.3 | $Mg^{2+}$ | 0.4 | Orthophosphoric acid | 0.42 | Acrylic-ethylene base water-dispersible resin | 180 |
| 53 | Colloidal silica | Nissan Chemical Industries, Ltd. SNOWTEX-OS | 8 to 10 | 0.3 | $Mg^{2-}$ | 0.02 | Orthophosphoric acid | 0.2 | Acrylic-ethylene base water-dispersible resin | 180 |

*1 Converted to $P_2O_5$

TABLE 15

| No. | Molar Ratio (ab)/(aa) | Molar Ratio (ac)/(ab) | pH of composition | Adaptability to the condition of the invention*2 |
|---|---|---|---|---|
| 48 | 2 | 1.0 | 4.0 | ◯ |
| 49 | 2 | 1.0 | 3.3 | ◯ |
| 50 | 1.5 | 1.4 | 0.8 | ◯ |
| 51 | 0.003 | 200 | 2.5 | ◯ |
| 52 | 1.3 | 1.1 | 2.2 | ◯ |
| 53 | 0.1 | 10 | 2.5 | ◯ |

*2 ◯: Satisfies the conditions of the invention
X: Dissatisfies the condition of the invention

TABLE 16

[Composition for Primary Layer Coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 54 | Colloidal silica | Nissan Chemical Industries, Ltd. SNOWTEX-OS | 8 to 10 | 3.2 | $Mg^{2-}$ | 0.1 | Orthophosphoric acid | 0.3 | — | — |
| 55 | — | — | — | — | $Mg^{2+}$ | 0.5 | Orthophosphoric acid | 2.0 | — | — |
| 56 | Colloidal silica | Nissan Chemical Industries, Ltd. SNOWTEX-OS | 8 to 10 | 0.2 | $Mg^{2+}$ | 4.0 | Orthophosphoric acid | 0.5 | — | — |
| 57 | Colloidal silica | Nissan Chemical Industries, Ltd. SNOWTEX-OS | 8 to 10 | 3.0 | $Mg^{2+}$ | — | Orthophosphoric acid | 0.5 | — | — |
| 58 | Colloidal silica | Nissan Chemical Industries, Ltd. SNOWTEX-OS | 8 to 10 | 0.02 | $Mg^{2+}$ | 3.0 | Orthophosphoric acid | 6.5 | — | — |
| 59 | Colloidal silica | Nissan Chemical Industries, Ltd. SNOWTEX-OS | 8 to 10 | 0.5 | $Mg^{2+}$ | 0.2 | Orthophosphoric acid | — | — | — |
| 60 | Colloidal silica | Nissan Chemical Industries, Ltd. SNOWTEX-OS | 8 to 10 | 0.001 | $Mg^{2+}$ | 0.02 | Orthophosphoric acid | 0.001 | — | — |
| 61 | Colloidal silica | Nissan Chemical Industries, Ltd. SNOWTEX-OS | 8 to 10 | 0.5 | $Mg^{2+}$ | 3.0 | Orthophosphoric acid | 6.0 | — | — |

*1 Converted to $P_2O_5$

TABLE 17

| No. | Molar Ratio (ab)/(aa) | Molar Ratio (ac)/(ab) | pH of composition | Adaptability to the condition of the invention*2 |
|---|---|---|---|---|
| 54 | 0.03 | 3.0 | 3.5 | X |
| 55 | — | 4.0 | 1.5 | X |
| 56 | 20 | 0.1 | 2.0 | X |
| 57 | — | — | 2.2 | X |
| 58 | 150 | 2.2 | 0.4 | X |
| 59 | 0.4 | — | 2.2 | X |
| 60 | 20 | 0.1 | 5.2 | X |
| 61 | 6 | 2.0 | 0.4 | X |

*2 ○: Satisfies the conditions of the invention
X: Dissatisfies the condition of the invention

TABLE 18

[Resin Composition of Secondary Layer Coating]

| | Base resin | | Curing agent | | | Adaptability to the |
|---|---|---|---|---|---|---|
| No. | Type *1 | Blending rate | Type *2 | Blending rate | Catalyst | conditions of the invention |
| 1 | (1) | 100 parts | A | 5 parts | Dibutyltin dilaurate (0.2 part) | Satisfies |
| 2 | (1) | 100 parts | B | 25 parts | Dibutyltin dilaurate (1.0 part) | Satisfies |
| 3 | (1) | 100 parts | C | 25 parts | — | Satisfies |
| 4 | (2) | 100 parts | A | 50 parts | Dibutyltin dilaurate (2.0 part) | Satisfies |
| 5 | (2) | 100 parts | B | 50 parts | Dibutyltin dilaurate (3.0 part) | Satisfies |
| 6 | (2) | 100 parts | C | 80 parts | Dibutyltin dilaurate (4.0 part) | Satisfies |
| 7 | (3) | 100 parts | A | 25 parts | Cobalt naphthenate (1.0 part) | Satisfies |
| 8 | (3) | 100 parts | B | 10 parts | Tin (II) chloride (1.0 part) | Satisfies |
| 9 | (3) | 100 parts | C | 50 parts | N-ethylmorpholine (1.0 part) | Satisfies |
| 10 | (1) | 100 parts | D | 25 parts | — | Satisfies |
| 11 | (3) | 100 parts | D | 30 parts | — | Satisfies |
| 12 | (4) | 100 parts | B | 25 parts | Dibutyltin dilaurate (0.2 part) | Dissatisfies |
| 13 | Aqueous solution of a hydrazine derivative (aqueous solution of 5 wt. % 3,5-dimethylpyrazole) | | | | | Dissatisfies |

TABLE 18-continued

[Resin Composition of Secondary Layer Coating]

| | Base resin | | Curing agent | | | Adaptability to the |
|---|---|---|---|---|---|---|
| No. | Type *1 | Blending rate | Type *2 | Blending rate | Catalyst | conditions of the invention |
| 14 | Mixture of an epoxyamine additive and a hydrazine derivative (3 parts by weight of 3,5-dimethylpyrazole is added to 100 parts by weight of base resin in the composition No. 12, followed by agitating the mixture.) | | | | | Dissatisfies |

*1 The resin compositions (1) through (4) which were synthesized in Synthesis Examples 1 through 4 described in the body of this specification.
*2 A An MEK oxime block body of IPDI, "TAKENATE B-870N" produced by Takeda Chemical Industries, Ltd.
B Isocyanurate type: "DESMODUR BL-3175" produced by Bayer A. G.
C An MEK oxime block body of HMDI, "DURANATE MF-B80M" produced by Asahi Chemical Industry Co., Ltd.
D A melamine resin of imino-base: "CYMEL 325" produced by Mitsui Cytech Co., Ltd.

TABLE 19

| No. | Type | Trade name |
|---|---|---|
| 1 | Dry silica | "AEROSIL R972" produced by Japan Aerosil Co., Ltd. |
| 2 | Dry silica | "AEROSIL R812" produced by Japan Aerosil Co., Ltd. |
| 3 | Dry silica | "AEROSIL R805" produced by Japan Aerosil Co., Ltd. |
| 4 | Dry silica | "AEROSIL R974" produced by Japan Aerosil Co., Ltd. |
| 5 | Dry silica | "AEROSIL R811" produced by Japan Aerosil Co., Ltd. |
| 6 | Dry silica | "AEROSIL RX200" produced by Japan Aerosil Co., Ltd. |
| 7 | Dry silica | "AEROSIL 130" produced by Japan Aerosil Co., Ltd. |
| 8 | Dry silica | "AEROSIL 200" produced by Japan Aerosil Co., Ltd. |
| 9 | Dry silica | "AEROSIL 300" produced by Japan Aerosil Co., Ltd. |
| 10 | Colloidal silica | "ORGANOSILCASOL EG-ST" (containing 20% solid matter), produced by Nissan Chemical Industries, Ltd. |
| 11 | Colloidal silica | "OSCAL 1632" (containing 30% solid matter), produced by Catalysts & Chemicals Industries Co., Ltd. |

TABLE 20

| No. | Type | Trade name |
|---|---|---|
| 1 | Polyethylene wax | "LUVAX1151" produced by Nippon Seiro Co., Ltd. |
| 2 | Polyethylene wax | "3620" produced by Sheridust Co., Ltd. |
| 3 | Polyethylene wax | "CHEMIPEARL W-100" produced by Mitsui Petrochemical Industries, Ltd. |
| 4 | Polytetrafluoroethylene resin | "MP1100", produced by Du Pont-Mitsui Company, Ltd. |
| 5 | Polytetrafluoroethylene resin | "L-2", produced by Daikin Industries, Ltd. |
| 6 | Mixture of No. 1 and No. 4 (blend ratio of 1:1) | — |

TABLE 21

| | | | | | Primary layer coating | | | |
|---|---|---|---|---|---|---|---|---|
| | | | | | | Coating weight *4 | | |
| No. | Plating steel plate *1 | Coating composition *2 | Drying temperature (° C.) | Coating thickness ($\mu$m) | Total coating weight (mg/m$^2$) | SiO$_2$ fine particles ($\alpha$) (mg/m$^2$) | Mg component ($\beta$) (mg/m$^2$) | P$_2$O$_5$ component ($\gamma$) (mg/m$^2$) |
| 1 | 1 | 1 | 140 | 0.3 | 366 | 34 | 25 | 307 |
| 2 | 1 | 1 | 140 | 0.3 | 366 | 34 | 25 | 307 |
| 3 | 1 | 1 | 140 | 0.3 | 366 | 34 | 25 | 307 |
| 4 | 1 | 1 | 140 | 0.3 | 366 | 34 | 25 | 307 |
| 5 | 1 | 1 | 140 | 0.3 | 366 | 34 | 25 | 307 |
| 6 | 1 | 1 | 140 | 0.3 | 366 | 34 | 25 | 307 |
| 7 | 1 | 1 | 140 | 0.3 | 366 | 34 | 25 | 307 |
| 8 | 1 | 1 | 140 | 0.3 | 366 | 34 | 25 | 307 |
| 9 | 1 | 1 | 140 | 0.3 | 366 | 34 | 25 | 307 |
| 10 | 1 | 1 | 140 | 0.3 | 366 | 34 | 25 | 307 |
| 11 | 1 | 1 | 140 | 0.3 | 366 | 34 | 25 | 307 |
| 12 | 1 | 1 | 140 | 0.3 | 366 | 34 | 25 | 307 |
| 13 | 1 | 1 | 140 | 0.3 | 366 | 34 | 25 | 307 |
| 14 | 1 | 1 | 140 | 0.3 | 366 | 34 | 25 | 307 |

TABLE 21-continued

| | | Primary layer coating Molar ratio of coating components | | Secondary layer coating | | | |
|---|---|---|---|---|---|---|---|
| | No. | Mg/SiO$_2$ *5 | P$_2$O$_5$/Mg *6 | Resin composition *3 | Drying temperature (° C.) | Coating thickness (μm) | Classification |
| | 1 | 1.82 | 2.1 | 1 | 230 | 1 | Example |
| | 2 | 1.82 | 2.1 | 2 | 230 | 1 | Example |
| | 3 | 1.82 | 2.1 | 3 | 230 | 1 | Example |
| | 4 | 1.82 | 2.1 | 4 | 230 | 1 | Example |
| | 5 | 1.82 | 2.1 | 5 | 230 | 1 | Example |
| | 6 | 1.82 | 2.1 | 6 | 230 | 1 | Example |
| | 7 | 1.82 | 2.1 | 7 | 230 | 1 | Example |
| | 8 | 1.82 | 2.1 | 8 | 230 | 1 | Example |
| | 9 | 1.82 | 2.1 | 9 | 230 | 1 | Example |
| | 10 | 1.82 | 2.1 | 10 | 230 | 1 | Example |
| | 11 | 1.82 | 2.1 | 11 | 230 | 1 | Example |
| | 12 | 1.82 | 2.1 | 12 | 230 | 1 | Comparative example |
| | 13 | 1.82 | 2.1 | 13 | 230 | 1 | Comparative example |
| | 14 | 1.82 | 2.1 | 14 | 230 | 1 | Comparative example |

TABLE 22

| | | Performance | | | |
|---|---|---|---|---|---|
| No. | Appearance | White-rust resistance: SST 96 hrs | White-rust resistance after alkaline degreasing: SST 96 hrs | Paint adhesiveness | Classification |
| 1 | ○ | ⊚ | ⊚ | ⊚ | Example |
| 2 | ○ | ⊚ | ⊚ | ⊚ | Example |
| 3 | ○ | ⊚ | ⊚ | ⊚ | Example |
| 4 | ○ | ⊚ | ⊚ | ⊚ | Example |
| 5 | ○ | ⊚ | ⊚ | ⊚ | Example |
| 6 | ○ | ⊚ | ⊚ | ⊚ | Example |
| 7 | ○ | ⊚ | ⊚ | ⊚ | Example |
| 8 | ○ | ⊚ | ⊚ | ⊚ | Example |
| 9 | ○ | ⊚ | ⊚ | ⊚ | Example |
| 10 | ○ | ⊚ | ⊚ | ⊚ | Example |
| 11 | ○ | ⊚ | ⊚ | ⊚ | Example |
| 12 | ○ | ○- | Δ | ⊚ | Comparative example |
| 13 | ○ | X | X | X | Comparative example |
| 14 | ○ | ○- | Δ | ⊚ | Comparative example |

TABLE 23

| | | Primary layer coating | | | | | | |
|---|---|---|---|---|---|---|---|---|
| | | | | | Coating weight *4 | | | |
| No. | Plating steel plate *1 | Coating composition *2 | Drying temperature (° C.) | Coating thickness (μm) | Total coating weight (mg/m$^2$) | SiO$_2$ fine particles (α) (mg/m$^2$) | Mg component (β) (mg/m$^2$) | P$_2$O$_5$ component (γ) (mg/m$^2$) |
| 15 | 1 | 2 | 140 | 0.3 | 400 | 66 | 25 | 310 |
| 16 | 1 | 3 | 140 | 0.3 | 303 | 49 | 20 | 234 |
| 17 | 1 | 4 | 140 | 0.3 | 320 | 53 | 20 | 248 |
| 18 | 1 | 5 | 140 | 0.3 | 293 | 27 | 20 | 245 |
| 19 | 1 | 6 | 140 | 0.3 | 317 | (Al$_2$O$_3$) | 25 | 292 |
| 20 | 1 | 7 | 140 | 0.3 | 317 | (ZrO$_2$) | 25 | 292 |
| 21 | 1 | 8 | 140 | 0.3 | 403 | 150 | 20 | 234 |

TABLE 23-continued

| No. | | | | | | | | |
|---|---|---|---|---|---|---|---|---|
| 22 | 1 | 9 | 140 | 0.3 | 320 | 95 | (Ca) | 225 |
| 23 | 1 | 10 | 140 | 0.3 | 320 | 90 | (Sr) | 230 |
| 24 | 1 | 11 | 140 | 0.3 | 329 | 89 | (Ba) | 240 |
| 25 | 1 | 12 | 140 | 0.3 | 320 | — | 40 | 280 |
| 26 | 1 | 13 | 140 | 0.3 | 300 | 50 | — | 250 |
| 27 | 1 | 14 | 140 | 0.3 | 416 | 346 | 70 | 0 |
| 28 | 1 | 15 | 140 | 0.3 | 500 | — | — | 0 |

| | Primary layer coating Molar ratio of coating components | | Secondary layer coating | | | |
|---|---|---|---|---|---|---|
| No. | $Mg/SiO_2$ *5 | $P_2O_5/Mg$ *6 | Resin composition *3 | Drying temperature (°C.) | Coating thickness (μm) | Classification |
| 15 | 0.94 | 2.12 | 1 | 230 | 1 | Example |
| 16 | 1 | 2 | 1 | 230 | 1 | Example |
| 17 | 0.94 | 2.12 | 1 | 230 | 1 | Example |
| 18 | 1.82 | 2.1 | 1 | 230 | 1 | Example |
| 19 | 1.5 | 2 | 1 | 230 | 1 | Example |
| 20 | 1 | 2 | 1 | 230 | 1 | Example |
| 21 | 0.33 | 2 | 1 | 230 | 1 | Example |
| 22 | — | — | 1 | 230 | 1 | Example |
| 23 | — | — | 1 | 230 | 1 | Example |
| 24 | 2 | 8 | 1 | 230 | 1 | Example |
| 25 | — | 1.2 | 1 | 230 | 1 | Comparative example |
| 26 | — | — | 1 | 230 | 1 | Comparative example |
| 27 | 0.5 | — | 1 | 230 | 1 | Comparative example |
| 28 | — | — | 1 | 230 | 1 | Comparative example |

TABLE 24

| | Performance | | | | |
|---|---|---|---|---|---|
| No. | Appearance | White-rust resistance: SST 96 hrs | White-rust resistance after alkaline degreasing: SST 96 hrs | Paint adhesiveness | Classification |
| 15 | ○ | ◉ | ◉ | ◉ | Example |
| 16 | ○ | ◉ | ◉ | ◉ | Example |
| 17 | ○ | ◉ | ◉ | ◉ | Example |
| 18 | ○ | ◉ | ◉ | ◉ | Example |
| 19 | ○ | ○ | ○ | ◉ | Example |
| 20 | ○ | ○ | ○ | ◉ | Example |
| 21 | ○ | ◉ | ◉ | ◉ | Example |
| 22 | ○ | ○+ | ○+ | ◉ | Example |
| 23 | ○ | ○ | ○ | ◉ | Example |
| 24 | ○ | ○ | ○ | ◉ | Example |
| 25 | ○ | Δ | Δ | ◉ | Comparative example |
| 26 | ○ | Δ | Δ | ◉ | Comparative example |
| 27 | ○ | Δ | Δ | ◉ | Comparative example |
| 28 | ○ | X | Δ | ◉ | Comparative example |

TABLE 25

| | Primary layer coating | | | | | | |
|---|---|---|---|---|---|---|---|
| | | | | | Coating weight *4 | | |
| No. | Plating steel plate *1 | Coating composition *2 | Drying temperature (°C.) | Coating thickness (μm) | Total coating weight (mg/m$^2$) | $SiO_2$ fine particles (α) (mg/m$^2$) | Mg component (β) (mg/m$^2$) | $P_2O_5$ component (γ) (mg/m$^2$) |
| 29 | 1 | 1 | 140 | 0.3 | 366 | 34 | 25 | 307 |
| 30 | 1 | 1 | 140 | 0.3 | 366 | 34 | 25 | 307 |
| 31 | 1 | 1 | 140 | 0.3 | 366 | 34 | 25 | 307 |

TABLE 25-continued

| | | | | | | | | |
|---|---|---|---|---|---|---|---|---|
| 32 | 1 | 1 | 140 | 0.3 | 366 | 34 | 25 | 307 |
| 33 | 1 | 1 | 140 | 0.3 | 366 | 34 | 25 | 307 |
| 34 | 1 | 1 | 140 | 0.3 | 366 | 34 | 25 | 307 |
| 35 | 1 | 1 | 140 | 0.3 | 366 | 34 | 25 | 307 |
| 36 | 1 | 1 | 140 | 0.3 | 366 | 34 | 25 | 307 |
| 37 | 1 | 1 | 140 | 0.3 | 366 | 34 | 25 | 307 |
| 38 | 1 | 1 | 140 | 0.3 | 366 | 34 | 25 | 307 |
| 39 | 1 | 1 | 140 | 0.3 | 366 | 34 | 25 | 307 |

| | Primary layer coating Molar ratio of coating components | | | Secondary layer coating | | | | |
|---|---|---|---|---|---|---|---|---|
| | | | Resin | Fine particles silica (b) | | Drying | Coating | |
| No. | $Mg/SiO_2$ *5 | $P_2O_5/Mg$ *6 | composition *3 | Type *8 | Blending rate *9 | temperature (° C.) | thickness (μm) | Classification |
| 29 | 1.82 | 2.1 | 1 | 1 | 10 | 230 | 1 | Example |
| 30 | 1.82 | 2.1 | 1 | 2 | 10 | 230 | 1 | Example |
| 31 | 1.82 | 2.1 | 1 | 3 | 10 | 230 | 1 | Example |
| 32 | 1.82 | 2.1 | 1 | 4 | 10 | 230 | 1 | Example |
| 33 | 1.82 | 2.1 | 1 | 5 | 10 | 230 | 1 | Example |
| 34 | 1.82 | 2.1 | 1 | 6 | 10 | 230 | 1 | Example |
| 35 | 1.82 | 2.1 | 1 | 7 | 10 | 230 | 1 | Example |
| 36 | 1.82 | 2.1 | 1 | 8 | 10 | 230 | 1 | Example |
| 37 | 1.82 | 2.1 | 1 | 9 | 10 | 230 | 1 | Example |
| 38 | 1.82 | 2.1 | 1 | 10 | 10 | 230 | 1 | Example |
| 39 | 1.82 | 2.1 | 1 | 11 | 10 | 230 | 1 | Example |

TABLE 26

| | Performance | | | | |
|---|---|---|---|---|---|
| No. | Appearance | White-rust resistance: SST 96 hrs | White-rust resistance after alkaline degreasing: SST 96 hrs | Paint adhesiveness | Classification |
| 29 | ○ | ⊙ | ⊙ | ⊙ | Example |
| 30 | ○ | ⊙ | ⊙ | ⊙ | Example |
| 31 | ○ | ⊙ | ⊙ | ⊙ | Example |
| 32 | ○ | ⊙ | ⊙ | ⊙ | Example |
| 33 | ○ | ⊙ | ⊙ | ⊙ | Example |
| 34 | ○ | ⊙ | ⊙ | ⊙ | Example |
| 35 | ○ | ⊙ | ⊙ | ⊙ | Example |
| 36 | ○ | ⊙ | ⊙ | ⊙ | Example |
| 37 | ○ | ⊙ | ⊙ | ⊙ | Example |
| 38 | ○ | ⊙ | ⊙ | ⊙ | Example |
| 39 | ○ | ⊙ | ⊙ | ⊙ | Example |

TABLE 27

| | Primary layer coating | | | | | | | |
|---|---|---|---|---|---|---|---|---|
| | | | | | Coating weight *4 | | | |
| No. | Plating steel plate *1 | Coating composition *2 | Drying temperature (° C.) | Coating thickness (μm) | Total coating weight (mg/m²) | $SiO_2$ fine particles (α) (mg/m²) | Mg component (β) (mg/m²) | $P_2O_5$ component (γ) (mg/m²) |
| 40 | 1 | 1 | 140 | 0.3 | 366 | 34 | 25 | 307 |
| 41 | 1 | 1 | 140 | 0.3 | 366 | 34 | 25 | 307 |
| 42 | 1 | 1 | 140 | 0.3 | 366 | 34 | 25 | 307 |
| 43 | 1 | 1 | 140 | 0.3 | 366 | 34 | 25 | 307 |
| 44 | 1 | 1 | 140 | 0.3 | 366 | 34 | 25 | 307 |
| 45 | 1 | 1 | 140 | 0.3 | 366 | 34 | 25 | 307 |

TABLE 27-continued

| No. | | | | | | | | |
|---|---|---|---|---|---|---|---|---|
| 46 | 1 | 1 | 140 | 0.3 | 366 | 34 | 25 | 307 |
| 47 | 1 | 1 | 140 | 0.3 | 366 | 34 | 25 | 307 |
| 48 | 1 | 1 | 140 | 0.3 | 366 | 34 | 25 | 307 |
| 49 | 1 | 1 | 140 | 0.3 | 366 | 34 | 25 | 307 |
| 50 | 1 | 1 | 140 | 0.3 | 366 | 34 | 25 | 307 |

| | Primary layer coating Molar ratio of coating components | | Secondary layer coating | | | | |
|---|---|---|---|---|---|---|---|
| | | | Resin composition *3 | Fine particles silica (b) | | Drying temperature (° C.) | Coating thickness ($\mu$m) | Classification |
| No. | $Mg/SiO_2$ *5 | $P_2O_5/Mg$ *6 | | Type *8 | Blending rate *9 | | | |
| 40 | 1.82 | 2.1 | 1 | — | — | 230 | 1 | Example |
| 41 | 1.82 | 2.1 | 1 | 1 | 1 | 230 | 1 | Example |
| 42 | 1.82 | 2.1 | 1 | 1 | 5 | 230 | 1 | Example |
| 43 | 1.82 | 2.1 | 1 | 1 | 10 | 230 | 1 | Example |
| 44 | 1.82 | 2.1 | 1 | 1 | 20 | 230 | 1 | Example |
| 45 | 1.82 | 2.1 | 1 | 1 | 30 | 230 | 1 | Example |
| 46 | 1.82 | 2.1 | 1 | 1 | 40 | 230 | 1 | Example |
| 47 | 1.82 | 2.1 | 1 | 1 | 50 | 230 | 1 | Example |
| 48 | 1.82 | 2.1 | 1 | 1 | 80 | 230 | 1 | Example |
| 49 | 1.82 | 2.1 | 1 | 1 | 100 | 230 | 1 | Example |
| 50 | 1.82 | 2.1 | 1 | 1 | 150 | 230 | 1 | Comparative example |

TABLE 28

| | Performance | | | | |
|---|---|---|---|---|---|
| No. | Appearance | White-rust resistance: SST 96 hrs | White-rust resistance after alkaline degreasing: SST 96 hrs | Paint adhesiveness | Classification |
| 40 | ◯ | ◯− | ◯− | ◉ | Example |
| 41 | ◯ | ◯ | ◯ | ◉ | Example |
| 42 | ◯ | ◯+ | ◯+ | ◉ | Example |
| 43 | ◯ | ◉ | ◉ | ◉ | Example |
| 44 | ◯ | ◉ | ◉ | ◉ | Example |
| 45 | ◯ | ◉ | ◉ | ◉ | Example |
| 46 | ◯ | ◉ | ◉ | ◉ | Example |
| 47 | ◯ | ◯+ | ◯+ | ◉ | Example |
| 48 | ◯ | ◯ | ◯ | ◉ | Example |
| 49 | ◯ | ◯− | ◯− | ◉ | Example |
| 50 | ◯ | Δ | Δ | ◉ | Comparative example |

TABLE 29

| | | | | | Primary layer coating | | | |
|---|---|---|---|---|---|---|---|---|
| | | | | | | Coating weight *4 | | |
| No. | Plating steel plate *1 | Coating composition *2 | Drying temperature (° C.) | Coating thickness ($\mu$m) | Total coating weight (mg/m²) | $SiO_2$ fine particles ($\alpha$) (mg/m²) | Mg component ($\beta$) (mg/m²) | $P_2O_5$ component ($\gamma$) (mg/m²) |
| 51 | 2 | 1 | 140 | 0.3 | 366 | 34 | 25 | 307 |
| 52 | 3 | 1 | 140 | 0.3 | 366 | 34 | 25 | 307 |
| 53 | 4 | 1 | 140 | 0.3 | 366 | 34 | 25 | 307 |
| 54 | 5 | 1 | 140 | 0.3 | 366 | 34 | 25 | 307 |
| 55 | 6 | 1 | 140 | 0.3 | 366 | 34 | 25 | 307 |
| 56 | 7 | 1 | 140 | 0.3 | 366 | 34 | 25 | 307 |
| 57 | 8 | 1 | 140 | 0.3 | 366 | 34 | 25 | 307 |
| 58 | 9 | 1 | 140 | 0.3 | 366 | 34 | 25 | 307 |
| 59 | 10 | 1 | 140 | 0.3 | 366 | 34 | 25 | 307 |
| 60 | 11 | 1 | 140 | 0.3 | 366 | 34 | 25 | 307 |
| 61 | 12 | 1 | 140 | 0.3 | 366 | 34 | 25 | 307 |
| 62 | 13 | 1 | 140 | 0.3 | 366 | 34 | 25 | 307 |

TABLE 29-continued

| | Primary layer coating Molar ratio of coating components | | Secondary layer coating | | | | | |
|---|---|---|---|---|---|---|---|---|
| | | | Resin | Fine particles silica (b) | | Drying | Coating | |
| No. | Mg/SiO$_2$ *5 | P$_2$O$_5$/Mg *6 | composition *3 | Type *8 | Blending rate *9 | temperature (° C.) | thickness (μm) | Classification |
| 51 | 1.82 | 2.1 | 1 | 1 | 10 | 230 | 1 | Example |
| 52 | 1.82 | 2.1 | 1 | 1 | 10 | 230 | 1 | Example |
| 53 | 1.82 | 2.1 | 1 | 1 | 10 | 230 | 1 | Example |
| 54 | 1.82 | 2.1 | 1 | 1 | 10 | 230 | 1 | Example |
| 55 | 1.82 | 2.1 | 1 | 1 | 10 | 230 | 1 | Example |
| 56 | 1.82 | 2.1 | 1 | 1 | 10 | 230 | 1 | Example |
| 57 | 1.82 | 2.1 | 1 | 1 | 10 | 230 | 1 | Example |
| 58 | 1.82 | 2.1 | 1 | 1 | 10 | 230 | 1 | Example |
| 59 | 1.82 | 2.1 | 1 | 1 | 10 | 230 | 1 | Example |
| 60 | 1.82 | 2.1 | 1 | 1 | 10 | 230 | 1 | Example |
| 61 | 1.82 | 2.1 | 1 | 1 | 10 | 230 | 1 | Example |
| 62 | 1.82 | 2.1 | 1 | 1 | 10 | 230 | 1 | Example |

TABLE 30

| | Performance | | | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 51 | ○ | ◉ | ◉ | ◉ | ◉ | Example |
| 52 | ○ | ◉ | ◉ | ◉ | ◉ | Example |
| 53 | ○ | ◉ | ◉ | ◉ | ◉ | Example |
| 54 | ○ | ◉ | ◉ | ◉ | ◉ | Example |
| 55 | ○ | ◉ | ◉ | ◉ | ◉ | Example |
| 56 | ○ | ◉ | ◉ | ◉ | ◉ | Example |
| 57 | ○ | ◉ | ◉ | ◉ | ◉ | Example |
| 58 | ○ | ◉ | ◉ | ◉ | ◉ | Example |
| 59 | ○ | ◉ | ◉ | ◉ | ◉ | Example |
| 60 | ○ | ◉ | ◉ | ◉ | ◉ | Example |
| 61 | ○ | ◉ | ◉ | ◉ | ◉ | Example |
| 62 | ○ | ◉ | ◉ | ◉ | ◉ | Example |

TABLE 31

| | | | | | Primary layer coating | | | | | |
|---|---|---|---|---|---|---|---|---|---|---|
| | Plating steel | Coating | Drying | Coating | Coating weight *4 | | | | Molar ratio of coating components | |
| | | | | | Total coating | SiO$_2$ fine particles | Mg component | P$_2$O$_5$ component | | |
| No. | plate *1 | composition *2 | temperature (° C.) | thickness (μm) | weight (mg/m$^2$) | (α) (mg/m$^2$) | (β) (mg/m$^2$) | (γ) (mg/m$^2$) | Mg/SiO$_2$ *5 | P$_2$O$_5$/Mg *6 |
| 63 | 1 | 1 | 140 | 0.3 | 366 | 34 | 25 | 307 | 1.82 | 2.1 |
| 64 | 1 | 1 | 140 | 0.3 | 366 | 34 | 25 | 307 | 1.82 | 2.1 |
| 65 | 1 | 1 | 140 | 0.3 | 366 | 34 | 25 | 307 | 1.82 | 2.1 |
| 66 | 1 | 1 | 140 | 0.3 | 366 | 34 | 25 | 307 | 1.82 | 2.1 |
| 67 | 1 | 1 | 140 | 0.3 | 366 | 34 | 25 | 307 | 1.82 | 2.1 |
| 68 | 1 | 1 | 140 | 0.3 | 366 | 34 | 25 | 307 | 1.82 | 2.1 |
| 69 | 1 | 1 | 140 | 0.3 | 366 | 34 | 25 | 307 | 1.82 | 2.1 |
| 70 | 1 | 1 | 140 | 0.3 | 366 | 34 | 25 | 307 | 1.82 | 2.1 |
| 71 | 1 | 1 | 140 | 0.3 | 366 | 34 | 25 | 307 | 1.82 | 2.1 |
| 72 | 1 | 1 | 140 | 0.3 | 366 | 34 | 25 | 307 | 1.82 | 2.1 |

TABLE 31-continued

| | | Secondary layer coating | | | | |
| --- | --- | --- | --- | --- | --- | --- |
| | | Resin | Fine particles silica (b) | | Drying | Coating |
| | No. | composition *3 | Type *8 | Blending rate *9 | temperature (° C.) | thickness (μm) | Classification |
| | 63 | 1 | 1 | 10 | 230 | 0.01 | Comparative example |
| | 64 | 1 | 1 | 10 | 230 | 0.1 | Example |
| | 65 | 1 | 1 | 10 | 230 | 0.5 | Example |
| | 66 | 1 | 1 | 10 | 230 | 1 | Example |
| | 67 | 1 | 1 | 10 | 230 | 2 | Example |
| | 68 | 1 | 1 | 10 | 230 | 2.5 | Example |
| | 69 | 1 | 1 | 10 | 230 | 3 | Example |
| | 70 | 1 | 1 | 10 | 230 | 4 | Example |
| | 71 | 1 | 1 | 10 | 230 | 5 | Example |
| | 72 | 1 | 1 | 10 | 230 | 20 | Comparative example |

TABLE 32

| | Performance | | | | |
| --- | --- | --- | --- | --- | --- |
| No. | Appearance | White-rust resistance: SST 120 hrs | White-rust resistance after alkaline degreasing: SST 120 hrs | Paint adhesiveness | Classification |
| 63 | ○ | x | x | ◎ | Comparative example |
| 64 | ○ | ○− | ○− | ◎ | Example |
| 65 | ○ | ○ | ○ | ◎ | Example |
| 66 | ○ | ◎ | ◎ | ◎ | Example |
| 67 | ○ | ◎ | ◎ | ◎ | Example |
| 68 | ○ | ◎ | ◎ | ◎ | Example |
| 69 | ○ | ◎ | ◎ | ◎ | Example |
| 70 | ○ | ◎ | ◎ | ◎ | Example |
| 71 | ○ | ◎ | ◎ | ◎ | Example |
| 72 | ○ | ◎ | ◎ | ◎ | Comparative※1 example |

※1 Unable to weld

TABLE 33

| | Primary layer coating | | | | | | | | | |
| --- | --- | --- | --- | --- | --- | --- | --- | --- | --- | --- |
| | | | | | Coating weight *4 | | | | Molar ratio of coating components | |
| | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| No. | | | | | | | | | | |
| 73 | 1 | 1 | 140 | 0.3 | 366 | 34 | 25 | 307 | 1.82 | 2.1 |
| 74 | 1 | 1 | 140 | 0.3 | 366 | 34 | 25 | 307 | 1.82 | 2.1 |
| 75 | 1 | 1 | 140 | 0.3 | 366 | 34 | 25 | 307 | 1.82 | 2.1 |
| 76 | 1 | 1 | 140 | 0.3 | 366 | 34 | 25 | 307 | 1.82 | 2.1 |
| 77 | 1 | 1 | 140 | 0.3 | 366 | 34 | 25 | 307 | 1.82 | 2.1 |
| 78 | 1 | 1 | 140 | 0.3 | 366 | 34 | 25 | 307 | 1.82 | 2.1 |
| 79 | 1 | 1 | 140 | 0.3 | 366 | 34 | 25 | 307 | 1.82 | 2.1 |
| 80 | 1 | 1 | 140 | 0.3 | 366 | 34 | 25 | 307 | 1.82 | 2.1 |
| 81 | 1 | 1 | 140 | 0.3 | 366 | 34 | 25 | 307 | 1.82 | 2.1 |
| 82 | 1 | 1 | 140 | 0.3 | 366 | 34 | 25 | 307 | 1.82 | 2.1 |

TABLE 33-continued

|  | Secondary layer coating | | | | | |
|---|---|---|---|---|---|---|
|  | Resin | Fine particles silica (b) | | Drying | Coating | |
| No. | composition *3 | Type *8 | Blending rate *9 | temperature (° C.) | thickness (μm) | Classification |
| 73 | 1 | 1 | 10 | 40 | 1 | Comparative example |
| 74 | 1 | 1 | 10 | 50 | 1 | Example |
| 75 | 1 | 1 | 10 | 80 | 1 | Example |
| 76 | 1 | 1 | 10 | 120 | 1 | Example |
| 77 | 1 | 1 | 10 | 180 | 1 | Example |
| 78 | 1 | 1 | 10 | 200 | 1 | Example |
| 79 | 1 | 1 | 10 | 230 | 1 | Example |
| 80 | 1 | 1 | 10 | 250 | 1 | Example |
| 81 | 1 | 1 | 10 | 350 | 1 | Example |
| 82 | 1 | 1 | 10 | 380 | 1 | Comparative example |

TABLE 34

| No. | Performance | | | | Classification |
|---|---|---|---|---|---|
|  | Appearance | White-rust resistance: SST 120 hrs | White-rust resistance after alkaline degreasing: SST 120 hrs | Paint adhesiveness | |
| 73 | ○ | X | X | X | Comparative example |
| 74 | ○ | ○− | ○− | ○ | Example |
| 75 | ○ | ○ | ○− | ○+ | Example |
| 76 | ○ | ⊙ | ○ | ⊙ | Example |
| 77 | ○ | ⊙ | ⊙ | ⊙ | Example |
| 78 | ○ | ⊙ | ⊙ | ⊙ | Example |
| 79 | ○ | ⊙ | ⊙ | ⊙ | Example |
| 80 | ○ | ⊙ | ⊙ | ⊙ | Example |
| 81 | ○ | ○ | ○ | ⊙ | Example |
| 82 | ○ | Δ | Δ | ⊙ | Comparative example |

TABLE 35

| | Primary layer coating | | | | | | | | | | |
|---|---|---|---|---|---|---|---|---|---|---|---|
| | | | | | Coating weight *4 | | | | Molar ratio of coating components | | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 | Classification |
| 83 | 1 | 1 | 140 | 0.3 | 366 | 34 | 25 | 307 | 1.82 | 2.1 | Example |
| 84 | 1 | 1 | 140 | 0.3 | 366 | 34 | 25 | 307 | 1.82 | 2.1 | Example |
| 85 | 1 | 1 | 140 | 0.3 | 366 | 34 | 25 | 307 | 1.82 | 2.1 | Example |
| 86 | 1 | 1 | 140 | 0.3 | 366 | 34 | 25 | 307 | 1.82 | 2.1 | Example |
| 87 | 1 | 1 | 140 | 0.3 | 366 | 34 | 25 | 307 | 1.82 | 2.1 | Example |
| 88 | 1 | 1 | 140 | 0.3 | 366 | 34 | 25 | 307 | 1.82 | 2.1 | Example |
| 89 | 1 | 1 | 140 | 0.3 | 366 | 34 | 25 | 307 | 1.82 | 2.1 | Example |
| 90 | 1 | 1 | 140 | 0.3 | 366 | 34 | 25 | 307 | 1.82 | 2.1 | Example |
| 91 | 1 | 1 | 140 | 0.3 | 366 | 34 | 25 | 307 | 1.82 | 2.1 | Example |
| 92 | 1 | 1 | 140 | 0.3 | 366 | 34 | 25 | 307 | 1.82 | 2.1 | Example |
| 93 | 1 | 1 | 140 | 0.3 | 366 | 34 | 25 | 307 | 1.82 | 2.1 | Comparative example |
| 94 | 1 | 1 | 140 | 0.001 | 1.46 | 0.14 | 0.10 | 1.23 | 1.82 | 2.1 | Comparative example |
| 95 | 1 | 1 | 140 | 0.005 | 5.85 | 0.54 | 0.40 | 4.91 | 1.82 | 2.1 | Example |
| 96 | 1 | 1 | 140 | 0.01 | 14.63 | 1.36 | 1.00 | 12.27 | 1.82 | 2.1 | Example |

TABLE 36

| | Secondary layer coating | | | | | | | |
|---|---|---|---|---|---|---|---|---|
| | Resin | Fine particles silica (b) | | Solid lubricant (c) | | Drying | Coating | |
| No. | composition *3 | Type *8 | Blending rate *9 | Type *12 | Blending rate *13 | temperature (° C.) | thickness (μm) | Classification |
| 83 | 1 | 1 | 10 | 1 | 5 | 230 | 1 | Example |
| 84 | 1 | 1 | 10 | 2 | 5 | 230 | 1 | Example |
| 85 | 1 | 1 | 10 | 3 | 5 | 230 | 1 | Example |
| 86 | 1 | 1 | 10 | 4 | 5 | 230 | 1 | Example |
| 87 | 1 | 1 | 10 | 5 | 5 | 230 | 1 | Example |
| 88 | 1 | 1 | 10 | 6 | 5 | 230 | 1 | Example |
| 89 | 1 | 1 | 10 | 1 | 1 | 230 | 1 | Example |
| 90 | 1 | 1 | 10 | 1 | 10 | 230 | 1 | Example |
| 91 | 1 | 1 | 10 | 1 | 30 | 230 | 1 | Example |
| 92 | 1 | 1 | 10 | 1 | 80 | 230 | 1 | Example |
| 93 | 1 | 1 | 10 | 1 | 100 | 230 | 1 | Comparative example |
| 94 | 1 | 1 | 10 | 1 | 5 | 230 | 1 | Comparative example |
| 95 | 1 | 1 | 10 | 1 | 5 | 230 | 1 | Example |
| 96 | 1 | 1 | 10 | 1 | 5 | 230 | 1 | Example |

TABLE 37

| | Performance | | | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 83 | ○ | ○+ | ○+ | ◎ | ◎ | Example |
| 84 | ○ | ◎ | ◎ | ◎ | ◎ | Example |
| 85 | ○ | ◎ | ◎ | ◎ | ◎ | Example |
| 86 | ○ | ◎ | ◎ | ◎ | ◎ | Example |
| 87 | ○ | ◎ | ◎ | ◎ | ◎ | Example |
| 88 | ○ | ◎ | ◎ | ◎ | ◎ | Example |
| 89 | ○ | ◎ | ◎ | ◎ | ○ | Example |
| 90 | ○ | ◎ | ◎ | ◎ | ◎ | Example |
| 91 | ○ | ◎ | ◎ | ◎ | ◎ | Example |
| 92 | ○ | ◎ | ◎ | ○ | ◎ | Example |
| 93 | ○ | ◎ | ◎ | X | ◎ | Comparative example |
| 94 | ○ | X | X | ◎ | ◎ | Comparative example |
| 95 | ○ | ○− | ○− | ◎ | ◎ | Example |
| 96 | ○ | ○ | ○ | ◎ | ◎ | Example |

※1: Unable to weld

TABLE 38

| | Primary layer coating | | | | | | | | | | |
|---|---|---|---|---|---|---|---|---|---|---|---|
| | | | | | Coating weight *4 | | | | Molar ratio of coating components | | |
| | Plating steel | Coating | Drying | Coating | Total coating | SiO₂ fine particles | Mg component | P₂O₅ component | | | |
| No. | plate *1 | composition *2 | temperature (° C.) | thickness (μm) | weight (mg/m²) (α) | (β) (mg/m²) | (γ) (mg/m²) | (mg/m²) | Mg/SiO₂ *5 | P₂O₅/Mg *6 | Classification |
| 97 | 1 | 1 | 140 | 0.1 | 146 | 14 | 10 | 123 | 1.82 | 2.1 | Example |
| 98 | 1 | 1 | 140 | 0.5 | 585 | 54 | 40 | 491 | 1.82 | 2.1 | Example |
| 99 | 1 | 1 | 140 | 1 | 1170 | 109 | 80 | 982 | 1.82 | 2.1 | Example |
| 100 | 1 | 1 | 140 | 2 | 2341 | 217 | 160 | 1963 | 1.82 | 2.1 | Example |
| 101 | 1 | 1 | 140 | 3 | 3511 | 326 | 240 | 2945 | 1.82 | 2.1 | Example |
| 102 | 1 | 1 | 140 | 5 | 5851 | 543 | 400 | 4909 | 1.82 | 2.1 | Comparative example |
| 103 | 1 | 1 | 30 | 0.3 | 366 | 34 | 25 | 307 | 1.82 | 2.1 | Comparative example |
| 104 | 1 | 1 | 50 | 0.3 | 366 | 34 | 25 | 307 | 1.82 | 2.1 | Example |
| 105 | 1 | 1 | 80 | 0.3 | 366 | 34 | 25 | 307 | 1.82 | 2.1 | Example |

TABLE 38-continued

| | | | | | Primary layer coating | | | | | | |
|---|---|---|---|---|---|---|---|---|---|---|---|
| | | | | | | Coating weight *4 | | | | | |
| | Plating steel plate | Coating composition | Drying temperature | Coating thickness | Total coating weight | SiO$_2$ fine particles (α) | Mg component (β) | P$_2$O$_5$ component (γ) | Molar ratio of coating components | | |
| No. | *1 | *2 | (° C.) | (μm) | (mg/m$^2$) | (mg/m$^2$) | (mg/m$^2$) | (mg/m$^2$) | Mg/SiO$_2$ *5 | P$_2$O$_5$/Mg *6 | Classification |
| 106 | 1 | 1 | 120 | 0.3 | 366 | 34 | 25 | 307 | 1.82 | 2.1 | Example |
| 107 | 1 | 1 | 180 | 0.3 | 366 | 34 | 25 | 307 | 1.82 | 2.1 | Example |
| 108 | 1 | 1 | 200 | 0.3 | 366 | 34 | 25 | 307 | 1.82 | 2.1 | Example |
| 109 | 1 | 1 | 300 | 0.3 | 366 | 34 | 25 | 307 | 1.82 | 2.1 | Example |
| 110 | 1 | 1 | 350 | 0.3 | 366 | 34 | 25 | 307 | 1.82 | 2.1 | Comparative example |

TABLE 39

| | | Secondary layer coating | | | | | | |
|---|---|---|---|---|---|---|---|---|
| | Resin | Fine particles silica (b) | | Solid lubricant (c) | | Drying | Coating | |
| No. | composition *3 | Type *8 | Blending rate *9 | Type *12 | Blending rate *13 | temperature (° C.) | thickness (μm) | Classification |
| 97 | 1 | 1 | 10 | 1 | 5 | 230 | 1 | Example |
| 98 | 1 | 1 | 10 | 1 | 5 | 230 | 1 | Example |
| 99 | 1 | 1 | 10 | 1 | 5 | 230 | 1 | Example |
| 100 | 1 | 1 | 10 | 1 | 5 | 230 | 1 | Example |
| 101 | 1 | 1 | 10 | 1 | 5 | 230 | 1 | Example |
| 102 | 1 | 1 | 10 | 1 | 5 | 230 | 1 | Comparative example |
| 103 | 1 | 1 | 10 | 1 | 5 | 230 | 1 | Comparative example |
| 104 | 1 | 1 | 10 | 1 | 5 | 230 | 1 | Example |
| 105 | 1 | 1 | 10 | 1 | 5 | 230 | 1 | Example |
| 106 | 1 | 1 | 10 | 1 | 5 | 230 | 1 | Example |
| 107 | 1 | 1 | 10 | 1 | 5 | 230 | 1 | Example |
| 108 | 1 | 1 | 10 | 1 | 5 | 230 | 1 | Example |
| 109 | 1 | 1 | 10 | 1 | 5 | 230 | 1 | Example |
| 110 | 1 | 1 | 10 | 1 | 5 | 230 | 1 | Comparative example |

TABLE 40

| | | Performance | | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 97 | ○ | ○+ | ○+ | ◉ | ◉ | Example |
| 98 | ○ | ◉ | ◉ | ◉ | ◉ | Example |
| 99 | ○ | ◉ | ◉ | ◉ | ◉ | Example |
| 100 | ○ | ◉ | ◉ | ◉ | ◉ | Example |
| 101 | ○ | ◉ | ◉ | ◉ | ◉ | Example |
| 102 | ○ | ◉ | ◉ | ◉ | ◉ | Comparative example ※1 |
| 103 | ○ | X | X | X | ◉ | Comparative example |
| 104 | ○ | ○− | ○− | ○ | ◉ | Example |
| 105 | ○ | ◉ | ◉ | ◉ | ◉ | Example |
| 106 | ○ | ◉ | ◉ | ◉ | ◉ | Example |
| 107 | ○ | ◉ | ◉ | ◉ | ◉ | Example |
| 108 | ○ | ◉ | ◉ | ◉ | ◉ | Example |
| 109 | ○ | ◉ | ◉ | ◉ | ◉ | Example |
| 110 | ○ | X | X | ◉ | ◉ | Comparative example |

※1: Unable to weld

TABLE 41

| | | | | | Primary layer coating | | | | | |
|---|---|---|---|---|---|---|---|---|---|---|
| | | | | | Coating weight *4 | | | | Molar ratio of coating components | |
| No. | Plating steel plate *1 | Coating composition *2 | Drying temperature (°C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 111 | 1 | 1 | 140 | 0.3 | 366 | 34 | 25 | 307 | 1.82 | 2.1 |
| 112 | 1 | 1 | 140 | 0.3 | 366 | 34 | 25 | 307 | 1.82 | 2.1 |
| 113 | 1 | 1 | 140 | 0.3 | 366 | 34 | 25 | 307 | 1.82 | 2.1 |
| 114 | 1 | 1 | 140 | 0.3 | 366 | 34 | 25 | 307 | 1.82 | 2.1 |
| 115 | 1 | 1 | 140 | 0.3 | 366 | 34 | 25 | 307 | 1.82 | 2.1 |
| 116 | 1 | 1 | 140 | 0.3 | 366 | 34 | 25 | 307 | 1.82 | 2.1 |
| 117 | 1 | 1 | 140 | 0.3 | 366 | 34 | 25 | 307 | 1.82 | 2.1 |
| 118 | 1 | 1 | 140 | 0.3 | 366 | 34 | 25 | 307 | 1.82 | 2.1 |
| 119 | 1 | 1 | 140 | 0.3 | 366 | 34 | 25 | 307 | 1.82 | 2.1 |
| 120 | 1 | 1 | 140 | 0.3 | 366 | 34 | 25 | 307 | 1.82 | 2.1 |
| 121 | 1 | 1 | 140 | 0.3 | 366 | 34 | 25 | 307 | 1.82 | 2.1 |
| 122 | 1 | 1 | 140 | 0.3 | 366 | 34 | 25 | 307 | 1.82 | 2.1 |
| 123 | 1 | 1 | 140 | 0.3 | 366 | 34 | 25 | 307 | 1.82 | 2.1 |
| 124 | 1 | 1 | 140 | 0.3 | 366 | 34 | 25 | 307 | 1.82 | 2.1 |

| | Secondary layer coating | | | | |
|---|---|---|---|---|---|
| No. | Resin composition *3 | Ion-exchanged silica (a) content *7 | Drying temperature (°C.) | Coating thickness (μm) | Classification |
| 111 | 1 | 30 | 230 | 1 | Example |
| 112 | 2 | 30 | 230 | 1 | Example |
| 113 | 3 | 30 | 230 | 1 | Example |
| 114 | 4 | 30 | 230 | 1 | Example |
| 115 | 5 | 30 | 230 | 1 | Example |
| 116 | 6 | 30 | 230 | 1 | Example |
| 117 | 7 | 30 | 230 | 1 | Example |
| 118 | 8 | 30 | 230 | 1 | Example |
| 119 | 9 | 30 | 230 | 1 | Example |
| 120 | 10 | 30 | 230 | 1 | Example |
| 121 | 11 | 30 | 230 | 1 | Example |
| 122 | 12 | 30 | 230 | 1 | Comparative example |
| 123 | 13 | 30 | 230 | 1 | Comparative example |
| 124 | 14 | 30 | 230 | 1 | Comparative example |

TABLE 42

| | Performance | | | | |
|---|---|---|---|---|---|
| No. | Appearance | White-rust resistance: SST 150 hrs | White-rust resistance after alkaline degreasing: SST 150 hrs | Paint adhesiveness | Classification |
| 111 | ○ | ⊙ | ⊙ | ⊙ | Example |
| 112 | ○ | ⊙ | ⊙ | ⊙ | Example |
| 113 | ○ | ⊙ | ⊙ | ⊙ | Example |
| 114 | ○ | ⊙ | ⊙ | ⊙ | Example |
| 115 | ○ | ⊙ | ⊙ | ⊙ | Example |
| 116 | ○ | ⊙ | ⊙ | ⊙ | Example |
| 117 | ○ | ⊙ | ⊙ | ⊙ | Example |
| 118 | ○ | ⊙ | ⊙ | ⊙ | Example |
| 119 | ○ | ⊙ | ⊙ | ⊙ | Example |
| 120 | ○ | ⊙ | ⊙ | ⊙ | Example |
| 121 | ○ | ⊙ | ⊙ | ⊙ | Example |
| 122 | ○ | Δ | X | ⊙ | Comparative example |
| 123 | ○ | X | X | X | Comparative example |
| 124 | ○ | Δ | X | ⊙ | Comparative example |

TABLE 43

| | | | | | Primary layer coating | | | |
| | | | | | Coating weight *4 | | | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) |
|---|---|---|---|---|---|---|---|---|
| 125 | 1 | 2 | 140 | 0.3 | 400 | 66 | 25 | 310 |
| 126 | 1 | 3 | 140 | 0.3 | 303 | 49 | 20 | 234 |
| 127 | 1 | 4 | 140 | 0.3 | 320 | 53 | 20 | 248 |
| 128 | 1 | 5 | 140 | 0.3 | 293 | 27 | 20 | 245 |
| 129 | 1 | 6 | 140 | 0.3 | 317 | (Al₂O₃) | 25 | 292 |
| 130 | 1 | 7 | 140 | 0.3 | 317 | (ZrO₂) | 25 | 292 |
| 131 | 1 | 8 | 140 | 0.3 | 403 | 150 | 20 | 234 |
| 132 | 1 | 9 | 140 | 0.3 | 320 | 95 | (Ca) | 225 |
| 133 | 1 | 10 | 140 | 0.3 | 320 | 90 | (Sr) | 230 |
| 134 | 1 | 11 | 140 | 0.3 | 329 | 89 | (Ba) | 240 |
| 135 | 1 | 12 | 140 | 0.3 | 320 | — | 40 | 280 |
| 136 | 1 | 13 | 140 | 0.3 | 300 | 50 | — | 250 |
| 137 | 1 | 14 | 140 | 0.3 | 416 | 346 | 70 | 0 |
| 138 | 1 | 15 | 140 | 0.3 | 500 | — | — | 0 |

| | Primary layer coating Molar ratio of coating components | | | Secondary layer coating | | | |
| No. | Mg/SiO₂ *5 | P₂O₅/Mg *6 | Resin composition *3 | Ion-exchanged silica (a) content *7 | Drying temperature (° C.) | Coating thickness (μm) | Classification |
|---|---|---|---|---|---|---|---|
| 125 | 0.94 | 2.12 | 1 | 30 | 230 | 1 | Example |
| 126 | 1 | 2 | 1 | 30 | 230 | 1 | Example |
| 127 | 0.94 | 2.12 | 1 | 30 | 230 | 1 | Example |
| 128 | 1.82 | 2.1 | 1 | 30 | 230 | 1 | Example |
| 129 | 1.5 | 2 | 1 | 30 | 230 | 1 | Example |
| 130 | 1 | 2 | 1 | 30 | 230 | 1 | Example |
| 131 | 0.33 | 2 | 1 | 30 | 230 | 1 | Example |
| 132 | — | — | 1 | 30 | 230 | 1 | Example |
| 133 | — | — | 1 | 30 | 230 | 1 | Example |
| 134 | 2 | 8 | 1 | 30 | 230 | 1 | Example |
| 135 | — | 1.2 | 1 | 30 | 230 | 1 | Comparative example |
| 136 | — | — | 1 | 30 | 230 | 1 | Comparative example |
| 137 | 0.5 | — | 1 | 30 | 230 | 1 | Comparative example |
| 138 | — | — | 1 | 30 | 230 | 1 | Comparative example |

TABLE 44

| | Performance | | | | |
| No. | Appearance | White-rust resistance: SST 150 hrs | White-rust resistance after alkaline degreasing: SST 150 hrs | Paint adhesiveness | Classification |
|---|---|---|---|---|---|
| 125 | ○ | ◎ | ◎ | ◎ | Example |
| 126 | ○ | ◎ | ◎ | ◎ | Example |
| 127 | ○ | ◎ | ◎ | ◎ | Example |
| 128 | ○ | ◎ | ◎ | ◎ | Example |
| 129 | ○ | ○ | ○ | ◎ | Example |
| 130 | ○ | ○ | ○ | ◎ | Example |
| 131 | ○ | ◎ | ◎ | ◎ | Example |
| 132 | ○ | ○+ | ○+ | ◎ | Example |
| 133 | ○ | ○ | ○ | ◎ | Example |
| 134 | ○ | ○ | ○ | ◎ | Example |
| 135 | ○ | Δ | Δ | ◎ | Comparative example |
| 136 | ○ | Δ | Δ | ◎ | Comparative example |
| 137 | ○ | Δ | Δ | ◎ | Comparative example |
| 138 | ○ | X | Δ | ◎ | Comparative example |

TABLE 45

| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) |
|---|---|---|---|---|---|---|---|---|
| 139 | 1 | 1 | 140 | 0.3 | 366 | 34 | 25 | 307 |
| 140 | 1 | 1 | 140 | 0.3 | 366 | 34 | 25 | 307 |
| 141 | 1 | 1 | 140 | 0.3 | 366 | 34 | 25 | 307 |
| 142 | 1 | 1 | 140 | 0.3 | 366 | 34 | 25 | 307 |
| 143 | 1 | 1 | 140 | 0.3 | 366 | 34 | 25 | 307 |
| 144 | 1 | 1 | 140 | 0.3 | 366 | 34 | 25 | 307 |
| 145 | 1 | 1 | 140 | 0.3 | 366 | 34 | 25 | 307 |
| 146 | 1 | 1 | 140 | 0.3 | 366 | 34 | 25 | 307 |
| 147 | 1 | 1 | 140 | 0.3 | 366 | 34 | 25 | 307 |
| 148 | 1 | 1 | 140 | 0.3 | 366 | 34 | 25 | 307 |

| No. | Primary layer coating Molar ratio Mg/SiO₂ *5 | Primary layer coating Molar ratio P₂O₅/Mg *6 | Resin composition *3 | Ion-exchanged silica (a) content *7 | Drying temperature (° C.) | Coating thickness (μm) | Classification |
|---|---|---|---|---|---|---|---|
| 139 | 1.82 | 2.1 | 1 | — | 230 | 1 | Example |
| 140 | 1.82 | 2.1 | 1 | 1 | 230 | 1 | Example |
| 141 | 1.82 | 2.1 | 1 | 5 | 230 | 1 | Example |
| 142 | 1.82 | 2.1 | 1 | 10 | 230 | 1 | Example |
| 143 | 1.82 | 2.1 | 1 | 30 | 230 | 1 | Example |
| 144 | 1.82 | 2.1 | 1 | 40 | 230 | 1 | Example |
| 145 | 1.82 | 2.1 | 1 | 50 | 230 | 1 | Example |
| 146 | 1.82 | 2.1 | 1 | 80 | 230 | 1 | Example |
| 147 | 1.82 | 2.1 | 1 | 100 | 230 | 1 | Example |
| 148 | 1.82 | 2.1 | 1 | 150 | 230 | 1 | Comparative example |

TABLE 46

| No. | Appearance | White-rust resistance: SST 150 hrs | White-rust resistance after alkaline degreasing: SST 150 hrs | Paint adhesiveness | Classification |
|---|---|---|---|---|---|
| 139 | ○ | Δ | Δ | ◎ | Example |
| 140 | ○ | ○ | ○ | ◎ | Example |
| 141 | ○ | ○+ | ○+ | ◎ | Example |
| 142 | ○ | ◎ | ◎ | ◎ | Example |
| 143 | ○ | ◎ | ◎ | ◎ | Example |
| 144 | ○ | ◎ | ◎ | ◎ | Example |
| 145 | ○ | ◎ | ◎ | ◎ | Example |
| 146 | ○ | ○+ | ○+ | ◎ | Example |
| 147 | ○ | ○ | ○ | ◎ | Example |
| 148 | ○ | Δ | Δ | ◎ | Comparative example |

TABLE 47

| | Plating steel plate *1 | Coating composition *2 | Drying temperature (° C.) | Coating thickness (μm) | Primary layer coating Coating weight *4 | | | |
|---|---|---|---|---|---|---|---|---|
| No. | | | | | Total coating weight (mg/m²) | SiO₂ fine particles (α) (mg/m²) | Mg component (β) (mg/m²) | P₂O₅ component (γ) (mg/m²) |
| 149 | 2 | 1 | 140 | 0.3 | 366 | 34 | 25 | 307 |
| 150 | 3 | 1 | 140 | 0.3 | 366 | 34 | 25 | 307 |
| 151 | 4 | 1 | 140 | 0.3 | 366 | 34 | 25 | 307 |
| 152 | 5 | 1 | 140 | 0.3 | 366 | 34 | 25 | 307 |
| 153 | 6 | 1 | 140 | 0.3 | 366 | 34 | 25 | 307 |
| 154 | 7 | 1 | 140 | 0.3 | 366 | 34 | 25 | 307 |
| 155 | 8 | 1 | 140 | 0.3 | 366 | 34 | 25 | 307 |
| 156 | 9 | 1 | 140 | 0.3 | 366 | 34 | 25 | 307 |
| 157 | 10 | 1 | 140 | 0.3 | 366 | 34 | 25 | 307 |
| 158 | 11 | 1 | 140 | 0.3 | 366 | 34 | 25 | 307 |
| 159 | 12 | 1 | 140 | 0.3 | 366 | 34 | 25 | 307 |
| 160 | 13 | 1 | 140 | 0.3 | 366 | 34 | 25 | 307 |

| | Primary layer coating Molar ratio of coating components | | Secondary layer coating | | | | |
|---|---|---|---|---|---|---|---|
| No. | Mg/SiO₂ *5 | P₂O₅/Mg *6 | Resin composition *3 | Ion-exchanged silica (a) content *7 | Drying temperature (° C.) | Coating thickness (μm) | Classification |
| 149 | 1.82 | 2.1 | 1 | 30 | 230 | 1 | Example |
| 150 | 1.82 | 2.1 | 1 | 30 | 230 | 1 | Example |
| 151 | 1.82 | 2.1 | I | 30 | 230 | 1 | Example |
| 152 | 1.82 | 2.1 | 1 | 30 | 230 | 1 | Example |
| 153 | 1.82 | 2.1 | 1 | 30 | 230 | 1 | Example |
| 154 | 1.82 | 2.1 | 1 | 30 | 230 | 1 | Example |
| 155 | 1.82 | 2.1 | 1 | 30 | 230 | 1 | Example |
| 156 | 1.82 | 2.1 | 1 | 30 | 230 | 1 | Example |
| 157 | 1.82 | 2.1 | 1 | 30 | 230 | 1 | Example |
| 158 | 1.82 | 2.1 | 1 | 30 | 230 | 1 | Example |
| 159 | 1.82 | 2.1 | 1 | 30 | 230 | 1 | Example |
| 160 | 1.82 | 2.1 | 1 | 30 | 230 | 1 | Example |

TABLE 48

| | | Performance | | | | |
|---|---|---|---|---|---|---|
| No. | Appearance | White-rust resistance: SST 150 hrs | White-rust resistance after alkaline degreasing: SST 150 hrs | Paint adhesiveness | Workability | Classification |
| 149 | ○ | ⊙ | ○ | ⊙ | ⊙ | Example |
| 150 | ○ | ⊙ | ⊙ | ⊙ | ⊙ | Example |
| 151 | ○ | ⊙ | ⊙ | ⊙ | ⊙ | Example |
| 152 | ○ | ⊙ | ⊙ | ⊙ | ⊙ | Example |
| 153 | ○ | ⊙ | ⊙ | ⊙ | ⊙ | Example |
| 154 | ○ | ⊙ | ⊙ | ⊙ | ⊙ | Example |
| 155 | ○ | ⊙ | ⊙ | ⊙ | ⊙ | Example |
| 156 | ○ | ⊙ | ⊙ | ⊙ | ⊙ | Example |
| 157 | ○ | ⊙ | ⊙ | ⊙ | ⊙ | Example |
| 158 | ○ | ⊙ | ⊙ | ⊙ | ⊙ | Example |
| 159 | ○ | ⊙ | ⊙ | ⊙ | ⊙ | Example |
| 160 | ○ | ⊙ | ⊙ | ⊙ | ⊙ | Example |

TABLE 49

| | | | | | Primary layer coating | | | |
|---|---|---|---|---|---|---|---|---|
| | | | | | | Coating weight *4 | | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) |
| 161 | 1 | 1 | 140 | 0.3 | 366 | 34 | 25 | 307 |
| 162 | 1 | 1 | 140 | 0.3 | 366 | 34 | 25 | 307 |
| 163 | 1 | 1 | 140 | 0.3 | 366 | 34 | 25 | 307 |
| 164 | 1 | 1 | 140 | 0.3 | 366 | 34 | 25 | 307 |
| 165 | 1 | 1 | 140 | 0.3 | 366 | 34 | 25 | 307 |
| 166 | 1 | 1 | 140 | 0.3 | 366 | 34 | 25 | 307 |
| 167 | 1 | 1 | 140 | 0.3 | 366 | 34 | 25 | 307 |
| 168 | 1 | 1 | 140 | 0.3 | 366 | 34 | 25 | 307 |
| 169 | 1 | 1 | 140 | 0.3 | 366 | 34 | 25 | 307 |
| 170 | 1 | 1 | 140 | 0.3 | 366 | 34 | 25 | 307 |

| | Primary layer coating Molar ratio of coating components | | | Secondary layer coating | | | | |
|---|---|---|---|---|---|---|---|---|
| No. | Mg/SiO₂ *5 | P₂O₅/Mg *6 | Resin composition *3 | Ion-exchanged silica (a) content *7 | Drying temperature (° C.) | Coating thickness (μm) | Classification | |
| 161 | 1.82 | 2.1 | 1 | 30 | 230 | 0.01 | Comparative example | |
| 162 | 1.82 | 2.1 | 1 | 30 | 230 | 0.1 | Example | |
| 163 | 1.82 | 2.1 | 1 | 30 | 230 | 0.5 | Example | |
| 164 | 1.82 | 2.1 | 1 | 30 | 230 | 1 | Example | |
| 165 | 1.82 | 2.1 | 1 | 30 | 230 | 2 | Example | |
| 166 | 1.82 | 2.1 | 1 | 30 | 230 | 2.5 | Example | |
| 167 | 1.82 | 2.1 | 1 | 30 | 230 | 3 | Example | |
| 168 | 1.82 | 2.1 | 1 | 30 | 230 | 4 | Example | |
| 169 | 1.82 | 2.1 | 1 | 30 | 230 | 5 | Example | |
| 170 | 1.82 | 2.1 | 1 | 30 | 230 | 20 | Comparative example | |

TABLE 50

| | Performance | | | | |
|---|---|---|---|---|---|
| No. | Appearance | White-rust resistance: SST 150 hrs | White-rust resistance after alkaline degreasing: SST 150 hrs | Paint adhesiveness | Classification |
| 161 | ○ | x | x | ⊙ | Comparative example |
| 162 | ○ | ○− | ○− | ⊙ | Example |
| 163 | ○ | ○+ | ○+ | ⊙ | Example |
| 164 | ○ | ⊙ | ⊙ | ⊙ | Example |
| 165 | ○ | ⊙ | ⊙ | ⊙ | Example |
| 166 | ○ | ⊙ | ⊙ | ⊙ | Example |
| 167 | ○ | ⊙ | ⊙ | ⊙ | Example |
| 168 | ○ | ⊙ | ⊙ | ⊙ | Example |
| 169 | ○ | ⊙ | ⊙ | ⊙ | Example |
| 170 | ○ | ⊙ | ⊙ | ⊙ | Comparative example ※1 |

※1 Unable to weld

TABLE 51

| | | | | | Primary layer coating | | | |
|---|---|---|---|---|---|---|---|---|
| | | | | | | Coating weight *4 | | |
| No. | Plating steel plate *1 | Coating composition *2 | Drying temperature (°C.) | Coating thickness (μm) | Total coating weight (mg/m²) | SiO₂ fine particles (α) (mg/m²) | Mg component (β) (mg/m²) | P₂O₅ component (γ) (mg/m²) |
| 171 | 1 | 1 | 140 | 0.3 | 366 | 34 | 25 | 307 |
| 172 | 1 | 1 | 140 | 0.3 | 366 | 34 | 25 | 307 |
| 173 | 1 | 1 | 140 | 0.3 | 366 | 34 | 25 | 307 |
| 174 | 1 | 1 | 140 | 0.3 | 366 | 34 | 25 | 307 |
| 175 | 1 | 1 | 140 | 0.3 | 366 | 34 | 25 | 307 |
| 176 | 1 | 1 | 140 | 0.3 | 366 | 34 | 25 | 307 |
| 177 | 1 | 1 | 140 | 0.3 | 366 | 34 | 25 | 307 |
| 178 | 1 | 1 | 140 | 0.3 | 366 | 34 | 25 | 307 |
| 179 | 1 | 1 | 140 | 0.3 | 366 | 34 | 25 | 307 |
| 180 | 1 | 1 | 140 | 0.3 | 366 | 34 | 25 | 307 |

| | Primary layer coating Molar ratio of coating components | | | Secondary layer coating | | | | |
|---|---|---|---|---|---|---|---|---|
| No. | Mg/SiO₂ *5 | P₂O₅/Mg *6 | Resin composition *3 | Ion-exchanged silica (a) content *7 | Drying temperature (°C.) | Coating thickness (μm) | Classification | |
| 171 | 1.82 | 2.1 | 1 | 30 | 40 | 1 | Comparative example | |
| 172 | 1.82 | 2.1 | 1 | 30 | 50 | 1 | Example | |
| 173 | 1.82 | 2.1 | 1 | 30 | 80 | 1 | Example | |
| 174 | 1.82 | 2.1 | 1 | 30 | 120 | 1 | Example | |
| 175 | 1.82 | 2.1 | 1 | 30 | 180 | 1 | Example | |
| 176 | 1.82 | 2.1 | 1 | 30 | 200 | 1 | Example | |
| 177 | 1.82 | 2.1 | 1 | 30 | 230 | 1 | Example | |
| 178 | 1.82 | 2.1 | 1 | 30 | 250 | 1 | Example | |
| 179 | 1.82 | 2.1 | 1 | 30 | 350 | 1 | Example | |
| 180 | 1.82 | 2.1 | 1 | 30 | 380 | 1 | Comparative example | |

TABLE 52

| | Performance | | | | |
|---|---|---|---|---|---|
| No. | Appearance | White-rust resistance: SST 150 hrs | White-rust resistance after alkaline degreasing: SST 150 hrs | Paint adhesiveness | Classification |
| 171 | ○ | x | x | x | Comparative example |
| 172 | ○ | ○− | ○− | ○ | Example |
| 173 | ○ | ○ | ○− | ○+ | Example |
| 174 | ○ | ⊙ | ○ | ⊙ | Example |
| 175 | ○ | ⊙ | ⊙ | ⊙ | Example |
| 176 | ○ | ⊙ | ⊙ | ⊙ | Example |
| 177 | ○ | ⊙ | ⊙ | ⊙ | Example |
| 178 | ○ | ⊙ | ⊙ | ⊙ | Example |
| 179 | ○ | ○ | ○ | ⊙ | Example |
| 180 | ○ | Δ | Δ | ⊙ | Comparative example |

TABLE 53

Primary layer coating

| No. | Plating steel plate *1 | Coating com- position *2 | Drying tempera- ture (° C.) | Coating thick- ness (μm) | Coating weight *4 Total coating weight (mg/m²) | SiO₂ fine particles (α) (mg/m²) | Mg component (β) (mg/m²) | P₂O₅ component (γ) (mg/m²) | Molar ratio of coating components Mg/SiO₂ *5 | P₂O₅/Mg *6 | Classification |
|---|---|---|---|---|---|---|---|---|---|---|---|
| 181 | 1 | 1 | 140 | 0.3 | 366 | 34 | 25 | 307 | 1.82 | 2.1 | Example |
| 182 | 1 | 1 | 140 | 0.3 | 366 | 34 | 25 | 307 | 1.82 | 2.1 | Example |
| 183 | 1 | 1 | 140 | 0.3 | 366 | 34 | 25 | 307 | 1.82 | 2.1 | Example |
| 184 | 1 | 1 | 140 | 0.3 | 366 | 34 | 25 | 307 | 1.82 | 2.1 | Example |
| 185 | 1 | 1 | 140 | 0.3 | 366 | 34 | 25 | 307 | 1.82 | 2.1 | Example |
| 186 | 1 | 1 | 140 | 0.3 | 366 | 34 | 25 | 307 | 1.82 | 2.1 | Example |
| 187 | 1 | 1 | 140 | 0.3 | 366 | 34 | 25 | 307 | 1.82 | 2.1 | Example |
| 188 | 1 | 1 | 140 | 0.3 | 366 | 34 | 25 | 307 | 1.82 | 2.1 | Example |
| 189 | 1 | 1 | 140 | 0.3 | 366 | 34 | 25 | 307 | 1.82 | 2.1 | Example |
| 190 | 1 | 1 | 140 | 0.3 | 366 | 34 | 25 | 307 | 1.82 | 2.1 | Example |
| 191 | 1 | 1 | 140 | 0.3 | 366 | 34 | 25 | 307 | 1.82 | 2.1 | Example |
| 192 | 1 | 1 | 140 | 0.3 | 366 | 34 | 25 | 307 | 1.82 | 2.1 | Comparative example |
| 193 | 1 | 1 | 140 | 0.3 | 366 | 34 | 25 | 307 | 1.82 | 2.1 | Comparative example |
| 194 | 1 | 1 | 140 | 0.3 | 366 | 34 | 25 | 307 | 1.82 | 2.1 | Comparative example |
| 195 | 1 | 1 | 140 | 0.3 | 366 | 34 | 25 | 307 | 1.82 | 2.1 | Example |

TABLE 54

Secondary layer coating

| No. | Resin composition *3 | Ion-exchanged silica (a) content *7 | Fine particles silica (b) Type *8 | Fine particles silica (b) Blending rate *9 | (a) + (b) Blending rate *10 | (a)/(b) Weight ratio *11 | Drying temperature (° C.) | Coating thickness (μm) | Classification |
|---|---|---|---|---|---|---|---|---|---|
| 181 | 1 | 30 | 5 | 5 | 35 | 6/1 | 230 | 1 | Example |
| 182 | 2 | 30 | 5 | 5 | 35 | 6/1 | 230 | 1 | Example |
| 183 | 3 | 30 | 5 | 5 | 35 | 6/1 | 230 | 1 | Example |
| 184 | 4 | 30 | 5 | 5 | 35 | 6/1 | 230 | 1 | Example |
| 185 | 5 | 30 | 5 | 5 | 35 | 6/1 | 230 | 1 | Example |
| 186 | 6 | 30 | 5 | 5 | 35 | 6/1 | 230 | 1 | Example |
| 187 | 7 | 30 | 5 | 5 | 35 | 6/1 | 230 | 1 | Example |
| 188 | 8 | 30 | 5 | 5 | 35 | 6/1 | 230 | 1 | Example |
| 189 | 9 | 30 | 5 | 5 | 35 | 6/1 | 230 | 1 | Example |
| 190 | 10 | 30 | 5 | 5 | 35 | 6/1 | 230 | 1 | Example |
| 191 | 11 | 30 | 5 | 5 | 35 | 6/1 | 230 | 1 | Example |
| 192 | 12 | 30 | 5 | 5 | 35 | 6/1 | 230 | 1 | Comparative example |
| 193 | 13 | 30 | 5 | 5 | 35 | 6/1 | 230 | 1 | Comparative example |
| 194 | 14 | 30 | 5 | 5 | 35 | 6/1 | 230 | 1 | Comparative example |
| 195 | 1 | 30 | — | — | 30 | 30/0 | 230 | 1 | Example |

TABLE 55

| No. | Ap- pear- ance | Performance White-rust resistance: SST 180 hrs | White-rust resistance after alkaline degreasing: SST 180 hrs | Paint adhe- sive- ness | Classification |
|---|---|---|---|---|---|
| 181 | ○ | ◎ | ◎ | ◎ | Example |
| 182 | ○ | ◎ | ◎ | ◎ | Example |
| 183 | ○ | ◎ | ◎ | ◎ | Example |
| 184 | ○ | ◎ | ◎ | ◎ | Example |
| 185 | ○ | ◎ | ◎ | ◎ | Example |
| 186 | ○ | ◎ | ◎ | ◎ | Example |
| 187 | ○ | ◎ | ◎ | ◎ | Example |

TABLE 55-continued

Performance

| No. | Appearance | White-rust resistance: SST 180 hrs | White-rust resistance after alkaline degreasing: SST 180 hrs | Paint adhesiveness | Classification |
|---|---|---|---|---|---|
| 188 | ○ | ◎ | ◎ | ◎ | Example |
| 189 | ○ | ◎ | ◎ | ◎ | Example |
| 190 | ○ | ◎ | ◎ | ◎ | Example |
| 191 | ○ | ◎ | ◎ | ◎ | Example |
| 192 | ○ | Δ | X | ◎ | Comparative example |
| 193 | ○ | X | X | X | Comparative example |
| 194 | ○ | Δ | X | ◎ | Comparative example |
| 195 | ○ | ○ | ○ | ◎ | Example |

TABLE 56

Primary layer coating

| No. | Plating steel plate *1 | Coating composition *2 | Drying temperature (° C.) | Coating thickness (μm) | Total coating weight (mg/m$^2$) (α) | SiO$_2$ fine particles (mg/m$^2$) (β) | Mg component (mg/m$^2$) (γ) | P$_2$O$_5$ component (mg/m$^2$) | Mg/SiO$_2$ *5 | P$_2$O$_5$/Mg *6 | Classification |
|---|---|---|---|---|---|---|---|---|---|---|---|
| 196 | 1 | 1 | 140 | 0.3 | 366 | 34 | 25 | 307 | 1.82 | 2.1 | Example |
| 197 | 1 | 1 | 140 | 0.3 | 366 | 34 | 25 | 307 | 1.82 | 2.1 | Example |
| 198 | 1 | 1 | 140 | 0.3 | 366 | 34 | 25 | 307 | 1.82 | 2.1 | Example |
| 199 | 1 | 1 | 140 | 0.3 | 366 | 34 | 25 | 307 | 1.82 | 2.1 | Example |
| 200 | 1 | 1 | 140 | 0.3 | 366 | 34 | 25 | 307 | 1.82 | 2.1 | Example |
| 201 | 1 | 1 | 140 | 0.3 | 366 | 34 | 25 | 307 | 1.82 | 2.1 | Example |
| 202 | 1 | 1 | 140 | 0.3 | 366 | 34 | 25 | 307 | 1.82 | 2.1 | Example |
| 203 | 1 | 1 | 140 | 0.3 | 366 | 34 | 25 | 307 | 1.82 | 2.1 | Example |
| 204 | 1 | 1 | 140 | 0.3 | 366 | 34 | 25 | 307 | 1.82 | 2.1 | Example |
| 205 | 1 | 1 | 140 | 0.3 | 366 | 34 | 25 | 307 | 1.82 | 2.1 | Example |
| 206 | 1 | I | 140 | 0.3 | 366 | 34 | 25 | 307 | 1.82 | 2.1 | Example |
| 207 | 1 | 1 | 140 | 0.3 | 366 | 34 | 25 | 307 | I.82 | 2.1 | Example |
| 208 | 1 | 1 | 140 | 0.3 | 366 | 34 | 25 | 307 | 1.82 | 2.1 | Example |
| 209 | 1 | 1 | 140 | 0.3 | 366 | 34 | 25 | 307 | 1.82 | 2.1 | Example |
| 210 | 1 | 1 | 140 | 0.3 | 366 | 34 | 25 | 307 | 1.82 | 2.1 | Example |
| 211 | 1 | 1 | 140 | 0.3 | 366 | 34 | 25 | 307 | 1.82 | 2.1 | Example |

TABLE 57

Secondary layer coating

| No. | Resin composition *3 | Ion-exchanged silica (a) content *7 | Fine particles silica (b) Type *8 | Fine particles silica (b) Blending rate *9 | (a) + (b) Content *10 | (a)/(b) Weight ratio *11 | Drying temperature (° C.) | Coating thickness (μm) | Classification |
|---|---|---|---|---|---|---|---|---|---|
| 196 | 1 | 29.9 | 5 | 0.1 | 30 | 299/1 | 230 | 1 | Example |
| 197 | 1 | 29 | 5 | 1 | 30 | 29/1 | 230 | 1 | Example |
| 198 | 1 | 20 | 5 | 10 | 30 | 2/1 | 230 | 1 | Example |
| 199 | 1 | 15 | 5 | 15 | 30 | 1/1 | 230 | 1 | Example |
| 200 | 1 | 10 | 5 | 20 | 30 | 1/2 | 230 | 1 | Example |
| 201 | 1 | 1 | 5 | 29 | 30 | 1/29 | 230 | 1 | Example |
| 202 | 1 | 0.1 | 5 | 29.9 | 30 | 1/299 | 230 | 1 | Example |
| 203 | 1 | 50 | — | — | 50 | 50/0 | 230 | 1 | Example |
| 204 | 1 | 49 | 5 | 1 | 50 | 49/1 | 230 | 1 | Example |
| 205 | 1 | 45 | 5 | 5 | 50 | 9/1 | 230 | 1 | Example |
| 206 | 1 | 40 | 5 | 10 | 50 | 4/1 | 230 | 1 | Example |
| 207 | 1 | 30 | 5 | 20 | 50 | 3/2 | 230 | 1 | Example |
| 208 | 1 | 25 | 5 | 25 | 50 | 1/1 | 230 | 1 | Example |
| 209 | 1 | 10 | 5 | 40 | 50 | 1/4 | 230 | 1 | Example |
| 210 | 1 | 1 | 5 | 49 | 50 | 1/50 | 230 | 1 | Example |
| 211 | 1 | 0.45 | 5 | 0.05 | 0.5 | 9/1 | 230 | 1 | Example |

TABLE 58

| No. | Appearance | White-rust resistance: SST 180 hrs | White-rust resistance after alkaline degreasing: SST 180 hrs | Paint adhesiveness | Classification |
|---|---|---|---|---|---|
| 196 | ○ | ○ | ○ | ⊙ | Example |
| 197 | ○ | ○+ | ○+ | ⊙ | Example |
| 198 | ○ | ⊙ | ⊙ | ⊙ | Example |
| 199 | ○ | ⊙ | ⊙ | ⊙ | Example |
| 200 | ○ | ○ | ○ | ⊙ | Example |
| 201 | ○ | ○ | ○ | ⊙ | Example |
| 202 | ○ | ○− | ○− | ⊙ | Example |
| 203 | ○ | ○ | ○ | ⊙ | Example |
| 204 | ○ | ○+ | ○+ | ⊙ | Example |
| 205 | ○ | ⊙ | ⊙ | ⊙ | Example |
| 206 | ○ | ⊙ | ⊙ | ⊙ | Example |
| 207 | ○ | ⊙ | ⊙ | ⊙ | Example |
| 208 | ○ | ⊙ | ⊙ | ⊙ | Example |
| 209 | ○ | ○ | ○ | ⊙ | Example |
| 210 | ○ | ○ | ○ | ⊙ | Example |
| 211 | ○ | × | × | ⊙ | Example |

TABLE 59

Primary layer coating

| No. | Plating steel plate *1 | Coating composition *2 | Drying temperature (° C.) | Coating thickness (μm) | Total coating weight (mg/m$^2$) | SiO$_2$ fine particles (α) (mg/m$^2$) | Mg component (β) (mg/m$^2$) | P$_2$O$_5$ component (γ) (mg/m$^2$) | Mg/SiO$_2$ *5 | P$_2$O$_5$/Mg *6 | Classification |
|---|---|---|---|---|---|---|---|---|---|---|---|
| 212 | 1 | 1 | 140 | 0.3 | 366 | 34 | 25 | 307 | 1.82 | 2.1 | Example |
| 213 | 1 | 1 | 140 | 0.3 | 366 | 34 | 25 | 307 | 1.82 | 2.1 | Example |
| 214 | 1 | 1 | 140 | 0.3 | 366 | 34 | 25 | 307 | 1.82 | 2.1 | Example |
| 215 | 1 | 1 | 140 | 0.3 | 366 | 34 | 25 | 307 | 1.82 | 2.1 | Example |
| 216 | 1 | 1 | 140 | 0.3 | 366 | 34 | 25 | 307 | 1.82 | 2.1 | Comparative example |
| 217 | 1 | 1 | 140 | 0.3 | 366 | 34 | 25 | 307 | 1.82 | 2.1 | Example |
| 218 | 1 | 1 | 140 | 0.3 | 366 | 34 | 25 | 307 | 1.82 | 2.1 | Example |
| 219 | 1 | 1 | 140 | 0.3 | 366 | 34 | 25 | 307 | 1.82 | 2.1 | Example |
| 220 | 1 | 1 | 140 | 0.3 | 366 | 34 | 25 | 307 | 1.82 | 2.1 | Example |
| 221 | 1 | 1 | 140 | 0.3 | 366 | 34 | 25 | 307 | 1.82 | 2.1 | Example |
| 222 | 1 | 1 | 140 | 0.3 | 366 | 34 | 25 | 307 | 1.82 | 2.1 | Example |
| 223 | 1 | 1 | 140 | 0.3 | 366 | 34 | 25 | 307 | 1.82 | 2.1 | Example |
| 224 | 1 | 1 | 140 | 0.3 | 366 | 34 | 25 | 307 | 1.82 | 2.1 | Example |
| 225 | 1 | 1 | 140 | 0.3 | 366 | 34 | 25 | 307 | 1.82 | 2.1 | Example |

TABLE 60

Secondary layer coating

| No. | Resin composition *3 | Ion-exchanged silica (a) content *7 | Fine particles silica (b) Type *8 | Fine particles silica (b) Blending rate *9 | (a) + (b) Blending rate *10 | (a)/(b) Weight ratio *11 | Drying temperature (° C.) | Coating thickness (μm) | Classification |
|---|---|---|---|---|---|---|---|---|---|
| 212 | 1 | 9 | 5 | 1 | 10 | 9/1 | 230 | 1 | Example |
| 213 | 1 | 27 | 5 | 3 | 30 | 9/1 | 230 | 1 | Example |
| 214 | 1 | 72 | 5 | 8 | 80 | 9/1 | 230 | 1 | Example |
| 215 | 1 | 90 | 5 | 10 | 100 | 9/1 | 230 | 1 | Example |
| 216 | 1 | 135 | 5 | 15 | 150 | 9/1 | 230 | 1 | Comparative example |
| 217 | 1 | 30 | 1 | 5 | 35 | 6/1 | 230 | 1 | Example |
| 218 | 1 | 30 | 2 | 5 | 35 | 6/1 | 230 | 1 | Example |
| 219 | 1 | 30 | 3 | 5 | 35 | 6/1 | 230 | 1 | Example |
| 220 | 1 | 30 | 4 | 5 | 35 | 6/1 | 230 | 1 | Example |
| 221 | 1 | 30 | 6 | 5 | 35 | 6/1 | 230 | 1 | Example |
| 222 | 1 | 30 | 7 | 5 | 35 | 6/1 | 230 | 1 | Example |

TABLE 60-continued

Secondary layer coating

| No. | Resin composition *3 | Ion-exchanged silica (a) content *7 | Fine particles silica (b) Type *8 | Blending rate *9 | (a) + (b) Blending rate *10 | (a)/(b) Weight ratio *11 | Drying temperature (° C.) | Coating thickness (μm) | Classification |
|---|---|---|---|---|---|---|---|---|---|
| 223 | 1 | 30 | 8 | 5 | 35 | 6/1 | 230 | 1 | Example |
| 224 | 1 | 30 | 9 | 5 | 35 | 6/1 | 230 | 1 | Example |
| 225 | 1 | 30 | 11 | 5 | 35 | 6/1 | 230 | 1 | Example |

TABLE 61

Performance

| No. | Appearance | White-rust resistance: SST 180 hrs | White-rust resistance after alkaline degreasing: SST 180 hrs | Paint adhesiveness | Classification |
|---|---|---|---|---|---|
| 212 | ○ | ○+ | ○+ | ⊙ | Example |
| 213 | ○ | ⊙ | ⊙ | ⊙ | Example |
| 214 | ○ | ⊙ | ⊙ | ⊙ | Example |
| 215 | ○ | ○+ | ○+ | ⊙ | Example |
| 216 | ○ | X | X | ⊙ | Comparative example |
| 217 | ○ | ⊙ | ⊙ | ⊙ | Example |
| 218 | ○ | ⊙ | ⊙ | ⊙ | Example |
| 219 | ○ | ⊙ | ⊙ | ⊙ | Example |
| 220 | ○ | ⊙ | ⊙ | ⊙ | Example |
| 221 | ○ | ⊙ | ⊙ | ⊙ | Example |
| 222 | ○ | ⊙ | ⊙ | ⊙ | Example |
| 223 | ○ | ⊙ | ⊙ | ⊙ | Example |
| 224 | ○ | ⊙ | ⊙ | ⊙ | Example |
| 225 | ○ | ⊙ | ⊙ | ⊙ | Example |

TABLE 62

Primary layer coating

| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Molar ratio of coating components Mg/SiO₂ *5 | P₂O₅/Mg *6 | Classification |
|---|---|---|---|---|---|---|---|---|---|---|---|
| 226 | 1 | 1 | 140 | 0.3 | 366 | 34 | 25 | 307 | 1.82 | 2.1 | Example |
| 227 | 1 | 1 | 140 | 0.3 | 366 | 34 | 25 | 307 | 1.82 | 2.1 | Example |
| 228 | 1 | 1 | 140 | 0.3 | 366 | 34 | 25 | 307 | 1.82 | 2.1 | Example |
| 229 | 1 | 1 | 140 | 0.3 | 366 | 34 | 25 | 307 | 1.82 | 2.1 | Example |
| 230 | 1 | 1 | 140 | 0.3 | 366 | 34 | 25 | 307 | 1.82 | 2.1 | Example |
| 231 | 1 | 1 | 140 | 0.3 | 366 | 34 | 25 | 307 | 1.82 | 2.1 | Example |
| 232 | 1 | 1 | 140 | 0.3 | 366 | 34 | 25 | 307 | 1.82 | 2.1 | Example |
| 233 | 1 | 1 | 140 | 0.3 | 366 | 34 | 25 | 307 | 1.82 | 2.1 | Example |
| 234 | 1 | 1 | 140 | 0.3 | 366 | 34 | 25 | 307 | 1.82 | 2.1 | Example |
| 235 | 1 | 1 | 140 | 0.3 | 366 | 34 | 25 | 307 | 1.82 | 2.1 | Example |
| 236 | 1 | 1 | 140 | 0.3 | 366 | 34 | 25 | 307 | 1.82 | 2.1 | Comparative example |

TABLE 63

| | Secondary layer coating | | | | | | |
|---|---|---|---|---|---|---|---|
| | Resin | Ion-exchanged | Solid lubricant (c) | | Drying | Coating | |
| No. | composition *3 | silica (a) content *7 | Type *12 | Blending rate *13 | temperature (° C.) | thickness (μm) | Classification |
| 226 | 1 | 30 | 1 | 10 | 230 | 1 | Example |
| 227 | 1 | 30 | 2 | 10 | 230 | 1 | Example |
| 228 | 1 | 30 | 3 | 10 | 230 | 1 | Example |
| 229 | 1 | 30 | 4 | 10 | 230 | 1 | Example |
| 230 | 1 | 30 | 5 | 10 | 230 | 1 | Example |
| 231 | 1 | 30 | 6 | 10 | 230 | 1 | Example |
| 232 | 1 | 30 | 1 | 1 | 230 | 1 | Example |
| 233 | 1 | 30 | 1 | 3 | 230 | 1 | Example |
| 234 | 1 | 30 | 1 | 40 | 230 | 1 | Example |
| 235 | 1 | 30 | 1 | 80 | 230 | 1 | Example |
| 236 | 1 | 30 | 1 | 100 | 230 | 1 | Comparative example |

TABLE 64

| | Performance | | | | | |
|---|---|---|---|---|---|---|
| No. | Appearance | White-rust resistance: SST 150 hrs | White-rust resistance after alkaline degreasing: SST 150 hrs | Paint adhesiveness | Workability | Classification |
| 226 | ○ | ◎ | ◎ | ◎ | ◎ | Example |
| 227 | ○ | ◎ | ◎ | ◎ | ◎ | Example |
| 228 | ○ | ◎ | ◎ | ◎ | ◎ | Example |
| 229 | ○ | ◎ | ◎ | ◎ | ◎ | Example |
| 230 | ○ | ◎ | ◎ | ◎ | ◎ | Example |
| 231 | ○ | ◎ | ◎ | ◎ | ◎ | Example |
| 232 | ○ | ◎ | ◎ | ◎ | ○ | Example |
| 233 | ○ | ◎ | ◎ | ◎ | ◎ | Example |
| 234 | ○ | ◎ | ◎ | ◎ | ◎ | Example |
| 235 | ○ | ◎ | ◎ | ○ | ◎ | Example |
| 236 | ○ | ◎ | ◎ | X | ◎ | Comparative example |

TABLE 65

| | Primary layer coating | | | | | | | | | | |
|---|---|---|---|---|---|---|---|---|---|---|---|
| | | | | | Coating weight *4 | | | | Molar ratio of coating components | | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 | Classification |
| 237 | 1 | 1 | 140 | 0.3 | 366 | 34 | 25 | 307 | 1.82 | 2.1 | Example |
| 238 | 1 | 1 | 140 | 0.3 | 366 | 34 | 25 | 307 | 1.82 | 2.1 | Example |
| 239 | 1 | 1 | 140 | 0.3 | 366 | 34 | 25 | 307 | 1.82 | 2.1 | Example |
| 240 | 1 | 1 | 140 | 0.3 | 366 | 34 | 25 | 307 | 1.82 | 2.1 | Example |
| 241 | 1 | 1 | 140 | 0.3 | 366 | 34 | 25 | 307 | 1.82 | 2.1 | Example |
| 242 | 1 | 1 | 140 | 0.3 | 366 | 34 | 25 | 307 | 1.82 | 2.1 | Example |
| 243 | 1 | 1 | 140 | 0.3 | 366 | 34 | 25 | 307 | 1.82 | 2.1 | Example |
| 244 | 1 | 1 | 140 | 0.3 | 366 | 34 | 25 | 307 | 1.82 | 2.1 | Example |
| 245 | 1 | 1 | 140 | 0.3 | 366 | 34 | 25 | 307 | 1.82 | 2.1 | Example |
| 246 | 1 | 1 | 140 | 0.3 | 366 | 34 | 25 | 307 | 1.82 | 2.1 | Example |
| 247 | 1 | 1 | 140 | 0.3 | 366 | 34 | 25 | 307 | 1.82 | 2.1 | Comparative example |

TABLE 66

| | | Secondary layer coating | | | | | | | | | |
|---|---|---|---|---|---|---|---|---|---|---|---|
| | | Ion- | Fine particles silica (b) | | | | Solid lubricant (c) | | | | |
| No. | Resin composition *3 | exchanged silica (a) content *7 | Type *8 | Blending rate *9 | (a) + (b) Blending rate *10 | (a)/(b) Weight ratio *11 | Type *12 | Blending rate *13 | Drying temperature (°C.) | Coating thickness (μm) | Classification |
| 237 | 1 | 30 | 1 | 5 | 35 | 6/1 | 1 | 10 | 230 | 1 | Example |
| 238 | 1 | 30 | 2 | 5 | 35 | 6/1 | 2 | 10 | 230 | 1 | Example |
| 239 | 1 | 30 | 3 | 5 | 35 | 6/1 | 3 | 10 | 230 | 1 | Example |
| 240 | 1 | 30 | 4 | 5 | 35 | 6/1 | 4 | 10 | 230 | 1 | Example |
| 241 | 1 | 30 | 6 | 5 | 35 | 6/1 | 5 | 10 | 230 | 1 | Example |
| 242 | 1 | 30 | 7 | 5 | 35 | 6/1 | 6 | 10 | 230 | 1 | Example |
| 243 | 1 | 30 | 8 | 5 | 35 | 6/1 | 1 | 1 | 230 | 1 | Example |
| 244 | 1 | 30 | 9 | 5 | 35 | 6/1 | 1 | 3 | 230 | 1 | Example |
| 245 | 1 | 30 | 11 | 5 | 35 | 6/1 | 1 | 40 | 230 | 1 | Example |
| 246 | 1 | 30 | 11 | 5 | 35 | 6/1 | 1 | 80 | 230 | 1 | Example |
| 247 | 1 | 30 | 11 | 5 | 35 | 6/1 | 1 | 100 | 230 | 1 | Comparative example |

TABLE 67

| | Performance | | | | | |
|---|---|---|---|---|---|---|
| No. | Appearance | White-rust resistance: SST 180 hrs | White-rust resistance after alkaline degreasing: SST 180 hrs | Paint adhesiveness | Workability | Classification |
| 237 | ○ | ⊙ | ⊙ | ⊙ | ⊙ | Example |
| 238 | ○ | ⊙ | ⊙ | ⊙ | ⊙ | Example |
| 239 | ○ | ⊙ | ⊙ | ⊙ | ⊙ | Example |
| 240 | ○ | ⊙ | ⊙ | ⊙ | ⊙ | Example |
| 241 | ○ | ⊙ | ⊙ | ⊙ | ⊙ | Example |
| 242 | ○ | ⊙ | ⊙ | ⊙ | ⊙ | Example |
| 243 | ○ | ⊙ | ⊙ | ⊙ | ○ | Example |
| 244 | ○ | ⊙ | ⊙ | ⊙ | ⊙ | Example |
| 245 | ○ | ⊙ | ⊙ | ⊙ | ⊙ | Example |
| 246 | ○ | ⊙ | ⊙ | ○ | ⊙ | Example |
| 247 | ○ | ⊙ | ⊙ | X | ⊙ | Comparative example |

TABLE 68

| | Primary layer coating | | | | | | | | | |
|---|---|---|---|---|---|---|---|---|---|---|
| | | | | | Coating weight *4 | | | | | |
| | Plating steel | Coating | Drying | Coating | Total coating | $SiO_2$ fine particles | Mg component | $P_2O_5$ component | Molar ratio of coating components | |
| No. | plate *1 | composition *2 | temperature (°C.) | thickness (μm) | weight (mg/m²) | (α) (mg/m²) | (β) (mg/m²) | (γ) (mg/m²) | $Mg/SiO_2$ *5 | $P_2O_5/Mg$ *6 |
| 248 | 1 | 1 | 140 | 0.001 | 1 | 0.14 | 0.1 | 1 | 1.82 | 2.1 |
| 249 | 1 | 1 | 140 | 0.005 | 5.9 | 0.54 | 0.4 | 5 | 1.82 | 2.1 |
| 250 | 1 | 1 | 140 | 0.01 | 15 | 1.4 | 1 | 12 | 1.82 | 2.1 |
| 251 | 1 | 1 | 140 | 0.1 | 146 | 14 | 10 | 123 | 1.82 | 2.1 |
| 252 | 1 | 1 | 140 | 0.5 | 585 | 54 | 40 | 491 | 1.82 | 2.1 |
| 253 | 1 | 1 | 140 | 1 | 1170 | 109 | 80 | 982 | 1.82 | 2.1 |
| 254 | 1 | 1 | 140 | 2 | 2341 | 217 | 160 | 1963 | 1.82 | 2.1 |
| 255 | 1 | 1 | 140 | 3 | 3511 | 326 | 240 | 2945 | 1.82 | 2.1 |
| 256 | 1 | 1 | 140 | 5 | 5851 | 543 | 400 | 4909 | 1.82 | 2.1 |

| | Secondary layer coating | | | | |
|---|---|---|---|---|---|
| No. | Resin composition *3 | Ion-exchanged silica (a) content *7 | Drying temperature (°C.) | Coating thickness (μm) | Classification |
| 248 | 1 | 30 | 230 | 1 | Comparative example |
| 249 | 1 | 30 | 230 | 1 | Example |

TABLE 68-continued

| | | | | | |
|---|---|---|---|---|---|
| 250 | 1 | 30 | 230 | 1 | Example |
| 251 | 1 | 30 | 230 | 1 | Example |
| 252 | 1 | 30 | 230 | 1 | Example |
| 253 | 1 | 30 | 230 | 1 | Example |
| 254 | 1 | 30 | 230 | 1 | Example |
| 255 | 1 | 30 | 230 | 1 | Example |
| 256 | 1 | 30 | 230 | 1 | Comparative example |

TABLE 69

| | Performance | | | | |
|---|---|---|---|---|---|
| No. | Appearance | White-rust resistance: SST 150 hrs | White-rust resistance after alkaline degreasing: SST 150 hrs | Paint adhesiveness | Classification |
| 248 | ○ | x | x | ⊚ | Comparative example |
| 249 | ○ | ○− | ○− | ⊚ | Example |
| 250 | ○ | ○ | ○ | ⊚ | Example |
| 251 | ○ | ○+ | ○+ | ⊚ | Example |
| 252 | ○ | ⊚ | ⊚ | ⊚ | Example |
| 253 | ○ | ⊚ | ⊚ | ⊚ | Example |
| 254 | ○ | ⊚ | ⊚ | ⊚ | Example |
| 255 | ○ | ⊚ | ⊚ | ⊚ | Example |
| 256 | ○ | ⊚ | ⊚ | ⊚ | Comparative ※1 example |

※1 Unable to weld

TABLE 70

| | Primary layer coating | | | | | | | | | |
|---|---|---|---|---|---|---|---|---|---|---|
| | | | | | Coating weight *4 | | | | Molar ratio of coating components | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 257 | 1 | 1 | 30 | 0.3 | 366 | 34 | 25 | 307 | 1.82 | 2.1 |
| 258 | 1 | 1 | 50 | 0.3 | 366 | 34 | 25 | 307 | 1.82 | 2.1 |
| 259 | 1 | 1 | 80 | 0.3 | 366 | 34 | 25 | 307 | 1.82 | 2.1 |
| 260 | 1 | 1 | 120 | 0.3 | 366 | 34 | 25 | 307 | 1.82 | 2.1 |
| 261 | 1 | 1 | 180 | 0.3 | 366 | 34 | 25 | 307 | 1.82 | 2.1 |
| 262 | 1 | 1 | 200 | 0.3 | 366 | 34 | 25 | 307 | 1.82 | 2.1 |
| 263 | 1 | 1 | 300 | 0.3 | 366 | 34 | 25 | 307 | 1.82 | 2.1 |
| 264 | 1 | 1 | 350 | 0.3 | 366 | 34 | 25 | 307 | 1.82 | 2.1 |

| | Secondary layer coating | | | | |
|---|---|---|---|---|---|
| No. | Resin composition *3 | Ion-exchanged silica (a) content *7 | Drying temperature (° C.) | Coating thickness (μm) | Classification |
| 257 | 1 | 30 | 230 | 1 | Comparative example |
| 258 | 1 | 30 | 230 | 1 | Example |
| 259 | 1 | 30 | 230 | 1 | Example |
| 260 | 1 | 30 | 230 | 1 | Example |
| 261 | 1 | 30 | 230 | 1 | Example |
| 262 | 1 | 30 | 230 | 1 | Example |
| 263 | 1 | 30 | 230 | 1 | Example |
| 264 | 1 | 30 | 230 | 1 | Comparative example |

TABLE 71

| | | Performance | | | |
|---|---|---|---|---|---|
| No. | Appearance | White-rust resistance: SST 150 hrs | White-rust resistance after alkaline degreasing: SST 150 hrs | Paint adhesiveness | Classification |
| 257 | ○ | X | X | X | Comparative example |
| 258 | ○ | ○− | ○− | ○ | Example |
| 259 | ○ | ⊙ | ⊙ | ⊙ | Example |
| 260 | ○ | ⊙ | ⊙ | ⊙ | Example |
| 261 | ○ | ⊙ | ⊙ | ⊙ | Example |
| 262 | ○ | ⊙ | ⊙ | ⊙ | Example |
| 263 | ○ | ⊙ | ⊙ | ⊙ | Example |
| 264 | ○ | X | X | ⊙ | Comparative example |

TABLE 72

| | | | | Primary layer coating | | | | | | Secondary coating layer | | | |
|---|---|---|---|---|---|---|---|---|---|---|---|---|---|
| | | | | | Coating weight *4 | | | | Molar ratio of coating components | | | | |
| No. | Plating steel plate *1 | Coating composition *2 | Drying temperature (°C.) | Coating thickness (μm) | Total coating weight (mg/m$^2$) | SiO$_2$ fine particles (α) (mg/m$^2$) | Mg component (β) (mg/m$^2$) | P$_2$O$_5$ component (γ) (mg/m$^2$) | Mg/SiO$_2$ *5 | P$_2$O$_5$/Mg *6 | Resin composition *3 | Drying temperature (°C.) | Coating thickness (μm) | Classification |
| 265 | 1 | 16 | 140 | 0.3 | 324 | 43.2 | 35 | 245.4 | 2 | 1.2 | 1 | 230 | 1 | Example |
| 266 | 1 | 17 | 140 | 0.3 | 324 | 43.2 | 35 | 245.4 | 2 | 1.2 | 1 | 230 | 1 | Example |
| 267 | 1 | 18 | 140 | 0.3 | 335 | 88.9 | 36 | 210.4 | 1 | 1 | 1 | 230 | 1 | Example |
| 268 | 1 | 19 | 140 | 0.3 | 292 | 38.0 | 20 | 233.7 | 1.3 | 2 | 1 | 230 | 1 | Example |
| 269 | 1 | 20 | 140 | 0.3 | 332 | 72.0 | 35 | 225.0 | 1.2 | 1.1 | 1 | 230 | 1 | Example |
| 270 | 1 | 21 | 140 | 0.3 | 330 | 22.2 | 45 | 263.0 | 5 | 1 | 1 | 230 | 1 | Example |
| 271 | 1 | 22 | 140 | 0.3 | 371 | 148.1 | 30 | 192.8 | 0.5 | 1.1 | 1 | 230 | 1 | Example |
| 272 | 1 | 23 | 140 | 0.3 | 349 | 114.0 | 60 | 175.3 | 1.3 | 0.5 | 1 | 230 | 1 | Example |
| 273 | 1 | 24 | 140 | 0.3 | 323 | 49.4 | 40 | 233.7 | 2.0 | 1.0 | 1 | 230 | 1 | Example |
| 274 | 1 | 25 | 140 | 0.3 | 323 | 49.4 | 40 | 233.7 | 2.0 | 1.0 | 1 | 230 | 1 | Example |
| 275 | 1 | 26 | 140 | 0.3 | 323 | 49.4 | 40 | 233.7 | 2.0 | 1.0 | 1 | 230 | 1 | Example |
| 276 | 1 | 27 | 140 | 0.3 | 374 | 246.9 | 10 | 116.9 | 0.1 | 2.0 | 1 | 230 | 1 | Example |

TABLE 73

| | | Performance | | | |
|---|---|---|---|---|---|
| No. | Appearance | White-rust resistance: SST 96 hrs | White-rust resistance after alkaline degreasing: SST 96 hrs | Paint adhesiveness | Classification |
| 265 | ○ | ⊙ | ⊙ | ⊙ | Example |
| 266 | ○ | ⊙ | ⊙ | ⊙ | Example |
| 267 | ○ | ⊙ | ⊙ | ⊙ | Example |

TABLE 73-continued

| | | Performance | | | |
|---|---|---|---|---|---|
| No. | Appearance | White-rust resistance: SST 96 hrs | White-rust resistance after alkaline degreasing: SST 96 hrs | Paint adhesiveness | Classification |
| 268 | ○ | ⊙ | ⊙ | ⊙ | Example |
| 269 | ○ | ⊙ | ⊙ | ⊙ | Example |
| 270 | ○ | ⊙ | ⊙ | ⊙ | Example |
| 271 | ○ | ⊙ | ⊙ | ⊙ | Example |
| 272 | ○ | ⊙ | ⊙ | ⊙ | Example |
| 273 | ○ | ⊙ | ⊙ | ⊙ | Example |
| 274 | ○ | ⊙ | ⊙ | ⊙ | Example |
| 275 | ○ | ⊙ | ○+ | ⊙ | Example |
| 276 | ○ | ⊙ | ○+ | ⊙ | Example |

TABLE 74

| | | | | Primary layer coating | | | | | |
|---|---|---|---|---|---|---|---|---|---|
| | | | | | Coating weight *4 | | | Molar ratio of coating components | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 277 | 1 | 28 | 140 | 0.3 | 330 | 9.9 | 40 | 280.5 | 10.0 | 1.2 |
| 278 | 1 | 29 | 140 | 0.3 | 323 | 164.6 | 100 | 58.4 | 1.5 | 0.1 |
| 279 | 1 | 30 | 140 | 0.3 | 310 | 12.3 | 5 | 292.2 | 1.0 | 10.0 |
| 280 | 1 | 31 | 140 | 0.3 | 310 | 13.2 | 40 | 257.1 | 7.5 | 1.1 |
| 281 | 1 | 32 | 140 | 0.3 | 310 | 2.2 | 45 | 263.0 | 50.0 | 1.0 |
| 282 | 1 | 33 | 140 | 0.3 | 300 | 123.5 | 1 | 175.3 | 0.02 | 30 |
| 283 | 1 | 34 | 140 | 0.3 | 324 | 148.1 | 0.6 | 175.3 | 0.01 | 50 |
| 284 | 1 | 35 | 140 | 0.3 | 389 | 3.5 | 140 | 245.4 | 100 | 0.3 |
| 285 | 1 | 36 | 140 | 0.3 | 401 | 1.8 | 145 | 254.2 | 200 | 0.3 |
| 286 | 1 | 37 | 140 | 0.3 | 394 | 246.9 | 0.5 | 146.1 | 0.005 | 50 |
| 287 | 1 | 38 | 140 | 0.3 | 293 | 74.1 | 0.15 | 219.1 | 0.005 | 250 |
| 288 | 1 | 39 | 140 | 0.3 | 365 | 6.9 | 350 | 8.2 | 125 | 0.004 |

| | Secondary coating layer | | | |
|---|---|---|---|---|
| No. | Resin composition *3 | Drying temperature (° C.) | Coating thickness (μm) | Classification |
| 277 | 1 | 230 | 1 | Example |
| 278 | 1 | 230 | 1 | Example |
| 279 | 1 | 230 | 1 | Example |
| 280 | 1 | 230 | 1 | Example |
| 281 | 1 | 230 | 1 | Example |
| 282 | 1 | 230 | 1 | Example |
| 283 | 1 | 230 | 1 | Example |
| 284 | 1 | 230 | 1 | Example |
| 285 | 1 | 230 | 1 | Example |
| 286 | 1 | 230 | 1 | Example |
| 287 | 1 | 230 | 1 | Example |
| 288 | 1 | 230 | 1 | Example |

TABLE 75

| | | Performance | | | |
|---|---|---|---|---|---|
| No. | Appearance | White-rust resistance: SST 96 hrs | White-rust resistance after alkaline degreasing: SST 96 hrs | Paint adhesiveness | Classification |
| 277 | ○ | ⊙ | ○+ | ⊙ | Example |
| 278 | ○ | ⊙ | ○+ | ⊙ | Example |
| 279 | ○ | ⊙ | ○+ | ⊙ | Example |

TABLE 75-continued

| No. | Appearance | White-rust resistance: SST 96 hrs | White-rust resistance after alkaline degreasing: SST 96 hrs | Paint adhesiveness | Classification |
|---|---|---|---|---|---|
| 280 | ○ | ◎ | ○+ | ◎ | Example |
| 281 | ○ | ◎ | ○ | ◎ | Example |
| 282 | ○ | ◎ | ○ | ◎ | Example |
| 283 | ○ | ◎ | ○ | ◎ | Example |
| 284 | ○ | ◎ | ○ | ◎ | Example |
| 285 | ○ | ◎ | ○− | ◎ | Example |
| 286 | ○ | ◎ | ○− | ◎ | Example |
| 287 | ○ | ○+ | ○+ | ◎ | Example |
| 288 | ○ | ○+ | ○+ | ◎ | Example |

TABLE 76

| | Primary layer coating | | | | | | | | | Secondary layer coating | | | |
|---|---|---|---|---|---|---|---|---|---|---|---|---|---|
| | | | | | Coating weight *4 | | | | Molar ratio of coating components | | | | |
| No. | Plating steel plate *1 | Coating composition *2 | Drying temperature (° C.) | Coating thickness (μm) | Total coating weight (mg/m²) | $SiO_2$ fine particles (α) (mg/m²) | Mg component (β) (mg/m²) | $P_2O_5$ component (γ) (mg/m²) | Mg/$SiO_2$ *5 | $P_2O_5$/Mg *6 | Resin composition *3 | Drying temperature (° C.) | Coating thickness (μm) | Classification |
| 289 | 1 | 40 | 140 | 0.3 | 394 | 0.2 | 160 | 233.7 | 2000 | 0.25 | 1 | 230 | 1 | Example |
| 290 | 1 | 41 | 140 | 0.3 | 391 | 0.3 | 180 | 210.4 | 1500 | 0.2 | 1 | 230 | 1 | Example |
| 291 | 1 | 42 | 140 | 0.3 | 365 | 246.9 | 0.8 | 116.9 | 0.008 | 25 | 1 | 230 | 1 | Example |
| 292 | 1 | 43 | 140 | 0.3 | 399 | 319.5 | 2.2 | 77.1 | 0.017 | 6 | 1 | 230 | 1 | Example |
| 293 | 1 | 44 | 140 | 0.3 | 379 | 98.8 | 0.08 | 280.5 | 0.002 | 600 | 1 | 230 | 1 | Example |
| 294 | 1 | 45 | 140 | 0.3 | 404 | 181.1 | 220 | 2.6 | 3 | 0.002 | 1 | 230 | 1 | Example |
| 295 | 1 | 46 | 140 | 0.3 | 399 | 18.5 | 30 | 350.6 | 4 | 2 | 1 | 230 | 1 | Example |
| 296 | 1 | 47 | 140 | 0.3 | 321 | 0.03 | 40 | 280.5 | 3000 | 1.2 | 1 | 230 | 1 | Example |
| 297 | 1 | 48 | 140 | 0.3 | 323 | 49.4 | 40 | 233.7 | 2 | 1 | 1 | 230 | 1 | Example |
| 298 | 1 | 49 | 140 | 0.3 | 323 | 49.4 | 40 | 233.7 | 2 | 1 | 1 | 230 | 1 | Example |
| 299 | 1 | 50 | 140 | 0.3 | 379 | 57.6 | 35 | 286.3 | 1.5 | 1.4 | 1 | 230 | 1 | Example |

TABLE 77

| No. | Appearance | White-rust resistance: SST 96 hrs | White-rust resistance after alkaline degreasing: SST 96 hrs | Paint adhesiveness | Classification |
|---|---|---|---|---|---|
| 289 | ○ | ○+ | ○+ | ◎ | Example |
| 290 | ○ | ○+ | ○+ | ◎ | Example |
| 291 | ○ | ○+ | ○+ | ◎ | Example |
| 292 | ○ | ○+ | ○+ | ◎ | Example |
| 293 | ○ | ○+ | ○+ | ◎ | Example |
| 294 | ○ | ○+ | ○+ | ◎ | Example |
| 295 | ○ | ○+ | ○+ | ◎ | Example |
| 296 | ○ | ○+ | ○+ | ◎ | Example |
| 297 | ○ | ◎ | ○+ | ◎ | Example |
| 298 | ○ | ◎ | ○+ | ◎ | Example |
| 299 | ○ | ◎ | ◎ | ◎ | Example |

TABLE 78

| | Primary layer coating | | | | | | | | | Secondary layer coating | | | |
|---|---|---|---|---|---|---|---|---|---|---|---|---|---|
| | | Coat- | | | Coating weight *4 | | | | Molar ratio of coating components | | | | |
| | Plating | ing com- | Drying tem- | Coating | Total | SiO₂ fine | Mg com- | P₂O₅ com- | | | Resin com- | Drying tem- | Coat-ing |
| No. | steel plate *1 | posi- tion *2 | pera- ture (° C.) | thick- ness (μm) | coating weight (mg/m²) | particles (α) (mg/m²) | ponent (β) (mg/m²) | ponent (γ) (mg/m²) | Mg/ SiO₂ *5 | P₂O₅/ Mg *6 | posi- tion *3 | pera- ture (° C.) | thick- ness (μm) | Class- ifica- tion |
| 300 | 1 | 51 | 140 | 0.3 | 399 | 164.6 | 0.2 | 233.7 | 0.003 | 200 | 1 | 230 | 1 | Example |
| 301 | 1 | 52 | 140 | 0.3 | 326 | 66.5 | 35 | 225.0 | 1.3 | 1.1 | 1 | 230 | 1 | Example |
| 302 | 1 | 53 | 140 | 0.3 | 337 | 98.8 | 4 | 233.7 | 0.1 | 10 | 1 | 230 | 1 | Example |
| 303 | 1 | 54 | 140 | 0.3 | 393 | 318.6 | 4 | 70.1 | 0.031 | 3 | 1 | 230 | 1 | Comparative example |
| 304 | 1 | 55 | 140 | 0.3 | 366 | 0.0 | 15 | 350.6 | — | 4 | 1 | 230 | 1 | Comparative example |
| 305 | 1 | 56 | 140 | 0.3 | 359 | 25.9 | 210 | 122.7 | 20 | 0.1 | 1 | 230 | 1 | Comparative example |
| 306 | 1 | 57 | 140 | 0.3 | 400 | 280.0 | 0 | 120.0 | — | — | 1 | 230 | 1 | Comparative example |
| 307 | 1 | 58 | 140 | 0.3 | 347 | 0.4 | 25 | 321.4 | 150 | 2.2 | 1 | 230 | 1 | Comparative example |
| 308 | 1 | 59 | 140 | 0.3 | 359 | 308.6 | 50 | 0.0 | 0.4 | — | 1 | 230 | 1 | Comparative example |
| 309 | 1 | 60 | 140 | 0.3 | 297 | 25.9 | 210 | 61.4 | 20 | 0.05 | 1 | 230 | 1 | Comparative example |
| 310 | 1 | 61 | 140 | 0.3 | 327 | 10.3 | 25 | 292.2 | 6 | 2 | 1 | 230 | 1 | Comparative example |

TABLE 79

| | Performance | | | |
|---|---|---|---|---|
| No. | Appear- ance | White-rust resistance: SST 96 hrs | White-rust resistance after alkaline degresing: SST 96 hrs | Paint ad- hesive- ness | Classi- fication |
| 300 | ○ | ◎ | ◎ | ◎ | Example |
| 301 | ○ | ◎ | ◎ | ◎ | Example |
| 302 | ○ | ◎ | ◎ | ◎ | Example |
| 303 | ○ | ○ | Δ | Δ | Comparative example |
| 304 | ○ | X | X | ◎ | Comparative example |
| 305 | X | Δ | ○ | ◎ | Comparative example |
| 306 | ○ | Δ | X | ◎ | Comparative example |
| 307 | X | Δ | Δ | ◎ | Comparative example |
| 308 | ○ | Δ | Δ | ◎ | Comparative example |
| 309 | ○ | X | Δ | ◎ | Comparative example |
| 310 | ○ | ○ | ○ | X | Comparative example |

TABLE 80

| | Primary layer coating | | | | | | | | | | Secondary layer coating | | | | |
|---|---|---|---|---|---|---|---|---|---|---|---|---|---|---|---|
| | | Coat- | | | Coating weight *4 | | | | Molar ratio of coating components | | | Ion- | | | |
| | Plating | ing com- | Drying tem- | Coating | Total | SiO₂ fine | Mg com- | P₂O₅ com- | | | Resin com- | exchanged silica | Drying tem- | Coat- ing | |
| No. | steel plate *1 | posi- tion *2 | pera- ture (° C.) | thick- ness (μm) | coating weight (mg/m²) | particles (α) (mg/m²) | ponent (β) (mg/m²) | ponent (γ) (mg/m²) | Mg/ SiO₂ *5 | P₂O₅/ Mg *6 | posi- tion *3 | (a) content *7 | pera- ture (° C.) | thick- ness (μm) | Class- ifica- tion |
| 311 | 1 | 16 | 140 | 0.3 | 324 | 43.2 | 35 | 245.4 | 2 | 1.2 | 1 | 30 | 230 | 1 | Example |
| 312 | 1 | 17 | 140 | 0.3 | 324 | 43.2 | 35 | 245.4 | 2 | 1.2 | 1 | 30 | 230 | 1 | Example |
| 313 | 1 | 18 | 140 | 0.3 | 335 | 88.9 | 36 | 210.4 | 1 | 1 | 1 | 30 | 230 | 1 | Example |
| 314 | 1 | 19 | 140 | 0.3 | 292 | 38.0 | 20 | 233.7 | 1.3 | 2 | 1 | 30 | 230 | 1 | Example |
| 315 | 1 | 20 | 140 | 0.3 | 332 | 72.0 | 35 | 225.0 | 1.2 | 1.1 | 1 | 30 | 230 | 1 | Example |

TABLE 80-continued

| | Primary layer coating | | | | | | | | | | Secondary layer coating | | | |
|---|---|---|---|---|---|---|---|---|---|---|---|---|---|---|
| | | Coat- | | | Coating weight *4 | | | | Molar ratio of coating components | | Resin | Ion-exchanged silica | Drying | Coat- |
| | Plating | ing com- | Drying tem- | Coating | Total | SiO$_2$ fine | Mg com- | P$_2$O$_5$ com- | | | com- | | tem- | ing |
| No. | steel plate *1 | posi-tion *2 | pera-ture (°C.) | thick-ness (μm) | coating weight (mg/m$^2$) | particles (α) (mg/m$^2$) | ponent (β) (mg/m$^2$) | ponent (γ) (mg/m$^2$) | Mg/ SiO$_2$ *5 | P$_2$O$_5$/ Mg *6 | posi-tion *3 | (a) content *7 | pera-ture (°C.) | thick-ness (μm) | Class-ifica-tion |
| 316 | 1 | 21 | 140 | 0.3 | 330 | 22.2 | 45 | 263.0 | 5 | 1 | 1 | 30 | 230 | 1 | Example |
| 317 | 1 | 22 | 140 | 0.3 | 371 | 148.1 | 30 | 192.8 | 0.5 | 1.1 | 1 | 30 | 230 | 1 | Example |
| 318 | 1 | 23 | 140 | 0.3 | 349 | 114.0 | 60 | 175.3 | 1.3 | 0.5 | 1 | 30 | 230 | 1 | Example |
| 319 | 1 | 24 | 140 | 0.3 | 323 | 49.4 | 40 | 233.7 | 2.0 | 1.0 | 1 | 30 | 230 | 1 | Example |
| 320 | 1 | 25 | 140 | 0.3 | 323 | 49.4 | 40 | 233.7 | 2.0 | 1.0 | 1 | 30 | 230 | 1 | Example |
| 321 | 1 | 26 | 140 | 0.3 | 323 | 49.4 | 40 | 233.7 | 2.0 | 1.0 | 1 | 30 | 230 | 1 | Example |
| 322 | 1 | 27 | 140 | 0.3 | 374 | 246.9 | 10 | 116.9 | 0.1 | 2.0 | 1 | 30 | 230 | 1 | Example |

TABLE 81

| | Performance | | | | |
|---|---|---|---|---|---|
| No. | Appear-ance | White-rust resistance: SST 150 hrs | White-rust resistance after alkaline degreasing: SST 150 hrs | Paint adhesive-ness | Classi-fication |
| 311 | ○ | ⊙ | ⊙ | ⊙ | Example |
| 312 | ○ | ⊙ | ⊙ | ⊙ | Example |
| 313 | ○ | ⊙ | ⊙ | ⊙ | Example |
| 314 | ○ | ⊙ | ⊙ | ⊙ | Example |
| 315 | ○ | ⊙ | ⊙ | ⊙ | Example |
| 316 | ○ | ⊙ | ⊙ | ⊙ | Example |
| 317 | ○ | ⊙ | ⊙ | ⊙ | Example |
| 318 | ○ | ⊙ | ⊙ | ⊙ | Example |
| 319 | ○ | ⊙ | ⊙ | ⊙ | Example |
| 320 | ○ | ⊙ | ⊙ | ⊙ | Example |
| 321 | ○ | ⊙ | ○+ | ⊙ | Example |
| 322 | ○ | ⊙ | ○+ | ⊙ | Example |

TABLE 82

| | Primary layer coating | | | | | | | | | | Secondary layer coating | | | |
|---|---|---|---|---|---|---|---|---|---|---|---|---|---|---|
| | | Coat- | | | Coating weight *4 | | | | Molar ratio of coating components | | Resin | Ion-ex-changed silica | Drying | Coat- |
| | Plating | ing com- | Drying tem- | Coating | Total | SiO$_2$ fine | Mg com- | P$_2$O$_5$ com- | | | com- | | tem- | ing |
| No. | steel plate *1 | posi-tion *2 | pera-ture (°C.) | thick-ness (μm) | coating weight (mg/m$^2$) | particles (α) (mg/m$^2$) | ponent (β) (mg/m$^2$) | ponent (γ) (mg/m$^2$) | Mg/ SiO$_2$ *5 | P$_2$O$_5$/ Mg *6 | posi-tion *3 | (a) con-tent *7 | pera-ture (°C.) | thick-ness (μm) | Class-ifica-tion |
| 323 | 1 | 28 | 140 | 0.3 | 330 | 9.9 | 40 | 280.5 | 10.0 | 1.2 | 1 | 30 | 230 | 1 | Example |
| 324 | 1 | 29 | 140 | 0.3 | 323 | 164.6 | 100 | 58.4 | 1.5 | 0.1 | 1 | 30 | 230 | 1 | Example |
| 325 | 1 | 30 | 140 | 0.3 | 310 | 12.3 | 5 | 292.2 | 1.0 | 10.0 | 1 | 30 | 230 | 1 | Example |
| 326 | 1 | 31 | 140 | 0.3 | 310 | 13.2 | 40 | 257.1 | 7.5 | 1.1 | 1 | 30 | 230 | 1 | Example |
| 327 | 1 | 32 | 140 | 0.3 | 310 | 2.2 | 45 | 263.0 | 50.0 | 1.0 | 1 | 30 | 230 | 1 | Example |
| 328 | 1 | 33 | 140 | 0.3 | 300 | 123.5 | 1 | 175.3 | 0.02 | 30 | 1 | 30 | 230 | 1 | Example |
| 329 | 1 | 34 | 140 | 0.3 | 324 | 148.1 | 0.6 | 175.3 | 0.01 | 50 | 1 | 30 | 230 | 1 | Example |
| 330 | 1 | 35 | 140 | 0.3 | 389 | 3.5 | 140 | 245.4 | 100 | 0.3 | 1 | 30 | 230 | 1 | Example |
| 331 | 1 | 36 | 140 | 0.3 | 401 | 1.8 | 145 | 254.2 | 200 | 0.3 | 1 | 30 | 230 | 1 | Example |
| 332 | 1 | 37 | 140 | 0.3 | 394 | 246.9 | 0.5 | 146.1 | 0.005 | 50 | 1 | 30 | 230 | 1 | Example |
| 333 | 1 | 38 | 140 | 0.3 | 293 | 74.1 | 0.15 | 219.1 | 0.005 | 250 | 1 | 30 | 230 | 1 | Example |
| 334 | 1 | 39 | 140 | 0.3 | 365 | 6.9 | 350 | 8.2 | 125 | 0.004 | 1 | 30 | 230 | 1 | Example |

TABLE 83

| No. | Appearance | White-rust resistance: SST 150 hrs | White-rust resistance after alkaline degreasing: SST 150 hrs | Paint adhesiveness | Classification |
|---|---|---|---|---|---|
| 323 | ○ | ⊚ | ○+ | ⊚ | Example |
| 324 | ○ | ⊚ | ○+ | ⊚ | Example |
| 325 | ○ | ⊚ | ○+ | ⊚ | Example |
| 326 | ○ | ⊚ | ○+ | ⊚ | Example |
| 327 | ○ | ⊚ | ○ | ⊚ | Example |
| 328 | ○ | ⊚ | ○ | ⊚ | Example |
| 329 | ○ | ⊚ | ○ | ⊚ | Example |
| 330 | ○ | ⊚ | ○ | ⊚ | Example |
| 331 | ○ | ⊚ | ○− | ⊚ | Example |
| 332 | ○ | ⊚ | ○− | ⊚ | Example |
| 333 | ○ | ○+ | ○+ | ⊚ | Example |
| 334 | ○ | ○+ | ○+ | ⊚ | Example |

TABLE 84

| | Primary layer coating | | | | | | | | | Secondary layer coating | | | | |
|---|---|---|---|---|---|---|---|---|---|---|---|---|---|---|
| | | | | | Coating weight *4 | | | | Molar ratio | | Ion- | | | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 | Resin composition *3 | ex-changed silica (a) content *7 | Drying temperature (° C.) | Coating thickness (μm) | Classification |
| 335 | 1 | 40 | 140 | 0.3 | 394 | 0.2 | 160 | 233.7 | 2000 | 0.25 | 1 | 30 | 230 | 1 | Example |
| 336 | 1 | 41 | 140 | 0.3 | 391 | 0.3 | 180 | 210.4 | 1500 | 0.2 | 1 | 30 | 230 | 1 | Example |
| 337 | 1 | 42 | 140 | 0.3 | 365 | 246.9 | 0.8 | 116.9 | 0.008 | 25 | 1 | 30 | 230 | 1 | Example |
| 338 | 1 | 43 | 140 | 0.3 | 399 | 319.5 | 2.2 | 77.1 | 0.017 | 6 | 1 | 30 | 230 | 1 | Example |
| 339 | 1 | 44 | 140 | 0.3 | 379 | 98.8 | 0.08 | 280.5 | 0.002 | 600 | 1 | 30 | 230 | 1 | Example |
| 340 | 1 | 45 | 140 | 0.3 | 404 | 181.1 | 220 | 2.6 | 3 | 0.002 | 1 | 30 | 230 | 1 | Example |
| 341 | 1 | 46 | 140 | 0.3 | 399 | 18.5 | 30 | 350.6 | 4 | 2 | 1 | 30 | 230 | 1 | Example |
| 342 | 1 | 47 | 140 | 0.3 | 321 | 0.03 | 40 | 280.5 | 3000 | 1.2 | 1 | 30 | 230 | 1 | Example |
| 343 | 1 | 48 | 140 | 0.3 | 323 | 49.4 | 40 | 233.7 | 2 | 1 | 1 | 30 | 230 | 1 | Example |
| 344 | 1 | 49 | 140 | 0.3 | 323 | 49.4 | 40 | 233.7 | 2 | 1 | 1 | 30 | 230 | 1 | Example |
| 345 | 1 | 50 | 140 | 0.3 | 379 | 57.6 | 35 | 286.3 | 1.5 | 1.4 | 1 | 30 | 230 | 1 | Example |

TABLE 85

| No. | Appearance | White-rust resistance: SST 150 hrs | White-rust resistance after alkaline degreasing: SST 150 hrs | Paint adhesiveness | Classification |
|---|---|---|---|---|---|
| 335 | ○ | ○+ | ○+ | ⊚ | Example |
| 336 | ○ | ○+ | ○+ | ⊚ | Example |
| 337 | ○ | ○+ | ○+ | ⊚ | Example |
| 338 | ○ | ○+ | ○+ | ⊚ | Example |
| 339 | ○ | ○+ | ○+ | ⊚ | Example |
| 340 | ○ | ○+ | ○+ | ⊚ | Example |
| 341 | ○ | ○+ | ○+ | ⊚ | Example |
| 342 | ○ | ○+ | ○+ | ⊚ | Example |
| 343 | ○ | ⊚ | ○+ | ⊚ | Example |
| 344 | ○ | ⊚ | ○+ | ⊚ | Example |
| 345 | ○ | ⊚ | ⊚ | ⊚ | Example |

TABLE 86

| | | Primary layer coating | | | | | | | | Secondary layer coating | | | |
|---|---|---|---|---|---|---|---|---|---|---|---|---|---|
| | | Coat- | | Coat- | Coating weight *4 | | | | Molar ratio of coating components | | Resin | Ion-ex- | Dry-ing | Coat- | |
| | Plat-ing steel plate *1 | ing com-posi-tion *2 | Drying tem-pera-ture (° C.) | Coat-ing thick-ness (μm) | Total coating weight (mg/m²) | SiO₂ fine particles (α) (mg/m²) | Mg com-ponent (β) (mg/m²) | P₂O₅ com-ponent (γ) (mg/m²) | Mg/ SiO₂ *5 | P₂O₅/ Mg *6 | Resin com-posi-tion *3 | ex-changed silica (a) con-tent *7 | tem-pera-ture (° C.) | ing thick-ness (μm) | Class-ifica-tion |
| No. | | | | | | | | | | | | | | | |
| 346 | 1 | 51 | 140 | 0.3 | 399 | 164.6 | 0.2 | 233.7 | 0.003 | 200 | 1 | 30 | 230 | 1 | Example |
| 347 | 1 | 52 | 140 | 0.3 | 326 | 66.5 | 35 | 225.0 | 1.3 | 1.1 | 1 | 30 | 230 | 1 | Example |
| 348 | 1 | 53 | 140 | 0.3 | 337 | 98.8 | 4 | 233.7 | 0.1 | 10 | 1 | 30 | 230 | 1 | Example |
| 349 | 1 | 54 | 140 | 0.3 | 393 | 318.6 | 4 | 70.1 | 0.031 | 3 | 1 | 30 | 230 | 1 | Comparative example |
| 350 | 1 | 55 | 140 | 0.3 | 366 | 0.0 | 15 | 350.6 | — | 4 | 1 | 30 | 230 | 1 | Comparative example |
| 351 | 1 | 56 | 140 | 0.3 | 359 | 25.9 | 210 | 122.7 | 20 | 0.1 | 1 | 30 | 230 | 1 | Comparative example |
| 352 | 1 | 57 | 140 | 0.3 | 400 | 280.0 | 0 | 120.0 | — | — | 1 | 30 | 230 | 1 | Comparative example |
| 353 | 1 | 58 | 140 | 0.3 | 347 | 0.4 | 25 | 321.4 | 150 | 2.2 | 1 | 30 | 230 | 1 | Comparative example |
| 354 | 1 | 59 | 140 | 0.3 | 359 | 308.6 | 50 | 0.0 | 0.4 | — | 1 | 30 | 230 | 1 | Comparative example |
| 355 | 1 | 60 | 140 | 0.3 | 297 | 25.9 | 210 | 61.4 | 20 | 0.05 | 1 | 30 | 230 | 1 | Comparative example |
| 356 | 1 | 61 | 140 | 0.3 | 327 | 10.3 | 25 | 292.2 | 6 | 2 | 1 | 30 | 230 | 1 | Comparative example |

TABLE 87

| | Performance | | | | |
|---|---|---|---|---|---|
| No. | Appear-ance | White-rust resistance: SST 150 hrs | White-rust resistance after alkaline degreasing: SST 150 hrs | Paint adhesive-ness | Classi-fication |
| 346 | ○ | ⊙ | ⊙ | ⊙ | Example |
| 347 | ○ | ⊙ | ⊙ | ⊙ | Example |
| 348 | ○ | ⊙ | ⊙ | ⊙ | Example |
| 349 | ○ | ○ | Δ | Δ | Comparative Example |
| 350 | ○ | X | X | ⊙ | Comparative Example |
| 351 | X | Δ | ○ | ⊙ | Comparative Example |
| 352 | ○ | Δ | X | ⊙ | Comparative Example |
| 353 | X | Δ | Δ | ⊙ | Comparative Example |
| 354 | ○ | Δ | Δ | ⊙ | Comparative Example |
| 355 | ○ | X | Δ | ⊙ | Comparative Example |
| 356 | ○ | ○ | ○ | X | Comparative Example |

Best Mode 2

A basic feature of the present invention is the following.

On the surface of a zinc base plated steel sheet or an aluminum base plated steel sheet, a composite oxide coating as the primary layer coating is formed, which composite oxide coating comprises (α) oxide fine particles and (β) phosphoric acid and/or phosphoric acid compound, and at need, (γ) at least one substance selected from the group consisting of Li, Mn, Fe, Co, Ni, Zn, Al, La, and Ce. Furthermore, on the composite oxide coating, an organic coating is formed as the secondary layer coating, which organic coating comprises a chelate-forming resin which is a product of reaction between a film-forming organic resin (A) and an active-hydrogen-laden compound (B), a part or whole of which compound (B) consists of a hydrazine derivative (C) containing active hydrogen, thus applying the hydrazine derivative (C) as a chelating group to the film-forming resin (A).

The present invention adopts a dual layer coating structure consisting of the above-described primary layer as the lower layer and the secondary layer as the upper layer. The synergy effect of the dual layer coating structure achieved to obtain corrosion resistance equivalent to that of chromate coating even with a thin coating film. Although the mechanism of corrosion resistance in the dual layer coating structure consisting of a specific composite oxide coating and a specific organic coating is not fully analyzed, the corrosion-preventive effect of the dual layer coating structure presumably comes from the combination of corrosion-suppression actions of individual coatings.

The corrosion preventive mechanism of the composite oxide coating as the primary layer coating is not fully understood. The excellent corrosion-preventive performance, supposedly, owes to the features described below.

(a) The dense and slightly soluble composite oxide coating acts as a barrier coating to shut off corrosion causes;

(b) The fine particles of oxide such as silicon oxide form a stable and dense barrier coating along with a metal and phosphoric acid and/or phosphoric acid compound; and (c) When the fine particles of oxide are those of silicon oxide, the silicic acid ion emitted from the silicon oxide forms basic zinc chloride under a corrosive environment to improve the barrier performance.

In addition, phosphoric acid and/or phosphoric acid compound contributes to the improved denseness of the composite oxide coating, and the phosphoric acid component catches the zinc ion which is eluted during an anodic reaction as a corrosion reaction in the coating-defect section, then the phosphoric acid component is converted to a slightly soluble zinc phosphate compound to form a precipitate at that place.

If at least one element selected from the group consisting of Li, Mn, Fe, Co, Ni, Zn, Al, La, and Ce is further added to the composite oxide coating, the corrosion resistance further improves. Although the reason of further improving corrosion resistance by these elements is not fully understood, any one of these elements likely forms slightly soluble salt with a phosphate in alkaline region, so that a cathodic reaction of oxygen in the corrosion reaction yields OH ion, which seals the corrosion site under an alkaline environment to provide high barrier effect.

Among these metallic elements, Mn and Ni particularly gave favorable corrosion resistance. The reason is, however, not fully analyzed, and the presumable reason is that these phosphates are difficult to dissolve under an alkaline environment.

The corrosion-preventive mechanism of the organic coating as the above-described secondary layer coating is also not fully analyzed. The mechanism is, however, presumably the following.

The rust-preventive effect of the chelate-forming resin as the secondary layer according to the present invention is not fully understood. And it is known that hydrazine derivatives provide light rust-preventive effect to metals. However, those derivatives cannot give high grade rust-preventive effect necessary to the steel sheets for household electric appliances and other products. According to the present invention, addition of a hydrazine derivative, not a simple low molecular weight chelating agent, to the film-forming organic resin provides the following-described work effects, and suppresses efficiently the progress of corrosion, thus assuring excellent corrosion resistance.
(1) The dense organic polymer coating gives an effect to shut-off corrosion causes such as oxygen and chlorine ions.
(2) The hydrazine derivative is able to form a stable passive layer by strongly bonding with the surface of the primary layer coating.
(3) The free hydrazine derivative in the coating traps the zinc ion which is eluted by a corrosion reaction, thus forming a stable insoluble chelated compound layer, which suppresses the formation of an ion conduction layer at interface to suppress the progress of corrosion.

When a resin containing epoxy group is used as the film-forming organic resin (A), a dense barrier coating is formed by the reaction between the epoxy-group-laden resin and a cross-linking agent. Thus, the formed barrier coating has excellent penetration-suppression performance against the corrosion causes such as oxygen, and gains excellent bonding force with the base material owing to the hydroxyl group in the molecule, which results in particularly superior corrosion resistance.

Further excellent corrosion resistance is obtained by using an active-hydrogen-laden pyrazole compound and/or an active-hydrogen-laden triazole compound as the hydrazine derivative (C) containing active hydrogen.

As in the case of prior art, blending simply a hydrazine derivative with the film-forming organic resin gives very little improvement in corrosion-suppression. The reason is presumably that the hydrazine derivative which does not enter the molecules of the film-forming organic resin forms a chelate compound with zinc which is eluted under a corrosive environment, and the chelate compound cannot form a dense barrier layer because of low molecular weight. To the contrary, introduction of a hydrazine derivative into the molecules of film-forming organic resin, as in the case of present invention, provides markedly high corrosion-suppression effect.

As described above, the plurality of corrosion-preventive effects of the primary layer and the plurality of corrosion preventive effects of the secondary layer work as the total in combination and synergy mode, thus providing excellent corrosion resistance with a thin coating film for the first time without using chromium.

As the plated steel sheet as the base of the organic coating steel sheet according to the present invention, a zinc base plated steel sheet or an aluminum base plated steel sheet which are described in the best mode 1 is used.

The following is the description about the composite oxide coating as the primary layer coating formed on the surface of the zinc base plated steel sheet or the aluminum base plated steel sheet.

Quite different from conventional alkali silicate treatment coating which is represented by the coating composition consisting of lithium oxide and silicon oxide, the composite oxide coating according to the present invention comprises: ($\alpha$) fine particles of oxide; and ($\beta$) phosphoric acid and/or phosphoric acid compound. If necessary, ($\gamma$) one or more of metal selected from the group consisting of Li, Mn, Fe, Co, Ni, Zn, Al, La, and Ce are contained.

From the viewpoint of corrosion resistance, particularly preferable oxide fine particles as the above-described component ($\alpha$) are those of silicon oxide (fine particles of $SiO_2$), and most preferable one among the silicon oxides is colloidal silica.

Among these silicon oxides ($SiO_2$ fine particles), the ones having particle sizes of 14 nm or less, more preferably 8 nm or less are preferred from the viewpoint of corrosion resistance.

The silicon oxide may be used by dispersing dry silica fine particles in a coating composition solution. Examples of the dry silica are AEROSIL 200, AEROSIL 3000, AEROSIL 300CF, AEROSIL 380, (these are trade names) manufactured by Japan Aerosil Co., Ltd., and particularly the ones having particle sizes of 12 nm or less, more preferably 7 nm or less are preferred.

Other than above-described silicon oxides, the oxide fine particles may be colloidal liquid and fine particles of aluminum oxide, zirconium oxide, titanium oxide, cerium oxide, and antimony oxide.

The phosphoric acid and/or phosphoric acid compound as the above-described component ($\beta$) may be blended by adding orthophosphoric acid, pyrophosphoric acid, polyphosphoric acid, methaphosphoric acid, or metallic salt or compound of them to the coating composition. The target composition may include organic phosphoric acid and salt thereof (for example, phytic acid, phytiate, phosphonic acid, phosphonate, their metal salt). Among them, primary phosphonic acid is preferable from the point of stability of the coating composition. When primary ammonium phosphate, secondary ammonium phosphate, or ternary ammonium phosphate was added as the phosphate to the coating composition solution, the corrosion resistance was improved. Although the reason is not fully analyzed, the presumable reason is that, since generally metallic salts become insoluble in alkaline region, when the metallic salts are formed from a composition solution of high pH, compounds of further difficult to dissolve are generated during the drying step.

There is no specific limitation on the form of existing phosphoric acid and phosphoric acid compound in the coating, and they may be crystals or non-crystals. Also there is no specific limitation on the ionicity and solubility of phosphoric acid and phosphoric acid compound in the coating.

The form of the above-described component ($\gamma$) existing in the coating is not specifically limited, and it may be metal, or compound or composite compound such as oxide, hydroxide, hydrated oxide, phosphoric acid compound, or composite compound or metal. The ionicity and solubility of these compound, hydroxide, hydrated oxide, phosphoric acid compound, coordination compound, or the like are not specifically limited.

There is no specific limitation on introducing the component ($\gamma$) into the coating, and the component ($\gamma$) may be added to the coating composition in a form of phosphate, sulfate, nitrate, and chloride of Li, Mn, Fe, Co, Ni, Zn, Al, La, and Ce.

A preferable range of coating weight of the composite oxide is, when the oxide fine particles ($\alpha$) and the above-described composition ($\alpha$) as $P_2O_5$, and further the component ($\gamma$) exist, from 5 to 4,000 mg/m$^2$ as the sum of ($\alpha$), ($\beta$), and ($\gamma$) as metal, more preferably from 50 to 1,000 mg/m$^2$, further preferably from 100 to 500 mg/m$^2$, and most preferably from 200 to 400 mg/m$^2$. If the coating weight is less than 5 mg/m$^2$, the corrosion resistance degrades. If the coating weight exceeds 4,000 mg/m$^2$, the conductive performance degrades and the weldability degrades.

To attain particularly superior corrosion resistance, it is preferred to select the ratio of silicon oxide as the component ($\alpha$), converted to $SiO_2$, to the total composite oxide coating to a range of from 5 to 95 wt. %, more preferably from 10 to 60 wt. %.

The reason of giving particularly superior corrosion resistance when the ratio of the silicon oxide is selected to the range given above is not fully analyzed. It is, however, speculated that the phosphoric acid component supports the barrier effect which cannot be attained solely by silicon oxide, thus contributing to forming a dense film, further that the synergy effect of corrosion-suppression actions of each of phosphoric acid component and silicon oxide component, resulting in obtaining the excellent corrosion resistance.

From the similar viewpoint, it is preferred to select the ratio of the phosphoric acid and/or phosphoric acid compound as the component ($\beta$) to the metallic component as the component ($\gamma$) (if there are two or more metals, the sum of each of them converted to respective metals) in the composite oxide coating to a range of from 1/2 to 2/1 as the molar ratio of the component ($\beta$) as $P_2O_5$ to the component ($\gamma$) as metal, or [$P_2O_5$/Me] for attaining further excellent corrosion resistance.

The reason of giving particularly superior corrosion resistance when the ratio of phosphoric acid component to metallic component is selected to the range given above is not fully analyzed. It is, however, speculated that, since the solubility of phosphoric component varies with the ratio of phosphoric acid to metal, the corrosion resistance becomes particularly high when the coating non-soluble property stays within the range given above, so that the barrier performance of the coating increases.

For further improving the workability and the corrosion resistance of the coating, the composite oxide coating may further contain organic resins. Examples of the organic resin are epoxy resin, polyurethane resin, polyacrylic resin, acrylic-ethylene copolymer resin, acrylic-styrene copolymer resin, alkyd resin, polyester resin, polyethylene resin. These resins may be introduced into the coating in a form of water-soluble resin or water-dispersible resin.

Adding to these water-dispersible resins, it is effective to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

For further improving the corrosion resistance, the composite oxide coating may further contain polyphosphate, phosphate (for example, zinc phosphate, aluminum dihydrogen phosphate, and zinc phosphate), molybdate, phospho molybdate (for example, aluminum phosphomolybdate), organic phosphate and its salt (for example, phytic acid, phytiate, phosphonic acid, phosphonate, their metal salt and alkali metal salt), organic inhibitor (for example, hydrazine derivative, thiol compound, dithiocarbamate), organic compound (polyethyleneglycol), and the like.

Other applicable additives include organic coloring pigments (for example, condensing polycyclic organic pigments, phthalocyanine base organic pigments), coloring dyes (for example, azo dye soluble in organic solvent, azo metal dye soluble in water), inorganic pigments (titanium oxide), chelating agents (for example, thiol), conductive pigments (for example, metallic powder of zinc, aluminum, nickel, or the like, iron phosphide, antimony-dope type tin oxide), coupling agents (for example, silane coupling agent and titanium coupling agent), melamine-cyanuric acid additives.

As for the organic coating formed as the secondary layer coating on the above-described oxide coating, similar ones described in the best mode 1 may be applied.

According to the best mode 2, an inorganic rust-preventive pigment (a) is further added to the organic coating.

Examples of the inorganic rust-preventive pigment are: silica compound such as ion-exchanged silica and fine particle silica; celium oxide; aluminum oxide; zirconium oxide; antimonium oxide; polyphosphoric acid (for example, aluminum polyphosphate, TAICA K-WHITE 80, 84, 105, G105, 90, 90, (produced by TAYCA CORPORATION); molybdenate; phospho-molybdenate (such as aluminum-phosphomolybdenate). Particularly improved corrosion resistance is obtained when the system includes at least one of silica compound such as ion-exchanged silica (c), fine particle silica (d), phosphate such as zinc phosphate (e) and aluminum phosphate (f), and calcium compound.

The adding amount of inorganic rust-preventive pigment is in a range of from 1 to 100 parts by weight (solid matter) as the total inorganic rust-preventive pigment to 100 parts by weight of the reaction product as the resin composition for forming coating (the product of reaction between the film-forming organic resin (A) and the active-hydrogen-laden compound (B) a part or whole of which compound (B) consists of a hydrazine derivative (C) containing active hydrogen), preferably from 5 to 80 parts by weight (solid matter).

The ion-exchanged silica is prepared by fixing metallic ion such as calcium and magnesium ions on the surface of porous silica gel powder. Under a corrosive environment, the metallic ion is released to form a deposit film. Among these ion-exchanged silicas, Ca ion-exchanged silica is most preferable.

The corrosion-preventive mechanism obtained by blending ion-exchanged silica (a) in the organic coating is presumably the following. That is, when cation such as Na ion enters under the corrosion environment, the iron exchange action emits Ca ion and Mg ion from the surface of silica. Furthermore, when OH ion is generated by the cathode reaction under the corrosive environment to increase pH value near the plating interface, the Ca ion (or Mg ion) emitted from the ion-exchanged silica precipitates in the vicinity of the plating interface in a form of $Ca(OH)_2$ or $Mg(OH)_2$, respectively. The precipitate seals defects as a dense and slightly soluble product to suppress the corrosion reactions. Furthermore, the eluted Zn ion exchanges Ca ion (or Mg ion) to be fixed onto the surface of silica.

Any type of Ca-exchanged silica may be used, and a preferred one has an average particle size not more than 6 μm, more preferably not more than 4 μm. For example, Ca-exchanged silica having average particle sizes of from 2 to 4 μm may be used. If the average particle size of the Ca-exchanged silica exceeds 6 μm, the corrosion resistance degrades, and the dispersion stability in a paint composition degrades.

A preferred range of the Ca concentration in the Ca-exchanged silica is 1 wt. % or more, more preferably from 2 to 8 wt. %. Ca content of less than 1 wt. % fails to obtain satisfactory rust-preventive effect under the Ca emission.

There is no specific limitation on the surface area, pH, and oil absorbing capacity of Ca-exchanged silica.

The corrosion-preventive mechanism in the case that ion-exchanged silica (c) is added to the organic coating is described before. In particular, according to the present invention, when an ion-exchanged silica is blended with an organic coating consisting of a specific chelate-modified resin, the corrosion-preventive effect at anode reaction section owing to the chelate-modified resin and the corrosion-preventive effect at cathode reaction section owing to the ion-exchanged silica are combined to suppress both the anode and the cathode corrosion reactions, which should provide markedly strong corrosion-preventive effect.

The adding amount of ion-exchanged silica (c) in the organic resin coating is in a range of from 1 to 100 parts by weight (solid matter) to 100 parts by weight of the reaction product as the resin composition for forming coating (the product of reaction between the film-forming organic resin (A) and the active-hydrogen-laden compound (B) a part or whole of which compound (B) consists of a hydrazine derivative (C) containing active hydrogen), preferably from 5 to 80 parts by weight (solid matter), more preferably from 10 to 50 parts by weight (solid matter). When the amount of ion-exchanged silica (c) is less than 1 part by weight, the effect to improve the corrosion resistance after alkaline degreasing becomes small. If the amount of ion-exchanged silica (c) exceeds 100 parts by weight, the corrosion resistance degrades, which is unfavorable.

The fine particle silica (d) may be either colloidal silica or fumed silica.

Particularly an organic solvent dispersible silica sol has superior dispersibility, and shows superior corrosion resistance to fumed silica.

Fine particle silica is supposed to contribute to forming dense and stable zinc corrosion products under a corrosive environment. Thus formed corrosion products cover the plating surface in a dense mode, thus presumably suppressing the development of corrosion.

From the viewpoint of corrosion resistance, the fine particle silica preferably has particle sizes of from 5 to 50 nm, more preferably from 5 to 20 nm, and most preferably from 5 to 15 nm.

The adding amount of fine particle silica (d) in the organic resin coating is in a range of from 1 to 100 parts by weight (solid matter) to 100 parts by weight of the reaction product as the resin composition for forming coating (the product of reaction between the film-forming organic resin (A) and the active-hydrogen-laden compound (B) a part or whole of which compound (B) consists of a hydrazine derivative (C) containing active hydrogen), preferably from 5 to 80 parts by weight (solid matter), more preferably from 10 to 30 parts by weight (solid matter). When the amount of fine particle silica (d) is less than 1 part by weight, the effect to improve the corrosion resistance after alkaline degreasing becomes small. If the amount of fine particle silica (d) exceeds 100 parts by weight, the corrosion resistance degrades, which is unfavorable.

According to the present invention, combined addition of ion-exchanged silica (c) and fine particle silica (d) to the organic coating provides particularly excellent corrosion resistance. That is, the combined addition of ion-exchanged silica (c) and fine particle silica (d) induces combined rust-preventive mechanism of both components as described before to give particularly excellent corrosion-preventive effect.

A preferred range of ratio of combined blend of ion-exchanged silica (c) and fine particle silica (d) in the organic resin coating is 1 to 100 parts by weight (solid matter) of the sum of the ion-exchanged silica (c) and the fine particle silica (d) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), and a preferred range of blending ratio of the ion-exchanged silica (c) to the fine particle silica (d), (solid matter), or (c)/(d), is from 99/1 to 1/99, more preferably from 95/5 to 40/60, and most preferably from 90/10 to 16/40.

If the blending ratio of the sum of the ion-exchanged silica (c) and the fine particle silica (d) becomes less than 1 part by weight, the effect of improved corrosion resistance after alkaline degreasing becomes small. If the blending ratio of the sum of the ion-exchanged silica (c) and the fine particle silica (d) exceeds 100 parts by weight, the paintability and the work ability degrade, which is unfavorable.

If the weight ratio of the ion-exchanged silica (c) to the fine particle silica (d), (c)/(d), is less than 1/99, the corrosion resistance degrades. If the weight ratio of the ion-exchanged silica (c) to the fine particle silica (d), (c)/(d), exceeds 99/1, the effect of combined addition of the ion-exchanged silica (c) and the fine particle silica (d) cannot fully be attained.

There is no specific limitation on the skeleton and degree of condensation of phosphoric acid ions for the zinc phosphate (e) and the aluminum phosphate (f) blended in the organic coating. They may be normal salt, dihydrogen salt, monohydrogen salt, or phosphite. The normal salt includes orthophosphoric acid and all the condensed phosphates such as polyphosphate. For example, zinc phosphate may be LF-BOSEI ZP-DL produced by Kikuchi Color Co., and aluminum phosphate may be K-WHITE produced by TAYCA CORPORATION.

These zinc phosphates and aluminum phosphates dissociate to phosphoric acid ion by hydrolysis under a corrosive environment, and form a protective coating through the complex-forming reaction with the eluted metals.

A preferred range of blending amount of zinc phosphate and/or aluminum phosphate (e, f) in the organic resin coating is from 1 to 100 parts by weight (solid matter) to 100 parts by weight (solid matter) of the film-forming organic resin (A), more preferably from 5 to 80 parts by weight (solid matter), and most preferably from 10 to 50 parts by weight (solid matter). If the blending amount of the zinc phosphate and/or aluminum phosphate (e, f) is less than 1 part by weight, the improved effect of corrosion resistance after alkaline degreasing becomes small. If the blending amount of the zinc phosphate and/or aluminum phosphate (e, f) exceeds 100 parts by weight, the corrosion resistance degrades, which is unfavorable.

According to the present invention, combined addition of zinc phosphate and/or aluminum phosphate (e, f) and calcium compound (g) to the organic coating provides particularly excellent corrosion resistance. That is, the combined addition of zinc phosphate and/or aluminum phosphate (e, f) and calcium compound (g) to the organic coating provides particularly excellent corrosion resistance which induces combined rust-preventive mechanism of both components as described before to give particularly excellent corrosion-preventive effect.

Calcium compound (g) may be either one of calcium oxide, calcium hydroxide, and calcium salt, and at least one of them is adopted. There is no specific limitation on the kind of calcium salt, and the salt may be a single salt containing only calcium as cation, for example, calcium silicate, calcium carbonate, and calcium phosphate, and may be complex salt containing cation other than calcium cation, for example, zinc calcium phosphate, magnesium calcium phosphate.

Since calcium compounds elute preferentially to metals under a corrosive environment, it presumably induces a complex-forming reaction with phosphoric acid ion without triggering the elution of plating metal, thus forming a dense and slightly-soluble protective coating to suppress the corrosion reactions.

A preferred blending ratio of combined addition of zinc phosphate and/or aluminum phosphate (e, f) and calcium compound (g) to the organic resin coating is from 1 to 100 parts by weight (solid matter) to 100 parts by weight (solid matter) of the film-forming organic resin (A), more preferably from 5 to 80 parts by weight, and a preferred blending weight ratio (solid matter) of the zinc phosphate and/or aluminum phosphate (e, f) and the calcium compound (g), (e, f)/(g), is from 99/1 to 1/99, more preferably from 95/5 to 40/60, and most preferably from 90/10 to 60/40.

If the blending amount of the sum of zinc phosphate and/or aluminum phosphate (e, f) and calcium compound (g) is less than 1 part by weight, the improved effect of corrosion resistance after alkaline degreasing becomes small. If the blending amount of the sum of zinc phosphate and/or aluminum phosphate (e, f) and calcium compound (g) exceeds 100 parts by weight, the corrosion resistance degrades, which is unfavorable.

If the blending ratio (solid matter) of zinc phosphate and/or aluminum phosphate (e, f) to calcium compound (g) is less than 1/99, the corrosion resistance is inferior. If the blending ratio (solid matter) of zinc phosphate and/or aluminum phosphate (e, f) to calcium compound (g) exceeds 99/1, the effect of combined addition of zinc phosphate and/or aluminum phosphate (e, f) and calcium compound (g) cannot be fully attained.

The organic coating may further contain, adding to the above-described inorganic rust-preventive pigments, corrosion-suppression agents such as organic inhibitors including organic phosphate and its salt (for example, phytic acid, phytiate, phosphonic acid, phosphonate, their metal salt, alkali metal salt, and alkali earth metal salt), hydrazine derivative, thiol compound, dithiocarbamate.

The organic coating may, at need, further include a solid lubricant (b) to improve the workability of the coating.

Examples of applicable solid lubricant according to the present invention are the following.
(1) Polyolefin wax, paraffin wax: for example, polyethylene wax, synthetic paraffin, natural paraffin, microwax, chlorinated hydrocarbon;
(2) Fluororesin fine particles: for example, polyfluoroethylene resin (such as poly-tetrafluoroethylene resin), polyvinylfluoride resin, polyvinylidenefluoride resin.

In addition, there may be applied fatty acid amide base compound (such as stearic acid amide, palmitic acid amide, methylene bis-stearoamide, ethylene bis-stearoamide, oleic acid amide, ethyl acid amide, alkylene bis-fatty acid amide), metallic soap (such as calcium stearate, lead stearate, calcium laurate, calcium palmate), metallic sulfide (molybdenum disulfide, tungsten disulfide), graphite, graphite fluoride, boron nitride, polyalkyleneglycol, and alkali metal sulfate.

Among those solid lubricants, particularly preferred ones are polyethylene wax, fluororesin fine particles (particularly poly-tetrafluoroethylene resin fine particles).

Applicable polyethylene wax include: Sheridust 9615A, CELIDUST 3715, CELIDUST 3620, CELIDUST 3910 (trade names) manufactured by Hoechst Co., Ltd.; SUNWAX 131-P, SUNWAX 161-P (trade names) manufactured by Sanyo Chemical Industries, Ltd.; CHEMIPEARL W-100, CHEMIPEARL W-200, CHEMIPEARL W-500, CHEMIPEARL W-800, CHEMIPEARL W-950 (trade names) manufactured by Mitsui Petrochemical Industries, Ltd.

A most preferred fluororesin fine particle is tetrafluoroethylene fine particle. Examples of the fine particles are LUBRON L-2, LUBRON L-5 (trade names) manufactured by Daikin Industries, Ltd.; MP 1100, MP 1200 (trade names; manufactured by Du Pont-Mitsui Company, Ltd.); FLUON DISPERSION AD1, FLUONDISPERSION AD2, FLUON L141J, FLUON L150J, FLUON L155J (trade names) manufactured by Asahi ICI Fluoropolymers Co., Ltd.

As of these compounds, combined use o f polyolefin in wax and tetrafluoroethylene fine particles is expected to provide particularly excellent lubrication effect.

A preferred range of blending ratio of the solid lubricant (b) in the organic resin coating is from 1 to 80 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 3 to 40 parts by weight (solid matter). If the blending ratio of the solid lubricant (b) becomes less than 1 part by weight, the effect of lubrication is small. If the blending ratio of the solid lubricant (b) exceeds 80 parts by weight, the pain ting performance degrade, which is unfavorable.

The organic coating of the organic coating steel sheet according to the present invention normally consists mainly of a product (resin composition) of reaction between a film-forming organic resin (A) and an active-hydrogen-laden compound (B) a part of or whole of which consists of a hydrazine derivative (C) containing active hydrogen). And, at need, an inorganic rust-preventive pigment (a), a solid lubricant (b), a curing agent, or the like may further be added to the organic coating. Furthermore, at need, there may be added other additives such as organic coloring pigment (for example, condensing polycyclic organic pigment, phthalocyanine base organic pigment), coloring dye (for example, azo dye soluble in organic solvent, azo metal dye soluble in water), inorganic pigment (for example, titanium oxide), chelating agent (for example, thiol), conductive pigment (for example, metallic powder of zinc, aluminum, nickel, or the like, iron phosphide, antimony-dope type tin oxide), coupling agent (for example, silane coupling agent and titanium coupling agent), melamine-cyanuric acid additive.

The paint composition for film-formation containing above-described main component and additive components normally contains solvent (organic solvent and/or water), and, at need, further a neutralizer or the like is added.

Applicable organic solvent described above has no specific limitation if only it dissolves or disperses the product of reaction between the above-described film-forming organic resin (A) and the active-hydrogen-laden compound (B), and adjusts the product as the painting composition. Examples of the organic solvent are the organic solvents given above as examples.

The above-described neutralizers are blended, at need, to neutralize the film-forming organic resin (A) to bring it to water-type. When the film-forming organic resin (A) is a cationic resin, acid such as acetic acid, lactic acid, and formic acid may be used as the neutralizer.

The organic coatings described above are formed on the above-described composite oxide coating.

The dry thickness of the organic coating is in a range of from 0.1 to 5 $\mu$m, preferably from 0.3 to 3 $\mu$m, and most preferably from 0.5 to 2 $\mu$m. If the thickness of the organic coating is less than 0.1 $\mu$m, the corrosion resistance becomes insufficient. If the thickness of the organic coating exceeds 5 $\mu$m, the conductivity and the workability degrade.

The following is the description about the method for manufacturing an organic coating steel sheet according to the present invention.

The organic coating steel sheet according to the present invention is manufactured by the steps of: treating the surface (applying a treatment liquid to the surface) of a zinc base plated steel sheet or an aluminum base plated steel sheet using a treatment liquid containing the components of above-described composite oxide coating; heating and drying the plate; applying a paint composition which contains the product of reaction between above-described film-forming organic resin (A) and an active-hydrogen-laden compound (B) a part of or whole of which consists of a hydrazine derivative (C) containing active hydrogen, which product of reaction is preferably the main component, and at need, further contains an inorganic rust-preventive pigment (a), a solid lubricant (b), and the like; heating to dry the product.

The surface of the plated steel sheet may be, at need, subjected to alkaline degreasing before applying the above-described treatment liquid, and may further be subjected to preliminary treatment such as surface adjustment treatment for further improving the adhesiveness and corrosion resistance.

For treating the surface of the zinc base plated steel sheet or the aluminum base plated steel sheet with a treatment liquid and for forming a composite oxide coating thereon, it is preferred that the plate is treated by an aqueous solution containing:

(aa) oxide fine particles ranging from 0.001 to 3.0 mole/liter; and (ab) phosphoric acid and/or phosphoric acid compound ranging from 0.001 to 6.0 mole/liter as $P_2O_5$; followed by heating to dry.

The aqueous solution may further contain: (ac) one or more of the substances selected from the group consisting of either one metallic ion of Li, Mn, Fe, Co, Ni, Zn, Al, La, and Ce; a compound containing at least one metal given above; a composite compound containing at least one metal given above; ranging from 0.001 to 3.0 mole/liter as metal given above.

As the oxide fine particles as an additive component (ab), silicon oxide ($SiO_2$) fine particles are most preferred. The silicon oxide may be commercially available silica sol and water-dispersion type silicic acid oligomer or the like if only the silicon oxide is water-dispersion type $SiO_2$ fine particles which are stable in an acidic aqueous solution. Since, however, fluoride such as hexafluoro silicic acid is strongly corrosive and gives strong effect to human body, that kind of compound should be avoided from the point of influence to work environment.

A preferred range of blending ratio of the fine particle oxide (the blending ratio as $SiO_2$ in the case of silicon oxide) in the treating liquid is from 0.001 to 3.0 mole/liter, more preferably from 0.05 to 1.0 mole/liter, and most preferably from 0.1 to 0.5 mole/liter. If the blending ratio of the fine particle oxide becomes less than 0.001 mole/liter, the effect of addition is not satisfactory. If the blending ratio of the fine particle oxide exceeds 3.0 mole/liter, the water-resistance of coating degrades, resulting in degradation of corrosion resistance.

The phosphoric acid and/or phosphoric acid compound as the additive component (ab) includes: a mode of aqueous solution in which a compound specific to phosphoric acid, such as polyphosphoric acid such as orthophosphoric acid, pyrophosphoric acid, and tripolyphosphoric acid, methaphosphoric acid, inorganic salt of these acids (for example, primary aluminum phosphate), phosphorous acid, phosphite, phosphinic acid, phosphinate, exists in a form of anion or complex ion combined with a metallic cation which are generated by dissolving the compound in the aqueous solution; and a mode of aqueous solution in which that kind of compound exists in a form of inorganic salt dispersed therein. The amount of phosphoric acid component according to the present invention is specified by the sum of all these modes of acidic aqueous solution thereof as converted to $P_2O_5$ amount.

A preferred range of blending ratio of the phosphoric acid and/or phosphoric acid compound as $P_2O_5$ is from 0.001 to 6.0 mole/liter, more preferably from 0.02 to 1.0 mole/liter, and most preferably from 0.1 to 0.8 mole/liter. If the blending ratio of the phosphoric acid and/or phosphoric acid compound becomes less than 0.001 mole/liter, the effect of addition is not satisfactory and the corrosion resistance degrades. If the blending ratio of the phosphoric acid and/or phosphoric acid compound exceeds 6.0 mole/liter, excess amount of phosphoric acid ion reacts with the plating film under a humid environment, which enhances the corrosion of plating base material to cause discoloration and stain-rusting under some corrosive environments.

As the component (ab), use of ammonium phosphate is also effective because the compound provides a highly anti-corrosive composite oxide. As for the ammonium phosphate, primary ammonium phosphate and secondary ammonium phosphate are preferred.

The added components (ac) in the treatment liquid is in a range of from 0.001 to 3.0 mole/liter as metal, preferably from 0.01 to 0.5 mole/liter. If the sum of the added amount of these components is less than 0.001 mole/liter, the effect of addition cannot be fully attained. If the sum of the added amount of these components exceeds 3.0 mole/liter, these components become soluble cations to interfere the network of coating.

For supplying ion of the additive components (ac) in a form of metallic salt, the treatment liquid may contain anion such as chlorine ion, nitric acid ion, sulfuric acid ion, acetic acid ion, and boric acid ion.

The treatment liquid may further contain an organic resin (ad) for improving workability and corrosion resistance of the composite oxide coating. Examples of the organic resin are water-soluble resins and/or water-dispersible resins such as epoxy resin, polyurethane resin, polyacrylic resin, acrylic-ethylene copolymer, acrylic-styrene copolymer, alkyd resin, polyester resin, polyethylene resin.

Adding to these water-dispersible resins, it is also possible to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

Adding to the above-described additive components (ab) through (ad), the treatment liquid may further contain an adequate amount of additive components to the coating, which are described before.

The methods for applying the treatment liquid onto the plated steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

Although there is no specific limitation on the temperature of the treatment liquid, a preferable range thereof is from normal temperature to around 60° C. Below the normal temperature is uneconomical because a cooling unit or other additional facilities are required. On the other hand, temperatures above 60° C. enhances the vaporization of water, which makes the control of the treatment liquid difficult.

After the coating of treatment liquid as described above, generally the plate is heated to dry without rinsing with water.

The treatment liquid according to the present invention forms a slightly soluble salt by a reaction with the substrate plated steel sheet, so that, rinsing with water may be applied after the treatment.

Method for heating to dry the coated treatment liquid is not limited. For example, dryer, hot air oven, high frequency induction heating furnace, infrared heating furnace may be applied.

The heating and drying treatment is preferably conducted at reaching temperatures of from 50 to 30° C., more preferably from 80 to 200° C., and most preferably from 80 to 160° C. If the heating temperature is less than 50° C., excess amount of water is left in the coating, which results in insufficient corrosion resistance. If the heating temperature exceeds 300° C., the operation becomes uneconomical and defects likely appear in the coating to degrade the corrosion resistance.

After forming the composite oxide coating on the surface of the zinc base plated steel sheet or the aluminum base plated steel sheet, as described above, a paint composition for forming an organic coating is applied on the composite oxide coating. Method for applying the paint composition is not limited, and examples of the method are coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, generally the plate is heated to dry without rinsing with water. After applying the paint composition, however, water-rinse step may be given.

Method for heating to dry the paint composition is not limited. For example, dryer, hot air oven, high frequency induction heating furnace, infrared heating furnace may be applied. The heating treatment is preferably conducted at reaching temperatures of from 50 to 350° C., more preferably from 80 to 250° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

As described above, the present invention includes a steel sheet having an organic coating on both sides or on side thereof. Accordingly, modes of the steel sheet according to the present invention include, for example, the followings.

(1) Plating film—Composite oxide coating—Organic coatings on one side of the steel sheet, and "Plating film" on other side of the steel sheet;
(2) "Plating film—Composite oxide coating—Organic coating" on one side of the steel sheet, and "Plating film—Known coating treated by phosphoric acid, or the like" on other side of the steel sheet;
(3) "Plating film—Composite oxide coating—Organic coating" on both sides of the steel sheet;
(4) "Plating film—Composite oxide coating—Organic coating" on one side of the steel sheet, and "Plating film—Composite oxide coating" on other side of the steel sheet;
(5) "Plating film—Composite oxide coating—Organic coating" on one side of the steel sheet, and "Plating film—Organic coating" on other side of the steel sheet.

Embodiments

Treatment liquids (coating compositions) for forming the primary layer coating, which are listed in Tables 88 through 90, were prepared.

In Tables 88 through 90, the concentration of oxide fine particles, (mole/liter), is converted to $SiO_2$, and the concentration of phosphoric acid and/or phosphoric acid compound, (mole/liter), is converted to $P_2O_5$. In the column "Adaptability to the conditions of the Invention", the symbol "○" signifies "Satisfies", and the symbol "x" signifies "Dissatisfies".

Resin compositions (reaction products) for forming the secondary layer coating were synthesized in the following-described procedure.

SYNTHESIS EXAMPLE 1

A 1870 parts of EP828 (epoxy equivalent 187, manufactured by Yuka Shell-Epoxy Co., Ltd.), 912 parts of bisphenol A, 2 parts of tetraethylammonium bromide, and 300 parts of methylethylketone were charged into a flask with four necks, which mixture was then heated to 140° C. to let them react for 4 hours. Thus, an epoxy resin having an epoxy equivalent of 1391 and a solid content of 90% was obtained. A 1500 parts of ethyleneglycol monobutylether was added to the epoxy resin, which were then cooled to 100° C. A 96 parts of 3,5-dimethylpyrazole (molecular weight 96) and 129 parts of dibutylamine (molecular weight 129) were added to the cooled resin, and they were reacted for 6 hours to eliminate the epoxy group. Then, a 205 parts of methylisobutylketone was added while the mixture was cooling, to obtain a pyrazole-modified epoxy resin having 60% of solid matter. The epoxy resin is defined as the resin composition (1). The resin composition (1) is a product of the reaction between the film-forming organic resin (A) and the active-hydrogen-laden compound that contains 50 mole % of hydrazine derivative (C) containing active hydrogen.

To the resin composition (1) thus synthesized, a curing agent was blended to prepare a resin composition (a paint composition).

| Resin composition | |
| --- | --- |
| Base resin | Resin composition (1), 100 parts |
| Curing agent | IPDI MEK oxime block, 5 parts |
| Catalyst | Dibutyl laurate, 0.2 part |

To the resin composition, the inorganic rust-preventive pigment shown in Table 91, and polyethylene wax as the solid lubricant were blended at respective adequate amounts, which resin composition was then treated in a paint dispersion machine (sand grinder) for a necessary time to obtain designed paint compositions. For the above-described ion-exchanged silica, SHILDEX C303 (average particle sizes of from 2.5 to 3.5 μm and Ca concentration of 3 wt. %) manufactured by W.R. Grace & Co., which is a Ca-exchanged silica, was used.

To obtain organic coating steel sheets for household electric appliances, building materials, and automobile parts, the plated steel sheets processed by electrolytic galvanizing at a coating weight of 20 mg/m2 were used as the target base plates which were the cold-rolled steel sheets having a plate thickness of 0.8 mm and a surface roughness Ra of 1.0 μm. The surface of the plated steel sheet was treated by alkaline degreasing and water washing, then the treatment liquids (coating compositions) shown in Tables 88 through 90 were applied to the surface using a roll coater, followed by heating to dry to form the first layer coating. The thickness of the first layer coating was adjusted by the solid content in the treatment liquid (heating residue) or applying conditions (roll pressing force, rotational speed, and other variables). Then, the paint composition was applied using a roll coater, which was then heated to dry to form the secondary layer coating, thus manufactured the organic coating steel sheets as Examples and Comparative Examples. The thickness of the second layer coating was adjusted by the solid content in the treatment liquid (heating residue) or applying conditions (roll pressing force, rotational speed, and other variables).

To each of thus obtained organic coating steel sheets, evaluation was given in terms of quality performance (appearance of coating, white-rust resistance, white-rust resistance after alkaline degreasing, paint adhesiveness, and workability). The results are given in Tables 92 through 96 along with the structure of primary layer coating and of secondary layer coating.

The quality performance evaluation on the organic coating steel sheets was carried out similar to the procedure of the best mode 1.

In Tables 92 through 96, each of *1 through *11 appeared in the tables expresses the following.

*1: Numeral "1" in Column 1 of the plated steel sheet signifies "Electrolytically galvanized steel sheets".

*2: Each "No." of coating composition corresponds to the "No." given in Tables 88 through 90.

*3: Ratio (wt. %) converted to $SiO_2$ is a weight ratio to the sum of the weight of the first layer (composite oxide).

*4: "(β)/(γ)" signifies the ratio of the moles of phosphoric acid and/or phosphoric acid compound (β) converted to $P_2O_5$ to the total moles of component (γ) converted to metal.

*5: Total coating weight=(α)+(β)+(γ).

*6: Numeral "1" signifies the resin composition described in this specification.

*7: The inorganic rust-preventive pigment given in Table 91.

*8: The blending ratio of solid matter (parts by weight) to 100 parts by weight of the solid matter in the resin compound.

*9: Total blending amount of the inorganic rust-preventive pigment 1 and the inorganic rust-preventive pigment 2.

*10: Solid weight ratio of the sum of the inorganic rust-preventive pigment 1 and the inorganic rust-preventive pigment 2.

*11: Solid blending rate (parts by weight) of the solid lubricant to 100 parts by weight of the solid matter in the resin composition.

TABLE 91

| No. | Kind of inorganic rust-preventive pigment | | |
| --- | --- | --- | --- |
| 1 | Ion-exchanged silica | Ca-exchanged silica | SHIELDEX C 303, produced by W. R. Grace & Co. average particle size 2.5–3.5 μm, Ca conc. 3 wt. % |
| 13 | Zinc phosphate | Zinc orthophosphate | |
| 28 | Calcium compound | Calcium carbonate 60 wt. % + Calcium silicate 40 wt. % | |

TABLE 92

| No. | Plating steel plate *1 | Coating composition *2 | Drying temperature (° C.) | Blending ratio converted to SiO₂ (wt %) *3 | (γ) Component | Molar ratio of phosphoric acid component (β)/(γ) *4 | Total coating weight (mg/m²) *5 | Resin composition *6 | (Pigment 1) Type *7 | (Pigment 1) Blending ratio *8 | (Pigment 2) Type *7 | (Pigment 2) Blending ratio *8 | (Pigment 1) + (Pigment 2) Total amount *9 | (Pigment 1)/(Pigment 2) Ratio *10 |
|---|---|---|---|---|---|---|---|---|---|---|---|---|---|---|
| 1 | 1 | 5 | 120 | 40 | Ni | 1.2 | 300 | 1 | 1 | 30 | | | | |
| 15 | 1 | 1 | 120 | 40 | Li | 1 | 320 | 1 | 1 | 30 | | | | |
| 16 | 1 | 2 | 120 | 40 | Mn | 1.47 | 290 | 1 | 1 | 30 | | | | |
| 17 | 1 | 3 | 120 | 40 | Fe | 1.3 | 320 | 1 | 1 | 30 | | | | |
| 18 | 1 | 4 | 120 | 40 | Co | 1.21 | 315 | 1 | 1 | 30 | | | | |
| 19 | 1 | 6 | 120 | 40 | Zn | 1.1 | 280 | 1 | 1 | 30 | | | | |
| 20 | 1 | 7 | 120 | 40 | Al | 1.5 | 350 | 1 | 1 | 30 | | | | |
| 21 | 1 | 8 | 120 | 40 | La | 1.8 | 350 | 1 | 1 | 30 | | | | |
| 22 | 1 | 9 | 120 | 40 | Ce | 1.8 | 350 | 1 | 1 | 30 | | | | |
| 23 | 1 | 10 | 120 | 60 | Mn | 1.47 | 360 | 1 | 1 | 30 | | | | |
| 24 | 1 | 11 | 120 | 60 | Ni | 1.2 | 290 | 1 | 1 | 30 | | | | |
| 25 | 1 | 12 | 120 | 40 | Co | 1.2 | 290 | 1 | 1 | 30 | | | | |
| 26 | 1 | 13 | 120 | 40 | Al | 1.5 | 280 | 1 | 1 | 30 | | | | |
| 27 | 1 | 14 | 120 | 20 | Ni | 1.2 | 320 | 1 | 1 | 30 | | | | |
| 28 | 1 | 15 | 120 | 20 | Al | 1.2 | 330 | 1 | 1 | 30 | | | | |

| No. | Solid lubricant Type *11 | Solid lubricant Blending ratio *12 | Drying temperature (° C.) | Coating thickness (μm) | Appearance | White-rust resistance: SST 120 hrs | White-rust resistance after alkaline degreasing: SST 120 hrs | Paint adhesiveness | Workability | Remark | Classification Example/Comparative Example |
|---|---|---|---|---|---|---|---|---|---|---|---|
| 1 | | | 230 | 1 | ○ | ◉ | ◉ | ◉ | | | Example |
| 15 | | | 230 | 1 | ○ | ○ | ○ | ◉ | | | Example |
| 16 | | | 230 | 1 | ○ | ◉ | ◉ | ◉ | | | Example |
| 17 | | | 230 | 1 | ○ | ◉ | ○ | ◉ | | | Example |
| 18 | | | 230 | 1 | ○ | ◉ | ○+ | ◉ | | | Example |
| 19 | | | 230 | 1 | ○ | ◉ | ○ | ◉ | | | Example |
| 20 | | | 230 | 1 | ○ | ◉ | ○+ | ◉ | | | Example |
| 21 | | | 230 | 1 | ○ | ◉ | ○ | ◉ | | | Example |
| 22 | | | 230 | 1 | ○ | ◉ | ○ | ◉ | | | Example |
| 23 | | | 230 | 1 | ○ | ◉ | ◉ | ◉ | | | Example |
| 24 | | | 230 | 1 | ○ | ◉ | ◉ | ◉ | | | Example |
| 25 | | | 230 | 1 | ○ | ◉ | ○+ | ◉ | | | Example |
| 26 | | | 230 | 1 | ○ | ◉ | ○+ | ◉ | | | Example |
| 27 | | | 230 | 1 | ○ | ◉ | ◉ | ◉ | | | Example |
| 28 | | | 230 | 1 | ○ | ◉ | ○+ | ◉ | | | Example |

TABLE 93

| No. | Plating steel plate *1 | Coating composition *2 | Drying temperature (° C.) | Blending ratio converted to SiO₂ (wt %) *3 | (γ) Component | Molar ratio of phosphoric acid component (β)/(γ) *4 | Total coating weight (mg/m²) *5 | Resin composition *6 | (Pigment 1) Type *7 | (Pigment 1) Blending ratio *8 | (Pigment 2) Type *7 | (Pigment 2) Blending ratio *8 | (Pigment 1) + (Pigment 2) Total amount *9 | (Pigment 1)/(Pigment 2) Ratio *10 |
|---|---|---|---|---|---|---|---|---|---|---|---|---|---|---|
| 29 | 1 | 16 | 120 | | Mn | 1.03 | 290 | 1 | 1 | 30 | | | | |
| 30 | 1 | 17 | 120 | | Mn | 1.47 | 320 | 1 | 1 | 30 | | | | |
| 31 | 1 | 18 | 120 | 40 | | | 320 | 1 | 1 | 30 | | | | |
| 32 | 1 | 19 | 120 | 40 | Ni, Mn | 1.2 | 290 | 1 | 1 | 30 | | | | |

TABLE 93-continued

| No. | *1 | *2 | *3 | *4 | *7 | *8 | *9 | *10 | *11 |
|---|---|---|---|---|---|---|---|---|---|
| 33 | 1 | 20 | 120 | 40 | Al, Mg | 1.05 | 300 | 1 | 1 | 30 |
| 34 | 1 | 21 | 120 | 40 | Ni | 2.5 | 320 | 1 | 1 | 30 |
| 35 | 1 | 22 | 120 | 98 | Ni | 1.03 | 280 | 1 | 1 | 30 |
| 36 | 1 | 23 | 120 | 4 | Ni | 1.2 | 320 | 1 | 1 | 30 |
| 37 | 1 | 24 | 120 | 40 | Ni | 1.33 | 350 | 1 | 1 | 30 |
| 38 | 1 | 25 | 120 | 40 | Li | 1 | 280 | 1 | 1 | 30 |
| 39 | 1 | 26 | 120 | 40 |  |  | 500 | 1 | 1 | 30 |
| 40 | 1 | 27 | 120 | 40 | Ni | 1.2 | 4200 | 1 | 1 | 30 |
| 41 | 1 | 28 | 120 | 0 | Ni | 1.1 | 360 | 1 | 1 | 30 |
| 42 | 1 | 29 | 120 | 60 |  |  | 290 | 1 | 1 | 30 |
| 43 | 1 | 30 | 120 | 60 | Ni | 0 | 290 | 1 | 1 | 30 |

| | Secondary layer coating | | | | Performance | | | | | |
|---|---|---|---|---|---|---|---|---|---|---|
| | Solid lubricant | | | | | White-rust resistance after alkaline degreasing: SST 120 hrs | | | | Classification |
| No. | Type *11 | Blending ratio *12 | Drying temperature (°C.) | Coating thickness (μm) | Appearance | White-rust resistance: SST 120 hrs | | Paint adhesiveness | Workability | Remark | Example/Comparative Example |
| 29 | | | 230 | 1 | ○ | ⊙ | ⊙ | ⊙ | | | Example |
| 30 | | | 230 | 1 | ○ | ⊙ | ⊙ | ⊙ | | | Example |
| 31 | | | 230 | 1 | ○ | ⊙ | ○ | ⊙ | | | Example |
| 32 | | | 230 | 1 | ○ | ⊙ | ⊙ | ⊙ | | | Example |
| 33 | | | 230 | 1 | ○ | ⊙ | ○+ | ⊙ | | | Example |
| 34 | | | 230 | 1 | ○ | ⊙ | ⊙ | ⊙ | | | Example |
| 35 | | | 230 | 1 | ○ | ⊙ | ○- | ⊙ | | | Example |
| 36 | | | 230 | 1 | ○ | ⊙ | ○- | ⊙ | | | Example |
| 37 | | | 230 | 1 | ○ | ⊙ | ⊙ | ⊙ | | | Example |
| 38 | | | 230 | 1 | ○ | ⊙ | ○+ | ⊙ | | | Example |
| 39 | | | 230 | 1 | ○ | ⊙ | ○+ | ⊙ | | | Example |
| 40 | | | 230 | 1 | X | ⊙ | ⊙ | X | | | Comparative Example |
| 41 | | | 230 | 1 | ○ | Δ | Δ | Δ | | | Comparative Example |
| 42 | | | 230 | 1 | ○ | ⊙ | ○+ | ⊙ | | | Example |
| 43 | | | 230 | 1 | ○ | X | X | X | | | Comparative Example |

TABLE 94

| | Primary layer coating | | | | | | Secondary layer coating | | | | | | |
|---|---|---|---|---|---|---|---|---|---|---|---|---|---|
| | | | | | | | | Inorganic rust-prevention pigment | | | | | |
| No. | Plating steel plate *1 | Coating composition *2 | Drying temperature (°C.) *2 | Blending ratio converted to SiO₂ (wt %) *3 | Component *4 | Molar ratio of phosphoric acid component (β)/(γ) *4 | Total coating weight (mg/m²) *5 | Resin composition *6 | (Pigment 1) Type *7 | (Pigment 1) Blending ratio *8 | (Pigment 2) Type *7 | (Pigment 2) Blending ratio *8 | (Pigment 1) + (Pigment 2) Total amount *9 | (Pigment 1)/(Pigment 2) Ratio *10 |
| 73 | 1 | 5 | 120 | 40 | Ni | 1.2 | 300 | 1 | 13 | 30 | | | | |

| | Secondary layer coating | | | | Performance | | | | | |
|---|---|---|---|---|---|---|---|---|---|---|
| | Solid lubricant | | | | | White-rust resistance after alkaline degreasing: SST 120 hrs | | | | Classification |
| No. | Type *11 | Blending ratio *12 | Drying temperature (°C.) | Coating thickness (μm) | Appearance | White-rust resistance: SST 120 hrs | | Paint adhesiveness | Workability | Remark | Example/Comparative Example |
| 73 | | | 230 | 1 | ○ | ⊙ | ⊙ | ⊙ | | | Example |

TABLE 95

| No. | Plating steel plate *1 | Primary layer coating | | | | | | Secondary layer coating | | | | | | |
|---|---|---|---|---|---|---|---|---|---|---|---|---|---|---|
| | | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 | Inorganic rust-prevention pigment | | | | | | |
| | | | | | | | | Resin composition *6 | (Pigment 1) | | (Pigment 2) | | (Pigment 1) + (Pigment 2) Total amount *9 | (Pigment 1)/(Pigment 2) Ratio *10 |
| | | | | | | | | | Type *7 | Blending ratio *8 | Type *7 | Blending ratio *8 | | |
| 81 | 1 | 5 | 120 | 40 | Ni | 1.2 | 300 | 1 | 13 | 30 | 28 | 20 | 50 | 3/2 |

| No. | Secondary layer coating | | | | Performance | | | | | | Classification Example/Comparative Example |
|---|---|---|---|---|---|---|---|---|---|---|---|
| | Solid lubricant | | Drying temperature (° C.) | Coating thickness (μm) | Appearance | White-rust resistance: SST 120 hrs | White-rust resistance after alkaline degreasing: SST 120 hrs | Paint adhesiveness | Workability | Remark | |
| | Type *11 | Blending ratio *12 | | | | | | | | | |
| 81 | | | 230 | 1 | ○ | ◎ | ◎ | ◎ | | | Example |

TABLE 96

| No. | Plating steel plate *1 | Primary layer coating | | | | | | Secondary layer coating | | | | | | |
|---|---|---|---|---|---|---|---|---|---|---|---|---|---|---|
| | | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 | Inorganic rust-prevention pigment | | | | | | |
| | | | | | | | | Resin composition *6 | (Pigment 1) | | (Pigment 2) | | (Pigment 1) + (Pigment 2) Total amount *9 | (Pigment 1)/(Pigment 2) Ratio *10 |
| | | | | | | | | | Type *7 | Blending ratio *8 | Type *7 | Blending ratio *8 | | |
| 140 | 1 | 5 | 120 | 40 | Ni | 1.2 | 300 | 1 | 13 | 30 | 28 | 20 | 50 | 3/2 |

| No. | Secondary layer coating | | | | Performance | | | | | | Classification Example/Comparative Example |
|---|---|---|---|---|---|---|---|---|---|---|---|
| | Solid lubricant | | Drying temperature (° C.) | Coating thickness (μm) | Appearance | White-rust resistance: SST 120 hrs | White-rust resistance after alkaline degreasing: SST 120 hrs | Paint adhesiveness | Workability | Remark | |
| | Type *11 | Blending ratio *12 | | | | | | | | | |
| 140 | 1 | 10 | 230 | 1 | ○ | ◎ | ◎ | ◎ | ◎ | | Example |

Best Mode 3

The inventors of the present invention found that, through the formation of a specific chelating resin coating on the chemical conversion treatment coating which is formed on the surface of a zinc base plated steel sheet or an aluminum base plated steel sheet, further preferably blending an adequate amount of a specific rust-preventive agent in the chelating resin coating, excellent corrosion resistance is obtained without applying chromate treatment as the chemical conversion treatment.

The organic coating steel sheet according to the present invention is basically characterized in that a chemical conversion treatment coating is formed on the surface of a zinc base plated steel sheet or an aluminum base plated steel sheet, and that, further on the chemical conversion treatment coating, an organic coating containing a chelating resin is formed as the product of reaction between a film-forming organic resin (A) and an active-hydrogen-laden compound (B), a part or whole of which compound (B) consists of a hydrazine derivative (C) containing active hydrogen, thus applying the hydrazine derivative (C) as a chelating group to the film-forming resin (A).

The corrosion-preventive mechanism of the organic coating comprising above-described specific reaction product is not fully analyzed. The mechanism is, however, presumably the following. By adding a hydrazine derivative, not applying a simple low molecular weight chelating agent, to the film-forming organic resin, (1) the dense organic polymer coating gives an effect to shut-off corrosion causes such as oxygen and chlorine ions, (2) the hydrazine derivative is able to form a stable passive layer by strongly bonding with the surface of the primary layer coating, and (3) the free hydrazine derivative in the coating traps the zinc ion which is eluted by a corrosion reaction, thus forming a stable insoluble chelated compound layer, which suppresses the formation of an ion conduction layer at interface to suppress the progress of corrosion. These work effects should effectively suppress the development of corrosion, thus giving excellent corrosion resistance.

As a result, even when a chemical conversion treatment coating (such as phosphate treatment coating) which contains no hexavalent chromium is used as the chemical conversion treatment coating on the base material, the obtained corrosion resistance is equivalent to that of chromate coating. When a chromate coating as the chemical conversion treatment coating, the obtained corrosion-preventive effect is combined with the corrosion-preventive effect of the organic coating, so that the attained corrosion resistance is markedly higher than that of conventional chromated steel sheets, while attaining superior chromium elution resistance.

Particularly when a resin containing epoxy group is used as the film-forming organic resin (A), a dense barrier coating is formed by the reaction between the epoxy-group-laden resin and a cross-linking agent. Thus, the formed barrier coating has excellent penetration-suppression performance against the corrosion causes such as oxygen, and gains excellent bonding force with the base material owing to the hydroxyl group in the molecule, which results in particularly superior corrosion resistance.

Further excellent corrosion resistance is obtained by using an active-hydrogen-laden pyrazole compound and/or an active-hydrogen-laden triazole compound as the hydrazine derivative (C) containing active hydrogen.

As in the case of prior art, blending simply a hydrazine derivative with the film-forming organic resin gives very little improvement in corrosion-suppression. The reason is presumably that the hydrazine derivative which does not enter the molecules of the film-forming organic resin forms a chelate compound with zinc which is eluted under a corrosive environment, and the chelate compound cannot form a dense barrier layer because of low molecular weight. To the contrary, introduction of a hydrazine derivative into the molecules of film-forming organic resin, as in the case of present invention, provides markedly high corrosion-suppression effect.

According to the organic coating steel sheet of the present invention, further high anti-corrosive performance (self-repair work at coating-defect section) is attained by blending adequate amount of ion-exchanged silica (a) with an organic coating consisting of above-described specific reaction products. The corrosion-preventive mechanism which is obtained by blending the ion-exchanged silica (a) with the specific organic coating is speculated as follows. First, under a corrosion environment, the zinc ion which is eluted from the plating coating is trapped by the above-described hydrazine derivative, thus suppressing the anode reaction. On the other hand, when cation such as Na ion enters under the corrosion environment, the iron exchange action emits Ca ion and Mg ion from the surface of silica. Furthermore, when OH ion is generated by the cathode reaction under the corrosive environment to increase pH value near the plating interface, the Ca ion (or Mg ion) emitted from the ion-exchanged silica precipitates in the vicinity of the plating interface in a form of $Ca(OH)_2$ or $Mg(OH)_2$, respectively. The precipitate seals defects as a dense and slightly soluble product to suppress the corrosion reactions.

There may given an effect that the eluted zinc ion is exchanged with Ca ion (or Mg ion) and is fixed onto the surface of silica. By combining both the anti-corrosive actions of hydrazine derivative and ion-exchanged silica, particularly strong corrosion-preventive effect would appear.

Also in the case that an ion-exchanged silica is blended with a general organic coating, corrosion-preventive effect is obtained to some extent. Nevertheless, when an ion-exchanged silica is blended with an organic coating consisting of a specific chelate-modified resin, as in the case of present invention, the corrosion-preventive effect at anode reaction section owing to the chelate-modified resin and the corrosion-preventive effect at cathode reaction section owing to the ion-exchanged silica are combined to suppress both the anode and the cathode corrosion reactions, which should provide markedly strong corrosion-preventive effect. Furthermore, that kind of combined corrosion-preventive effect is effective in suppressing corrosion at flaws and defects on coatings, and is able to give excellent self-repair work to the coating.

According to the organic coating steel sheet of the present invention, the corrosion resistance can also be increased by blending an adequate amount of silica fine particles (b) with an organic coating consisting of a specific reaction product as described above. That is, by blending silica fine particles such as fumed silica and colloidal silica (having average primary particle sizes of from 5 to 50 nm, preferably from 5 to 20 nm, more preferably from 5 to 15 nm) having large specific surface area into a specific organic coating, the generation of dense and stable corrosion products such as basic zinc chloride is enhanced, thus suppressing the generation of zinc oxide (white-rust).

Furthermore, according to the organic coating steel sheet of the present invention, the corrosion resistance can further be increased by blending an ion-exchanged silica (a) and silica fine particles (b) together into the organic coating consisting of a specific reaction product as described above. The ion-exchanged silica consists mainly of porous silica, and generally has a relatively large particle size, 1 μm or more. Accordingly, after releasing Ca ion, the rust-preventive effect as silica is not much expectable. Consequently, by accompanying fine particle silica having a relatively large specific surface area, such as fumed silica and colloidal silica, (with primary particle sizes of from 5 to 50 nm, preferably from 5 to 20 nm, more preferably from 5 to 15 nm), the generation of dense and stable corrosion products such as basic zinc chloride may be enhanced, thus suppressing the generation of zinc oxide (white-rust). Through the combined rust-preventive mechanisms of ion-exchanged silica and fine particle silica, particularly strong corrosion-preventive effect would appear.

The following is the detail description of the present invention and the reasons to specify the conditions of the present invention.

First, the description is given about the chemical conversion treatment coating formed on the surface of a zinc base plated steel sheet or an aluminum base plated steel sheet.

The chemical conversion treatment coating is formed to suppress the activity of the plated steel sheet and to improve the corrosion resistance and the adhesiveness of the coating. The kind of chemical conversion treatment coating is not specifically limited, and it may be a chemical conversion treatment coating having no hexavalent chromium or a chromate coating.

Examples of the chemical conversion treatment coating having no hexavalent chromium are inorganic coating including:
(1) Phosphate treatment coating;
(2) Passive coating such as coating treated by molybdate or tungstate, coating treated by phosphoric acid/molybdic acid;
(3) Alkali silicate treatment coating comprising silicon oxide and alkali metal oxide such as lithium oxide;
(4) Composite oxide coating comprising trivalent chromium; and
(5) Oxide coating comprising titanium oxide and zirconium oxide.

Other than the above-described inorganic coatings, the following may, for example, be applied:
(6) Thin film organic resin coating (0.1 to 2 $\mu$m of thicknesses), or organic composite silicate coating;
(7) Chelating organic coating such as that of tannic acid, phitic acid, and phosphonic acid; and
(8) Composite coating comprising an inorganic coating of either one of (1) through (3) given above and an organic resin.

Among them, it is most preferable to use a slightly soluble coating containing silicon oxide (such as alkali silicate coating) from the viewpoint of suppression of white-rust on zinc.

The above-described chemical conversion treatment coating may further contain organic resin to improve the workability and the corrosion resistance. Examples of the organic resin are epoxy resin, polyurethane resin, polyacrylic resin, acrylic-ethylene copolymer, acrylic-styrene copolymer, alkyd resin, polyester resin, polyethylene resin. These resins may be supplied as water-soluble resin and/or water-dispersible resin. Adding to these water-dispersible resins, it is effective to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

For further improving the corrosion resistance, the composite oxide coating may further contain polyphosphate, phosphate (for example, zinc phosphate, aluminum dihydrogen phosphate, and zinc phosphate), molybdate, phospho molybdate (for example, aluminum phosphomolybdate), organic phosphate and its salt (for example, phytic acid, phytiate, phosphonic acid, phosphonate, their metal salt and alkali metal salt), organic inhibitor (for example, hydrazine derivative, thiol compound, dithiocarbamate), organic compound (polyethyleneglycol), and the like.

Other applicable additives include organic coloring pigments (for example, condensing polycyclic organic pigments, phthalocyanine base organic pigments), coloring dyes (for example, azo dye soluble in organic solvent, azo metal dye soluble in water), inorganic pigments (titanium oxide), chelating agents (for example, thiol), conductive pigments (for example, metallic powder of zinc, aluminum, nickel, or the like, iron phosphide, antimony-dope type tin oxide), coupling agents (for example, silane coupling agent and titanium coupling agent), melamine-cyanuric acid additives.

The composite oxide coating may contain one or more of iron group metallic ions (Ni ion, Co ion, Fe ion), preferably Ni ion, to prevent blackening (an oxidizing phenomenon appeared on plating surface) under a use environment of organic coating steel sheets. In that case, concentration of the iron base metallic ion of 1/10,000 mole per 1 mole of the component ($\beta$), converted to the metal amount in the target composition, gives satisfactory effect. Although the upper limit of the iron group ion is not specifically limited, it is preferable to select a concentration level thereof not to give influence to the corrosion resistance.

The thickness of these chemical conversion treatment coating is specified.to 3 $\mu$m or less. If the coating thickness exceeds 3 $\mu$m, workability and conductivity degrade. The lower limit of the thickness of these chemical conversion treatment coatings is not specifically limited, and the coating thickness may be selected to a level that gives improvement of corrosion resistance.

Next, the description is given about the organic coating which is formed on the above-described chemical conversion treatment coating. An organic coating similar with that is described in the best mode 1 is formed.

According to the present invention, the organic coating formed on the chemical conversion treatment coating is an organic coating having thicknesses of from 0.1 to 5 $\mu$m, containing a product of reaction between a film-forming organic resin (A) and an active-hydrogen-laden compound (B), a part or whole of which compound (B) consists of a hydrazine derivative (C) containing active hydrogen, and, at need, containing additives such as rust-preventive agent.

The kinds of film-forming organic resin (A) are not specifically limited if only the resin reacts with the active-hydrogen-laden compound (B), a part or whole of which compound (B) consists of a hydrazine derivative (C) containing active hydrogen, to bind the active-hydrogen-laden compound (B) with the film-forming organic resin by addition or condensation reaction, and adequately form the coating.

Examples of the film-forming organic resin (A) are epoxy resin, modified epoxy resin, polyurethane resin, polyester resin, alkyd resin, acrylic base copolymer resin, polybutadiene resin, phenol resin, and adduct or condensate thereof. These resins may be applied separately or blending two or more of them.

From the standpoint of reactivity, readiness of reaction, and corrosion-prevention, an epoxy-group-laden resin (D) in the resin is particularly preferred as the film-forming organic resin (A). The epoxy-group-laden resin (D) has no specific limitation if only the resin reacts with an active-hydrogen-laden compound (B), a part or whole of which compound (B) consists of a hydrazine derivative (C) containing active hydrogen, to bind with the active hydrogen-laden compound (B) by addition or condensation reaction, and adequately form the coating. Examples of the epoxy-group-laden resin (D) are epoxy resin, modified epoxy resin, acrylic base copolymer resin copolymerized with an epoxy-group-laden monomer, polybutadiene resin containing epoxy group, polyurethane resin containing epoxy group, and adduct or condensate of these resins. These resins may be applied separately or blending two or more of them together.

From the point of adhesiveness with plating surface and of corrosion resistance, epoxy resin and modified epoxy resin are particularly preferred among these epoxy-group-laden resins (D).

The acrylic base copolymer resin which was copolymerized with the epoxy-group-laden monomer may be a resin which is modified by polyester resin, epoxy resin, or phenol resin.

A particularly preferred epoxy resin described above is a resin is the product of the reaction between bisphenol A and epihalohydrin. The epoxy resin is preferred because of superior corrosion resistance.

The film-forming organic resin (A) may be either organic solvent dissolving type, organic solvent dispersing type, water dissolving type, or water dispersing type.

According to the present invention, a hydrazine derivative is introduced into the molecules of the film-forming organic resin (A). To do this, at least a part of the active-hydrogen-laden compound (B), (preferably whole thereof), is necessary to be a hydrazine derivative (C) containing active hydrogen.

When the film-forming organic resin (A) is an epoxy-group-laden resin, examples of the active-hydrogen-laden compound (B) reacting with the epoxy group are listed below. One or more of these compounds (B) may be applied. Also in that case, at least a part of the active-hydrogen-laden compound (B), (preferably whole thereof), is necessary to be a hydrazine derivative (C) containing active hydrogen.

A hydrazine derivative containing active hydrogen

A primary or secondary amine compound containing active hydrogen

An organic acid such as ammonia and carboxylic acid

A halogenated hydrogen such as hydrogen chloride

An alcohol, a thiol

A hydrazine derivative containing no active hydrogen or a quaternary chlorinating agent which is a mixture with a ternary amine.

Examples of the above-described hydrazine derivative (C) containing active hydrogen are the following.

Hydrazide compound such as carbohydrazide, propionic acid hydrazide, salicylic acid hydrazide, adipic acid hydrazide, sebacic acid hydrazide, dodecanic acid hydrazide, isophtharic acid hydrazide, thiocarbo-hydrazide, 4,4'-oxy-bis-benzenesulfonyl hydrazide, benzophenone hydrazone, amino-polyacrylamide hydrazide;

Pyrazole compound such as pyrazole, 3,5-dimethylpyrazole, 3-methyl-5-pyrazolone, 3-amino-5-methylpyrazole;

Triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (mono hydrate), 6-methyl-8-hydroxytriazolopyridazine, 6-phenyl-8-hydroxytriazolopyrydazine, 5-hydroxy-7-methyl-1,3,8-triazaindolizine;

Tetrazole compound such as 5-phenyl-1,2,3,4-tetrazole, 5-mercapto-1-phenyl-1,2,3,4-tetrazole;

Thiadiazole compound such as 5-amino-2-mercapto-1,3,4-thiadiazole, 2,5-dimercapto-1,3,4-thiadiazole;

Pyridazine compound such as maleic acid hydrazide, 6-methyl-3-pyridazone, 4,5-dichloro-3-pyridazone, 4,5-dibromo-3-pyridazone, 6-methyl-4,5-dihydro-3-pyridazone.

Among these compounds, particularly preferred ones are pyrazole compound and triazole compound which have cyclic structure of five- or six-membered ring and which have nitrogen atom in the cyclic structure.

These hydrazine derivatives may be applied separately or blending two or more of them together.

Examples of above-described amine compound having active hydrogen, which can be used as a part of the active-hydrogen-laden compound (B) are the following.

A compound prepared by heating to react a primary amino group of an amine compound containing a single secondary amino group of diethylenetriamine, hydroxylaminoethylamine, ethylaminoethylamine, methylaminopropylamine, or the like and one or more of primary amino group, with ketone, aldehyde, or carboxylic acid, at, for example, approximate temperatures of from 100 to 230° C. to modify them to aldimine, ketimine, oxazoline, or imidazoline;

A secondary monoamine such as diethylamine, diethanolamine, di-n- or -iso-propanolamine, N-methylethanolamine, N-ethylethanolamine;

A secondary-amine-laden compound prepared by Michael addition reaction through the addition of monoalkanolamine such as monoethanolamine to dialkyl(meth)acrylamide;

A compound prepared by modifying a primary amino group of alkanolamine such as monoethanolamine, neopentanolamine, 2-aminopropanol, 3-aminopropanol, 2-hydroxy-2' (aminopropoxy)ethylether to ketimine.

As for the above-described quaternary chlorinating agents which are able to be used as a part of the active-hydrogen-laden compound (B), the hydrazine derivative having active hydrogen or ternary amine has no reactivity with epoxy group as it is. Accordingly, they are mixed with an acid to make them reactive with epoxy group. The quaternary chlorinating agent reacts with epoxy group with the presence of water, at need, to form a quaternary salt with the epoxy-group-laden resin.

The acid used to obtain the quaternary chlorinating agent may be organic acid such as acetic acid and lactic acid, or inorganic acid such as hydrochloric acid. The hydrazine derivative containing no active hydrogen, which is used to obtain quaternary chlorinating agent may be 3,6-dichloropyridazine. The ternary amine may be dimethylethanolamine, triethylamine, trimethylamine, tri-isopropylamine, methyldiethanolamine.

The product of the reaction between the film-forming organic resin (A) and the active-hydrogen-laden compound (B) a part of or whole of which consists of a hydrazine derivative (C) containing active hydrogen, may be prepared by reacting the film-forming organic resin (A) with the active-hydrogen-laden compound (B) at temperatures of from 10 to 300° C., preferably from 50 to 150° C., for about 1 to about 8 hours.

The reaction may be carried out adding an organic solvent. The kind of adding organic solvent is not specifically limited. From the viewpoint of solubility and coating film-forming performance with epoxy resin, ketone group or ether group solvents are particularly preferred.

The blending ratio of the film-forming organic resin (A) and the active-hydrogen-laden compound (B), a part or whole of which compound consists of a hydrazine derivative (C) containing active hydrogen, is in a range of from 0.5 to 20 parts by weight of the active-hydrogen-laden compound (B), more preferably from 1.0 to 10 parts by weight, to 100 parts by weight of the film-forming organic resin (A).

When the film-forming organic resin (A) is an epoxy-group-laden resin (D), the blending ratio of the epoxy-group-laden resin (D) to the active-hydrogen-laden compound (B) is preferably, from the viewpoint of corrosion resistance and other performance, in a range of from 0.01 to 10 as the ratio of the number of active hydrogen groups in the active-hydrogen-laden compound (B) to the number of epoxy groups in the epoxy-group-laden resin (D), or [the number of active hydrogen groups/the number of epoxy groups], more preferably from 0.1 to 8, most preferably from 0.2 to 4.

A preferred range of hydrazine derivative (C) containing active hydrogen in the active-hydrogen-laden compound (B) is from 10 to 100 mole %, more preferably from 30 to 100 mole %, and most preferably from 40 to 100 mole %. If the rate of hydrazine derivative (C) containing active hydrogen is less than 10 mole %, the organic coating fails to have satisfactory rust-preventive function, thus the obtained rust-preventive effect becomes similar with the case of simple blending of a film-forming organic resin with a hydrazine derivative.

To form a dense barrier coating according to the present invention, it is preferable that a curing agent is blended into the resin composition, and that the organic coating is heated to cure.

Suitable methods for curing to form a resin composition coating include (1) a curing method utilizing a urethanation reaction between isocyanate and hydroxide group in the base resin, and (2) a curing method utilizing an ether reaction between hydroxide group in the base resin and an alkyletherified amino resin which is prepared by reacting between a part of or whole of a methylol compound which is prepared by reacting formaldehyde with one or more of melamine, urea, and benzoguanamine, and a C1–5 primary alcohol. As of these methods, particularly preferred one is to adopt a urethanation reaction between isocyanate and hydroxyl group in the base resin as the main reaction.

The polyisocyanate compound used in the curing method (1) described above is a compound prepared by partially reacting an aliphatic, alicyclic (including heterocyclic), or aromatic isocyanate compound, or a compound thereof using a polyhydric alcohol. Examples of that kind of polyisocyanate compound are the following.

These polyisocyanate compounds may be used separately or mixing two or more of them together.

Examples of protective agent (blocking agent) of the polyisocyanate compound are the following.

Aliphatic monoalcohol such as methanol, ethanol, propanol, butanol, octylalcohol;

Monoether of ethyleneglycol and/or diethyleneglycol, for example, monoether of methyl, ethyl, propyl (n-, iso-), butyl (n-, iso-, sec-);

Aromatic alcohol such as phenol and cresol;

Oxime such as acetoxime and methylethylketone oxime.

Through reaction between one or more of these compounds with above-described polyisocyanate compound, a polyisocyanate compound thus obtained is stably protected at least at normal temperature.

It is preferable to blend that kind of polyisocyanate compound (E) with a film-forming organic resin (A) as the curing agent at a range of (A)/(E)=95/5 to 55/45 (weight ratio of non-volatile matter), more preferably (A)/(E)=90/10 to 65/35. Since polyisocyanate compounds have water-absorbing property, blending of the compound at ratios above (A)/(E)=55/45 degrades the adhesiveness of the organic coating. If top coating is given on the organic coating, unreacted polyisocyanate compound migrates into the coating film to induce hindrance of curing or insufficient adhesiveness of the coating film. Accordingly, the blending ratio of the polyisocyanate compound (E) is preferably not more than (A)/(E)=55/45.

The film-forming organic resin (A) is fully cross-linked by the addition of above-described cross-linking agent (curing agent). For further increasing the cross-linking performance at a low temperature, it is preferable to use a known catalyst for enhancing curing. Examples of the curing-enhancing catalyst are N-ethylmorpholine, dibutyltin dilaurate, cobalt naphthenate, tin(II)chloride, zinc naphthenate, and bismuth nitrate.

When an epoxy-group-laden resin is used as the film-forming organic resin (A), the epoxy-group-laden resin may be blended with a known resin such as that of acrylic, alkyd, and polyester to improve the physical properties such as adhesiveness to some extent.

According to the present invention, the organic coating may be blended with ion-exchanged silica (a) and/or fine particle silica (b) as the rust-preventive additive.

The ion-exchanged silica is prepared by fixing metallic ion such as calcium and magnesium ions on the surface of porous silica gel powder. Under a corrosive environment, the metallic ion is released to form a deposit film. Among these ion-exchanged silicas, Ca ion-exchanged silica is most preferable.

Any type of Ca ion-exchanged silica may be applied. A preferred range of average particle size of Ca ion-exchanged silica is 6 $\mu$m or less, more preferably 4 $\mu$m or less. For example, Ca ion-exchanged silica having average particle sizes of from 2 to 4 $\mu$m may be used. If the average particle size of Ca ion-exchanged silica exceeds 6 $\mu$m, the corrosion resistance degrades and the dispersion stability in the coating composition degrades.

A preferred range of Ca concentration in the Ca ion-exchanged silica is 1 wt. % or more, more preferably from 2 to 8 wt. %. If the Ca concentration is below 1 wt. %, the rust-preventive effect by the Ca release becomes insufficient.

Surface area, pH, and oil-absorbance of the Ca ion-exchanged silica are not specifically limited.

The rust-preventive mechanism in the case of addition of ion-exchanged silica (a) to organic coating is described above. Particularly according to the present invention, markedly excellent corrosion preventive effect is attained by combining a specific chelate-modified resin which is the film-forming organic resin with an ion-exchanged silica, thus inducing the combined effect of the corrosion-suppression effect of the chelate-modified resin at the anodic reaction section with the corrosion-suppression effect of the ion-exchanged silica at the cathodic reaction section.

A preferred range of blending ratio of the ion-exchanged silica (a) in the organic resin coating is 1 to 100 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 5 to 80 parts by weight (solid matter), and most preferably from 10 to 50 parts by weight (solid matter). If the blending ratio of the ion-exchanged silica (a) becomes less than 1 part by weight, the effect of improved corrosion resistance after alkaline degreasing becomes small. If the blending ratio of the ion-exchanged silica (a) exceeds 100 parts by weight, the corrosion resistance degrades, which is unfavorable.

The fine particle silica (b) may be either colloidal silica or fumed silica.

In particular, organic solvent dispersion silica sol is superior in corrosion resistance to fumed silica.

The fine particle silica contributes to forming dense and stable zinc corrosion products under a corrosive environment. Thus formed corrosion products cover the plating surface in a dense mode, thus presumably suppressing the development of corrosion.

From the viewpoint of corrosion resistance, the fine particle silica preferably has particle sizes of from 5 to 50 nm, more preferably from 5 to 20 nm, and most preferably from 5 to 15 nm.

A preferred range of blending ratio of the fine particle silica (b) in the organic resin coating is 1 to 100 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 5 to 80 parts by weight (solid matter), and most preferably from 10 to 30 parts by weight (solid matter). If the blending ratio of the fine particle silica (b) becomes less than 1 part by weight, the effect of improved corrosion resistance after alkaline degreasing becomes small. If the blending ratio of the fine particle silica (b) exceeds 100 parts by weight, the corrosion resistance and the workability degrade, which is unfavorable.

According to the present invention, markedly high corrosion resistance is attained by combined addition of an ion-exchanged silica (a) and a fine particle silica (b) to the organic coating. That is, the combined addition of ion-exchanged silica (a) and fine particle silica (b) induces above-described combined rust-preventive mechanism which gives markedly excellent corrosion-preventive effect.

The blending ratio of combined addition of ion-exchanged silica (a) and fine particle silica (b) to the organic coating is in a range of from 1 to 100 parts by weight (solid matter) of the sum of the ion-exchanged silica (a) and the fine particle silica (b), to 100 parts by weight (solid matter) of the reaction product as the resin composition for film-forming (that is, the product of reaction between the film-forming organic resin (A) and an active-hydrogen-laden compound (B) a part of or whole of which consists of a hydrazine derivative (C) containing active hydrogen), preferably from 5 to 80 parts by weight (solid matter). Further the weight ratio of blending amount (solid matter) of the ion-exchanged silica (a) to the fine particle silica (b), (a)/(b), is selected to a range of from 99/1 to 1/99, preferably from 95/5 to 40/60, more preferably from 90/10 to 60/40.

If the blending ratio of sum of the ion-exchanged silica (a) and the fine particle silica (b) is less than 1 part by weight, the effect of improved corrosion resistance after alkaline degreasing becomes small. If the blending ratio of sum of the ion-exchanged silica (a) and the fine particle silica (b) exceeds 100 parts by weight, the coatability and the weldability degrade, which is unfavorable.

If the weight ratio of the ion-exchanged silica (a) to the fine particle silica (b), (a)/(b), is less than 1/99, the corrosion resistance degrades. If the weight ratio of the ion-exchanged silica (a) to the fine particle silica (b), (a)/(b), exceeds 99/1, the effect of combined addition of the ion-exchanged silica (a) and the fine particle silica (b) cannot fully be attained.

Adding to the above-described rust-preventive agents, the organic coating may contain other corrosion-suppressing agent such as polyphosphate (for example, aluminum polyphosphate such as TAICA K-WHITE 82, TAICA K-WHITE 105, TAICA K-WHITE G105, TAICA K-WHITE Ca650 (trade marks) manufactured by TAYCA CORPORATION), phosphate (for example, zinc phosphate, aluminum dihydrogenphosphate, zinc phosphite), molybdenate, phosphomolybdenate (for example, aluminum phosphomolybdenate), organic phosphoric acid and its salt (for example, phytic acid, phytiate, phosphonic acid, phosphonate, their metal salt and alkali metal salt, alkali earth metal salt), organic inhibitor (for example, hydrazine derivative, thiol compound).

The organic coating may, at need, further include a solid lubricant (c) to improve the workability of the coating.

Examples of applicable solid lubricant according to the present invention are the following.

(1) Polyolefin wax, paraffin wax; and
(2) Fluororesin fine particles.

Among those solid lubricants, particularly preferred ones are polyethylene wax, fluororesin fine particles (particularly poly-tetrafluoroethylene resin fine particles).

As of these compounds, combined use of polyolefin wax and tetrafluoroethylene fine particles is expected to provide particularly excellent lubrication effect.

A preferred range of blending ratio of the solid lubricant (c) in the organic resin coating is from 1 to 80 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 3 to 40 parts by weight (solid matter). If the blending ratio of the solid lubricant (c) becomes less than 1 part by weight, the effect of lubrication is small. If the blending ratio of the solid lubricant (c) exceeds 80 parts by weight, the painting performance degrade, which is unfavorable.

The organic coating of the organic coating steel sheet according to the present invention normally consists mainly of a product (resin composition) of reaction between a film-forming organic resin (A) and an active-hydrogen-laden compound (B) a part of or whole of which consists of a hydrazine derivative (C) containing active hydrogen). And, at need, an ion-exchanged silica (a), a fine particle silica (b), a solid lubricant (c), and a curing agent may further be added to the organic coating. Furthermore, at need, there may be added other additives such as organic coloring pigment (for example, condensing polycyclic organic pigment, phthalocyanine base organic pigment), coloring dye (for example, azo dye soluble in organic solvent, azo metal dye soluble in water), inorganic pigment (for example, titanium oxide), chelating agent (for example, thiol), conductive pigment (for example, metallic powder of zinc, aluminum, nickel, or the like, iron phosphide, antimony-dope type tin oxide), coupling agent (for example, silane coupling agent and titanium coupling agent), melamine-cyanuric acid additive.

The paint composition for film-formation containing above-described main component and additive components normally contains solvent (organic solvent and/or water), and, at need, further a neutralizer or the like is added.

Applicable organic solvent described above has no specific limitation if only it dissolves or disperses the product of reaction between the above-described film-forming organic resin (A) and the active-hydrogen-laden compound (B), and adjusts the product as the painting composition. Examples of the organic solvent are the organic solvents given above as examples.

The above-described neutralizers are blended, at need, to neutralize the film-forming organic resin (A) to bring it to water-type. When the film-forming organic resin (A) is a cationic resin, acid such as acetic acid, lactic acid, and formic acid may be used as the neutralizer.

The organic coatings described above are formed on the above-described composite oxide coating.

The dry thickness of the organic coating is in a range of from 0.1 to 5 μm, preferably from 0.3 to 3 μm, and most preferably from 0.5 to 2 μm. If the thickness of the organic coating is less than 0.1 μμm, the corrosion resistance becomes insufficient. If the thickness of the organic coating exceeds 5 μm, the conductivity and the workability degrade.

The following is the description about the method for manufacturing an organic coating steel sheet according to the present invention.

The organic coating steel sheet according to the present invention is manufactured by the steps of: treating the surface of a zinc base plated steel sheet or an aluminum base plated steel sheet by chemical conversion treatment; applying a paint composition which contains the product of reaction between above-described film-forming organic resin (A) and an active-hydrogen-laden compound (B) a part of or whole of which consists of a hydrazine derivative (C) containing active hydrogen, which product of reaction is preferably the main component, and at need, further contains an ion-exchanged silica (a), a fine particle silica (b), and a solid lubricant (c), and the like; heating to dry the product.

The surface of the plated steel sheet may be, at need, subjected to alkaline degreasing before applying the above-described treatment liquid, and may further be subjected to preliminary treatment such as surface adjustment treatment for further improving the adhesiveness and corrosion resistance.

In the case that a chemical conversion treatment coating containing no hexavalent chromium is formed as the chemical conversion treatment coating, the methods for applying the treatment liquid onto the plated steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After the coating of treatment liquid as described above, there may applied, at need, rinsing with water, followed by heating to dry.

Method for heating to dry the coated treatment liquid is not limited. For example, dryer, hot air oven, high frequency induction heating furnace, infrared heating furnace may be applied.

The heating and drying treatment is preferably conducted at reaching temperatures of from 40 to 350°C., more preferably from 80 to 20° C., and most preferably from 80 to 160° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

After forming the chemical conversion treatment coating on the surface of the zinc base plated steel sheet or the aluminum base plated steel sheet, as described above, a paint composition for forming an organic coating is applied on the composite oxide coating. Method for applying the paint composition is not limited, and examples of the method are coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, generally the plate is heated to dry without rinsing with water. After applying the paint composition, however, water-rinse step may be given.

Method for heating to dry the paint composition is not limited. For example, dryer, hot air oven, high frequency induction heating furnace, infrared heating furnace may be applied. The heating treatment is preferably conducted at reaching temperatures of from 50 to 350° C., more preferably from 80 to 250° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

As described above, the present invention includes a steel sheet having an organic coating on both sides or on side thereof. Accordingly, modes of the steel sheet according to the present invention include, for example, the followings.

(1) "Plating film—Chemical conversion treatment coating—Organic coating" on one side of the steel sheet, and "Plating film" on other side of the steel sheet;

(2) "Plating film—Chemical conversion treatment coating—Organic coating" on one side of the steel sheet, and "Plating film—Chemical conversion treatment coating" on other side of the steel sheet;

(3) "Plating film—Chemical conversion treatment coating—Organic coating" on both sides of the steel sheet;

(4) "Plating film—Chemical conversion treatment coating—Organic coating" on one side of the steel sheet, and "Plating film—Organic coating" on other side of the steel sheet;

Embodiments

Resin compositions (reaction products) for forming the organic coating were synthesized in the following-described procedure.

SYNTHESIS EXAMPLE 1

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylethylketone were charged in a flask with four necks, which mixture was then heated to 14° C. to let them react for 4 hours. Thus, an epoxy resin having an epoxy equivalent of 1391 and a solid content of 90% was obtained. A 1500 parts of ethyleneglycol monobutylether was added to the epoxy resin, which were then cooled to 100° C. A 96 parts of 3,5-dimethylpyrazole (molecular weight 96) and 129 parts of dibutylamine (molecular weight 129) were added to the cooled resin, and they were reacted for 6 hours to eliminate the epoxy group. Then, a 205 parts of methylisobutylketone was added while the mixture was cooling, to obtain a pyrazole-modified epoxy resin having 60% of solid matter. The epoxy resin is defined as the resin composition (1). The resin composition (1) is a product of the reaction between the film-forming organic resin (A) and the active-hydrogen-laden compound that contains 50 mole % of hydrazine derivative (C) containing active hydrogen.

SYNTHESIS EXAMPLE 2

A 4000 parts of EP1007 (epoxy equivalent 2000, manufactured by Yuka Shell Epoxy Co., Ltd.) and 2239 parts of ethyleneglycol monobutylether were charged into a flask with four necks, which mixture was then heated to 120° C. to let them react for 1 hour to fully dissolve the epoxy resin. The mixture was cooled to 100° C. A 168 parts of 3-amino-1,2,4-triazole (molecular weight 84) was added to the mixture, and they were reacted for 6 hours to eliminate the epoxy group. Then, a 540 parts of methylisobutylketone was added while the mixture was cooling, to obtain a triazole-modified epoxy resin having 60% of solid matter. The epoxy resin is defined as the resin composition (2). The resin composition (2) is a product of the reaction between the film-forming organic resin (A) and the active-hydrogen-laden compound that contains 100 mole % of hydrazine derivative (C) containing active hydrogen.

SYNTHESIS EXAMPLE 3

A 222 parts of isophorone diisocyanate (epoxy equivalent 111) and 34 parts of methylisobutylketone were charged into a flask with four necks. A 87 parts of methylethylketoxime (molecular weight 87) was added to the mixture dropwise for 3 hours while keeping the mixture at temperatures ranging from 30 to 40° C., then the mixture was kept to 40° C. for 2 hours. Thus, a block isocyanate having isocyanate equivalent of 309 and solid content of 90% was obtained.

A 1489 parts of EP828 (epoxy equivalent 187, manufactured by Yuka Shell Epoxy Co., Ltd.) 684 parts of bisphenol A, 1 part of tetraethylammonium bromide, and 241 parts of methylisobutylketone were charged into a flask with four necks, which mixture was then heated to 140° C. to let them react for 4 hours. Thus, an epoxy resin having epoxy equivalent of 1090 and solid content of 90% was obtained. To the epoxy resin, 1000 parts of methylisobutylketone was added, then the mixture was cooled to 1000° C., and 202 parts of 3-mercapto-1,2,4-triazole (molecular weight 101) was added to the mixture, and let the mixture react for 6 hours to fully eliminate the epoxy group. After that, the part-block isocyanate of the above-described 90% solid portion was added to the reaction product to let the mixture react at 1000° C. for 3 hours, and the vanish of isocyanate group was confirmed. Further, 461 parts of ethyleneglycol monobutylether was added to the product to obtain a triazole-modified epoxy resin having 60% solid content. The product is defined as the resin composition (3). The resin composition (3) is a product of the reaction between the film-forming organic resin (A) and the active-hydrogen-laden compound that contains 100 mole % of hydrazine derivative (C) containing active hydrogen.

SYNTHESIS EXAMPLE 4

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylisobutylketone were charged into a flask with four necks, which mixture was then heated to 140° C. to let them react for 4 hours. Thus, an epoxy resin having epoxy equivalent of 1391 and solid content of 90% was obtained. To the epoxy resin, 1500 parts of ethyleneglycol monobutylether was added, then the mixture was cooled to 100° C., and 258 parts of dibutylamine (molecular weight 129) was added to the mixture, and let the mixture react for 6 hours to fully eliminate the epoxy group. While cooling the mixture, 225 parts of methylisobutylketone was further added to the mixture to obtain an epoxyamine adduct having 60% solid content. The product is defined as the resin composition (4). The resin composition (4) is a product of the reaction between the film-forming organic resin (A) and the active-hydrogen-laden compound of hydrazine derivative (C) containing no active hydrogen.

A curing agent was blended to each of the synthesized resin compositions (1) through (4) to prepare the resin compositions (paint compositions) listed in Table 101. The Nos. allotted to the kinds of the base resins in Table 101 correspond to respective Nos. of the resin composition which were synthesized in Synthesis Examples (1) through (4).

The kinds of curing agents (A) through (D) in Table 101 are the following.

A: IPDI MEK oxime block body.
B: isocyanurate type.
C: HMDI MEK oxime block body.
D: imino group type melamine resin.

To each of these paint compositions, ion-exchanged silica, fine particle silica given in Table 98, and solid lubricant given in Table 99 were added at specified amounts, and they were dispersed in the composition using a paint dispersion machine (sand grinder) for a necessary time. For the above-described ion-exchanged silica, SHIELDEX C303 (average particle sizes of from 2.5 to 3.5 μm and Ca concentration of 3 wt. %) manufactured by W.R. Grace & Co., which is a Ca-exchanged silica, was used.

EXAMPLE 1

To obtain organic coating steel sheets for household electric appliances, building materials, and automobile parts, the plated steel sheets shown in Table 97 were used as the target base plates, which plates were prepared by applying zinc base plating or aluminum base plating on the cold-rolled steel sheets having a plate thickness of 0.8 mm and a surface roughness Ra of 1.0 μm. The surface of the plated steel sheet was treated by alkaline degreasing and water washing, followed by drying, then the chemical conversion treatment was applied using the treatment liquid under the treatment condition shown in Table 100 to form the chemical conversion coating. Then, the paint composition given in Table 101 was applied using a roll coater, which was then heated to dry to form the secondary layer coating (the organic coating), thus manufactured the organic coating steel sheets as Examples and Comparative Examples. The thickness of the secondary layer coating was adjusted by the solid content in the treatment liquid (heating residue) or applying conditions (roll pressing force, rotational speed, and other variables).

To each of thus obtained organic coating steel sheets, evaluation was given in terms of quality performance (appearance of coating, white-rust resistance, white-rust resistance after alkaline degreasing, paint adhesiveness, and workability). The results are given in Tables 102 through 114 along with the structure of chemical conversion treatment layer coating and of organic coating.

The quality performance evaluation on the organic coating steel sheets was carried out by the same procedure as in the best mode 1.

TABLE 97

| No. | Type | Coating weight (g/m$^2$) |
|---|---|---|
| 1 | Electrolytically galvanized steel plate | 20 |

TABLE 98

[Fine particle silica]

| No. | Type | Trade name |
|---|---|---|
| 5 | Dry silica | "AEROSIL R811" produced by Japan Aerosil Co. |

TABLE 99

[Solid lubricant]

| No. | Type | Trade name |
|---|---|---|
| 1 | Polyethylene wax | "LUVAX 1151" produced by Nippon Seiro Co. |

TABLE 100

| No. | Target composition Type | Target composition Trade name | Target composition Remark | Treatment method | Coating thickness | Adaptability to the conditions of the invention |
|---|---|---|---|---|---|---|
| 1 | Lithium silicate | Nissan Kagaku Kogyo Co. LSS-35 | $SiO_2/LiO_2 = 3.5$ | Coating→drying at 150° C. | 0.5 μm | Satisfies |
| 2 | Lithium silicate | Nissan Kagaku Kogyo Co. LSS-45 | $SiO_2/LiO_2 = 4.5$ | Coating→drying at 150° C. | 0.5 μm | Satisfies |
| 3 | Lithium silicate | Nissan Kagaku Kogyo Co. LSS-75 | $SiO_2/LiO_2 = 7.5$ | Coating→drying at 150° C. | 0.5 μm | Satisfies |
| 4 | Lithium silicate | DuPont Polysilicate 48 | $SiO_2/LiO_2 = 4.6–5.0$ | Coating→drying at 150° C. | 0.5 μm | Satisfies |
| 5 | Phosphate treatment | Nihon Parkerizing Co. PB3312 | — | Spray→drying | 2 μm | Satisfies |
| 6 | Organic resin coating | Acrylic-ethylene copolymer | Organic resin: Colloidal silica = 100:10 | Coating→drying at 150° C. | 1 μm | Satisfies |
| 7 | Phitinic acid treatment | Mitsui Chemicals Inc. Phytinic acid 10 g/L aqueous solution | — | Coating→drying at 150° C. | 0.5 μm | Satisfies |
| 8 | Tannic acid treatment | Fuji Chemical Co., Ltd. Tannin AL 10 g/L aqueous solution | — | Coating→drying at 150° C. | 0.5 μm | Satisfies |
| 9 | Polymer chelating agent | Miyoshi Oil & Fat Co. Dithiocarbamic acid Antimonate | — | Coating→drying at 150° C. | 0.5 μm | Satisfies |

TABLE 101

[Resin composition of secondary layer coating]

| | Base resin | | Curing agent | | | Adaptability to the |
|---|---|---|---|---|---|---|
| No. | Type *1 | Blending rate | Type *2 | Blending rate | Catalyst | conditions of the invention |
| 1 | (1) | 100 parts | A | 5 parts | Dibutyltin dilaurate (0.2 part) | Satisfies |
| 2 | (1) | 100 parts | B | 25 parts | Dibutyltin dilaurate (1.0 part) | Satisfies |
| 3 | (1) | 100 parts | C | 25 parts | — | Satisfies |
| 4 | (2) | 100 parts | A | 50 parts | Dibutyltin dilaurate (2.0 part) | Satisfies |
| 5 | (2) | 100 parts | B | 50 parts | Dibutyltin dilaurate (3.0 part) | Satisfies |
| 6 | (2) | 100 parts | C | 80 parts | Dibutyltin dilaurate (4.0 part) | Satisfies |
| 7 | (3) | 100 parts | A | 25 parts | Cobalt naphthenate (1.0 part) | Satisfies |
| 8 | (3) | 100 parts | B | 10 parts | Tin (II) chloride (1.0 part) | Satisfies |
| 9 | (3) | 100 parts | C | 50 parts | N-ethylmorpholine (1.0 part) | Satisfies |
| 10 | (1) | 100 parts | D | 25 parts | — | Satisfies |
| 11 | (3) | 100 parts | D | 30 parts | — | Satisfies |
| 12 | (4) | 100 parts | B | 25 parts | Dibutyltin dilaurate (1.0 part) | Dissatisfies |
| 13 | Aqueous solution of a hydrazine derivative (aqueous solution of 5 wt. % 3,5-dimethylpyrazole) | | | | | Dissatisfies |
| 14 | Mixture of an epoxyamine adduct and a hydrazine derivative (3 parts by weight of 3,5-dimethylpyrazole per 100 parts by weight of base resin is added to the composition No. 12, followed by agitating the mixture.) | | | | | Dissatisfies |

TABLE 102

| | Primary | | Performance | | | | | | | |
|---|---|---|---|---|---|---|---|---|---|---|
| | Plating | layer coating | Secondary layer coating | | | | | White-rust | | |
| No. | steel plate *1 | Coating composition *2 | Resin composition *3 | Drying temperature (° C.) | Coating thickness (μm) | Appearance | White-rust resistance: SST 72 hrs | resistance after alkaline degreasing: SST 72 hrs | Paint adhesiveness | Classification |
| 1 | 1 | 1 | 1 | 230 | 1.5 | ○ | ⊚ | ⊚ | ⊚ | Example |
| 2 | 1 | 1 | 2 | 230 | 1.5 | ○ | ⊚ | ⊚ | ⊚ | Example |
| 3 | 1 | 1 | 3 | 230 | 1.5 | ○ | ⊚ | ⊚ | ⊚ | Example |
| 4 | 1 | 1 | 4 | 230 | 1.5 | ○ | ⊚ | ⊚ | ⊚ | Example |
| 5 | 1 | 1 | 5 | 230 | 1.5 | ○ | ⊚ | ⊚ | ⊚ | Example |
| 6 | 1 | 1 | 6 | 230 | 1.5 | ○ | ⊚ | ⊚ | ⊚ | Example |
| 7 | 1 | 1 | 7 | 230 | 1.5 | ○ | ⊚ | ⊚ | ⊚ | Example |
| 8 | 1 | 1 | 8 | 230 | 1.5 | ○ | ⊚ | ⊚ | ⊚ | Example |
| 9 | 1 | 1 | 9 | 230 | 1.5 | ○ | ⊚ | ⊚ | ⊚ | Example |
| 10 | 1 | 1 | 10 | 230 | 1.5 | ○ | ⊚ | ⊚ | ⊚ | Example |

TABLE 102-continued

| No. | Primary Plating steel plate *1 | layer coating Coating composition *2 | Secondary layer coating Resin composition *3 | Drying temperature (° C.) | Coating thickness (μm) | Appearance | Performance White-rust resistance: SST 72 hrs | White-rust resistance after alkaline degreasing: SST 72 hrs | Paint adhesiveness | Classification |
|---|---|---|---|---|---|---|---|---|---|---|
| 11 | 1 | 1 | 11 | 230 | 1.5 | ○ | ⊚ | ⊚ | ⊚ | Example |
| 12 | 1 | 1 | 12 | 230 | 1.5 | ○ | Δ | Δ | ⊚ | Comparative example |

*1: Corresponding to No. given in Table 97
*2: Corresponding to No. given in Table 100
*3: Corresponding to No. given in Table 101

TABLE 103

| No. | Primary Plating steel plate *1 | layer coating Coating composition *2 | Secondary layer coating Resin composition *3 | Drying temperature (° C.) | Coating thickness (μm) | Appearance | Performance White-rust resistance: SST 72 hrs | White-rust resistance after alkaline degreasing: SST 72 hrs | Paint adhesiveness | Classification |
|---|---|---|---|---|---|---|---|---|---|---|
| 13 | 1 | 1 | 13 | 230 | 1.5 | ○ | X | X | X | Comparative example |
| 14 | 1 | 1 | 14 | 230 | 1.5 | ○ | Δ | Δ | ⊚ | Comparative example |
| 15 | 1 | 2 | 1 | 230 | 1.5 | ○ | ⊚ | ⊚ | ⊚ | Example |
| 16 | 1 | 3 | 1 | 230 | 1.5 | ○ | ⊚ | ⊚ | ⊚ | Example |
| 17 | 1 | 4 | 1 | 230 | 1.5 | ○ | ⊚ | ⊚ | ⊚ | Example |
| 18 | 1 | 5 | 1 | 230 | 1.5 | ○ | ⊚ | ⊚ | ⊚ | Example |
| 19 | 1 | 6 | 1 | 230 | 1.5 | ○ | ⊚ | ⊚ | ⊚ | Example |
| 20 | 1 | 7 | 1 | 230 | 1.5 | ○ | ⊚ | ⊚ | ⊚ | Example |
| 21 | 1 | 8 | 1 | 230 | 1.5 | ○ | ⊚ | ⊚ | ⊚ | Example |
| 22 | 1 | 9 | 1 | 230 | 1.5 | ○ | ⊚ | ⊚ | ⊚ | Example |
| 23 | 1 | 2 | 2 | 230 | 1.5 | ○ | ⊚ | ⊚ | ⊚ | Example |

*1: Corresponding to No. given in Table 97
*2: Corresponding to No. given in Table 100
*3: Corresponding to No. given in Table 101

TABLE 104

| No. | Primary layer Plating steel plate *1 | coating Coating composition *2 | Secondary layer coating Resin composition *3 | Fine particles silica (b) Type *5 | Fine particles silica (b) Blending rate *6 | Drying temperature (° C.) | White-rust resistance (μm) | Appearance | Performance White-rust resistance: SST 96 hrs | White-rust resistance after alkaline degreasing: SST 96 hrs | Paint adhesiveness | Classification |
|---|---|---|---|---|---|---|---|---|---|---|---|---|
| 24 | 1 | 1 | 1 | 1 | 10 | 230 | 1.5 | ○ | ⊚ | ⊚ | ⊚ | Example |
| 36 | 1 | 1 | 1 | 1 | 1 | 230 | 1.5 | ○ | ○ | ○ | ⊚ | Example |
| 37 | 1 | 1 | 1 | 1 | 5 | 230 | 1.5 | ○ | ○+ | ○+ | ⊚ | Example |
| 38 | 1 | 1 | 1 | 1 | 10 | 230 | 1.5 | ○ | ⊚ | ⊚ | ⊚ | Example |
| 39 | 1 | 1 | 1 | 1 | 20 | 230 | 1.5 | ○ | ⊚ | ⊚ | ⊚ | Example |
| 40 | 1 | 1 | 1 | 1 | 30 | 230 | 1.5 | ○ | ⊚ | ⊚ | ⊚ | Example |
| 41 | 1 | 1 | 1 | 1 | 40 | 230 | 1.5 | ○ | ○+ | ○+ | ⊚ | Example |
| 42 | 1 | 1 | 1 | 1 | 50 | 230 | 1.5 | ○ | ○+ | ○+ | ⊚ | Example |
| 43 | 1 | 1 | 1 | 1 | 80 | 230 | 1.5 | ○ | ○ | ○ | ⊚ | Example |
| 44 | 1 | 1 | 1 | 1 | 100 | 230 | 1.5 | ○ | ○− | ○− | ⊚ | Example |
| 45 | 1 | 1 | 1 | 1 | 150 | 230 | 1.5 | ○ | Δ | Δ | ⊚ | Comparative example |

*1: Corresponding to No. given in Table 97
*2: Corresponding to No. given in Table 100
*3: Corresponding to No. given in Table 101
*5: Corresponding to No. given in Table 98
*6: Blending rate (parts by weight) of fine particles silica to 100 parts by weight of solid matter of resin

TABLE 105

| No. | Plating steel plate *1 | Primary layer coating Coating composition *2 | Resin composition *3 | Fine particles silica (b) Type *5 | Blending rate *6 | Drying temperature (°C.) | White-rust resistance: (μm) | Appearance | White-rust resistance: SST 96 hrs | White-rust resistance after alkaline degreasing: SST 96 hrs | Paint adhesiveness | Classification |
|---|---|---|---|---|---|---|---|---|---|---|---|---|
| 59 | 1 | 1 | 1 | 1 | 10 | 230 | 0.01 | ○ | X | X | ◎ | Comparative example |
| 60 | 1 | 1 | 1 | 1 | 10 | 230 | 0.1 | ○ | ○- | ○- | ◎ | Example |
| 61 | 1 | 1 | 1 | 1 | 10 | 230 | 0.5 | ○ | ○- | ○- | ◎ | Example |
| 62 | 1 | 1 | 1 | 1 | 10 | 230 | 1 | ○ | ○ | ○ | ◎ | Example |
| 63 | 1 | 1 | 1 | 1 | 10 | 230 | 2 | ○ | ◎ | ◎ | ◎ | Example |
| 64 | 1 | 1 | 1 | 1 | 10 | 230 | 2.5 | ○ | ◎ | ◎ | ◎ | Example |
| 65 | 1 | 1 | 1 | 1 | 10 | 230 | 3 | ○ | ◎ | ◎ | ◎ | Example |
| 66 | 1 | 1 | 1 | 1 | 10 | 230 | 4 | ○ | ◎ | ◎ | ◎ | Example |
| 67 | 1 | 1 | 1 | 1 | 10 | 230 | 5 | ○ | ◎ | ◎ | ◎ | Example |
| 68 | 1 | 1 | 1 | 1 | 10 | 230 | 20 | ○ | ◎ | ◎ | ◎ | Comparative example ※1 |

*1: Corresponding to No. given in Table 97
*2: Corresponding to No. given in Table 100
*3: Corresponding to No. given in Table 101
*5: Corresponding to No. given in Table 98
*6: Blending rate (parts by weight) of fine particles silica to 100 parts by weight of solid matter of resin
※1: Unable to weld

TABLE 106

| No. | Plating steel plate *1 | Primary layer coating Coating composition *2 | Resin composition *3 | Fine particles silica(b) Type *5 | Blending rate *6 | Solid lubricant(c) Type *9 | Blending rate *10 | Drying temperature (°C.) | Coating thickness (μm) | Appearance | White-rust resistance: SST 96 hrs | White-rust resistance after alkaline degreasing: SST 96 hrs | Paint adhesiveness | Workability | Classification ※1 |
|---|---|---|---|---|---|---|---|---|---|---|---|---|---|---|---|
| 79 | 1 | 1 | 1 | 1 | 10 | 1 | 5 | 230 | 1.5 | ○ | ◎ | ◎ | ◎ | ◎ | Example |
| 85 | 1 | 1 | 1 | 1 | 10 | 1 | 1 | 230 | 1.5 | ○ | ◎ | ◎ | ◎ | ○ | Example |
| 86 | 1 | 1 | 1 | 1 | 10 | 1 | 10 | 230 | 1.5 | ○ | ◎ | ◎ | ◎ | ◎ | Example |
| 87 | 1 | 1 | 1 | 1 | 10 | 1 | 30 | 230 | 1.5 | ○ | ◎ | ◎ | ◎ | ◎ | Example |
| 88 | 1 | 1 | 1 | 1 | 10 | 1 | 80 | 230 | 1.5 | ○ | ◎ | ◎ | ○ | ◎ | Example |
| 89 | 1 | 1 | 1 | 1 | 10 | 1 | 100 | 230 | 1.5 | ○ | ◎ | ◎ | X | ◎ | Comparative example |

*1: Corresponding to No. given in Table 97
*2: Corresponding to No. given in Table 100
*3: Corresponding to No. given in Table 101
*5: Corresponding to No. given in Table 98
*6: Blending rate (parts by weight) of fine particles silica to 100 parts by weight of solid matter of resin
*9: Corresponding to No. given in Table 99
*10: Blending rate (parts by weight) of solid lubricant to 100 parts by weight of solid matter of resin

TABLE 107

| No. | Plating steel plate *1 | Primary layer coating Coating composition *2 | Resin composition *3 | Ion-exchanged silica (a) blending rate *4 | Drying temperature (°C.) | Coating thickness (μm) | Appearance | White-rust resistance: SST 120 hrs | White-rust resistance after alkaline degreasing: SST 120 hrs | Paint adhesiveness | Classification |
|---|---|---|---|---|---|---|---|---|---|---|---|
| 1 | 1 | 1 | 1 | 30 | 230 | 1.5 | ○ | ◎ | ◎ | ◎ | Example |
| 2 | 1 | 1 | 2 | 30 | 230 | 1.5 | ○ | ◎ | ◎ | ◎ | Example |
| 3 | 1 | 1 | 3 | 30 | 230 | 1.5 | ○ | ◎ | ◎ | ◎ | Example |
| 4 | 1 | 1 | 4 | 30 | 230 | 1.5 | ○ | ◎ | ◎ | ◎ | Example |
| 5 | 1 | 1 | 5 | 30 | 230 | 1.5 | ○ | ◎ | ◎ | ◎ | Example |

TABLE 107-continued

| No. | Plating steel plate *1 | Primary layer coating Coating composition *2 | Secondary layer coating Resin composition *3 | Ion-exchanged silica (a) blending rate *4 | Drying temperature (° C.) | Coating thickness (μm) | Appearance | Performance White-rust resistance: SST 120 hrs | White-rust resistance after alkaline degreasing: SST 120 hrs | Paint adhesiveness | Classification |
|---|---|---|---|---|---|---|---|---|---|---|---|
| 6 | 1 | 1 | 6 | 30 | 230 | 1.5 | ○ | ⊙ | ⊙ | ⊙ | Example |
| 7 | 1 | 1 | 7 | 30 | 230 | 1.5 | ○ | ⊙ | ⊙ | ⊙ | Example |
| 8 | 1 | 1 | 8 | 30 | 230 | 1.5 | ○ | ⊙ | ⊙ | ⊙ | Example |
| 9 | 1 | 1 | 9 | 30 | 230 | 1.5 | ○ | ⊙ | ⊙ | ⊙ | Example |
| 10 | 1 | 1 | 10 | 30 | 230 | 1.5 | ○ | ⊙ | ⊙ | ⊙ | Example |
| 11 | 1 | 1 | 11 | 30 | 230 | 1.5 | ○ | ⊙ | ⊙ | ⊙ | Example |
| 12 | 1 | 1 | 12 | 30 | 230 | 1.5 | ○ | △ | X | ⊙ | Comparative example |

*1: Corresponding to No. given in Table 97
*2: Corresponding to No. given in Table 100
*3: Corresponding to No. given in Table 101
*4: Blending rate (parts by weight) of ion-exchanged silica to 100 parts by weight of solid matter of resin

TABLE 108

| No. | Plating steel plate *1 | Primary layer coating Coating composition *2 | Secondary layer coating Resin composition *3 | Ion-exchanged silica (a) blending rate *4 | Drying temperature (° C.) | Coating thickness (μm) | Appearance | Performance White-rust resistance: SST 120 hrs | White-rust resistance after alkaline degreasing: SST 120 hrs | Paint adhesiveness | Classification |
|---|---|---|---|---|---|---|---|---|---|---|---|
| 13 | 1 | 1 | 13 | 30 | 230 | 1.5 | ○ | X | X | X | Comparative example |
| 14 | 1 | 1 | 14 | 30 | 230 | 1.5 | ○ | △ | X | ⊙ | Comparative example |
| 15 | 1 | 2 | 1 | 30 | 230 | 1.5 | ○ | ⊙ | ⊙ | ⊙ | Example |
| 16 | 1 | 3 | 1 | 30 | 230 | 1.5 | ○ | ⊙ | ⊙ | ⊙ | Example |
| 17 | 1 | 4 | 1 | 30 | 230 | 1.5 | ○ | ⊙ | ⊙ | ⊙ | Example |
| 18 | 1 | 5 | 1 | 30 | 230 | 1.5 | ○ | ⊙ | ⊙ | ⊙ | Example |
| 19 | 1 | 6 | 1 | 30 | 230 | 1.5 | ○ | ⊙ | ⊙ | ⊙ | Example |
| 20 | 1 | 7 | 1 | 30 | 230 | 1.5 | ○ | ⊙ | ⊙ | ⊙ | Example |
| 21 | 1 | 8 | 1 | 30 | 230 | 1.5 | ○ | ⊙ | ⊙ | ⊙ | Example |
| 22 | 1 | 9 | 1 | 30 | 230 | 1.5 | ○ | ⊙ | ⊙ | ⊙ | Example |

*1: Corresponding to No. given in Table 97
*2: Corresponding to No. given in Table 100
*3: Corresponding to No. given in Table 101
*4: Blending rate (parts by weight) of ion-exchanged silica to 100 parts by weight of solid matter of resin

TABLE 109

| No. | Plating steel plate *1 | Primary layer coating Coating composition *2 | Secondary layer coating Resin composition *3 | Ion-exchanged silica (a) blending rate *4 | Drying temperature (° C.) | Coating thickness (μm) | Appearance | Performance White-rust resistance: SST 120 hrs | White-rust resistance after alkaline degreasing: SST 120 hrs | Paint adhesiveness | Classification |
|---|---|---|---|---|---|---|---|---|---|---|---|
| 24 | 1 | 1 | 13 | — | 230 | 1.5 | ○ | △ | △ | ⊙ | Example |
| 25 | 1 | 1 | 14 | 1 | 230 | 1.5 | ○ | ○ | ○ | ⊙ | Example |
| 26 | 1 | 1 | 1 | 5 | 230 | 1.5 | ○ | ○+ | ○+ | ⊙ | Example |
| 27 | 1 | 1 | 1 | 10 | 230 | 1.5 | ○ | ⊙ | ⊙ | ⊙ | Example |
| 28 | 1 | 1 | 1 | 30 | 230 | 1.5 | ○ | ⊙ | ⊙ | ⊙ | Example |
| 29 | 1 | 1 | 1 | 40 | 230 | 1.5 | ○ | ⊙ | ⊙ | ⊙ | Example |
| 30 | 1 | 1 | 1 | 50 | 230 | 1.5 | ○ | ⊙ | ⊙ | ⊙ | Example |
| 31 | 1 | 1 | 1 | 80 | 230 | 1.5 | ○ | ○+ | ○+ | ⊙ | Example |
| 32 | 1 | 1 | 1 | 100 | 230 | 1.5 | ○ | ○ | ○ | ⊙ | Example |

TABLE 109-continued

| No. | Plating steel plate *1 | Primary layer coating Coating composition *2 | Resin composition *3 | Secondary layer coating Ion-exchanged silica (a) blending rate *4 | Drying temperature (° C.) | Coating thickness (μm) | Appearance | Performance White-rust resistance: SST 120 hrs | White-rust resistance after alkaline degreasing: SST 120 hrs | Paint adhesiveness | Classification |
|---|---|---|---|---|---|---|---|---|---|---|---|
| 33 | 1 | 1 | 1 | 150 | 230 | 1.5 | ○ | Δ | Δ | ⊙ | Comparative example |

*1: Corresponding to No. given in Table 97
*2: Corresponding to No. given in Table 100
*3: Corresponding to No. given in Table 101
*4: Blending rate (parts by weight) of ion-exchanged silica to 100 parts by weight of solid matter of resin

TABLE 110

| | | | | Secondary layer coating | | | | | | | |
|---|---|---|---|---|---|---|---|---|---|---|---|
| No. | Plating steel plate*1 | Primary layer coating Coating composition*2 | Resin composition*3 | Ion-exchanged silica (a) blending rate*4 | Fine particles silica (b) Type*5 | Blending rate*6 | (a) + (b) Blending rate*7 | (a)/(b) Weight ratio*8 | Drying temperature (° C.) | Coating thickness (μm) | Classification |
| 66 | 1 | 1 | 1 | 30 | 5 | 5 | 35 | 6/1 | 230 | 1.5 | Example |
| 81 | 1 | 1 | 1 | 30 | — | — | 30 | 30/0 | 230 | 1.5 | Example |
| 82 | 1 | 1 | 1 | 29.9 | 5 | 0.1 | 30 | 299/1 | 230 | 1.5 | Example |
| 83 | 1 | 1 | 1 | 29 | 5 | 1 | 30 | 29/1 | 230 | 1.5 | Example |
| 84 | 1 | 1 | 1 | 20 | 5 | 10 | 30 | 2/1 | 230 | 1.5 | Example |
| 85 | 1 | 1 | 1 | 15 | 5 | 15 | 30 | 1/1 | 230 | 1.5 | Example |
| 86 | 1 | 1 | 1 | 10 | 5 | 20 | 30 | 1/2 | 230 | 1.5 | Example |
| 87 | 1 | 1 | 1 | 1 | 5 | 29 | 30 | 1/29 | 230 | 1.5 | Example |
| 88 | 1 | 1 | 1 | 0.1 | 5 | 29.9 | 30 | 1/299 | 230 | 1.5 | Example |

*1 Corresponding to No. given in Table 97
*2 Corresponding to No. given in Table 100
*3 Corresponding to No. given in Table 101
*4 Blending rate (parts by weight) of ion-exchanged silica (a) to 100 parts by weight of solid matter of resin
*5 Corresponding to No. given in Table 98
*6 Blending rate (parts by weight) of fine particles silica (b) to 100 parts by weight of solid matter of resin
*7 Total blending rate (parts by weight) of ion-exchanged silica (a) and fine particles silica (b) to 100 parts by weight of solid matter of resin
*8 Weight ratio of ion-exchanged silica (a) and fine particles silica (b) of solid matter of resin

TABLE 111

| No. | Appearance | Performance White-rust resistance: SST 150 hrs | White-rust resistance after alkaline degreasing: SST 150 hrs | Paint adhesiveness | Classification |
|---|---|---|---|---|---|
| 66 | ○ | ⊙ | ⊙ | ⊙ | Example |
| 81 | ○ | ○ | ○ | ⊙ | Example |
| 82 | ○ | ○ | ○ | ⊙ | Example |
| 83 | ○ | ○+ | ○+ | ⊙ | Example |
| 84 | ○ | ⊙ | ⊙ | ⊙ | Example |
| 85 | ○ | ⊙ | ⊙ | ⊙ | Example |
| 86 | ○ | ○ | ○ | ⊙ | Example |
| 87 | ○ | ○ | ○ | ⊙ | Example |
| 88 | ○ | ○− | ○− | ⊙ | Example |

TABLE 112

| | | | Performance | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 112 | ○ | ⊚ | ⊚ | ⊚ | ⊚ | Example |
| 114 | ○ | ⊚ | ⊚ | ⊚ | ⊚ | Example |
| 115 | ○ | ⊚ | ⊚ | ⊚ | ⊚ | Example |
| 116 | ○ | ⊚ | ⊚ | ⊚ | ⊚ | Example |
| 117 | ○ | ⊚ | ⊚ | ⊚ | ⊚ | Example |
| 118 | ○ | ⊚ | ⊚ | ⊚ | ○ | Example |
| 119 | ○ | ⊚ | ⊚ | ⊚ | ⊚ | Example |
| 120 | ○ | ⊚ | ⊚ | ⊚ | ⊚ | Example |
| 121 | ○ | ⊚ | ⊚ | ○ | ⊚ | Example |
| 122 | ○ | ⊚ | ⊚ | × | ⊚ | Comparative example |
| 123 | ○ | ⊚ | ⊚ | ⊚ | ⊚ | Example |

TABLE 113

| | | | | Secondary layer coating | | | | | |
|---|---|---|---|---|---|---|---|---|---|
| | Plating | Primary layer coating | Resin | Ion-exchanged silica (a) | Solid lubricant (c) | | Drying | Coating | |
| No. | steel plate *1 | Coating composition *2 | composition *3 | blending rate *4 | Type *5 | Blending rate *6 | temperature (° C.) | thickness (μm) | Classification |
| 112 | 1 | 1 | 1 | 30 | 1 | 10 | 230 | 1.5 | Example |
| 114 | 1 | 1 | 1 | 30 | 3 | 10 | 230 | 1.5 | Example |
| 115 | 1 | 1 | 1 | 30 | 4 | 10 | 230 | 1.5 | Example |
| 116 | 1 | 1 | 1 | 30 | 5 | 10 | 230 | 1.5 | Example |
| 117 | 1 | 1 | 1 | 30 | 6 | 10 | 230 | 1.5 | Example |
| 118 | I | 1 | 1 | 30 | 1 | 1 | 230 | 1.5 | Example |
| 119 | 1 | 1 | 1 | 30 | 1 | 3 | 230 | 1.5 | Example |
| 120 | 1 | 1 | 1 | 30 | 1 | 40 | 230 | 1.5 | Example |
| 121 | 1 | 1 | 1 | 30 | 1 | 80 | 230 | 1.5 | Example |
| 122 | 1 | 1 | 1 | 30 | 1 | 100 | 230 | 1.5 | Comparative example |

*1: Corresponding to No. given in Table 97
*2: Corresponding to No. given in Table 100
*3: Corresponding to No. given in Table 101
*4: Blending rate (parts by weight) of ion-exchanged silica to 100 parts by weight of solid matter of resin
*9: Corresponding to No. given in Table 99
*10: Blending rate (parts by weight) of solid lubricant to 100 parts by weight of solid matter of resin

TABLE 114

| | | | | Secondary layer coating | | | |
|---|---|---|---|---|---|---|---|
| | Plating steel | Primary layer coating | Resin | Ion-exchanged silica (a) | Fine particles silica (b) | | (a) + (b) |
| No. | plate *1 | Coating composition *2 | composition *3 | blending rate *4 | Type *5 | Blending rate *6 | Blending rate *7 |
| 123 | 1 | 1 | 1 | 30 | 1 | 5 | 35 |

TABLE 114-continued

|     | (a)/(b) | Solid lubricant (c) | | Drying | Coating | |
|-----|---------|---------------------|---|--------|---------|---|
| No. | Weight ratio *8 | Type *9 | Blending rate *10 | temperature (° C.) | thickness (μm) | Classification |
| 123 | 6/1 | 1 | 10 | 230 | 1.5 | Example |

*1: Corresponding to No. given in Table 97
*2: Corresponding to No. given in Table 100
*3: Corresponding to No. given in Table 101
*5: Corresponding to No. given in Table 4
*6: Blending rate (parts by weight) of fine particles silica to 100 parts by weight of solid matter of resin
*7: Blending rate (parts by weight) of ion-exchanged silica to 100 parts by weight of solid matter of resin
*8: Weight ratio of ion-exchanged silica (a) and fine particles silica (b) of solid matter of resin
*9: Corresponding to No. given in Table 99
*10: Blending rate (parts by weight) of solid lubricant to 100 parts by weight of solid matter of resin

Best Mode 4

The organic coating steel sheet according to the present invention is basically characterized in that a chemical conversion treatment coating is formed on the surface of a zinc base plating steel sheet or an aluminum base plating steel sheet, and that, further on the chemical conversion treatment coating, a reaction is given between a film-forming organic resin (A) and an active-hydrogen-laden compound (B), a part or whole of which compound (B) consists of a hydrazine derivative (C) containing active hydrogen, thus applying the hydrazine derivative (C) which is the reaction product as the base resin as a chelating group to the film-forming resin (A), and that zinc phosphate and/or aluminum phosphate (a) is blended to the base resin as a rust-preventive additive, and that, at need, further a calcium compound (b) is blended to the base resin.

The corrosion-preventive mechanism of the organic coating comprising above-described specific reaction product is not fully analyzed. The mechanism is, however, presumably the following. By adding a hydrazine derivative, not applying a simple low molecular weight chelating agent, to the film-forming organic resin, (1) the dense organic polymer coating gives an effect to shut-off corrosion causes such as oxygen and chlorine ions, (2) the hydrazine derivative is able to form a stable passive layer by strongly bonding with the surface of the primary layer coating, and (3) the free hydrazine derivative in the coating traps the zinc ion which is eluted by a corrosion reaction, thus forming a stable insoluble chelated compound layer, which suppresses the formation of an ion conduction layer at interface to suppress the progress of corrosion. These work effects should effectively suppress the development of corrosion, thus giving excellent corrosion resistance.

As a result, even when a chemical conversion treatment coating (such as phosphate treatment coating) which contains no hexavalent chromium is used as the chemical conversion treatment coating on the base material, the obtained corrosion resistance is equivalent to that in the case of using a chromate coating as the chemical conversion treatment coating. Furthermore, the obtained corrosion-preventive effect is combined with the corrosion-preventive effect of the organic coating, so that the attained corrosion resistance is markedly higher than that of conventional chromated steel sheets, while attaining superior chromium elution resistance.

Particularly when a resin containing epoxy group is used as the film-forming organic resin (A), a dense barrier coating is formed by the reaction between the epoxy-group-laden resin and a cross-linking agent. Thus, the formed barrier coating has excellent penetration-suppression performance against the corrosion causes such as oxygen, and gains excellent bonding force with the base material owing to the hydroxyl group in the molecule, which results in particularly superior corrosion resistance.

Further excellent corrosion resistance is obtained by using an active-hydrogen-laden pyrazole compound and/or an active-hydrogen-laden triazole compound as the hydrazine derivative (C) containing active hydrogen.

As in the case of prior art, blending simply a hydrazine derivative with the film-forming organic resin gives very little improvement in corrosion-suppression. The reason is presumably that the hydrazine derivative which does not enter the molecules of the film-forming organic resin forms a chelate compound with zinc which is eluted under a corrosive environment, and the chelate compound cannot form a dense barrier layer because of low molecular weight. To the contrary, introduction of a hydrazine derivative into the molecules of film-forming organic resin, as in the case of present invention, provides markedly high corrosion-suppression effect.

According to the organic coating steel sheet of the present invention, further high anti-corrosive performance (self-repair work at coating-defect section) is attained by blending adequate amount of zinc phosphate and/or aluminum phosphate (a) with an organic coating consisting of above-described specific reaction products. The corrosion-preventive mechanism which is obtained by blending the zinc phosphate and/or aluminum phosphate (a) with the specific organic coating is speculated to proceed conforming to the reaction steps given below.

| | |
|---|---|
| [The first step]: | under a corrosive environment, zinc, aluminum, and the like which are the plating metals are eluted. |
| [The second step]: | Zinc phosphate and/or aluminum phosphate is hydrolyzed to dissociate to phosphoric acid ion. |
| [The third step]: | The eluted zinc ion and aluminum ion initiate complex-forming reactions with phosphoric acid ion to form a dense and slightly soluble protective coating, which coating then seals the defects on the coating to suppress the corrosion reactions. |

Also in the case that zinc phosphate and/or aluminum phosphate is blended with a general organic coating, corrosion-preventive effect is obtained to some extent. Nevertheless, when zinc phosphate and/or aluminum phosphate is blended with an organic coating consisting of a specific chelate-modified resin, as in the case of present invention, the combined corrosion-preventive effect of both compounds appears, which should provide markedly strong corrosion-preventive effect.

Furthermore, according to the organic coating steel sheet of the present invention, the corrosion resistance can further be increased by blending a zinc phosphate and/or aluminum phosphate (a) and calcium compound (b) together into the organic coating consisting of a specific reaction product as described above. The reason of the superior corrosion resistance is speculated as follows. The self-repair action by zinc phosphate and/or aluminum phosphate cannot fully suppress the corrosion reactions, though the action suppresses the corrosion reactions during very early period of the corrosion, because the action triggers the elution of plating metals as described in the first step given above. By applying a calcium compound which is less noble metal than zinc and aluminum, the calcium is preferentially eluted rather than zinc and aluminum which are noble than calcium, thus the corrosion reactions are suppressed without depending on the elution of plating metals. Through the mechanism, the combined rust-preventive effect resulted from combined use of zinc phosphate and/or aluminum phosphate with calcium compound would appear.

The chemical conversion treatment coating formed on the surface of a zinc plating steel sheet or an aluminum plating steel sheet is the same as the chemical conversion treatment coating described in the best mode 3.

The following is the description of the organic coating formed on the above-described chemical conversion treatment coating.

According to the present invention, the organic coating formed on the above-described chemical conversion treatment coating contains a product of reaction between a film-forming organic resin (A) and an active-hydrogen-laden compound (B), a part or whole of which compound (B) consists of a hydrazine derivative (C) containing active hydrogen, and a zinc phosphate and/or aluminum phosphate (a), and at need, further contains a calcium compound (b) and a solid lubricant (c), which organic coating has a thickness in a range of from 0.1 to 5 $\mu$m.

The kinds of film-forming organic resin (A) are not specifically limited if only the resin reacts with the active-hydrogen-laden compound (B), a part or whole of which compound (B) consists of a hydrazine derivative (C) containing active hydrogen, to bind the active-hydrogen-laden compound (B) with the film-forming organic resin by addition or condensation reaction, and adequately form the coating.

Examples of the film-forming organic resin (A) are epoxy resin, modified epoxy resin, polyurethane resin, polyester resin, alkyd resin, acrylic base copolymer resin, polybutadiene resin, phenol resin, and adduct or condensate thereof. These resins may be applied separately or blending two or more of them.

From the standpoint of reactivity, readiness of reaction, and corrosion-prevention, an epoxy-group-laden resin (D) in the resin is particularly preferred as the film-forming organic resin (A). The epoxy-group-laden resin (D) has no specific limitation if only the resin reacts with an active-hydrogen-laden compound (B), a part or whole of which compound (B) consists of a hydrazine derivative (C) containing active hydrogen, to bind with the active hydrogen-laden compound (B) by addition or condensation reaction, and adequately form the coating. Examples of the epoxy-group-laden resin (D) are epoxy resin, modified epoxy resin, acrylic base copolymer resin copolymerized with an epoxy-group-laden monomer, polybutadiene resin containing epoxy group, polyurethane resin containing epoxy group, and adduct or condensate of these resins. These resins may be applied separately or blending two or more of them together.

From the point of adhesiveness with plating surface and of corrosion resistance, epoxy resin and modified epoxy resin are particularly preferred among these epoxy-group-laden resins (D).

Examples of the above-described epoxy resins are: aromatic epoxy resins prepared by reacting a polyphenol such as bisphenol A, bisphenol F, and novorak type phenol with epihalohydrin such as epychlorohydrin followed by introducing glycidyl group thereinto, or further by reacting a polyphenol with thus obtained product containing glycidyl group to increase the molecular weight; aliphatic epoxy resin, and alicyclic epoxy resin. These resins may be applied separately or blending two or more of them together. If film-formation at a low temperature is required, the epoxy resins preferably have number-average molecular weights of 1500 or more.

The above-described modified epoxy resin may be a resin prepared by reacting epoxy group or hydroxyl group in one of the above-given epoxy resins with various kinds of modifying agents. Examples of the modified epoxy resin are epoxy-ester resin prepared by reacting with a drying oil fatty acid, epoxy-acrylate resin prepared by modifying with a polymerizable unsaturated monomer component containing acrylic acid or methacrylic acid, and urethane-modified epoxy resin prepared by reacting with an isocyanate compound.

Examples of the above-described acrylic base copolymer resin which is copolymerized with the above-described epoxy-group-laden monomer are the resins which are prepared by solution polymerization, emulsion polymerization, or suspension polymerization of an unsaturated monomer containing epoxy group with a polymerizable unsaturated monomer component containing acrylic acid ester or methacrylic acid ester as the essential ingredient.

Examples of the above-described unsaturated monomer component are: C1–24 alkylester of acrylic acid or methacrylic acid, such as methyl(meth)acrylate, ethyl(meth)acrylate, propyl(meth)acrylate, n-iso- or tert-butyl(meth)acrylate, hexyl(meth)acrylate, 2-ethylhexyl(meth)acrylate, decyl(meth)acrylate, lauryl(meth)acrylate; C1–4 alkylether compound of acrylic acid, methacrylic acid, styrene, vinyltoluene, acrylamide, acrylonitrile, N-methylol(meth)acrylamide, N-methylol(meth)acrylamide; and N,N-diethylaminoethylmethacrylate.

The unsaturated monomer having epoxy group has no special limitation if only the monomer has epoxy group and polymerizable unsaturated group, such as glycidylmethacrylate, glycidylacrylate, 3,4-epoxycyclohexylmethyl(meth)acrylate.

The acrylic base copolymer resin which was copolymerized with the epoxy-group-laden monomer may be a resin which is modified by polyester resin, epoxy resin, or phenol resin.

A particularly preferred epoxy resin described above is an epoxy resin as a product of the reaction between bisphenol A and epihalohydrin because of superior corrosion resistance.

The method for manufacturing that kind of bisphenol A type epoxy resin is widely known in the industry concerned.

In the above-given chemical formula, q value is in a range of from 0 to 50, preferably from 1 to 40, more preferably from 2 to 20.

The film-forming organic resin (A) may be either organic solvent dissolving type, organic solvent dispersing type, water dissolving type, or water dispersing type.

According to the present invention, a hydrazine derivative is introduced into the molecules of the film-forming organic resin (A). To do this, at least a part of the active-hydrogen-laden compound (B), (preferably whole thereof), is necessary to be a hydrazine derivative (C) containing active hydrogen.

When the film-forming organic resin (A) is an epoxy-group-laden resin, examples of the active-hydrogen-laden compound (B) reacting with the epoxy group are listed below. One or more of these compounds (B) may be applied. Also in that case, at least a part of the active-hydrogen-laden compound (B), (preferably whole thereof), is necessary to be a hydrazine derivative (C) containing active hydrogen.

A hydrazine derivative containing active hydrogen

A primary or secondary amine compound containing active hydrogen

An organic acid such as ammonia and carboxylic acid

A halogenated hydrogen such as hydrogen chloride

An alcohol, a thiol

A hydrazine derivative containing no active hydrogen or a quaternary chlorinating agent which is a mixture with a ternary amine.

Examples of the above-described hydrazine derivative (C) containing active hydrogen are the following.

Hydrazide compound such as carbohydrazide, propionic acid hydrazide, salicylic acid hydrazide, adipic acid hydrazide, sebacic acid hydrazide, dodecanic acid hydrazide, isophtharic acid hydrazide, thiocarbo-hydrazide, 4,4'-oxy-bis-benzenesulfonyl hydrazide, benzophenone hydrazone, amino-polyacrylamide hydrazide;

Pyrazole compound such as pyrazole, 3,5-dimethylpyrazole, 3-methyl-5-pyrazolone, 3-amino-5-methylpyrazole;

Triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (mono hydrate), 6-methyl-8-hydroxytriazolopyridazine, 6-phenyl-8-hydroxytriazolopyrydazine, 5-hydroxy-7-methyl-1,3,8-triazaindolizine;

Tetrazole compound such as 5-phenyl-1,2,3,4-tetrazole, 5-mercapto-1-phenyl-1,2,3,4-tetrazole;

Thiadiazole compound such as 5-amino-2-mercapto-1,3,4-thiadiazole, 2,5-dimercapto-1,3,4-thiadiazole;

Pyridazine compound such as maleic acid hydrazide, 6-methyl-3-pyridazone, 4,5-dichloro-3-pyridazone, 4,5-dibromo-3-pyridazone, 6-methyl-4,5-dihydro-3-pyridazone. Among these compounds, particularly preferred ones are pyrazole compound and triazole compound which have cyclic structure of five- or six-membered ring and which have nitrogen atom in the cyclic structure.

These hydrazine derivatives may be applied separately or blending two or more of them together.

Examples of above-described amine compound having active hydrogen, which can be used as a part of the active-hydrogen-laden compound (B), are the following.

A compound prepared by heating to react a primary amino group of an amine compound containing a single secondary amino group of diethylenetriamine, hydroxylaminoethylamine, ethylaminoethylamine, methylaminopropylamine, or the like and one or more of primary amino group, with ketone, aldehyde, or carboxylic acid, at, for example, approximate temperatures of from 100 to 230° C. to modify them to aldimine, ketimine, oxazoline, or imidazoline;

A secondary monoamine such as diethylamine, diethanolamine, di-n- or -iso-propanolamine, N-methylethanolamine, N-ethylethanolamine;

A secondary-amine-laden compound prepared by Michael addition reaction through the addition of monoalkanolamine such as monoethanolamine to dialkyl(meth)acrylamide;

A compound prepared by modifying a primary amino group of alkanolamine such as monoethanolamine, neopentanolamine, 2-aminopropanol, 3-aminopropanol, 2-hydroxy-2'(aminopropoxy)ethylether to ketimine.

As for the above-described quaternary chlorinating agents which are able to be used as a part of the active-hydrogen-laden compound (B), the hydrazine derivative having active hydrogen or ternary amine has no reactivity with epoxy group as it is. Accordingly, they are mixed with an acid to make them reactive with epoxy group. The quaternary chlorinating agent reacts with epoxy group with the presence of water, at need, to form a quaternary salt with the epoxy-group-laden resin.

The acid used to obtain the quaternary chlorinating agent may be organic acid such as acetic acid and lactic acid, or inorganic acid such as hydrochloric acid. The hydrazine derivative containing no active hydrogen, which is used to obtain quaternary chlorinating agent may be 3,6-dichloropyridazine. The ternary amine may be dimethylethanolamine, triethylamine, trimethylamine, tri-isopropylamine, methyldiethanolamine.

The product of the reaction between the film-forming organic resin (A) and the active-hydrogen-laden compound (B) a part of or whole of which consists of a hydrazine derivative (C) containing active hydrogen, may be prepared by reacting the film-forming organic resin (A) with the active-hydrogen-laden compound (B) at temperatures of from 10 to 300° C., preferably from 50 to 150° C., for about 1 to about 8 hours.

The reaction may be carried out adding an organic solvent. The kind of adding organic solvent is not specifically limited. Examples of the organic solvent are: ketone such as acetone, methyethylketone, methylisobutylketone, dibutylketone, cyclohexanone; alcohol or ether having hydroxyl group, such as ethanol, butanol, 2-ethylhexylalcohol, benzylalcohol, ethyleneglycol, ethyleneglycol mono-isopropylether, ethyleneglycol monobutylether, ethyleneglycol monohexylether, propyleneglycol, propyleneglycol monomethylether, diethyleneglycol, diethyleneglycol monoethylether, diethyleneglycol monobutylether; ester such as ethylacetate, butylacetate, ethyleneglycol monobutylether acetate; and aromatic hydrocarbon such as toluene and xylene. These compounds may be applied separately or blending two or more of them together.

From the viewpoint of solubility and coating film-forming performance with epoxy resin, ketone group or ether group solvents are particularly preferred.

The blending ratio of the film-forming organic resin (A) and the active-hydrogen-laden compound (B), a part or whole of which compound consists of a hydrazine derivative (C) containing active hydrogen, is in a range of from 0.5 to 20 parts by weight of the active-hydrogen-laden compound (B), more preferably from 1.0 to 10 parts by weight, to 100 parts by weight of the film-forming organic resin (A).

When the film-forming organic resin (A) is an epoxy-group-laden resin (D), the blending ratio of the epoxy-group-laden resin (D) to the active-hydrogen-laden compound (B) is preferably, from the viewpoint of corrosion resistance and other performance, in a range of from 0.01 to 10 as the ratio of the number of active hydrogen groups in the active-hydrogen-laden compound (B) to the number of epoxy groups in the epoxy-group-laden resin (D), or [the number of active hydrogen groups/the number of epoxy groups], more preferably from 0.1 to 8, most preferably from 0.2 to 4.

A preferred range of hydrazine derivative (C) containing active hydrogen in the active-hydrogen-laden compound (B) is from 10 to 100 mole %, more preferably from 30 to 100 mole %, and most preferably from 40 to 100 mole %. If the rate of hydrazine derivative (C) containing active hydrogen is less than 10 mole %, the organic coating fails to have satisfactory rust-preventive function, thus the obtained rust-preventive effect becomes similar with the case of simple blending of a film-forming organic resin with a hydrazine derivative.

To form a dense barrier coating according to the present invention, it is preferable that a curing agent is blended into the resin composition, and that the organic coating is heated to cure.

Suitable methods for curing to form a resin composition coating include (1) a curing method utilizing a urethanation reaction between isocyanate and hydroxide group in the base resin, and (2) a curing method utilizing an ether reaction between hydroxide group in the base resin and an alky-letherified amino resin which is prepared by reacting between a part of or whole of a methylol compound which is prepared by reacting formaldehyde with one or more of melamine, urea, and benzoguanamine, and a C1–5 primary alcohol. As of these methods, particularly preferred one is to adopt a urethanation reaction between isocyanate and hydroxyl group in the base resin as the main reaction.

The polyisocyanate compound used in the curing method (1) described above is a compound prepared by partially reacting an aliphatic, alicyclic (including heterocyclic), or aromatic isocyanate compound, or a compound thereof using a polyhydric alcohol. Examples of that kind of polyisocyanate compound are the following. m- or p-Phenylene diisocyanate, 2,4- or 2,6-trilene diisocyanate, o- or p-xylylene diisocyanate, hexamethylene diisocyanate, dimer acid diisocyanate, isophorone diisocyanate;

A compound of product of reaction between separate or mixture of the compounds given in (1) with a polyhydric alcohol (for example, a dihydric alcohol such as ethyleneglycol and propyleneglycol, a trihydric alcohol such as glycerin and trimethylolpropane, a tetrahydric alcohol such as pentaerythritol, and hexahydric alcohol such as sorbitol and dipentaerythritol) leaving at least two isocyanate within a molecule.

These polyisocyanate compounds may be used separately or mixing two or more of them together.

Examples of protective agent (blocking agent) of the polyisocyanate compound are the following.

Aliphatic monoalcohol such as methanol, ethanol, propanol, butanol, octylalcohol;

Monoether of ethyleneglycol and/or diethyleneglycol, for example, monoether of methyl, ethyl, propyl (n-, iso-), butyl (n-, iso-, sec-);

Aromatic alcohol such as phenol and cresol;

Oxime such as acetoxime and methylethylketone oxime.

Through reaction between one or more of these compounds with above-described polyisocyanate compound, a polyisocyanate compound thus obtained is stably protected at least at normal temperature.

It is preferable to blend that kind of polyisocyanate compound (E) with a film-forming organic resin (A) as the curing agent at a range of (A)/(E)=95/5 to 55/45 (weight ratio of non-volatile matter), more preferably (A)/(E)=90/10 to 65/35. Since polyisocyanate compounds have water-absorbing property, blending of the compound at ratios above (A)/(E)=55/45 degrades the adhesiveness of the organic coating. If top coating is given on the organic coating, unreacted polyisocyanate compound migrates into the coating film to induce hindrance of curing or insufficient adhesiveness of the coating film. Accordingly, the blending ratio of the polyisocyanate compound (E) is preferably not more than (A)/(E)=55/45.

The film-forming organic resin (A) is fully cross-linked by the addition of above-described cross-linking agent (curing agent). For further increasing the cross-linking performance at a low temperature, it is preferable to use a known catalyst for enhancing curing. Examples of the curing-enhancing catalyst are N-ethylmorpholine, dibutyltin dilaurate, cobalt naphthenate, tin(II)chloride, zinc naphthenate, and bismuth nitrate.

When an epoxy-group-laden resin is used as the film-forming organic resin (A), the epoxy-group-laden resin may be blended with a known resin such as that of acrylic, alkyd, and polyester to improve the physical properties such as adhesiveness to some extent.

According to the present invention, the organic coating is blended with zinc phosphate and/or aluminum phosphate (a) as the rust-preventive additive.

There is no specific limitation on the skeleton and degree of condensation of phosphoric acid ions for the zinc phosphate and the aluminum phosphate blended in the organic coating. They may be normal salt, dihydrogen salt, monohydrogen salt, or phosphate. The normal salt includes orthophosphoric acid and all the condensed phosphates such as polyphosphate. For example, zinc phosphate may be LF-BOSEI ZP-DL produced by Kikuchi Color Co., and aluminum phosphate ma y be K-WHITE produced by TAYCA CORPORATION.

These zinc phosphates and aluminum phosphates dissociate to phosphoric acid ion by hydrolysis under a corrosive environment, and form a protective coating through the complex-forming reaction with the eluted metals.

The rust-preventive mechanism in the case of addition of zinc phosphate and/or aluminum phosphate (a) to organic coating is described above. Particularly according to the present invention, markedly excellent corrosion preventive effect is attained by combining a specific chelate-modified resin which is the film-forming organic resin with zinc phosphate and/or aluminum phosphate (a), thus inducing the combined effect of the corrosion-suppression effect of the chelate-modified resin at the anodic reaction section with the corrosion-suppression effect of the zinc phosphate and/or aluminum phosphate (a).

A preferred range of blending ratio of the zinc phosphate and/or aluminum phosphate (a) in the organic resin coating is 1 to 100 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 5 to 80 parts by weight (solid matter), and most preferably from 10 to 50 parts by weight (solid matter). If the blending ratio of the zinc phosphate and/or aluminum phosphate (a) becomes less than 1 part by weight, the effect of improved corrosion resistance after alkaline degreasing becomes small. If the blending ratio of the zinc phosphate and/or aluminum phosphate (a) exceeds 100 parts by weight, the corrosion resistance degrades, which is unfavorable.

According to the present invention, markedly high corrosion resistance is attained by combined addition of zinc phosphate and/or aluminum phosphate (a) and a calcium compound (b) to the organic coating. That is, the combined addition of zinc phosphate and/or aluminum phosphate (a) and calcium compound (b) induces above-described combined rust-preventive mechanism which gives markedly excellent corrosion-preventive effect.

Calcium compound (b) may be either one of calcium oxide, calcium hydroxide, and calcium salt, and at least one of them may be adopted. There is no specific limitation on the kind of calcium salt, and the salt may be a single salt containing only calcium as cation, for example, calcium silicate, calcium carbonate, and calcium phosphate, and may he complex salt containing cation other than calcium cation, for example, zinc calcium phosphate, magnesium calcium phosphate.

Since calcium compounds elute preferentially to metals under a corrosive environment, it presumably induces a complex-forming reaction with phosphoric acid ion without triggering the elution of plating metal, thus forming a dense and slightly-soluble protective coating to suppress the corrosion reactions.

A preferred blending ratio of combined addition of zinc phosphate and/or aluminum phosphate (a) and calcium compound (b) to the organic resin coating is from 1 to 100 parts by weight as the sum of them (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 5 to 80 parts by weight, and a preferred blending weight ratio (solid matter) of the zinc phosphate and/or aluminum phosphate (a) and the calcium compound (b), (a)/(b), is from 99/1 to 1/99, more preferably from 95/5 to 40/60, and most preferably from 90/10 to 60/40.

If the blending amount of the sum of zinc phosphate and/or aluminum phosphate (a) and calcium compound (b) is less than 1 part by weight, the improved effect of corrosion resistance after alkaline degreasing becomes small. If the blending amount of the sum of zinc phosphate and/or aluminum phosphate (a) and calcium compound (b) exceeds 100 parts by weight, the corrosion resistance degrades, which is unfavorable. If the blending ratio (solid matter) of zinc phosphate and/or aluminum phosphate (a) to calcium compound (b) is less than 1/99, the corrosion resistance is inferior. If the blending ratio (solid matter) of zinc phosphate and/or aluminum phosphate (a) to calcium compound (b) exceeds 99/1, the effect of combined addition of zinc phosphate and/or aluminum phosphate (a) and calcium compound (b) cannot be fully attained.

The organic coating may further contain, adding to the above-described inorganic rust-preventive pigments, corrosion-suppression agents such as oxide fine particles (for example, fine particles of silicon oxide, aluminum oxide, zirconium oxide, titanium oxide, cerium oxide, antimonium oxide), molybdate, phosphomolybdate (for example, aluminum phosphomolybdate), organic phosphoric acid and its salt (for example, phytic acid, phytiate, -phosphonic acid, phosphonate, their metal salt, alkali metal salt, and alkali earth metal salt), organic inhibitor (for example, hydrazine derivative, thiol compound, dithiocarbamate).

The organic coating may, at need, further include a solid lubricant (c) to improve the workability of the coating.

Examples of applicable solid lubricant according to the present invention are the following.
(1) Polyolefin wax, paraffin wax: for example, polyethylene wax, synthetic paraffin, natural paraffin, microwax, chlorinated hydrocarbon;
(2) Fluororesin fine particles: for example, polyfluoroethylene resin (such as poly-tetrafluoroethylene resin), polyvinylfluoride resin, polyvinylidenefluoride resin.

In addition, there may be applied fatty acid amide base compound (such as stearic acid amide, palmitic acid amide, methylene bis-stearoamide, ethylene bis-stearoamide, oleic acid amide, ethyl acid amide, alkylene bis-fatty acid amide), metallic soap (such as calcium stearate, lead stearate, calcium laurate, calcium palmate), metallic sulfide (molybdenum disulfide, tungsten disulfide), graphite, graphite fluoride, boron nitride, polyalkyleneglycol, and alkali metal sulfate.

Among those solid lubricants, particularly preferred ones are polyethylene wax, fluororesin fine particles (particularly poly-tetrafluoroethylene resin fine particles).

Applicable polyethylene wax include: Sheridust 9615A, Sheridust 3715, Sheridust 3620, Sheridust 3910 (trade names) manufactured by Hoechst Co., Ltd.; SUNWAX 131-P, SUNWAX 161-P (trade names) manufactured by Sanyo Chemical Industries, Ltd.; CHEMIPEARL W-100, CHEMIPEARL W-200, CHEMIPEARL W-500, CHEMIPEARL W-800, CHEMIPEARL W-950 (trade names) manufactured by Mitsui Petrochemical Industries, Ltd.

A most preferred fluororesin fine particle is tetrafluoroethylene fine particle. Examples of the fine particles are LUBRON L-2, LUBRON L-5 (trade names) manufactured by Daikin Industries, Ltd.; MP 1100, MP 1200 (trade names; manufactured by Du Pont-Mitsui Company, Ltd.); FLUON DISPERSION AD1, FLUON DISPERSION AD2, FLUON L141J, FLUON L150J, FLUON L155J (trade names) manufactured by Asahi ICI Fluoropolymers Co., Ltd.

As of these compounds, combined use of polyolefin wax and tetrafluoroethylene fine particles is expected to provide particularly excellent lubrication effect.

A preferred range of blending ratio of the solid lubricant (c) in the organic resin coating is from 1 to 80 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 3 to 40 parts by weight (solid matter). If the blending ratio of the solid lubricant (c) becomes less than 1 part by weight, the effect of lubrication is small. If the blending ratio of the solid lubricant (b) exceeds 80 parts by weight, the painting performance degrade, which is unfavorable.

The organic coating of the organic coating steel sheet according to the present invention normally consists mainly of a product (resin composition) of reaction between a film-forming organic resin (A) and an active-hydrogen-laden compound (B) a part of or whole of which consists of a hydrazine derivative (C) containing active hydrogen). And, a zinc phosphate and/or aluminum phosphate (a) is added, further at need, a calcium compound (b), a solid lubricant (c), and a curing agent may further be added to the organic coating. Furthermore, at need, there may be added other additives such as organic coloring pigment (for example, condensing polycyclic organic pigment, phthalocyanine base organic pigment), coloring dye (for example, azo dye soluble in organic solvent, azo metal dye soluble in water), inorganic pigment (for example, titanium oxide), chelating agent (for example, thiol), conductive pigment (for example, metallic powder of zinc, aluminum, nickel, or the like, iron phosphide, antimony-dope type tin oxide), coupling agent (for example, silane coupling agent and titanium coupling agent), melamine-cyanuric acid additive.

The paint composition for film-formation containing above-described main component and additive components normally contains solvent (organic solvent and/or water), and, at need, further a neutralizer or the like is added.

Applicable organic solvent described above has no specific limitation if only it dissolves or disperses the product of reaction between the above-described film-forming organic resin (A) and the active-hydrogen-laden compound (B), and adjusts the product as the painting composition. Examples of the organic solvent are the organic solvents given above as examples.

The above-described neutralizers are blended, at need, to neutralize the film-forming organic resin (A) to bring it to water-type. When the film-forming organic resin (A) is a cationic resin, acid such as acetic acid, lactic acid, and formic acid may be used as the neutralizer.

The organic coatings described above are formed on the above-described composite oxide coating.

The dry thickness of the organic coating is in a range of from 0.1 to 5 $\mu$m, preferably from 0.3 to 3 $\mu$m, and most preferably from 0.5 to 2 $\mu$m. If the thickness of the organic coating is less than 0.1 $\mu$m, the corrosion resistance becomes insufficient. If the thickness of the organic coating exceeds 5 $\mu$m, the conductivity and the workability degrade.

The following is the description about the method for manufacturing an organic coating steel sheet according to the present invention.

The organic coating steel sheet according to the present invention is manufactured by the steps of: treating the surface of a zinc base plating steel sheet or an aluminum base plating steel sheet by chemical conversion treatment; applying a paint composition which contains the product of reaction between above-described film-forming organic resin (A) and an active-hydrogen-laden compound (B) a part of or whole of which consists of a hydrazine derivative (C) containing active hydrogen, which product of reaction is preferably the main component, further contains a zinc phosphate and/or aluminum phosphate (a), and at need, a calcium compound (b), a solid lubricant (c), and the like; heating to dry the product.

The surface of the plating steel sheet may be, at need, subjected to alkaline degreasing before applying the above-described treatment liquid, and may further be subjected to preliminary treatment such as surface adjustment treatment for further improving the adhesiveness and corrosion resistance.

In the case that a chemical conversion treatment coating containing no hexavalent chromium is formed as the chemical conversion treatment coating, the methods for applying the treatment liquid onto the plating steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight. the uniformizing appearance, and the uniformizing the film-thickness using air-knife method and roll-squeezing method.

After the coating of treatment liquid as described above, there may applied, at need, rinsing with water, followed by heating to dry.

Method for heating to dry the coated treatment liquid is not limited. For example, dryer, hot air oven, high frequency induction heating furnace, infrared heating furnace may be applied.

The heating and drying treatment is preferably conducted at reaching temperatures of from 40 to 350° C., more preferably from 80 to 200° C., and most preferably from 80 to 160° C. If the heating temperature is less than 40° C., excess amount of water is left in the coating, which results in insufficient corrosion resistance. If the heating temperature exceeds 350° C., the operation becomes uneconomical and defects likely appear in the coating to degrade the corrosion resistance.

After forming the chemical conversion treatment coating on the surface of the zinc base plating steel sheet or the aluminum base plating steel sheet, as described above, a paint composition for forming an organic coating is applied on the composite oxide coating. Method for applying the paint composition is not limited, and examples of the method are coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, generally the plate is heated to dry without rinsing with water. After applying the paint composition, however, water-rinse step may be given.

Method for heating to dry the paint composition is not limited. For example, dryer, hot air oven, high frequency induction heating furnace, infrared heating furnace may be applied. The heating treatment is preferably conducted at reaching temperatures of from 50 to 350° C., more preferably from 80 to 250° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

As described above, the present invention includes a steel sheet having an organic coating on both sides or on side thereof. Accordingly, modes of the steel sheet according to the present invention include, for example, the followings.

(1) "Plating film—Chemical conversion treatment coating—Organic coating" on one side of the steel sheet, and "Plating film" on other side of the steel sheet;

(2) "Plating film—Chemical conversion treatment coating—Organic coating" on one side of the steel sheet, and "Plating film—Chemical conversion treatment coating" on other side of the steel sheet;

(3) "Plating film—Chemical conversion treatment coating—Organic coating" on both sides of the steel sheet;

(4) "Plating film—Chemical conversion treatment coating—Organic coating" on one side of the steel sheet, and "Plating film—Organic coating" on other side of the steel sheet;

Embodiments

Resin compositions (reaction products) for forming the organic coating were synthesized in the following-described procedure.

SYNTHESIS EXAMPLE 1

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylethylketone were charged in a flask with four necks, which mixture was then heated to 14° C. to let them react for 4 hours. Thus, an epoxy resin having an epoxy equivalent of 1391 and a solid content of 90% was obtained. A 1500 parts of ethyleneglycol monobutylether was added to the epoxy resin, which were then cooled to 100° C. A 96 parts of 3,5-dimethylpyrazole (molecular weight 96) and 129 parts of dibutylamine (molecular weight 129) were added to the cooled resin, and they were reacted for 6 hours to eliminate the epoxy group. Then, a 205 parts of methylisobutylketone was added while the mixture was cooling, to obtain a pyrazole-modified epoxy resin having 60% of solid matter. The epoxy resin is defined as the resin composition (1). The resin composition (1) is a product of the reaction between the film-forming organic resin (A) and the active-hydrogen-laden compound that contains 50 mole % of hydrazine derivative (C) containing active hydrogen.

SYNTHESIS EXAMPLE 2

A 4000 parts of EP1007 (epoxy equivalent 2000, manufactured by Yuka Shell Epoxy Co., Ltd.) and 2239 parts of ethyleneglycol monobutylether were charged into a flask with four necks, which mixture was then heated to 120° C. to let them react for 1 hour to fully dissolve the epoxy resin. The mixture was cooled to 100° C. A 168 parts of 3-amino-1,2,4-triazole (molecular weight 84) was added to the mixture, and they were reacted for 6 hours to eliminate the epoxy group. Then, a 540 parts of methylisobutylketone was added while the mixture was cooling, to obtain a triazole-modified epoxy resin having 60% of solid matter. The epoxy resin is defined as the resin composition (2). The resin composition (2) is a product of the reaction between the film-forming organic resin (A) and the active-hydrogen-laden compound that contains 100 mole % of hydrazine derivative (C) containing active hydrogen.

SYNTHESIS EXAMPLE 3

A 222 parts of isophorone diisocyanate (epoxy equivalent 111) and 34 parts of methylisobutylketone were charged into a flask with four necks. A 87 parts of methylethylketoxime (molecular weight 87) was added to the mixture dropwise for 3 hours while keeping the mixture at temperatures ranging from 30 to 40° C., then the mixture was kept to 40° C. for 2 hours. Thus, a block isocyanate having isocyanate equivalent of 309 and solid content of 90% was obtained.

A 1489 parts of EP828 (epoxy equivalent 187, manufactured by Yuka Shell Epoxy Co., Ltd.), 684 parts of bisphenol A, 1 part of tetraethylammonium bromide, and 241 parts of methylisobutylketone were charged into a flask with four necks, which mixture was then heated to 140° C. to let them react for 4 hours. Thus, an epoxy resin having epoxy equivalent of 1090 and solid content of 90% was obtained. To the epoxy resin, 1000 parts of methylisobutylketone was added, then the mixture was cooled to 100° C., and 202 parts of 3-mercapto-1,2,4-triazole (molecular weight 101) was added to the mixture, and let the mixture react for 6 hours to fully eliminate the epoxy group. After that, the part-block isocyanate of the above-described 90% solid portion was added to the reaction product to let the mixture react at 100° C. for 3 hours, and the vanish of isocyanate group was confirmed. Further, 461 parts of ethyleneglycol monobutylether was added to the product to obtain a triazole-modified epoxy resin having 60% solid content. The product is defined as the resin composition (3). The resin composition (3) is a product of the reaction between the film-forming organic resin (A) and the active-hydrogen-laden compound that contains 100 mole % of hydrazine derivative (C) containing active hydrogen.

SYNTHESIS EXAMPLE 4

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylisobutylketone were charged into a flask with four necks, which mixture was then heated to 140° C. to let them react for 4 hours. Thus, an epoxy resin having epoxy equivalent of 1391 and solid content of 90% was obtained. To the epoxy resin, 1500 parts of ethyleneglycol monobutylether was added, then the mixture was cooled to 100° C., and 258 parts of dibutylamine (molecular weight 129) was added to the mixture, and let the mixture react for 6 hours to fully eliminate the epoxy group. While cooling the mixture, 225 parts of methylisobutylketone was further added to the mixture to obtain an epoxyamine adduct having 60% solid content. The product is defined as the resin composition (4). The resin composition (4) is a product of the reaction between the film-forming organic resin (A) and the active-hydrogen-laden compound of hydrazine derivative (C) containing no active hydrogen.

A curing agent was blended to each of the synthesized resin compositions (1) through (4) to prepare the resin compositions (paint compositions) listed in Table 119. To these paint compositions, zinc phosphate and/or aluminum phosphate shown in Table 120, calcium compound shown in Table 116, and solid lubricant shown in Table 117 were added at respective adequate amounts, then the mixture was dispersed to each other using a paint dispersion apparatus (a sand grinder) to prepare desired plating compositions.

EXAMPLE 1

To obtain organic coating steel sheets for household electric appliances, building materials, and automobile parts, the plating steel sheets shown in Table 115 were used as the target base plates, which plates were prepared by applying zinc base plating or aluminum base plating on the cold-rolled steel sheets having a plate thickness of 0.8 mm and a surface roughness Ra of 1.0 $\mu$m. The surface of the plating steel sheet was treated by alkaline degreasing and water washing, followed by drying, then the chemical conversion treatment was applied using the treatment liquid under the treatment condition shown in Table 118 to form the chemical conversion coating. Then, the paint composition given in Table 119 was applied using a roll coater, which was then heated to dry to form the secondary layer coating (the organic coating), thus manufactured the organic coating steel sheets as Examples and Comparative Examples. The thickness of the secondary layer coating was adjusted by the solid content in the treatment liquid (heating residue) or applying conditions (roll pressing force, rotational speed, and other variables).

To each of thus obtained organic coating steel sheets, evaluation was given in terms of quality performance (appearance of coating, white-rust resistance, white-rust resistance after alkaline degreasing, paint adhesiveness, and workability). The results are given in Tables 121 through 134 along with the structure of chemical conversion treatment layer coating and of organic coating.

The quality performance evaluation on the organic coating steel sheets was carried out by the same procedure as in the best mode 1.

As the conventional reaction type chromate steel sheet treatment liquid, a solution containing 30 g/l of anhydrous chromic acid, 10 g/l of phosphoric acid, 0.5 g/l of NaF, and 4 g/l of $K_2TiF_6$ was used. After spray treatment at a bath temperature of 40° C., the steel sheet was washed with water and was dried, thus a chromated steel sheet having a chromium coating weight of 20 $mg/m^2$ as metallic chromium as prepared. Thus obtained steel sheet was subjected to the salt spray test under the same condition that applied to Examples, and the plate generated white-rust within about 24 hours. Consequently, the results of Examples show that the organic coating steel sheets according to the present invention provide remarkably superior corrosion resistance to the conventional type chromate treated steel sheets.

TABLE 115

[Plating steel plate]

| No. | Type | Coating weight (g/m²) |
|---|---|---|
| 1 | Electrolytically galvanized steel plate | 20 |

TABLE 116

[Calcium compound]

| No. | Type and compound |
|---|---|
| 1 | Calcium carbonate |
| 2 | Calcium silicate |
| 3 | Calcium phosphate |
| 4 | Calcium phosphate, zinc |
| 5 | Calcium carbonate (60 wt. %) + calcium silicate (40 wt. %) |
| 6 | Calcium carbonate (12 wt. %) + calcium silicate (6 wt. %) + calcium phosphate, zinc (82 wt. %) |

TABLE 117

[Solid lubricant]

| No. | Type | Trade name |
|---|---|---|
| 1 | Polyethylene wax | LUVAX 1151 Produced by Nippon Seiro Co. |

TABLE 118

| | Target composition | | | | Coating | Adaptability to the |
|---|---|---|---|---|---|---|
| No. | Type | Trade name | Remark | Treatment method | thickness | conditions of the invention |
| 1 | Lithium silicate | Nissan Kagaku Kogyo Co. LSS-35 | $SiO_2/LiO_2$ = 3.5 | Coating → drying at 150° C. | 0.5 μm | Satisfies |
| 2 | Lithium silicate | Nissan Kagaku Kogyo Co. LSS-45 | $SiO_2/LiO_2$ = 4.5 | Coating → drying at 150° C. | 0.5 μm | Satisfies |
| 3 | Lithium silicate | Nissan Kagaku Kogyo Co. LSS-75 | $SiO_2/LiO_2$ = 7.5 | Coating → drying at 150° C. | 0.5 μm | Satisfies |
| 4 | Lithium silicate | DuPont Polysilicate 48 | $SiO_2/LiO_2$ = 4.6–5.0 | Coating → drying at 150° C. | 0.5 μm | Satisfies |
| 5 | Phosphate treatment | Nihon Parkerizing Co. PB3312 | — | Spray → drying | 2 μm | Satisfies |
| 6 | Organic resin coating | Acrylic-ethylene copolymer | Organic resin:Colloidal silica = 100:10 | Coating → drying at 150° C. | 1 μm | Satisfies |
| 7 | Phitinic acid treatment | Mitsui Chemicals Inc. Phytinic acid 10 g/L aqueous solution | — | Coating → drying at 150° C. | 0.5 μm | Satisfies |
| 8 | Tannic acid treatment | Fuji Chemicals Inc. Tannin AL 10 g/L aqueous solution | — | Coating → drying at 150° C. | 0.5 μm | Satisfies |
| 9 | Polymer chelating agent | Miyoshi Oil & Fat Co. Dithiocarbamic acid Antimonate | — | Coating → drying at 150° C. | 0.5 μm | Satisfies |

TABLE 119

[Resin composition of secondary layer coating]

| | Base resin | | Curing agent | | | Adaptability to the |
|---|---|---|---|---|---|---|
| No. | Type *1 | Blending rate | Type | Blending rate | Catalyst | conditions of the invention |
| 1 | (1) | 100 parts | A | 5 parts | Dibutyltin dilaurate (0.2 part) | Satisfies |
| 2 | (1) | 100 parts | B | 25 parts | Dibutyltin dilaurate (1.0 part) | Satisfies |
| 3 | (1) | 100 parts | C | 25 parts | — | Satisfies |
| 4 | (2) | 100 parts | A | 50 parts | Dibutyltin dilaurate (2.0 part) | Satisfies |
| 5 | (2) | 100 parts | B | 50 parts | Dibutyltin dilaurate (3.0 part) | Satisfies |
| 6 | (2) | 100 parts | C | 80 parts | Dibutyltin dilaurate (4.0 part) | Satisfies |
| 7 | (3) | 100 parts | A | 25 parts | Cobalt naphthenate (1.0 part) | Satisfies |
| 8 | (3) | 100 parts | B | 10 parts | Tin (II) chloride (1.0 part) | Satisfies |
| 9 | (3) | 100 parts | C | 50 parts | N-ethylmorpholine (1.0 part) | Satisfies |
| 10 | (1) | 100 parts | D | 25 parts | — | Satisfies |
| 11 | (3) | 100 parts | D | 30 parts | — | Satisfies |

TABLE 119-continued

[Resin composition of secondary layer coating]

| No. | Base resin Type *1 | Base resin Blending rate | Curing agent Type | Curing agent Blending rate | Catalyst | Adaptability to the conditions of the invention |
|---|---|---|---|---|---|---|
| 12 | (4) | 100 parts | B | 25 parts | Dibutyltin dilaurate (1.0 part) | Dissatisfies |
| 13 | Aqueous solution of a hydrazine derivative (aqueous solution of 5 wt. % 3,5-dimethylpyrazole) | | | | | Dissatisfies |
| 14 | Mixture of an epoxyamine adduct and a hydrazine derivative (3 parts by weight of 3,5-dimethylpyrazole per 100 parts by weight of base resin is added to the composition No. 12, followed by agitating the mixture.) | | | | | Dissatisfies |

*1 The resin compositions (1) through (4) which were synthesized in Synthesis Examples 1 through 4 described in the body of this specification.

TABLE 120

[Zinc phosphate/aluminum phosphate]

| No. | Kind and composition |
|---|---|
| 1 | Zinc orthophosphate |
| 2 | Zinc polyphosphate |
| 3 | Zinc monohydrogenphosphate |
| 4 | Zinc dihydrogenphosphate |
| 5 | Zinc phosphite |
| 6 | Aluminum orthophosphate |
| 7 | Aluminum polyphosphate |
| 8 | Aluminum monohydrogenphosphate |
| 9 | Aluminum dihydrogenphosphate |
| 10 | Zinc polyphosphate (50 wt. %) + Aluminum monohydrogenphosphate (50 wt. %) |
| 11 | Zinc orthophosphate (50 wt. %) + Aluminum dihydrogenphosphate (50 wt. %) |

TABLE 121

| No. | Primary layer Plating steel plate *1 | Primary layer coating Coating composition *2 | Secondary layer coating Resin composition *3 | Secondary layer coating Zinc phosphate and/or aluminum phosphate (a) Type *4 | Secondary layer coating Zinc phosphate and/or aluminum phosphate (a) Blending ratio *5 | Drying temperature (° C.) | Coating thickness (μm) |
|---|---|---|---|---|---|---|---|
| 1 | 1 | 1 | 1 | 1 | 30 | 230 | 1.5 |
| 2 | 1 | 1 | 1 | 2 | 30 | 230 | 1.5 |
| 3 | 1 | 1 | 1 | 3 | 30 | 230 | 1.5 |
| 4 | 1 | 1 | 1 | 4 | 30 | 230 | 1.5 |
| 5 | 1 | 1 | 1 | 5 | 30 | 230 | 1.5 |
| 6 | 1 | 1 | 1 | 6 | 30 | 230 | 1.5 |
| 7 | 1 | 1 | 1 | 7 | 30 | 230 | 1.5 |
| 8 | 1 | 1 | 1 | 8 | 30 | 230 | 1.5 |
| 9 | 1 | 1 | 1 | 9 | 30 | 230 | 1.5 |
| 10 | 1 | 1 | 1 | 10 | 30 | 230 | 1.5 |
| 11 | 1 | 1 | 1 | 11 | 30 | 230 | 1.5 |
| 12 | 1 | 1 | 1 | — | — | 230 | 1.5 |

| No. | Performance Appearance | Performance White-rust resistance: SST 96 hrs | Performance White-rust resistance after alkaline degreasing: SST 96 hrs | Performance Paint adhesiveness | Classification *1 |
|---|---|---|---|---|---|
| 1 | ○ | ⊚ | ⊚ | ⊚ | Example |
| 2 | ○ | ⊚ | ⊚ | ⊚ | Example |
| 3 | ○ | ⊚ | ⊚ | ⊚ | Example |
| 4 | ○ | ⊚ | ⊚ | ⊚ | Example |
| 5 | ○ | ⊚ | ⊚ | ⊚ | Example |
| 6 | ○ | ⊚ | ⊚ | ⊚ | Example |
| 7 | ○ | ⊚ | ⊚ | ⊚ | Example |
| 8 | ○ | ⊚ | ⊚ | ⊚ | Example |
| 9 | ○ | ⊚ | ⊚ | ⊚ | Example |
| 10 | ○ | ⊚ | ⊚ | ⊚ | Example |
| 11 | ○ | ⊚ | ⊚ | ⊚ | Example |

TABLE 121-continued

|    |    |   |   |    |                     |
|----|----|---|---|----|---------------------|
| 12 | ○  | X | X | ⊚  | Comparative example |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition
※1: Example/Comparative example

TABLE 122

| No. | Plating steel plate *1 | Primary layer coating Coating composition *2 | Secondary layer coating Resin composition *3 | Zinc phosphate and/or aluminum phosphate (a) Type *4 | Blending ratio *5 | Drying temperature (° C.) | Coating thickness (μm) |
|-----|------|------|------|------|------|------|------|
| 13  | 1    | 1    | 1    | 1    | 1    | 230  | 1.5  |
| 14  | 1    | 1    | 1    | 1    | 5    | 230  | 1.5  |
| 15  | 1    | 1    | 1    | 1    | 10   | 230  | 1.5  |
| 16  | 1    | 1    | 1    | 1    | 20   | 230  | 1.5  |
| 17  | 1    | 1    | 1    | 1    | 25   | 230  | 1.5  |
| 18  | 1    | 1    | 1    | 1    | 40   | 230  | 1.5  |
| 19  | 1    | 1    | 1    | 1    | 50   | 230  | 1.5  |
| 20  | 1    | 1    | 1    | 1    | 80   | 230  | 1.5  |
| 21  | 1    | 1    | 1    | 1    | 100  | 230  | 1.5  |
| 22  | 1    | 1    | 1    | 1    | 150  | 230  | 1.5  |

| No. | Appearance | White-rust resistance: SST 96 hrs | White-rust resistance after alkaline degreasing: SST 96 hrs | Paint adhesiveness | Classification |
|-----|----|----|----|----|-------|
| 13 | ○ | ○  | ○  | ⊚ | Example |
| 14 | ○ | ○+ | ○+ | ⊚ | Example |
| 15 | ○ | ⊚  | ⊚  | ⊚ | Example |
| 16 | ○ | ⊚  | ⊚  | ⊚ | Example |
| 17 | ○ | ⊚  | ⊚  | ⊚ | Example |
| 18 | ○ | ○+ | ○+ | ⊚ | Example |
| 19 | ○ | ○+ | ○+ | ⊚ | Example |
| 20 | ○ | ○  | ○  | ⊚ | Example |
| 21 | ○ | ○- | ○- | ⊚ | Example |
| 22 | ○ | Δ  | Δ  | ⊚ | Comparative example |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition

TABLE 123

| No. | Plating steel plate *1 | Primary layer coating Coating composition *2 | Secondary layer coating Resin composition *3 | Zinc phosphate and/or aluminum phosphate (a) Type *4 | Blending ratio *5 | Drying temperature (° C.) | Coating thickness (μm) |
|-----|---|---|---|---|----|-----|------|
| 35  | 1 | 1 | 1 | 1 | 30 | 230 | 0.01 |
| 36  | 1 | 1 | 1 | 1 | 30 | 230 | 0.1  |
| 37  | 1 | 1 | 1 | 1 | 30 | 230 | 0.5  |
| 38  | 1 | 1 | 1 | 1 | 30 | 230 | 1    |
| 39  | 1 | 1 | 1 | 1 | 30 | 230 | 2    |
| 40  | 1 | 1 | 1 | 1 | 30 | 230 | 2.5  |
| 41  | 1 | 1 | 1 | 1 | 30 | 230 | 3    |
| 42  | 1 | 1 | 1 | 1 | 30 | 230 | 4    |

TABLE 123-continued

| | | | | | | | |
|---|---|---|---|---|---|---|---|
| 43 | 1 | 1 | 1 | 1 | 30 | 230 | 5 |
| 44 | 1 | 1 | 1 | 1 | 30 | 230 | 20 |

| | | | Performance | | | |
|---|---|---|---|---|---|---|
| No. | Appearance | White-rust resistance: SST 96 hrs | White-rust resistance after alkaline degreasing: SST 96 hrs | Paint adhesiveness | Classification | |
| 35 | ○ | X | X | ⊙ | Comparative example | |
| 36 | ○ | ○− | ○− | ⊙ | Example | |
| 37 | ○ | ○− | ○− | ⊙ | Example | |
| 38 | ○ | ○ | ○ | ⊙ | Example | |
| 39 | ○ | ⊙ | ⊙ | ⊙ | Example | |
| 40 | ○ | ⊙ | ⊙ | ⊙ | Example | |
| 41 | ○ | ⊙ | ⊙ | ⊙ | Example | |
| 42 | ○ | ⊙ | ⊙ | ⊙ | Example | |
| 43 | ○ | ⊙ | ⊙ | ⊙ | Example | |
| 44 | ○ | ⊙ | ⊙ | ⊙ | Comparative example ※2 | |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition
※2: Unable to weld

TABLE 124

| | Primary layer | | | Secondary layer coating | | | | | |
|---|---|---|---|---|---|---|---|---|---|
| No. | Plating steel plate *1 | coating Coating composition *2 | Resin composition *3 | Zinc phosphate and/or aluminum phosphate (a) Type *4 | Blending ratio *5 | Solid lubricant (c) Type *10 | Blending ratio *11 | Drying temperature (° C.) | Coating thickness (μm) |
| 54 | 1 | 1 | 1 | 1 | 10 | 1 | 5 | 230 | 1.5 |
| 60 | 1 | 1 | 1 | 1 | 10 | 1 | 1 | 230 | 1.5 |
| 61 | 1 | 1 | 1 | 1 | 10 | 1 | 10 | 230 | 1.5 |
| 62 | 1 | 1 | 1 | 1 | 10 | 1 | 30 | 230 | 1.5 |
| 63 | 1 | 1 | 1 | 1 | 10 | 1 | 80 | 230 | 1.5 |
| 64 | 1 | 1 | 1 | 1 | 10 | 1 | 100 | 230 | 1.5 |

| | | Performance | | | | |
|---|---|---|---|---|---|---|
| No. | Appearance | White-rust resistance: SST 96 hrs | White-rust resistance after alkaline degreasing: SST 96 hrs | Paint adhesiveness | Workability | Classification |
| 54 | ○ | ⊙ | ⊙ | ⊙ | ⊙ | Example |
| 60 | ○ | ⊙ | ⊙ | ⊙ | ○ | Example |
| 61 | ○ | ⊙ | ⊙ | ⊙ | ⊙ | Example |
| 62 | ○ | ⊙ | ⊙ | ⊙ | ⊙ | Example |
| 63 | ○ | ⊙ | ⊙ | ○ | ⊙ | Example |
| 64 | ○ | ⊙ | ⊙ | X | ⊙ | Comparative example |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition
*10: Corresponding to No. given in Table 6
*11: Blending rate (parts by weight) of solid lubricant (c) to 100 parts by weight of solid matter of resin

TABLE 125

| No. | Plating steel plate *1 | Primary layer coating Coating composition *2 | Secondary layer coating Resin composition *3 | Zinc phosphate and/or aluminum phosphate (a) Type *4 | Blending ratio *5 | Drying temperature (° C.) | Coating thickness (μm) |
|---|---|---|---|---|---|---|---|
| 65 | 1 | 1 | 2 | 1 | 30 | 230 | 1.5 |
| 66 | 1 | 1 | 3 | 1 | 30 | 230 | 1.5 |
| 67 | 1 | 1 | 4 | 1 | 30 | 230 | 1.5 |
| 68 | 1 | 1 | 5 | 1 | 30 | 230 | 1.5 |
| 69 | 1 | 1 | 6 | 1 | 30 | 230 | 1.5 |
| 70 | 1 | 1 | 7 | 1 | 30 | 230 | 1.5 |
| 71 | 1 | 1 | 8 | 1 | 30 | 230 | 1.5 |
| 72 | 1 | 1 | 9 | 1 | 30 | 230 | 1.5 |
| 73 | 1 | 1 | 10 | 1 | 30 | 230 | 1.5 |
| 74 | 1 | 1 | 11 | 1 | 30 | 230 | 1.5 |
| 75 | 1 | 1 | 12 | 1 | 30 | 230 | 1.5 |
| 76 | 1 | 1 | 13 | 1 | 30 | 230 | 1.5 |
| 77 | 1 | 1 | 14 | 1 | 30 | 230 | 1.5 |

| No. | Appearance | Performance White-rust resistance: SST 96 hrs | White-rust resistance after alkaline degreasing: SST 96 hrs | Paint adhesiveness | Classification |
|---|---|---|---|---|---|
| 65 | ○ | ⊙ | ⊙ | ⊙ | Comparative example |
| 66 | ○ | ○+ | ○ | ⊙ | Example |
| 67 | ○ | ○+ | ○ | ⊙ | Example |
| 68 | ○ | ○ | ○− | ⊙ | Example |
| 69 | ○ | ○ | ○− | ⊙ | Example |
| 70 | ○ | ○ | ○− | ⊙ | Example |
| 71 | ○ | ○ | ○− | ⊙ | Example |
| 72 | ○ | ⊙ | ⊙ | ⊙ | Example |
| 73 | ○ | ⊙ | ⊙ | ⊙ | Example |
| 74 | ○ | ⊙ | ⊙ | ⊙ | Example |
| 75 | ○ | Δ | Δ | ⊙ | Comparative example |
| 76 | X | X | X | X | Comparative example |
| 77 | ○ | Δ | Δ | ⊙ | Comparative example |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition

TABLE 126

| No. | Plating steel plate *1 | Primary layer coating Coating composition *2 | Secondary layer coating Resin composition *3 | Zinc phosphate and/or aluminum phosphate (a) Type *4 | Blending ratio *5 | Drying temperature (° C.) | Coating thickness (μm) |
|---|---|---|---|---|---|---|---|
| 78 | 1 | 2 | 1 | 1 | 30 | 230 | 1.5 |
| 79 | 1 | 3 | 1 | 1 | 30 | 230 | 1.5 |
| 80 | 1 | 4 | 1 | 1 | 30 | 230 | 1.5 |
| 81 | 1 | 5 | 1 | 1 | 30 | 230 | 1.5 |
| 82 | 1 | 6 | 1 | 1 | 30 | 230 | 1.5 |
| 83 | 1 | 7 | 1 | 1 | 30 | 230 | 1.5 |
| 84 | 1 | 8 | 1 | 1 | 30 | 230 | 1.5 |
| 85 | 1 | 9 | 1 | 1 | 30 | 230 | 1.5 |

TABLE 126-continued

| No. | Appearance | White-rust resistance: SST 96 hrs | White-rust resistance after alkaline degreasing: SST 96 hrs | Paint adhesiveness | Classification |
|---|---|---|---|---|---|
| 78 | ○ | ⊙ | ⊙ | ⊙ | Example |
| 79 | ○ | ⊙ | ⊙ | ⊙ | Example |
| 80 | ○ | ⊙ | ⊙ | ⊙ | Example |
| 81 | ○ | ⊙ | ⊙ | ⊙ | Example |
| 82 | ○ | ⊙ | ⊙ | ⊙ | Example |
| 83 | ○ | ⊙ | ⊙ | ⊙ | Example |
| 84 | ○ | ⊙ | ⊙ | ⊙ | Example |
| 85 | ○ | ⊙ | ⊙ | ⊙ | Example |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition

TABLE 127

| | Primary layer | | Secondary layer coating | | | |
|---|---|---|---|---|---|---|
| | Plating steel | coating Coating | Resin | Zinc phosphate and/or aluminum phosphate (a) | | Fine particles silica (b) | |
| No. | plate *1 | composition *2 | composition *3 | Type *4 | Blending ratio *5 | Type *6 | Blending ratio *7 |
| 86 | 1 | 1 | 1 | 1 | 30 | 1 | 20 |
| 87 | 1 | 1 | 2 | 1 | 30 | 2 | 20 |
| 88 | 1 | 1 | 3 | 1 | 30 | 3 | 20 |
| 89 | 1 | 1 | 4 | 1 | 30 | 4 | 20 |
| 90 | 1 | 1 | 5 | 1 | 30 | 5 | 20 |
| 91 | 1 | 1 | 6 | 1 | 30 | 6 | 20 |
| 92 | 1 | 1 | 7 | 1 | 30 | 6 | 20 |
| 93 | 1 | 1 | 8 | 1 | 30 | 6 | 20 |
| 94 | 1 | 1 | 9 | 1 | 30 | 6 | 20 |
| 95 | 1 | 1 | 10 | 1 | 30 | 6 | 20 |
| 96 | 1 | 1 | 11 | 1 | 30 | 6 | 20 |
| 97 | 1 | 1 | 12 | 1 | 30 | 6 | 20 |

| | Secondary layer coating | | | | |
|---|---|---|---|---|---|
| No. | (a) + (b) Blending rate *8 | (a)/(b) Weight ratio *9 | Drying temperature (° C.) | Coating thickness (μm) | Classification |
| 86 | 50 | 3/2 | 230 | 1.5 | Example |
| 87 | 50 | 3/2 | 230 | 1.5 | Example |
| 88 | 50 | 3/2 | 230 | 1.5 | Example |
| 89 | 50 | 3/2 | 230 | 1.5 | Example |
| 90 | 50 | 3/2 | 230 | 1.5 | Example |
| 91 | 50 | 3/2 | 230 | 1.5 | Example |
| 92 | 50 | 3/2 | 230 | 1.5 | Example |
| 93 | 50 | 3/2 | 230 | 1.5 | Example |
| 94 | 50 | 3/2 | 230 | 1.5 | Example |
| 95 | 50 | 3/2 | 230 | 1.5 | Example |
| 96 | 50 | 3/2 | 230 | 1.5 | Example |
| 97 | 50 | 3/2 | 230 | 1.5 | Comparative example |

*1: Corresponding to No. given in Table 115
*2: Corresponding to No. given in Table 118
*3: Corresponding to No. given in Table 119
*4: Corresponding to No. given in Table 120
*5: Blending rate (parts by weight) of solid matter of zinc phosphate and/or aluminum phosphate (a) to 100 parts by weight of solid matter of resin composition
*6: Given in Table 116
*7: Blending rate (parts by weight) of calcium compound (b) to 100 parts by weight of solid matter of resin composition
*8: Blending rate (parts by weight) of the sum of zinc phosphate and/or aluminum phosphate (a) and calcium compound (b) to 100 parts by weight of solid matter of resin composition
*9: Weight ratio of zinc phosphate and/or aluminum phosphate (a) to calcium compound (b)

TABLE 128

| No. | Appearance | White-rust resistance: SST 120 hrs | White-rust resistance after alkaline degreasing: SST 120 hrs | Paint adhesiveness | Classification |
|---|---|---|---|---|---|
| 86 | ○ | ⊚ | ⊚ | ⊚ | Example |
| 87 | ○ | ⊚ | ⊚ | ⊚ | Example |
| 88 | ○ | ⊚ | ⊚ | ⊚ | Example |
| 89 | ○ | ⊚ | ⊚ | ⊚ | Example |
| 90 | ○ | ⊚ | ⊚ | ⊚ | Example |
| 91 | ○ | ⊚ | ⊚ | ⊚ | Example |
| 92 | ○ | ⊚ | ⊚ | ⊚ | Example |
| 93 | ○ | ⊚ | ⊚ | ⊚ | Example |
| 94 | ○ | ⊚ | ⊚ | ⊚ | Example |
| 95 | ○ | ⊚ | ⊚ | ⊚ | Example |
| 96 | ○ | ⊚ | ⊚ | ⊚ | Example |
| 97 | ○ | Δ | X | ⊚ | Comparative example |

TABLE 129

| No. | Plating steel plate*1 | Primary layer coating Coating composition*2 | Resin composition*3 | Zinc phosphate and/or aluminum phosphate (a) Type*4 | Blending ratio*5 | Fine particles silica (b) Type*6 | Blending ratio*7 | (a) + (b) Blending rate*8 | (a)/(b) Weight ratio*9 | Drying temperature (° C.) | Coating thickness (μm) | Classification |
|---|---|---|---|---|---|---|---|---|---|---|---|---|
| 98 | 1 | 1 | 13 | 1 | 30 | 6 | 20 | 50 | 3/2 | 230 | 1.5 | Comparative example |
| 99 | 1 | 1 | 14 | 1 | 30 | 6 | 20 | 50 | 3/2 | 230 | 1.5 | Comparative example |
| 100 | 1 | 1 | 1 | 1 | 30 | — | — | 30 | 30/0 | 230 | 1.5 | Example |
| 101 | 1 | 1 | 1 | 1 | 29.9 | 6 | 0.1 | 30 | 299/1 | 230 | 1.5 | Example |
| 102 | 1 | 1 | 1 | 1 | 29 | 6 | 1 | 30 | 29/1 | 230 | 1.5 | Example |
| 103 | 1 | 1 | 1 | 1 | 20 | 6 | 10 | 30 | 2/1 | 230 | 1.5 | Example |
| 104 | 1 | 1 | 1 | 1 | 15 | 6 | 15 | 30 | 1/1 | 230 | 1.5 | Example |
| 105 | 1 | 1 | 1 | 1 | 10 | 6 | 20 | 30 | 1/2 | 230 | 1.5 | Example |
| 106 | 1 | 1 | 1 | 1 | 1 | 6 | 29 | 30 | 1/29 | 230 | 1.5 | Example |
| 107 | 1 | 1 | 1 | 1 | 0.1 | 6 | 29.9 | 30 | 1/299 | 230 | 1.5 | Comparative example |
| 108 | 1 | 1 | 1 | 1 | 50 | — | — | 30 | 50/0 | 230 | 1.5 | Example |

*1 Corresponding to No. given in Table 115
*2 Corresponding to No. given in Table 118
*3 Corresponding to No. given in Table 119
*4 Corresponding to No. given in Table 120
*5 Blending rate (parts by weight) of solid matter of zinc phosphate and/or aluminum phosphate (a) to 100 parts by weight of solid matter of resin composition
*6 Given in Table 116
*7 Blending rate (parts by weight) of calcium compound (b) to 100 parts by weight of solid matter of resin composition
*8 Blending rate (parts by weight) of the sum of zinc phosphate and/or aluminum phosphate (a) and calcium compound (b) to 100 parts by weight of solid matter of resin composition
*9 Weight ratio of zinc phosphate and/or aluminum phosphate (a) to calcium compound (b)

TABLE 130

| No. | Appearance | White-rust resistance: SST 120 hrs | White-rust resistance after alkaline degreasing: SST 120 hrs | Paint adhesiveness | Classification |
|---|---|---|---|---|---|
| 98 | ○ | X | X | X | Comparative example |
| 99 | ○ | Δ | X | ⊚ | Comparative example |
| 100 | ○ | ○ | ○ | ⊚ | Example |
| 101 | ○ | ○ | ○ | ⊚ | Example |
| 102 | ○ | ○+ | ○+ | ⊚ | Example |
| 103 | ○ | ⊚ | ⊚ | ⊚ | Example |
| 104 | ○ | ⊚ | ⊚ | ⊚ | Example |

TABLE 130-continued

| | | Performance | | | |
|---|---|---|---|---|---|
| No. | Appearance | White-rust resistance: SST 120 hrs | White-rust resistance after alkaline degreasing: SST 120 hrs | Paint adhesiveness | Classification |
| 105 | ○ | ○ | ○ | ⊚ | Example |
| 106 | ○ | ○ | ○ | ⊚ | Example |
| 107 | ○ | Δ | Δ | ⊚ | Comparative example |
| 108 | ○ | ○ | ○ | ⊚ | Example |

TABLE 131

| | | | Secondary layer coating | | | | | | | | |
|---|---|---|---|---|---|---|---|---|---|---|---|
| | | Primary layer coating | Zinc phosphate and/or aluminum phosphate (a) | | Fine particles silica (b) | | (a) + (b) | (a)/(b) | Drying temper- | Coating | |
| No. | Plating steel plate*1 | Coating composition*2 | Resin composition*3 | Type*4 | Blending ratio*5 | Type*6 | Blending ratio*7 | Blending rate*8 | Weight ratio*9 | ature (° C.) | thickness (μm) | Classification |
| 109 | 1 | 1 | 1 | 1 | 49 | 6 | 1 | 50 | 49/1 | 230 | 1 | Example |
| 110 | 1 | 1 | 1 | 1 | 45 | 6 | 5 | 50 | 9/1 | 230 | 1 | Example |
| 111 | 1 | 1 | 1 | 1 | 40 | 6 | 10 | 50 | 4/1 | 230 | 1 | Example |
| 112 | 1 | 1 | 1 | 1 | 30 | 6 | 20 | 50 | 3/2 | 230 | 1 | Example |
| 113 | 1 | 1 | 1 | 1 | 25 | 6 | 25 | 50 | 1/1 | 230 | 1 | Example |
| 114 | 1 | 1 | 1 | 1 | 10 | 6 | 40 | 50 | 1/4 | 230 | 1 | Example |
| 115 | 1 | 1 | 1 | 1 | 1 | 6 | 49 | 50 | 1/49 | 230 | 1 | Example |

*1 Corresponding to No. given in Table 115
*2 Corresponding to No. given in Table 118
*3 Corresponding to No. given in Table 119
*4 Corresponding to No. given in Table 120
*5 Blending rate (parts by weight) of solid matter of zinc phosphate and/or aluminum phosphate (a) to 100 parts by weight of solid matter of resin composition
*6 Given in Table 116
*7 Blending rate (parts by weight) of calcium compound (b) to 100 parts by weight of solid matter of resin composition
*8 Blending rate (parts by weight) of the sum of zinc phosphate and/or aluminum phosphate (a) and calcium compound (b) to 100 parts by weight of solid matter of resin composition
*9 Weight ratio of zinc phosphate and/or aluminum phosphate (a) to calcium compound (b)

TABLE 132

| | | Performance | | | |
|---|---|---|---|---|---|
| No. | Appearance | White-rust resistance: SST 120 hrs | White-rust resistance after alkaline degreasing: SST 120 hrs | Paint adhesiveness | Classification |
| 109 | ○ | ○+ | ○+ | ⊚ | Example |
| 110 | ○ | ⊚ | ⊚ | ⊚ | Example |
| 111 | ○ | ⊚ | ⊚ | ⊚ | Example |
| 112 | ○ | ⊚ | ⊚ | ⊚ | Example |
| 113 | ○ | ⊚ | ⊚ | ⊚ | Example |
| 114 | ○ | ○ | ○ | ⊚ | Example |
| 115 | ○ | ○ | ○ | ⊚ | Example |

TABLE 133

| | | | | Secondary layer coating | | | | | | | | | | |
|---|---|---|---|---|---|---|---|---|---|---|---|---|---|---|
| | | Primary layer coating | | Zinc phosphate and/or aluminum phosphate (a) | | Calcium compound (b) | | | (a)/(b) | Solid lubricant (c) | | Drying | Coating | |
| No. | Plating steel plate*1 | Coating compo- sition*2 | Resin compo- sition*3 | Type*4 | Blend- ing ratio*5 | Type*6 | Blend- ing ratio*7 | (a) + (b) Blending ratio*8 | Blending ratio by weight*9 | Type*10 | Blend- ing rate*11 | temper- ature (° C.) | thick- ness (μm) | Classi- fication |
| 116 | 1 | 1 | 1 | 1 | 30 | 6 | 20 | 50 | 3/2 | 1 | 10 | 230 | 1.5 | Example |
| 117 | 1 | 1 | 1 | 2 | 30 | 6 | 20 | 50 | 3/2 | 2 | 10 | 230 | 1.5 | Example |

TABLE 133-continued

|  | Primary layer coating | | Secondary layer coating | | | | | | | | | | |
|---|---|---|---|---|---|---|---|---|---|---|---|---|---|
|  |  |  | Zinc phosphate and/or aluminum phosphate (a) | | Calcium compound (b) | | | | Solid lubricant (c) | | Drying | Coating | |
| No. | Plating steel plate*1 | Coating compo- sition*2 | Resin compo- sition*3 | Type*4 | Blend- ing ratio*5 | Type*6 | Blend- ing ratio*7 | (a) + (b) Blending ratio*8 | Blending ratio by weight*9 | Type*10 | Blend- ing rate*11 | temper- ature (° C.) | thick- ness (μm) | Classi- fication |
| 118 | 1 | 1 | 1 | 3 | 30 | 6 | 20 | 50 | 3/2 | 3 | 10 | 230 | 1.5 | Example |
| 119 | 1 | 1 | 1 | 4 | 30 | 6 | 20 | 50 | 3/2 | 4 | 10 | 230 | 1.5 | Example |
| 120 | 1 | 1 | 1 | 5 | 30 | 6 | 20 | 50 | 3/2 | 5 | 10 | 230 | 1.5 | Example |
| 121 | 1 | 1 | 1 | 6 | 30 | 6 | 20 | 50 | 3/2 | 6 | 10 | 230 | 1.5 | Example |
| 122 | 1 | 1 | 1 | 7 | 30 | 6 | 20 | 50 | 3/2 | 1 | 10 | 230 | 1.5 | Example |
| 123 | 1 | 1 | 1 | 8 | 30 | 6 | 20 | 50 | 3/2 | 1 | 1 | 230 | 1.5 | Example |
| 124 | 1 | 1 | 1 | 9 | 30 | 6 | 20 | 50 | 3/2 | 1 | 3 | 230 | 1.5 | Example |
| 125 | 1 | 1 | 1 | 10 | 30 | 6 | 20 | 50 | 3/2 | 1 | 10 | 230 | 1.5 | Example |
| 126 | 1 | 1 | 1 | 11 | 30 | 6 | 20 | 50 | 3/2 | 1 | 40 | 230 | 1.5 | Example |
| 127 | 1 | 1 | 1 | 11 | 30 | 6 | 20 | 50 | 3/2 | 1 | 80 | 230 | 1.5 | Example |
| 128 | 1 | 1 | 1 | 11 | 30 | 6 | 20 | 50 | 3/2 | 1 | 100 | 230 | 1.5 | Com- parative example |

*1 Corresponding to No. given in Table 115
*2 Corresponding to No. given in Table 118
*3 Corresponding to No. given in Table 119
*4 Corresponding to No. given in Table 120
*5 Blending rate (parts by weight) of solid matter of zinc phosphate and/or aluminum phosphate (a) to 100 parts by weight of solid matter of resin composition
*6 Given in Table 116
*7 Blending rate (parts by weight) of calcium compound (b) to 100 parts by weight of solid matter of resin composition
*8 Blending rate (parts by weight) of the sum of zinc phosphate and/or aluminum phosphate (a) and calcium compound (b) to 100 parts by weight of solid matter of resin composition
*9 Weight ratio of zinc phosphate and/or aluminum phosphate (a) to calcium compound (b)
*10 Corresponding to No. given in Table 117
*11 Blending rate (parts by weight) of solid lubricant (c) to 100 parts by weight of solid matter of resin composition

TABLE 134

| | | Performance | | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 116 | ○ | ◎ | ◎ | ◎ | ◎ | Example |
| 117 | ○ | ◎ | ◎ | ◎ | ◎ | Example |
| 118 | ○ | ◎ | ◎ | ◎ | ◎ | Example |
| 119 | ○ | ◎ | ◎ | ◎ | ◎ | Example |
| 120 | ○ | ◎ | ◎ | ◎ | ◎ | Example |
| 121 | ○ | ◎ | ◎ | ◎ | ◎ | Example |
| 122 | ○ | ◎ | ◎ | ◎ | ○ | Example |
| 123 | ○ | ◎ | ◎ | ◎ | ◎ | Example |
| 124 | ○ | ◎ | ◎ | ◎ | ◎ | Example |
| 125 | ○ | ◎ | ◎ | ◎ | ◎ | Example |
| 126 | ○ | ◎ | ◎ | ○ | ◎ | Example |
| 127 | ○ | ◎ | ◎ | ○ | ◎ | Example |
| 128 | ○ | ◎ | ◎ | × | ◎ | Comparative example |

Best Mode 5

According to a finding of the inventors of the present invention, an organic coating steel sheet inducing no pollution problem and providing excellent corrosion resistance is obtained without applying chromate treatment which may give bad influence to environment and human body, by forming a specific chelating resin coating on the surface of a zinc base plating steel sheet or an aluminum base plating steel sheet.

The organic coating steel sheet according to the present invention is basically characterized in that a chelating resin is formed as the rust-preventive coating as the product of reaction between a film-forming organic resin (A) and an active-hydrogen-laden compound (B), a part or whole of which compound (B) consists of a hydrazine derivative (C) containing active hydrogen, thus applying the hydrazine derivative (C) as a chelating group to the film-forming resin (A), and that the chelating resin is formed on the surface of a zinc base plating steel sheet or an aluminum base plating steel sheet.

The corrosion-preventive mechanism of the organic coating as the above-described organic coating is not fully analyzed. The mechanism is, however, presumably the following. By adding a hydrazine derivative, not applying a simple low molecular weight chelating agent, to the film-forming organic resin, (1) the dense organic polymer coating gives an effect to shut-off corrosion causes such as oxygen and chlorine ions, (2) the hydrazine derivative is able to form a stable passive layer by strongly adsorbing to the surface of the plating film or reacting with the surface of the plating film, (3) the hydrazine derivative traps the zinc ion which is eluted during the film-forming stage to form an electrically neutral insoluble chelate compound layer (a dense barrier layer having a complex structure), which suppresses the formation of an ion conduction layer at interface between the plating film and the organic resin layer to suppress the progress of corrosion, and (4) further in a corrosive environment, free hydrazine derivative in the coating traps the zinc ion which is generated by corrosion to form a stable metallic complex structure, thus suppressing the progress of corrosion. These work effects should effectively suppress the development of corrosion, thus giving excellent corrosion resistance.

Particularly when a resin containing epoxy group is used as the film-forming organic resin (A), a dense barrier coating is formed by the reaction between the epoxy-group-laden resin and a cross-linking agent. Thus, the formed barrier coating has excellent penetration-suppression performance against the corrosion causes such as oxygen, and gains excellent bonding force with the base material owing to the hydroxyl group in the molecule, which results in particularly superior corrosion resistance.

Further excellent corrosion resistance is obtained by using an active-hydrogen-laden pyrazole compound and/or an active-hydrogen-laden triazole compound as the hydrazine derivative (C) containing active hydrogen.

As in the case of prior art, blending simply a hydrazine derivative (C) with the film-forming organic resin (A) gives very little improvement in corrosion-suppression. The reason is presumably that the hydrazine derivative which does not enter the molecules of the film-forming organic resin cannot form a dense barrier layer because of low molecular weight, though the hydrazine derivative is adsorbed onto the metal surface. To the contrary, introduction of a hydrazine derivative into the molecules of film-forming organic resin (A), as in the case of present invention, provides markedly high corrosion-suppression effect.

The following is the description about a specific organic coating formed on the above-described zinc base plating steel sheet or aluminum base plating steel sheet.

According to the present invention, the organic coating formed on the zinc base plating steel sheet or aluminum base plating steel sheet contains a product of reaction between a film-forming organic resin (A) and an active-hydrogen-laden compound (B), a part or whole of which compound (B) consists of a hydrazine derivative (C) containing active hydrogen, which organic coating has a thickness in a range of from 0.1 to 5 μm.

The kinds of film-forming organic resin (A) are not specifically limited if only the resin reacts with the active-hydrogen-laden compound (B), a part or whole of which compound (B) consists of a hydrazine derivative (C) containing active hydrogen, to bind the active-hydrogen-laden compound (B) with the film-forming organic resin by addition or condensation reaction, and adequately form the coating.

Examples of the film-forming organic resin (A) are epoxy resin, modified epoxy resin, polyurethane resin, polyester resin, alkyd resin, acrylic base copolymer resin, polybutadiene resin, phenol resin, and adduct or condensate thereof. These resins may be applied separately or blending two or more of them.

From the standpoint of reactivity, readiness of reaction, and corrosion-prevention, an epoxy-group-laden resin (D) in the resin is particularly preferred as the film-forming organic resin (A).

The epoxy-group-laden resin (D) has no specific limitation if only the resin reacts with an active-hydrogen-laden compound (B), a part or whole of which compound (B) consists of a hydrazine derivative (C) containing active hydrogen, to bind with the active hydrogen-laden compound (B) by addition or condensation reaction, and adequately form the coating. Examples of the epoxy-group-laden resin (D) are epoxy resin, modified epoxy resin, acrylic base copolymer resin copolymerized with an epoxy-group-laden monomer, polybutadiene resin containing epoxy group, polyurethane resin containing epoxy group, and adduct or condensate of these resins. These resins may be applied separately or blending two or more of them together.

From the point of adhesiveness with plating surface and of corrosion resistance, epoxy resin and modified epoxy resin are particularly preferred among these epoxy-group-laden resins Examples of the above-described epoxy resins are: aromatic epoxy resins prepared by reacting a polyphenol such as bisphenol A, bisphenol F, and novorak type phenol with epihalohydrin such as epychlorohydrin followed by introducing glycidyl group thereinto, or further by reacting a polyphenol with thus obtained product containing glycidyl group to increase the molecular weight; aliphatic epoxy resin, and alicyclic epoxy resin. These resins may be applied separately or blending two or more of them together. If film-formation at a low temperature is required, the epoxy resins preferably have number-average molecular weights of 1500 or more.

The above-described modified epoxy resin may be a resin prepared by reacting epoxy group or hydroxyl group in one of the above-given epoxy resins with various kinds of modifying agents. Examples of the modified epoxy resin are epoxy-ester resin prepared by reacting with a drying oil fatty acid, epoxy-acrylate resin prepared by modifying with a polymerizable unsaturated monomer component containing acrylic acid or methacrylic acid, and urethane-modified epoxy resin prepared by reacting with an isocyanate compound.

Examples of the above-described acrylic base copolymer resin which is copolymerized with the above-described epoxy-group-laden monomer are the resins which are prepared by solution polymerization, emulsion polymerization, or suspension polymerization of an unsaturated monomer containing epoxy group with a polymerizable unsaturated monomer component containing acrylic acid ester or methacrylic acid ester as the essential ingredient.

Examples of the above-described unsaturated monomer component are: C1–24 alkylester of acrylic acid or methacrylic acid, such as methyl(meth)acrylate, ethyl(meth)acrylate, propyl(meth)acrylate, n-iso- or tert-butyl(meth)acrylate, hexyl(meth)acrylate, 2-ethylhexyl(meth)acrylate, decyl(meth)acrylate, lauryl(meth)acrylate; C1–4 alkylether compound of acrylic acid, methacrylic acid, styrene, vinyltoluene, acrylamide, acrylonitrile, N-methylol(meth)acrylamide, N-methylol(meth)acrylamide; and N,N-diethylaminoethylmethacrylate.

The unsaturated monomer having epoxy group has no special limitation if only the monomer has epoxy group and polymerizable unsaturated group, such as glycidylmethacrylate, glycidylacrylate, 3,4-epoxycyclohexylmethyl(meth)acrylate.

The acrylic base copolymer resin which was copolymerized with the epoxy-group-laden monomer may be a resin which is modified by polyester resin, epoxy resin, or phenol resin.

A particularly preferred epoxy resin described above is a resin, which is a product of the reaction between bisphenol A and epihalohydrin. The epoxy resin is preferred because of superior corrosion resistance.

The method for manufacturing that kind of bisphenol A type epoxy resin is widely known in the industry concerned.

The film-forming organic resin (A) may be either organic solvent dissolving type, organic solvent dispersing type, water dissolving type, or water dispersing type.

According to the present invention, a hydrazine derivative is introduced into the molecules of the film-forming organic resin (A). To do this, at least a part of the active-hydrogen-laden compound (B), (preferably whole thereof), is necessary to be a hydrazine derivative (C) containing active hydrogen.

When the film-forming organic resin (A) is an expoxy-group group-laden resin, examples of the active-hydrogen-laden compound (B) reacting with the epoxy group are listed below. One or more of these compounds (B) may be applied. Also in that case, at least a part of the active-hydrogen-laden compound (B), (preferably whole thereof), is necessary to be a hydrazine derivative (C) containing active hydrogen.

A hydrazine derivative containing active hydrogen

A primary or secondary amine compound containing active hydrogen

An organic acid such as ammonia and carboxylic acid

A halogenated hydrogen such as hydrogen chloride

An alcohol, a thiol

A hydrazine derivative containing no active hydrogen or a quaternary chlorinating agent which is a mixture with a ternary amine.

Examples of the above-described hydrazine derivative (C) containing active hydrogen are the following.
(1) hydrazide compound such as carbohydrazide, propionic acid hydrazide, salicylic acid hydrazide, adipic acid hydrazide, sebacic acid hydrazide, dodecanic acid hydrazide, isophtharic acid hydrazide, thiocarbohydrazide, 4,4'-oxy-bis-benzenesulfonyl hydrazide, benzophenone hydrazone, amino-polyacrylamide hydrazide; (2) pyrazole compound such as pyrazole, 3,5-dimethylpyrazole, 3-methyl-5-pyrazolone, 3-amino-5-methylpyrazole; (3) triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (mono hydrate), 6-methyl-8-hydroxytriazolopyridazine, 6-phenyl-8-hydroxytriazolopyrydazine, 5-hydroxy-7-methyl-1,3,8-triazaindolizine;
(4) tetrazole compound such as 5-phenyl-1,2,3,4-tetrazole, 5-mercapto-1-phenyl-1,2,3,4-tetrazole;
(5) thiadiazole compound such as 5-amino-2-mercapto-1,3,4-thiadiazole, 2,5-dimercapto-1,3,4-thiadiazole;
(6) pyridazine compound such as maleic acid hydrazide, 6-methyl-3-pyridazone, 4,5-dichloro-3-pyridazone, 4,5-dibromo-3-pyridazone, 6-methyl-4,5-dihydro-3-pyridazone.

Among these compounds, particularly preferred ones are pyrazole compound and triazole compound which have cyclic structure of five- or six-membered ring and which have nitrogen atom in the cyclic structure.

These hydrazine derivatives may be applied separately or blending two or more of them together.

Examples of above-described amine compound having active hydrogen, which can be used as a part of the active-hydrogen-laden compound (B) are the following.

(1) a compound prepared by heating to react a primary amino group of an amine compound containing a single secondary amino group of diethylenetriamine, hydroxylaminoethylamine, ethylaminoethylamine, methylaminopropylamine, or the like and one or more of primary amino group, with ketone, aldehyde, or carboxylic acid, at, for example, approximate temperatures of from 100 to 230° C. to modify them to aldimine, ketimine, oxazoline, or imidazoline;
(2) a secondary monoamine such as diethylamine, diethanolamine, di-n- or -iso-propanolamine, N-methylethanolamine, N-ethylethanolamine;
(3) a secondary-amine-laden compound prepared by Michael addition reaction through the addition of monoalkanolamine such as monoethanolamine to dialkyl(meth)acrylamide;
(4) a compound prepared by modifying a primary amino group of alkanolamine such as monoethanolamine, neopentanolamine, 2-aminopropanol, 3-aminopropanol, 2-hydroxy-2'(aminopropoxy)ethylether to ketimine.

As for the above-described quaternary chlorinating agents which are able to be used as a part of the active-hydrogen-laden compound (B), the hydrazine derivative having active hydrogen or ternary amine has no reactivity with epoxy group as it is. Accordingly, they are mixed with an acid to make them reactive with epoxy group. The quaternary chlorinating agent reacts with epoxy group with the presence of water, at need, to form a quaternary salt with the expoxy-groupgroup-laden resin.

The acid used to obtain the quaternary chlorinating agent may be organic acid such as acetic acid and lactic acid, or inorganic acid such as hydrochloric acid. The hydrazine derivative containing no active hydrogen, which is used to obtain quaternary chlorinating agent may be 3,6-dichloropyridazine. The ternary amine may be dimethylethanolamine, triethylamine, trimethylamine, tri-isopropylamine, methyldiethanolamine.

The product of the reaction between the film-forming organic resin (A) and the active-hydrogen-laden compound (B) a part of or whole of which consists of a hydrazine derivative (C) containing active hydrogen, may be prepared by reacting the film-forming organic resin (A) with the active-hydrogen-laden compound (B) at temperatures of from 10 to 300° C., preferably from 50 to 150° C., for about 1 to about 8 hours.

The reaction may be carried out adding an organic solvent. The kind of adding organic solvent is not specifically limited. Examples of the organic solvent are: ketone such as acetone, methyethylketone, methylisobutylketone, dibutylketone, cyclohexanone; alcohol or ether having hydroxyl group, such as ethanol, butanol, 2-ethylhexylalcohol, benzylalcohol, ethyleneglycol, ethyleneglycol mono-isopropylether, ethyleneglycol monobutylether, ethyleneglycol monohexylether, propyleneglycol, propyleneglycol monomethylether, diethyleneglycol, diethyleneglycol monoethylether, diethyleneglycol monobutylether; ester such as ethylacetate, butylacetate, ethyleneglycol monobutylether acetate; and aromatic hydrocarbon such as toluene and xylene. These compounds may be applied separately or blending two or more of them together. Among them, from the viewpoint of solubility and coating film-forming performance with epoxy resin, ketone group or ether group solvents are particularly preferred.

The blending ratio of the film-forming organic resin (A) and the active-hydrogen-laden compound (B), a part or whole of which compound consists of a hydrazine derivative (C) containing active hydrogen, is in a range of from 0.5 to 20 parts by weight of the active-hydrogen-laden compound (B), more preferably from 1.0 to 10 parts by weight, to 100 parts by weight of the film-forming organic resin (A).

When the film-forming organic resin (A) is an expoxy-group group-laden resin (D), the blending ratio of the expoxy-group group-laden resin (D) to the active-hydrogen-laden compound (B) is preferably, from the viewpoint of corrosion resistance and other performance, in a range of from 0.01 to 10 as the ratio of the number of active hydrogen groups in the active-hydrogen-laden compound (B) to the number of epoxy groups in the expoxy-group-laden resin (D), or [the number of active hydrogen groups/the number of epoxy groups], more preferably from 0.1 to 8, most preferably from 0.2 to 4.

A preferred range of hydrazine derivative (C) containing active hydrogen in the active-hydrogen-laden compound (B) is from 10 to 100 mole %, more preferably from 30 to 100 mole %, and most preferably from 40 to 100 mole %. If the rate of hydrazine derivative (C) containing active hydrogen is less than 10 mole %, the organic coating fails to have satisfactory rust-preventive function, thus the obtained rust-preventive effect becomes similar with the case of simple blending of a film-forming organic resin with a hydrazine derivative.

To form a dense barrier coating according to the present invention, it is preferable that a curing agent is blended into the resin composition, and that the organic coating is heated to cure.

Suitable methods for curing to form a resin composition coating include (1) a curing method utilizing a urethanation reaction between isocyanate and hydroxide group in the base resin, and (2) a curing method utilizing an ether reaction between hydroxide group in the base resin and an alky-letherified amino resin which is prepared by reacting between a part of or whole of a methylol compound which is prepared by reacting formaldehyde with one or more of melamine, urea, and benzoguanamine, and a C1–5 primary alcohol. As of these methods, particularly preferred one is to adopt a urethanation reaction between isocyanate and hydroxyl group in the base resin as the main reaction.

The polyisocyanate compound used in the curing method (1) described above is a compound prepared by partially reacting an aliphatic, alicyclic (including heterocyclic), or aromatic isocyanate compound, or a compound thereof using a polyhydric alcohol. Examples of that kind of poly-isocyanate compound are the following.

(1) m- or p-phenylene diisocyanate, 2,4- or 2,6-trilene diisocyanate, o- or p-xylylene diisocyanate, hexamethylene diisocyanate, dimer acid diisocyanate, isophorone diisocyanate;
(2) a compound of product of reaction between separate or mixture of the compounds given in-(1) with a polyhydric alcohol (for example, a dihydric alcohol such as ethyleneglycol and propyleneglycol, a trihydric alcohol such as glycerin and trimethylolpropane, a tetrahydric alcohol such as pentaerythritol, and hexahydric alcohol such as sorbitol and dipentaerythritol) leaving at least two isocy-anate within a molecule.

These polyisocyanate compounds may be used separately or mixing two or more of them together.

Examples of protective agent (blocking agent) of the polyisocyanate compound are the following.
(1) Aliphatic monoalcohol such as methanol, ethanol, propanol, butanol, octylalcohol;
(2) Monoether of ethyleneglycol and/or diethyleneglycol, for example, monoether of methyl, ethyl, propyl (n-, iso-), butyl (n-, iso-, sec-);
(3) Aromatic alcohol such as phenol and cresol;
(4) Oxime such as acetoxime and methylethylketone oxime.

Through reaction between one or more of these compounds with above-described polyisocyanate compound, a polyisocyanate compound thus obtained is stably protected at least at normal temperature.

It is preferable to blend that kind of polyisocyanate compound (E) with a film-forming organic resin (A) as the curing agent at a range of (A)/(E)=95/5 to 55/45 (weight ratio of non-volatile matter), more preferably (A)/(E)=90/10 to 65/35. Since polyisocyanate compounds have water-absorbing property, blending of the compound at ratios above (A)/(E)=55/45 degrades the adhesiveness of the organic coating. If top coating is given on the organic coating, unreacted polyisocyanate compound migrates into the coating film to induce hindrance of curing or insufficient adhesiveness of the coating film. Accordingly, the blending ratio of the polyisocyanate compound (E) is preferably not more than (A)/(E)=55/45.

The film-forming organic resin (A) is fully cross-linked by the addition of above-described cross-linking agent (curing agent). For further increasing the cross-linking performance at a low temperature, it is preferable to use a known catalyst for enhancing curing. Examples of the curing-enhancing catalyst are N-ethylmorpholine, dibutyltin dilaurate, cobalt naphthenate, tin(II)chloride, zinc naphthenate, and bismuth nitrate.

When an expoxy-groupgroup-laden resin is used as the film-forming organic resin (A), the expoxy-groupgroup-laden resin may be blended with a known resin such as that of acrylic, alkyd, and polyester to improve the physical properties such as adhesiveness to some extent.

The organic coating of the organic coating steel sheet according to the present invention normally consists mainly of a product (resin composition) of reaction between a film-forming organic resin (A) and an active-hydrogenhydrogen-laden compound (B) a part of or whole of which consists of a hydrazine derivative (C) containing active hydrogen). And, at need, additives may be added to the organic coating, which additives include a lubricant (for example, polyethylene wax and fluororesin compound), a rust-preventive agent (for example, silica), an organic coloring pigment (for example, condensing polycyclic organic pigment, phthalocyanine base organic pigment), a coloring dye (for example, azo dye soluble in organic solvent, azo metal dye soluble in water), an inorganic pigment (for example, titanium oxide), a chelating agent (for example, thiol), a conductive pigment (for example, metallic powder of zinc, aluminum, nickel, or the like, iron phosphide, antimony-dope type tin oxide), a coupling agent (for example, silane coupling agent and titanium coupling agent), a melamine-cyanuric acid additive.

The paint composition for film-formation containing above-described main component and additive components normally contains solvent (organic solvent and/or water), and, at need, further a neutralizer or the like is added.

Applicable organic solvent described above has no specific limitation if only it dissolves or disperses the product of reaction between the above-described film-forming organic resin (A) and the active-hydrogenhydrogen-laden compound (B), and adjusts the product as the painting composition. Examples of the organic solvent are the organic solvents given above as examples.

The above-described neutralizers are blended, at need, to neutralize the film-forming organic resin (A) to bring it to water-type. When the film-forming organic resin (A) is a cationic resin, acid such as acetic acid, lactic acid, and formic acid may be used as the neutralizer.

The organic coatings described above are formed on the surface of zinc base plating steel sheet or aluminum base plating steel sheet without inserting chromated coating.

The dry thickness of the organic coating is in a range of from 0.1 to 5 μm. If the thickness of the organic coating is less than 0.1 μm, the corrosion resistance becomes insufficient. If the thickness of the organic coating exceeds 5 μm, the conductivity and the workability degrade. Further preferable thickness of the organic coating is in a range of from 0.5 to 3 μm.

The organic coating steel sheet according to the present invention is manufactured by applying a paint composition which contains the product of reaction between above-described film-forming organic resin (A) and an active-hydrogenhydrogen-laden compound (B) a part of or whole of which consists of a hydrazine derivative (C) containing active hydrogen, which product of reaction is preferably the main component, onto the surface of a zinc base plating steel sheet or aluminum base plating steel sheet, followed by heating to dry the product.

The surface of the plating steel sheet may be, at need, subjected to alkaline degreasing before applying the above-described treatment liquid, and may further be subjected to preliminary treatment such as surface adjustment treatment for further improving the adhesiveness and corrosion resistance.

The methods for applying the paint composition onto the surface of the zinc plating steel sheet or aluminum base plating steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, normally heating and drying are given without giving rinsing with water. However, the organic coating according to the present invention is bonded to the surface of the plating steel sheet as the base material by chemical adsorption or by reaction, so that there may be given water rinsing after applying the paint composition.

The heating and drying treatment is preferably conducted at reaching temperatures of from 50 to 300° C., more preferably from 80 to 200° C., and most preferably from 80 to 250° C. If the heating temperature is less than 50° C., excess amount of water is left in the coating, which results in insufficient corrosion resistance. If the heating temperature exceeds 300° C., the operation becomes uneconomical and defects likely appear in the coating to degrade the corrosion resistance.

As described above, the present invention includes a steel sheet having an organic coating on both sides or on side thereof. Accordingly, modes of the steel sheet according to the present invention include, for example, the followings.

(1) "Plating film—Organic coating" on one side of the steel sheet, and "Plating film" on other side of the steel sheet;
(2) "Plating film—Organic coating" on one side of the steel sheet, and "a known phosphate treatment coating" on other side of the steel sheet;
(3) "Plating film—Organic coating" on both sides of the steel sheet;

Embodiments

Following is the embodiments for synthesizing resin compositions for forming the coating according to the present invention.

SYNTHESIS EXAMPLE 1

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylethylketone were charged in a flask with four necks, which mixture was then heated to 140° C. to let them react for 4 hours. Thus, an epoxy resin having an epoxy equivalent of 1391 and a solid content of 90% was obtained. A 1500 parts of ethyleneglycol monobutylether was added to the epoxy resin, which were then cooled to 100° C. A 96 parts of 3,5-dimethylpyrazole (molecular weight 96) and 129 parts of dibutylamine (molecular weight 129) were added to the cooled resin, and they were reacted for 6 hours to eliminate the epoxy group. Then, a 205 parts of methylisobutylketone was added while the mixture was cooling, to obtain a pyrazole-modified epoxy resin having 60% of solid matter. The epoxy resin is defined as the resin composition (1). The resin composition (1) is a product of the reaction between the film-forming organic resin (A) and the active-hydrogenhydrogen-laden compound that contains 50 mole % of hydrazine derivative (C) containing active hydrogen.

SYNTHESIS EXAMPLE 2

A 4000 parts of EP1007 (epoxy equivalent 2000, manufactured by Yuka Shell Epoxy Co., Ltd.) and 2239 parts of ethyleneglycol monobutylether were charged into a flask with four necks, which mixture was then heated to 120° C. to let them react for 1 hour to fully dissolve the epoxy resin. The mixture was cooled to 100° C. A 168 parts of 3-amino-1,2,4-triazole (molecular weight 84) was added to the mixture, and they were reacted for 6 hours to eliminate the epoxy group. Then, a 540 parts of methylisobutylketone was added while the mixture was cooling, to obtain a triazole-modified epoxy resin having 60% of solid matter. The epoxy resin is defined as the resin composition (2). The resin composition (2) is a product of the reaction between the film-forming organic resin (A) and the active-hydrogenhydrogen-laden compound that contains 100 mole % of hydrazine derivative (C) containing active hydrogen.

SYNTHESIS EXAMPLE 3

A 222 parts of isophorone diisocyanate (epoxy equivalent 111) and 34 parts of methylisobutylketone were charged into a flask with four necks. A 87 parts of methylethylketoxime (molecular weight 87) was added to the mixture dropwise for 3 hours while keeping the mixture at temperatures ranging from 30 to 40° C., then the mixture was kept to 40° C. for 2 hours. Thus, a block isocyanate having isocyanate equivalent of 309 and solid content of 90% was obtained.

A 1489 parts of EP828 (epoxy equivalent 187, manufactured by Yuka Shell Epoxy Co., Ltd.), 684 parts of bisphenol A, 1 part of tetraethylammonium bromide, and 241 parts of methylisobutylketone were charged into a flask with four necks, which mixture was then heated to 140° C. to let them react for 4 hours. Thus, an epoxy resin having epoxy equivalent of 1090 and solid content of 90% was obtained. To the epoxy resin, 1000 parts of methylisobutylketone was added, then the mixture was cooled to 100° C., and 202 parts of 3-mercapto-1,2,4-triazole (molecular weight 101) was added to the mixture, and let the mixture react for 6 hours to fully eliminate the epoxy group. After that, the part-block isocyanate of the above-described 90% solid portion was added to the reaction product to let the mixture react at 100° C. for 3 hours, and the vanish of isocyanate group was confirmed. Further, 461 parts of ethyleneglycol monobutylether was added to the product to obtain a triazole-modified epoxy resin having 60% solid content. The product is defined as the resin composition (3). The resin composition (3) is a product of the reaction between the film-forming organic resin (A) and the active-hydrogenhydrogen-laden compound that contains 100 mole % of hydrazine derivative (C) containing active hydrogen.

SYNTHESIS EXAMPLE 4

A 1870 parts of EP828 (epoxy equivalent 187, manufactured by Yuka Shell Epoxy Co., Ltd.), 912 parts of bisphenol A, 2 parts of tetraethylammonium bromide, and 300 parts of methylisobutylketone were charged into a flask with four necks, which mixture was then heated to 140° C. to let them react for 4 hours. Thus, an epoxy resin having epoxy equivalent of 1391 and solid content of 90% was obtained. To the epoxy resin, 1500 parts of ethyleneglycol monobutylether was added, then the mixture was cooled to 100° C., and 258 parts of dibutylamine (molecular weight 129) was added to the mixture, and let the mixture react for 6 hours to fully eliminate the epoxy group. While cooling the mixture, 225 parts of methylisobutylketone was further added to the mixture to obtain an epoxyamine adduct having 60% solid content. The product is defined as the resin composition (4). The resin composition (4) is a product of the reaction between the film-forming organic resin (A) and the active-hydrogenhydrogen-laden compound of hydrazine derivative (C) containing no active hydrogen.

A curing agent was blended to each of the synthesized resin compositions (1) through (4) to prepare the resin compositions (paint compositions) listed in Table 135.

To obtain organic coating steel sheets for household electric appliances, building materials, and automobile parts, the plating steel sheets shown in Table 136 were used as the target base plates, which plates were prepared by applying zinc base plating or aluminum base plating on the cold-rolled steel sheets having a plate thickness of 0.8 mm and a surface roughness Ra of 1.0 $\mu$m. The surface of the plating steel sheet was treated by alkaline degreasing and water washing, then the paint composition shown in Table 135 was applied to the surface using a roll coater, followed by heating to dry at various temperatures to form the organic coating steel sheets. The thickness of the organic coating was adjusted by the solid content in the paint composition (heating residue) or applying conditions (roll pressing force, rotational speed, and other variables).

To each of thus obtained organic coating steel sheets, evaluation was given in terms of quality performance (appearance of coating, white-rust resistance, paint adhesiveness). The results are given in Tables 137 and 138 along with the structure of organic coating.

TABLE 135

| | Base resin | | Curing agent | | | Adaptability to the |
|---|---|---|---|---|---|---|
| No. | Type*1 | Blending rate | Type*2 | Blending rate | Catalyst | conditions of the invention |
| 1 | (1) | 100 parts | A | 5 parts | Dibutyltin dilaurate (0.2 part) | Example |
| 2 | (1) | 100 parts | B | 25 parts | Dibutyltin dilaurate (1.0 part) | Example |
| 3 | (1) | 100 parts | C | 25 parts | — | Example |
| 4 | (2) | 100 parts | A | 50 parts | Dibutyltin dilaurate (2.0 part) | Example |
| 5 | (2) | 100 parts | B | 50 parts | Dibutyltin dilaurate (3.0 part) | Example |
| 6 | (2) | 100 parts | C | 80 parts | Dibutyltin dilaurate (4.0 part) | Example |
| 7 | (3) | 100 parts | A | 25 parts | Cobalt naphthenate (1.0 part) | Example |
| 8 | (3) | 100 parts | B | 10 parts | Tin (II) chloride (1.0 part) | Example |
| 9 | (3) | 100 parts | C | 50 parts | N-ethylmorpholine (1.0 part) | Example |
| 10 | (1) | 100 parts | D | 25 parts | — | Example |
| 11 | (3) | 100 parts | D | 30 parts | — | Example |
| 12 | (4) | 100 parts | B | 25 parts | Dibutyltin dilaurate (1.0 part) | Comparative example |
| 13 | Aqueous solution of a hydrazine derivative (aqueous solution of 5 wt. % 3,5-dimethylpyrazole) | | | | | Comparative example |
| 14 | Mixture of an epoxyamine adduct and a hydrazine derivative (3 parts by weight of 3,5-dimethylpyrazole per 100 parts by weight of base resin is added to the composition No. 12, followed by agitating the mixture.) | | | | | Comparative example |

*1 The resin compositions (1) through (4) which were synthesized in Synthesis Examples 1 through 4 described in the body of this specification.
*2
A An MEK oxime block body of IPDI, "TAKENATE B-870N" produced by Takeda Chemical Industries, Ltd.
B Isocyanurate type: "DESMODUR BL-3175" produced by Bayer A. G.
C An MEK oxime block body of HMDI, "DURANATE MF-B80M" produced by Asahi Chemical Industry Co., Ltd.
D A melamine resin of imino-base: "CYMEL 325" produced by Mitsui Cytech Co., Ltd.

TABLE 136

| [Plating steel plate] | | |
|---|---|---|
| No. | Type | Coating weight (g/m²) |
| 1 | Electrolytically galvanized steel plate | 20 |

TABLE 137

| No. | Plating steel plate*1 | Resin composition*3 | Drying temperature (° C.) | Coating thickness (μm) | Appearance | White-rust resistance: SST 72 hrs | White-rust resistance after alkaline SST 72 hrs | Paint adhesiveness | Classification |
|---|---|---|---|---|---|---|---|---|---|
| 1 | 1 | 1 | 150 | 1.5 | ○ | ⊚ | ⊚ | ⊚ | Example |
| 2 | 1 | 2 | 150 | 1.5 | ○ | ⊚ | ⊚ | ⊚ | Example |
| 3 | 1 | 3 | 150 | 1.5 | ○ | ⊚ | ⊚ | ⊚ | Example |
| 4 | 1 | 4 | 150 | 1.5 | ○ | ⊚ | ⊚ | ⊚ | Example |
| 5 | 1 | 5 | 150 | 1.5 | ○ | ⊚ | ⊚ | ⊚ | Example |
| 6 | 1 | 6 | 150 | 1.5 | ○ | ⊚ | ⊚ | ⊚ | Example |
| 7 | 1 | 7 | 150 | 1.5 | ○ | ⊚ | ⊚ | ⊚ | Example |
| 8 | 1 | 8 | 150 | 1.5 | ○ | ⊚ | ⊚ | ⊚ | Example |
| 9 | 1 | 9 | 150 | 1.5 | ○ | ⊚ | ⊚ | ⊚ | Example |
| 10 | 1 | 10 | 150 | 1.5 | ○ | ⊚ | ⊚ | ⊚ | Example |
| 11 | 1 | 11 | 150 | 1.5 | ○ | ⊚ | ⊚ | ⊚ | Example |
| 12 | 1 | 12 | 150 | 1.5 | ○ | △ | × | ⊚ | Comparative example |
| 13 | 1 | 13 | 150 | 1.5 | ○ | × | × | × | Comparative example |
| 14 | 1 | 14 | 150 | 1.5 | ○ | △ | × | ⊚ | Comparative example |
| 15 | 1 | 1 | 40 | 1.5 | ○ | × | × | × | Comparative example |
| 16 | 1 | 1 | 50 | 1.5 | ○ | ○− | ○− | ○ | Example |
| 17 | 1 | 1 | 80 | 1.5 | ○ | ○ | ○ | ○+ | Example |

*1 Corresponding to No. given in Table 136
*2 Corresponding to No. given in Table 135

TABLE 138

| No. | Plating steel plate*1 | Resin composition*3 | Drying temperature (° C.) | Coating thickness (μm) | Appearance | White-rust resistance: SST 72 hrs | White-rust resistance after alkaline SST 72 hrs | Paint adhesiveness | Classification |
|---|---|---|---|---|---|---|---|---|---|
| 18 | 1 | 1 | 120 | 1.5 | ○ | ⊚ | ○+ | ⊚ | Example |
| 19 | 1 | 1 | 180 | 1.5 | ○ | ⊚ | ⊚ | ⊚ | Example |
| 20 | 1 | 1 | 200 | 1.5 | ○ | ⊚ | ⊚ | ⊚ | Example |
| 21 | 1 | 1 | 230 | 1.5 | ○ | ⊚ | ⊚ | ⊚ | Example |
| 22 | 1 | 1 | 250 | 1.5 | ○ | ⊚ | ⊚ | ⊚ | Example |
| 23 | 1 | 1 | 300 | 1.5 | ○ | ⊚ | ⊚ | ⊚ | Example |
| 24 | 1 | 1 | 350 | 1.5 | ○ | △ | △ | ⊚ | Comparative example |
| 25 | 1 | 1 | 200 | 0.01 | ○ | × | × | ⊚ | Comparative example |
| 26 | 1 | 1 | 200 | 0.1 | ○ | ○− | ○− | ⊚ | Example |
| 27 | 1 | 1 | 200 | 0.5 | ○ | ○ | ○ | ⊚ | Example |
| 28 | 1 | 1 | 200 | 1.0 | ○ | ⊚ | ⊚ | ⊚ | Example |
| 29 | 1 | 1 | 200 | 2.0 | ○ | ⊚ | ⊚ | ⊚ | Example |
| 30 | 1 | 1 | 200 | 2.5 | ○ | ⊚ | ⊚ | ⊚ | Example |
| 31 | 1 | 1 | 200 | 3.0 | ○ | ⊚ | ⊚ | ⊚ | Example |
| 32 | 1 | 1 | 200 | 4.0 | ○ | ⊚ | ⊚ | ⊚ | Example |
| 33 | 1 | 1 | 200 | 5.0 | ○ | ⊚ | ⊚ | ⊚ | Example |
| 34 | 1 | 1 | 200 | 20 | ○ | ⊚ | ⊚ | ⊚ | Comparative※1 example |

*1 Corresponding to No. given in Table 136
*2 Corresponding to No. given in Table 135
※1 Unable to weld

Best Mode 6

According to a finding of the inventors of the present invention, an organic coating steel sheet inducing no pollution problem and providing excellent corrosion resistance is obtained without applying chromate treatment which may give bad influence to environment and human body, through the steps of: forming a specific composite oxide coating as the primary layer coating on the surface of a zinc base plating steel sheet or an aluminum base plating steel sheet; then, on the primary layer coating, forming an organic coating as the secondary layer coating having a specific organic polymer resin as the base resin; further preferably blending an adequate amount of a specific rust-preventive agent into the organic coating.

The organic coating steel sheet according to the present invention is basically characterized in that a composite oxide coating as the primary layer coating comprising (α) fine particles of oxide, (β) one or more of metal selected from the group consisting of Mg, Ca, Sr, and Ba (including the case that the metal is in a form of compound and/or composite compound), and (γ) phosphoric acid and/or phosphoric acid compound, is formed on the surface of a zinc base plating steel sheet or an aluminum base plating steel sheet, and that, further on the primary coating layer, an organic coating as the secondary layer coating containing an organic polymer resin (A) (preferably a thermosetting resin, and further preferably an epoxy resin and/or a modified epoxy resin) containing OH group and/or COOH group, as the second layer coating.

Preferably the above-described composite oxide coating as the primary layer coating contains: $SiO_2$ fine particles as the component (α) at a specific coating weight; one or more substance (magnesium component) selected from the group consisting of Mg, a compound containing Mg, a composite compound containing Mg, as the component (β) at a specific coating weight; and phosphoric acid and/or phosphoric acid compound as the component (γ) at a specific coating weight.

Although the mechanism of corrosion resistance in the dual layer coating structure consisting of a specific composite oxide coating and a specific organic coating is not fully analyzed, a thin coating provides corrosion resistance equivalent to that of chromate coating owing to the synergy effect of the corrosion-suppression effect of the composite oxide coating of the primary coating, described below, and the barrier action of the film-forming resin of the secondary layer coating.

The corrosion preventive mechanism of the composite oxide coating as the primary layer coating is not fully understood. The excellent corrosion-preventive performance, supposedly, owes to that the dense and slightly soluble composite oxide coating acts as a barrier coating to shut off corrosion causes, that the fine particles of oxide such as silicon oxide ($SiO_2$) form a stable and dense barrier coating along with an alkali earth metal such as Mg and phosphoric acid and/or phosphoric acid compound, and that, when the fine particles of oxide are those of silicon oxide ($SiO_2$), the silicic acid ion emitted from the silicon oxide forms basic zinc chloride under a corrosive environment to improve the barrier performance. Even when defects occur on the coating, it is supposed that a cathodic reaction generates OH ion to bring the interface to alkali side, and Mg ion and Ca ion, which are soluble matter in alkali earth metal, precipitates as $Mg(OH)_2$ and Ca(OH)2, respectively, which act as the dense and slightly soluble reaction products to seal the defects, thus resulting in suppressing the corrosion reactions. Also it is assumed that phosphoric acid and/or phosphoric acid compound contributes to the improvement of denseness of the composite oxide coating, further that the phosphoric acid component catches the zinc ion which is eluted during an anodic reaction as a corrosion reaction in the coating-defect section, then the phosphoric acid component is converted to a slightly soluble zinc phosphate compound to form a precipitate at that place. As described above, alkali earth metals and phosphoric acid and/or phosphoric acid compounds should perform self-repair action in the coating-defect section.

That kind of work effect appears particularly when the composite oxide coating contains, as described before, $SiO_2$ fine particles as the component (α) at a specific coating weight; a magnesium component as the component (β) at a specific coating weight; and phosphoric acid and/or phosphoric acid compound as the component (γ) at a specific coating weight.

The corrosion-preventive mechanism of the organic coating as the above-described secondary layer coating is also not fully analyzed. The mechanism is, however, presumably the following. An organic polymer resin (A) (preferably a thermosetting resin, and further preferably an epoxy resin and/or a modified epoxy resin) containing OH group and/or COOH group reacts with a cross-linking agent to form a dense barrier coating. The barrier coating has superior penetration-suppression performance against the corrosion causes such as oxygen, and provides strong bonding force with the base material, thus providing particularly excellent corrosion resistance.

According to the organic coating steel sheet of the present invention, further high anti-corrosive performance (self-repair work at coating-defect section) is attained by blending adequate amount of ion-exchanged silica (a) with an organic coating consisting of above-described specific organic polymer resin (A). The corrosion-preventive mechanism attained by blending an ion-exchanged silica (a) to the specific organic coating is presumably the following. When cation such as Na ion enters under a corrosion environment, the iron exchange action emits Ca ion and Mg ion from the surface of silica. Furthermore, when OH ion is generated by the cathode reaction under the corrosive environment to increase pH value near the plating interface, the Ca ion (or Mg ion) emitted from the ion-exchanged silica precipitates in the vicinity of the plating interface in a form of $Ca(OH)_2$ or $Mg(OH)_2$, respectively. The precipitate seals defects as a dense and slightly soluble product to suppress the corrosion reactions. There may given an effect that the eluted zinc ion is exchanged with Ca ion (or Mg ion) and is fixed onto the surface of silica.

According to the organic coating steel sheet of the present invention, the corrosion resistance can also be increased by blending an adequate amount of silica fine particles (b) with an organic coating consisting of a specific organic polymer resin (A) as described above. That is, by blending silica fine particles such as fumed silica and colloidal silica (having average primary particle sizes of from 5 to 50 nm, preferably from 5 to 20 nm, more preferably from 5 to 15 nm) having large specific surface area into a specific organic coating, the generation of dense and stable corrosion products such as basic zinc chloride is enhanced, thus suppressing the generation of zinc oxide (white-rust).

Furthermore, according to the organic coating steel sheet of the present invention, the corrosion resistance can further be increased by blending an ion-exchanged silica (a) and silica fine particles (b) together into the organic coating consisting of a specific organic polymer resin (A) as described above. The ion-exchanged silica consists mainly of porous silica, and generally has a relatively large particle size, 1 μm or more. Accordingly, after releasing Ca ion, the rust-preventive effect as silica is not much expectable. Consequently, by accompanying fine particle silica having a relatively large specific surface area, such as fumed silica and colloidal silica, (with primary particle sizes of from 5 to 50 nm, preferably from 5 to 20 nm, more preferably from 5 to 15 nm), the generation of dense and stable corrosion products such as basic zinc chloride may be enhanced, thus suppressing the generation of zinc oxide (white rust). Through the combined rust-preventive mechanisms of ion-exchanged silica and fine particle silica, particularly strong corrosion-preventive effect would appear.

The following is the description of the composite oxide coating as the primary layer coating which is formed on the surface of zinc base plating steel sheet or aluminum base plating steel sheet.

Quite different from conventional alkali silicate treatment coating which is represented by the coating composition consisting of lithium oxide and silicon oxide, the composite oxide coating according to the present invention comprises:

(α) fine particles of oxide (preferably $SiO_2$ fine particles);

(β) one or more of metal selected from the group consisting of Mg, Ca, Sr, and Ba (including the case that the metal is in a form of compound and/or composite compound); and (γ) phosphoric acid and/or phosphoric acid compound.

Particularly preferable oxide fine particles as the above-described component (α) are those of silicon oxide (fine particles of $SiO_2$), and most preferable one among the silicon oxides is colloidal silica.

Among these silicon oxides (SiO$_2$ fine particles), the ones having particle sizes of 14 nm or less, more preferably 8 nm or less are preferred from the viewpoint of corrosion resistance.

The silicon oxide may be used by dispersing dry silica fine particles in a coating composition solution. Examples of the dry silica are AEROSIL 200, AEROSIL 3000, AEROSIL 300CF, AEROSIL 380, (these are trade names) manufactured by Japan Aerosil Co., Ltd., and particularly the ones having particle sizes of 12 nm or less, more preferably 7 nm or less are preferred.

Other than above-described silicon oxides, the oxide fine particles may be colloidal liquid and fine particles of aluminum oxide, zirconium oxide, titanium oxide, cerium oxide, and antimony oxide.

From the viewpoint of corrosion resistance and weldability, a preferred range of coating weight of the above-described component ($\alpha$) is from 0.01 to 3,000 mg/m$^2$, more preferably from 0.1 to 1,000 mg/m$^2$, and most preferably from 1 to 500 mg/m$^2$.

As for the specific alkali earth metal components (Mg, Ca, Sr , Ba), which a re the above-described component ($\beta$) one or more of these alkali earth metals are necessary to be contained in the coating. The form of these alkali earth metals existing in the coating is not specifically limited, and they may exist in a form of metal, or compound or composite compound of their oxide, hydroxide, hydrated oxide, phosphoric acid compound, coordination compound, or the like. The ionicity and solubility of these compound, hydroxide, hydrated oxide, phosphoric acid compound, coordination compound, o r the like are not specifically limited.

Among those alkali earth metals, it is most preferable to use Mg to obtain particularly superior corrosion resistance. The presumable reason of significant increase in corrosion resistance by the addition of Mg is that Mg shows lower solubility of its hydroxide than other alkali earth metals, thus likely forming slightly soluble salt.

The method to introduce the component ($\beta$) into coating may be the addition of phosphate, sulfate, nitrate, chloride, or the like of Mg, Ca, Sr, Ba to the coating composition.

From the standpoint of prevention of degradation in corrosion resistance and in coating appearance, a preferred range of coating weight of the above-described ($\beta$) is from 0.01 to 1,000 mg/m$^2$ as metal, more preferably from 0.1 to 500 mg/m$^2$, and most preferably from 1 to 100 mg/m$^2$.

The phosphoric acid and/or phosphoric acid compound as the above-described component ($\gamma$) may be blended by adding orthophosphoric acid, pyrophosphoric acid, polyphosphoric acid, or metallic salt or compound of them to the coating composition.

There is no specific limitation on the form of existing phosphoric acid and phosphoric acid compound in the coating, and they may be crystals or non-crystals. Also there is no specific limitation on the ionicity and solubility of phosphoric acid and phosphoric acid compound in the coating.

From the viewpoint of corrosion resistance and weldability, a preferred range of coating weight of the above-described component ($\gamma$) is from 0.01 to 3,000 mg/m$^2$ as P$_2$O$_5$, more preferably from 0.1 to 1,000 mg/m$^2$, and most preferably from 1 to 500 mg/m$^2$.

The composite oxide coating may further contain an organic resin for improving workability and corrosion resistance of the coating. Examples of the organic resin are epoxy resin, polyurethane resin, polyacrylic resin, acrylic-ethylene copolymer, acrylic-styrene copolymer, alkyd resin, polyester resin, polyethylene resin. These resins may be introduced into the coating in a form of water-soluble resin or water-dispersible resin.

Adding to these water type resins, it is effective to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

For further improving the corrosion resistance, the composite oxide coating may further contain polyphosphate, phosphate (for example, zinc phosphate, aluminum dihydrogen phosphate, and zinc phosphite), molybdate, phospho molybdate (for example, aluminum phosphomolybdate), organic phosphate and its salt (for example, phytic acid, phytiate, phosphonic acid, phosphonate, their metal salt and alkali metal salt), organic inhibitor (for example, hydrazine derivative, thiol compound, dithiocarbamate), organic compound (polyethyleneglycol), and the like.

Other applicable additives include organic coloring pigments (for example, condensing polycyclic organic pigments, phthalocyanine base organic pigments), coloring dyes (for example, azo dye soluble in organic solvent, azo metal dye soluble in water), inorganic pigments (titanium oxide), chelating agents (for example, thiol), conductive pigments (for example, metallic powder of zinc, aluminum, nickel, or the like, iron phosphide, antimony-dope type tin oxide), coupling agents (for example, silane coupling agent and titanium coupling agent), melamine-cyanuric acid additives.

The composite oxide coating may contain one or more of iron group metallic ions (Ni ion, Co ion, Fe ion) to prevent blackening (an oxidizing phenomenon appeared on plating surface) under a use environment of organic coating steel sheets. As of these ions, addition of Ni ion is most preferable. In that case, concentration of the iron base metallic ion of 1/10,000 mole per 1 mole of the component ($\beta$), converted to the metal amount in the target composition, gives satisfactory effect. Although the upper limit of the iron group ion is not specifically limited, it is preferable to select a concentration level thereof not to give influence to the corrosion resistance.

A preferable range of the thickness of the composite oxide coating is from 0.005 to 3 $\mu$m, more preferably from 0.01 to 2 $\mu$m, further preferably from 0.1 to 1 $\mu$m, and most preferably from 0.2 to 0.5 $\mu$m. If the thickness of the composite oxide coating is less than 0.005 $\mu$m, the corrosion resistance degrades. If the thickness of the composite oxide coating exceeds 3 $\mu$m, conductive performance such as weldability degrades. When the composite oxide coating is specified in terms of coating weight, it is adequate to specify the sum of coating weight of the above-described component ($\alpha$), the above-described component ($\beta$) converted to metal amount, and the above-described component ($\gamma$) converted to P$_2$O$_5$, to a range of from 6 to 3,600 mg/m$^2$, more preferably from 10 to 1,000 mg/m$^2$, and most preferably from 50 to 500 mg/m$^2$. If the total coating weight is less than 6 mg/m$^2$, the corrosion resistance degrades. If the total coating weight exceeds 3,600 mg/m$^2$, the conductive performance such as weldability degrades.

To attain particularly superior performance of the present invention, it is preferable that the above-described oxide coating comprises: SiO$_2$ fine particles as the component ($\alpha$) at a specific coating weight; one or more of magnesium components selected from the group consisting of Mg, a compound containing Mg, and a composite compound containing Mg, as the component ($\beta$) at a specific coating weight; and phosphoric acid and/or phosphoric acid compound as the component ($\gamma$) at a specific coating weight.

The preferred condition for $SiO_2$ fine particles as the above-described component ($\alpha$) was described before.

A preferred range of the coating weight of the $SiO_2$ fine particles in the coating is from 0.01 to 3,000 mg/m² as $SiO_2$, more preferably from 0.1 to 1,000 mg/m², further preferably from 1 to 500 mg/m², and most preferably from 5 to 100 mg/m².

If the coating weight of $SiO_2$ fine particles is less than 0.01 mg/m² as $SiO_2$, the contribution of the silicon component emitted from silicon oxide to the corrosion resistance becomes small to fail in attaining sufficient corrosion resistance. If the coating weight of $SiO_2$ fine particles exceeds 3,000 mg/m² as $SiO_2$, the conductive performance such as weldability degrades.

Introduction of the above-described component ($\alpha$) into the coating may be done by adding a silicic acid sol such as colloidal silica to the film-forming composition. Examples of preferred colloidal silica are described before.

The form of magnesium component as the above-described component ($\beta$) existing in the coating is not specifically limited, and it may be metal, or compound or composite compound such as oxide, hydroxide, hydrated oxide, phosphoric acid compound, coordination compound. The ionicity and solubility of these compound, hydroxide, hydrated oxide, phosphoric acid compound, coordination compound, or the like are not specifically limited.

A preferable range of the coating weight of the magnesium component in the coating is from 0.01 to 1,000 mg/² as Mg, more preferably from 0.1 to 500 mg/m², and most preferably from 1 to 100 mg/m².

If the coating weight of magnesium component is less than 0.01 mg/m² as Mg, the contribution of the magnesium component to the corrosion resistance becomes small to fail in attaining sufficient corrosion resistance. If the coating weight of magnesium component exceeds 1,000 mg/m² as Mg, the excess amount of magnesium exists as a soluble component, which degrades the appearance of the coating.

Introduction of the above-described component ($\beta$) into the coating may be done by adding phosphate, sulfate, nitrate, chloride of magnesium, or magnesium oxide fine particles, to the film-forming composition.

In particular, the composite oxide according to the present invention contains phosphoric acid as a constitution component, it is preferable to add a phosphate such as magnesium phosphate to the target composition. In that case, the form of magnesium phosphate is not specifically limited, and it may be orthophosphate, pyrophosphate, tripolyphosphate, phosphite, hypophosphate.

For the methods and the forms in the coating of phosphoric acid and/or phosphoric acid compound as the above-described component ($\gamma$), there is no specific limitation as described before.

In the composite oxide coating, since the phosphoric acid component coexists with a magnesium component, the form of phosphoric acid compound in the coating may be phosphate or condensing phosphate of magnesium phosphate. Methods to introduce those phosphoric acid compounds into the coating may be the addition of phosphate or organic phosphoric acid or its salt (for example, phytic acid, phytiate, phosphonic acid, phosphonate, their metal salt) to the target composition.

A preferable range of coating weight of phosphoric acid and/or phosphoric acid compound in the coating is from 0.01 to 3,000 mg/m² as $P_2O_5$, more preferably from 0.1 to 1,000 mg/m², and most preferably from 1 to 500 mg/m².

If the coating weight of phosphoric acid and/or phosphoric acid compound is less than 0.01 mg/m² as $P_2O_5$, the corrosion resistance degrades. If the coating weight of phosphoric acid and/or phosphoric acid compound exceeds 3,000 mg/m² as $P_2O_5$, the conductive performance degrades and the weldability degrades.

To attain particularly superior corrosion resistance, it is preferred to select the ratio of the magnesium component as the component ($\beta$) to the $SiO_2$ fine particles as the component ($\alpha$) in the composite oxide coating to a range of from 1/100 to 100/1 as the molar ratio of the component ($\beta$) as Mg to the component ($\alpha$) as $SiO_2$, or [Mg/$SiO_2$], more preferably from 1/10 to 10/1, and most preferably from 1/2 to 5/1.

The reason of giving particularly superior corrosion resistance when the ratio of coating weight of magnesium to $SiO_2$ fine particles is selected to the range given above is not fully analyzed. It is, however, speculated that, when the ratio of the magnesium component to the $SiO_2$ fine particles falls in the range given above, the synergy effect of the corrosion-suppressing actions of each of the silicon component emitted from the $SiO_2$ fine particles and the magnesium component markedly appears.

From the similar viewpoint, it is preferred to select the ratio of the phosphoric acid and/or phosphoric acid compound as the component ($\gamma$) to the magnesium component as the component ($\beta$) in the composite oxide coating to a range of from 1/100 to 100/1 as the molar ratio of the component ($\gamma$) as $P_2O_5$ to the component ($\beta$) as Mg, or [$P_2O_5$/Mg], more preferably from 1/10 to 10/1, and most preferably from 1/2 to 2/1.

The reason of giving particularly superior corrosion resistance when the ratio of coating weight of phosphoric acid and/or phosphoric acid compound to magnesium is selected to the range given above is not fully analyzed. It is, however, speculated that, when the ratio of the phosphoric acid and/or phosphoric acid compound to the magnesium component falls in the range given above, the synergy effect of the corrosion-suppressing actions of each of the phosphoric acid and/or phosphoric acid compound and the magnesium component markedly appears.

To obtain most excellent corrosion resistance, it is preferred to select the ratio of the magnesium component as the component ($\beta$) and the $SiO_2$ fine particles as the component ($\alpha$) in the composite oxide coating to a range of from 1/100 to 100/1 as the molar ratio of the component ($\beta$) as Mg to the component ($\alpha$) as $SiO_2$, or [Mg/$SiO_2$], more preferably from 1/10 to 10/1, and most preferably from 1/2 to 5/1, further to select the ratio of the phosphoric acid and/or phosphoric acid compound as the component ($\gamma$) to the magnesium component as the component ($\beta$) in the composite oxide coating to a range of from 1/100 to 100/1 as the molar ratio of the component ($\gamma$) as $P_2O_5$ to the component ($\beta$) as Mg, or [$P_2O_5$/Mg], more preferably from 1/10 to 10/1, and most preferably from 1/2 to 2/1.

The reason of giving most excellent corrosion resistance when the ratio of magnesium component, $SiO_2$ fine particles, and phosphoric acid and/or phosphoric acid compound is selected to the range given above is presumably explained by the significant synergy effect of corrosion-suppressing actions of each component, as described above, and by the optimization of coating mode resulted from the reaction with base material for plating during the film-forming period.

A preferred range of the total coating weight in the composite oxide coating, or the sum of the coating weight of the above-described component ($\alpha$) as $SiO_2$, the coating weight of the above-described component ($\beta$) as Mg, and the coating weight of the above-described component ($\gamma$) as $P_2O_5$, is from 6 to 3,600 mg/m², more preferably from 10 to 1,000 mg/m², and most preferably from 50 to 500 mg/m². If the total coating weight is less than 6 mg/m², the corrosion resistance becomes insufficient. If the total coating weight exceeds 3,600 mg/m², the conductive performance such as weldability degrades.

The following is the description about the organic coating formed as the secondary layer coating on the above-described oxide coating.

As the base resin of the organic coating, organic polymer resins (A) having OH group and/or COOH group are used. As of these resins, thermosetting resins are preferred, and epoxy resins or modified epoxy resins are particularly preferred.

Examples of the organic polymer resin containing OH group and/or COOH group are epoxy resin, polyhydroxy-polyether resin, acrylic copolymer resin, ethylene-acrylic acid copolymer resin, alkyd resin, polybutadiene resin, phenol resin, polyurethane resin, polyamine resin, polyphenylene resin, and mixture or addition polymerization product of two or more of these resins.

(1) Epoxy Resin

Examples of epoxy resin are: epoxy resins which are prepared by glycidyl-etherifying bisphenol A, bisphenol F, novorak and the like; epoxy resins which are prepared by adding propyleneoxide, ethyleneoxide, or polyalkylenegly-col to bisphenol A, followed by glycidyl-etherifying; aliphatic epoxy resins, alicyclic epoxy resins, and polyether base epoxy resins.

As for these epoxy resins, particularly when they are necessary to be cured in low temperatures, preferably the number-average molecular weight of them is 1,500 or more. These epoxy resins may be used separately or mixing two or more of them.

The modified epoxy resins include the ones in which various types of modifiers are reacted with epoxy group or hydroxyl group in the above-described given epoxy resins. Examples of these modified epoxy resins are an epoxy-ester resin prepared by reacting carboxylic group in the drying oil fatty acid, an epoxy-acrylate resin prepared by modifying thereof using acrylic acid, methacrylic acid, or the like; a urethane-modified epoxy resin prepared by reacting with an isocyanate compound; and an amine-added-urethane-modified epoxy resin prepared by reacting an epoxy resin with an isocyanate compound to form a urethane-modified epoxy resin, followed by adding an alkanol amine to the urethane-modified epoxy resin.

The above-described hydroxypolyether resins are polymers prepared by polycondensation of a divalent phenol of a mononuclear or dinuclear divalent phenol or a mixture of mononuclear and dinuclear divalent phenols with a nearly equal moles of epihalohydrin under the presence of an alkali catalyst. Typical examples of the mononuclear divalent phenol are resorcin, hydroquinone, and catechol. Typical example of the dinuclear divalent phenol is bisphenol A. These divalent phenols may be used separately or two or more of them simultaneously.

(2) Polyurethane Resin

Examples of polyurethane resin are oil-modified polyurethane resin, alkyd base polyurethane resin, polyester base polyurethane resin, polyether base polyurethane resin, and polycarbonate base polyurethane resin.

(3) Alkyd Resin

Examples of alkyd resin are oil-modified alkyd resin, resin-modified alkyd resin, phenol-modified alkyd resin, styrenated alkyd resin, silicon-modified alkyd resin, acrylic-modified alkyd resin, oil-free alkyd resin, and high molecular weight oil-free alkyd resin.

(4) Polyacrylic Resin

Examples of polyacrylic resin are polyacrylic acid and its copolymer, polyacrylic ester and its copolymer, polymethacrylic acid ester and its copolymer, polymethacrylic acid ester and its copolymer, urethane-acrylic acid copolymer (or urethane-modified polyacrylic resin), styrene-acrylic acid copolymer. Further these resins may be modified by other alkyd resin, epoxy resin, phenol resin, and the like.

(5) Polyethylene Resin (Polyolefin Resin)

Examples of polyethylene resin are: ethylene base copolymers such as ethylene-acrylic acid copolymer, ethylene-methacrylic acid copolymer, carboxylic-modified polyolefin resin; ethylene-unsaturated carboxylic acid copolymers, and ethylene base ionomers. Further these resins may be modified by other alkyd resin, epoxy resin, and phenol resin.

(6) Acrylic Silicon Resin

Examples of acrylic silicon resin are the one which contains an acrylic base copolymer as a main component having hydrolyzable alcoxysilyl group at side chain or terminal of the acrylic base copolymer, further contains a curing agent. When that kind of acrylic silicon resin is used, superior weather-resistance is obtained.

(7) Fluororesin

Example of fluororesin is a fluoro-olefin base copolymer including a copolymer of a fluorine monomer (fluoro-olefin) with a monomer such as alkylvinylether, syncro-alkylvinylether, carboxylic acid modified vinylester, hydroxy-alkylallylether, tetrafluoropropylvinylether. When that kind of fluororesin is used, superior weather-resistance and hydrophobic property.

Aiming at reduction of resin drying temperature, there may be applied a resin having difference in resin kinds between the core and the shell of the resin particle, or a core-shell type water-dispersible resin comprising resins having different glass transition temperatures to each other.

By using a water-dispersible resin having self-cross-linking property, and by adding, for example, alkoxysilane group to the resin particles to generate silanol group by hydrolysis of alkoxysilane during the heating and drying process of the resin, it is possible to utilize cross-linking process between particles using the dehydration condensation reaction of the silanol group between the resin particles.

As a resin to use for the organic coating, an organic composite silicate which is prepared by compositing an organic resin with a silane coupling agent is preferable.

According to the present invention, aiming at the improvement of corrosion resistance and workability of the organic coating, particularly the thermosetting resins are preferred. In this case, there may be added curing agent such as amino resins including urea resin (butylated urea resin, and the like), melamine resin (butylated melamine resin), butylated urea-melamine resin, and benzoguanamine resin, block isocyanate, oxazoline compound, and phenol resin.

Among these organic resins, epoxy resin and polyethylene base resin are preferable from the viewpoint of corrosion resistance, workability, and paintability, and, particularly preferred ones are thermosetting epoxy resin and modified epoxy resin which have excellent shut-off performance against corrosive causes such as oxygen. Examples of these thermosetting resins are thermosetting epoxy resin, thermosetting modified epoxy resin, acrylic base copolymer resin copolymerized with an expoxy-groupgroup-laden monomer, expoxy-groupgroup-laden polybutadiene resin, expoxy-groupgroup-laden polyurethane resin, and their adducts or condensates. These expoxy-groupgroup-laden resins may be used separately or mixing two or more of them.

According to the present invention, the organic coating may include ion-exchanged silica (a) and/or fine particle silica (b) as the rust-preventive additive.

The ion-exchanged silica is prepared by fixing metallic ion such as calcium and magnesium ions on the surface of porous silica gel powder. Under a corrosive environment, the metallic ion is released to form a deposit film. Among these ion-exchanged silicas, Ca ion-exchanged silica is most preferable.

Any type of Ca ion-exchanged silica may be applied. A preferred range of average particle size of Ca ion-exchanged silica is 6 μm or less, more preferably 4 μm or less. For example, Ca ion-exchanged silica having average particle sizes of from 2 to 4 μm may be used. If the average particle size of Ca ion-exchanged silica exceeds 6 μm, the corrosion resistance degrades and the dispersion stability in the coating composition degrades.

A preferred range of Ca concentration in the Ca ion-exchanged silica is 1 wt. % or more, more preferably from 2 to 8 wt. %. If the Ca concentration is below 1 wt. %, the rust-preventive effect by the Ca release becomes insufficient.

Surface area, pH, and oil-absorbance of the Ca ion-exchanged silica are not specifically limited.

The rust-preventive mechanism in the case of addition of ion-exchanged silica (a) to organic coating is described above. Particularly according to the present invention, markedly excellent corrosion preventive effect is attained by combining a specific organic polymer resin with ion-exchanged silica, thus inducing the combined effect of the barrier action of the specific organic polymer resin coating with the corrosion-suppression effect of the ion-exchanged silica at the cathodic reaction section.

A preferred range of blending ratio of the ion-exchanged silica (a) in the organic resin coating is 1 to 100 parts by weight (solid matter) to 100 parts by weight (solid matter) of the base resin, more preferably from 5 to 80 parts by weight (solid matter), and most preferably from 10 to 50 parts by weight (solid matter). If the blending ratio of the ion-exchanged silica (a) becomes less than 1 part by weight, the effect of improved corrosion resistance after alkaline degreasing becomes small. If the blending ratio of the ion-exchanged silica (a) exceeds 100 parts by weight, the corrosion resistance degrades, which is unfavorable.

The fine particle silica (b) may be either colloidal silica or fumed silica.

The fine particle silica contributes to forming dense and stable zinc corrosion products under a corrosive environment. Thus formed corrosion products cover the plating surface in a dense mode, thus presumably suppressing the development of corrosion.

From the viewpoint of corrosion resistance, the fine particle silica preferably has particle sizes of from 5 to 50 nm, more preferably from 5 to 20 nm, and most preferably from 5 to 15 nm.

A preferred range of blending ratio of the fine particle silica (b) in the organic resin coating is 1 to 100 parts by weight (solid matter) to 100 parts by weight (solid matter) of the base resin, more preferably from 5 to 80 parts by weight (solid matter), and most preferably from 10 to 30 parts by weight (solid matter). If the blending ratio of the fine particle silica (b) becomes less than 1 part by weight, the effect of improved corrosion resistance after alkaline degreasing becomes small. If the blending ratio of the fine particle silica (b) exceeds 100 parts by weight, the corrosion resistance and the workability degrade, which is unfavorable.

According to the present invention, markedly high corrosion resistance is attained by combined addition of an ion-exchanged silica (a) and a fine particle silica (b) to the organic coating. That is, the combined addition of ion-exchanged silica (a) and fine particle silica (b) induces above-described combined rust-preventive mechanism which gives markedly excellent corrosion-preventive effect.

The blending ratio of combined addition of ion-exchanged silica (a) and fine particle silica (b) to the organic coating is in a range of from 1 to 100 parts by weight (solid matter) of the base resin, preferably from 5 to 80 parts by weight (solid matter). Further the weight ratio of blending amount (solid matter) of the ion-exchanged silica (a) to the fine particle silica (b), $(\alpha)/(b)$, is selected to a range of from 99/1 to 1/99, preferably from 95/5 to 40/60, more preferably from 90/10 to 60/40.

If the blending ratio of sum of the ion-exchanged silica (a) and the fine particle silica (b) is less than 1 part by weight, the effect of improved corrosion resistance after alkaline degreasing becomes small. If the blending ratio of sum of the ion-exchanged silica (a) and the fine particle silica (b) exceeds 100 parts by weight, the coatability and the weldability degrade, which is unfavorable.

If the weight ratio of the ion-exchanged silica ($\alpha$) to the fine particle silica (b), (a)/(b), is less than 1/99, the corrosion resistance degrades. If the weight ratio of the ion-exchanged silica (a) to the fine particle silica (b), $(\beta)/(b)$, exceeds 99/1, the effect of combined addition of the ion-exchanged silica (a) and the fine particle silica (b) cannot fully be attained.

Adding to the above-described rust-preventive agents, the organic coating may contain other corrosion-suppressing agent such as polyphosphate (for example, aluminum polyphosphate such as TAICA K-WHITE 82, TAICA K-WHITE 105, TAICA K-WHITE G105, TAICA K-WHITE Ca650 (trade marks) manufactured by TAYCA CORPORATION), phosphate (for example, zinc phosphate, aluminum dihydrogenphosphate, zinc phosphate), molybdenate, phosphomolybdenate (for example, aluminum phosphomolybdenate), organic phosphoric acid and its salt (for example, phytic acid, phytiate, phosphonic acid, phosphonate, their metal salt and alkali metal salt, alkali earth metal salt), organic inhibitor (for example, hydrazine derivative, thiol compound).

The organic coating may, at need, further include a solid lubricant (c) to improve the workability of the coating.

Examples of applicable solid lubricant according to the present invention are the following.

(1) Polyolefin wax, paraffin wax: for example, polyethylene wax, synthetic paraffin, natural paraffin, microwax, chlorinated hydrocarbon;
(2) Fluororesin fine particles: for example, polyfluoroethylene resin (such as poly-tetrafluoroethylene resin), polyvinylfluoride resin, polyvinylidenefluoride resin.

In addition, there may be applied fatty acid amide base compound (such as stearic acid amide, palmitic acid amide, methylene bis-stearoamide, ethylene bis-stearoamide, oleic acid amide, ethyl acid amide, alkylene bis-fatty acid amide), metallic soap (such as calcium stearate, lead stearate, calcium laurate, calcium palmate), metallic sulfide (molybdenum disulfide, tungsten disulfide), graphite, graphite fluoride, boron nitride, polyalkyleneglycol, and alkali metal sulfate.

Among those solid lubricants, particularly preferred ones are polyethylene wax, fluororesin fine particles (particularly poly-tetrafluoroethylene resin fine particles).

A most preferred fluororesin fine particle is tetrafluoroethylene fine particle.

As of these compounds, combined use of polyolefin wax and tetrafluoroethylene fine particles is expected to provide particularly excellent lubrication effect.

A preferred range of blending ratio of the solid lubricant (c) in the organic resin coating is from 1 to 80 parts by weight (solid matter) to 100 parts by weight (solid matter) of the base resin, more preferably from 3 to 40 parts by weight (solid matter). If the blending ratio of the solid lubricant (c) becomes less than 1 part by weight, the effect of lubrication is small. If the blending ratio of the solid lubricant (c) exceeds 80 parts by weight, the painting performance degrade, which is unfavorable.

The organic coating of the organic coating steel sheet according to the present invention comprises an organic polymer resin (A) as the base resin. And, at need, an ion-exchanged silica (a), a fine particle silica (b), a solid lubricant (c), and a curing agent may further be added to the organic coating. Furthermore, at need, there may be added other additives such as organic coloring pigment (for example, condensing polycyclic organic pigment, phthalocyanine base organic pigment), coloring dye (for example, azo dye soluble in organic solvent, azo metal dye soluble in water), inorganic pigment (for example, titanium oxide), chelating agent (forexample, thiol), conductive pigment (for example, metallic powder of zinc, aluminum, nickel, or the like, iron phosphide, antimony-dope type tin oxide), coupling agent (for example, silane coupling agent and titanium coupling agent), melamine-cyanuric acid additive.

The paint composition for film-formation containing above-described main component and additive components normally contains solvent (organic solvent and/or water), and, at need, further a neutralizer or the like is added.

The organic coatings described above are formed on the above-described composite oxide coating.

The dry thickness of the organic coating is in a range of from 0.1 to 5 $\mu$m preferably from 0.3 to 3 $\mu$m, and most preferably from 0.5 to 2 $\mu$m If the thickness of the organic coating is less than 0.1 $\mu$, the corrosion resistance becomes insufficient. If the thickness of the organic coating exceeds 5 $\mu$m, the conductivity and the workability degrade.

The following is the description about the method for manufacturing an organic coating steel sheet according to the present invention.

The organic coating steel sheet according to the present invention is manufactured by the steps of: treating the surface (applying a treatment liquid to the surface) of a zinc base plating steel sheet or an aluminum base plating steel sheet using a treatment liquid containing the components of above-described composite oxide coating; heating and drying the plate; applying a paint composition which contains the above-described organic polymer resin (A) as the base resin, and at need, further contains an ion-exchanged silica (a), a fine particle silica (b), and a solid lubricant (c), and the like; heating to dry the product.

The surface of the plating steel sheet may be, at need, subjected to alkaline degreasing before applying the above-described treatment liquid, and may further be subjected to preliminary treatment such as surface adjustment treatment for further improving the adhesiveness and corrosion resistance.

For treating the surface of the zinc base plating steel sheet or the aluminum base plating steel sheet with a treatment liquid and for forming a composite oxide coating thereon, it is preferred that the plate is treated by an acidic aqueous solution, at pH ranging from 0.5 to 5, containing:

(aa) oxide fine particles ranging from 0.001 to 3.0 mole/liter;

(ab) one or more of the substances selected from the group consisting of either one metallic ion of Mg, Ca, Sr, Ba; a compound containing at least one metal given above; a composite compound containing at least one metal given above; ranging from 0.001 to 3.0 mole/liter as metal given above;

(ac) phosphoric acid and/or phosphoric acid compound ranging from 0.001 to 6.0 mole/liter as $P_2O_5$;

further adding, at need, above-described additive components (organic resin components, iron group metal ions, corrosion-suppression agents, other additives); then heating and drying the product.

The added components (ab) in the treatment liquid is in a range of from 0.001 to 3.0 mole/liter as metal, preferably from 0.01 to 0.5 mole/liter. If the sum of the added amount of these components is less than 0.001 mole/liter, the effect of addition cannot be fully attained. If the sum of the added amount of these components exceeds 3.0 mole/liter, these components interfere the network of coating, thus failing in forming dense coating. Furthermore, excess amount of addition of these components makes the metallic components likely elute from the coating, which results in defects such as discoloration of appearance under some environmental conditions.

A s of above-described given additive components (ab), Mg most significantly increases the corrosion resistance. The form of Mg in the treatment liquid may be compound or composite compound. To attain particularly excellent corrosion resistance, however, a metallic ion or a water-soluble ion form containing Mg is particularly preferred.

For supplying ion of the additive components (ab) in a form of metallic salt, the treatment liquid may contain anion such as chlorine ion, nitric acid ion, sulfuric acid ion, acetic acid ion, and boric acid ion.

It should be emphasized that the treatment liquid is an acidic aqueous solution. That is, by bringing the treatment liquid to acidic, the plating components such as zinc are readily dissolved. As a result, at the interface between the chemical conversion treatment film and the plating, a phosphoric acid compound layer containing plating components such as zinc is presumably formed, which layer strengthens the interface bonding of both sides to structure a coating having excellent corrosion resistance.

As the oxide fine particles as an additive component (aa), silicon oxide ($SiO_2$) fine particles are most preferred. The silicon oxide may be commercially available silica sol and water-dispersion type silicic acid oligomer or the like if only the silicon oxide is water-dispersion type $SiO_2$ fine particles which are stable in an acidic aqueous solution. Since, however, fluoride such as hexaf luoro silicic acid is strongly corrosive and gives strong effect to human body, that kind of compound should be avoided from the point of influence to work environment.

A preferred range of blending ratio of the fine particle oxide (the blending ratio as $SiO_2$ in the case of silicon oxide) in the treating liquid is from 0.001 to 3.0 mole/liter, more preferably from 0.05 to 1.0 mole/liter, and most preferably from 0.1 to 0.5 mole/liter. If the blending ratio of the fine particle oxide becomes less than 0.001 mole/liter, the effect of addition is not satisfactory. If the blending ratio of the fine particle oxide exceeds 3.0 mole/liter, the water-resistance of coating degrades, resulting in degradation of corrosion resistance.

The phosphoric acid and/or phosphoric acid compound as the additive component (ac) includes: a mode of aqueous solution in which a compound specific to phosphoric acid, such as polyphosphoric acid such as orthophosphoric acid, pyrophosphoric acid, and tripolyphosphoric acid, methaphosphoric acid, inorganic salt of these acids (for example, primary aluminum phosphate), phosphorous acid, phosphate, phosphinic acid, phosphinate, exists in a form of anion or complex ion combined with a metallic cation which are generated by dissolving the compound in the aqueous solution; and a mode of aqueous solution in which that kind of compound exists in a form of inorganic salt dispersed therein. The amount of phosphoric acid component according to the present invention is specified by the sum of all these modes of acidic aqueous solution thereof as converted to $P_2O_5$ amount.

A preferred range of blending ratio of the phosphoric acid and/or phosphoric acid compound as $P_2O_5$ is from 0.001 to 6.0 mole/liter, more preferably from 0.02 to 1.0 mole/liter, and most preferably from 0.1 to 0.8 mole/liter. If the blending ratio of the phosphoric acid and/or phosphoric acid compound becomes less than 0.001 mole/liter, the effect of addition is not satisfactory and the corrosion resistance degrades. If the blending ratio of the phosphoric acid and/or phosphoric acid compound exceeds 6.0 mole/liter, excess amount of phosphoric acid ion reacts with the plating film under a humid environment, which enhances the corrosion of plating base material to cause discoloration and stain-rusting under some corrosive environments.

For obtaining a composite oxide coating providing particularly excellent corrosion resistance, or for preparing a composite oxide coating comprising components ($\alpha$), ($\beta$), and ($\gamma$) given below, and having the coating weight of the sum of these components ($\alpha$), ($\beta$), and ($\gamma$) in a range of from 6 to 3,600 mg/m$^2$, it is preferable that the above-described composite oxide coating contains the additive components (aa), (ab), and (ac) in the acidic aqueous solution, further, the composite oxide coating is treated by an acidic aqueous solution of pH of from 0.5 to 5 containing, at need, above-described additive components (organic resin component, iron group metallic ion, corrosion-suppression agent, and other additives), followed by heating and drying. The above-described given composite oxide coating components ($\alpha$), ($\beta$), and ($\gamma$), and the above-described given additive components (aa), (ab), and (ac) are specified below.

($\alpha$) $SiO_2$ fine particles in a range of from 0.01 to 3,000 mg/m$^2$ as $SiO_2$, ($\beta$) One or more of Mg, compound containing Mg, and composite compound containing Mg in a range of from 0.01 to 1,000 mg/m$^2$ as Mg, ($\gamma$) Phosphoric acid and/or phosphoric acid compound in a range of from 0.01 to 3,000 mg/m$^2$ as $P_2O_5$;

(aa) $SiO_2$ fine particles in a range of from 0.001 to 3.0 mole/liter as $SiO_2$, preferably from 0.05 to 1.0 mole/liter, more preferably from 0.1 to 0.5 mole/liter, (ab) One or more of the substances selected from the group consisting of Mg ion, water-soluble ion containing Mg, compound containing Mg, composite compound containing Mg in a range of from 0.001 to 3.0 mole/liter as Mg, preferably from 0.01 to 0.5 mole/liter, (ac) phosphoric acid and/or phosphoric acid compound in a range of from 0.001 to 6.0 mole/liter as $P_2O_5$, preferably from 0.02 to 1.0 mole/liter, more preferably from 0.1 to 0.8 mole/liter.

The reason to specify the conditions and amount of the above-described given additives (aa), (ab), and (ac) is described before.

To prepare the range of the ratio of the component ($\beta$) to the component ($\alpha$) in the composite oxide coating, molar ratio [Mg/SiO$_2$], or the component ($\beta$) as Mg to the component ($\alpha$) as SiO$_2$, from 1/100 to 100/1, the ratio of the additive component (ab) to the additive component (aa) in the acidic aqueous solution for forming the composite oxide coating may be adjusted to a range of from 1/100 to 100/1 as the molar ratio [Mg/SiO$_2$], or the additive component (ab) as Mg to the additive component (aa) as SiO$_2$.

To adjust the ratio of the component ($\beta$) to the component ($\alpha$) in the composite oxide coating to a preferred range of from 1/10 to 10/1, more preferably from 1/2 to 5/1, as the molar ratio [Mg/SiO$_2$], or the ratio of the component ($\beta$) as Mg to the component ($\alpha$) as SiO$_2$, it is adequate to adjust the ratio of the additive component (ab) to the additive component (aa) in the acidic aqueous solution for forming the composite oxide coating to a range of from 1/10 to 10/1, more preferably from 1/2 to 5/1, as the molar ratio [Mg/SiO$_2$], or the ratio of the additive component (ab) as Mg to the additive component (aa) as SiO$_2$.

To adjust the ratio of the component ($\gamma$) to the component ($\beta$) in the composite oxide coating to a range of from 1/100 to 100/1 as the molar ratio [P$_2$O$_5$/Mg], or the ratio of the component ($\gamma$) as P$_2$O$_5$ to the component ($\beta$) as Mg, it is adequate to adjust the ratio of additive component (ac) to the additive component (ab) in the acidic aqueous solution for forming the composite oxide coating to a range of from 1/100 to 100/1 as the molar ratio [P$_2$O$_5$/Mg] represented by the ratio of the additive component (ac) as P$_2$O$_5$ to the additive component (ab) as Mg.

To adjust the ratio of the component ($\gamma$) to the component ($\beta$) in the composite oxide coating to a further preferable range of from 1/10 to 10/1 as the molar ratio [P$_2$O$_5$/Mg], or the ratio of the component ($\gamma$) as P$_2$O$_5$ to the component ($\beta$) as Mg, more preferably from 1/2 to 2/1, it is adequate to adjust the ratio of additive component (ac) to the additive component (ab) in the acidic aqueous solution for forming the composite oxide coating to a range of from 1/10 to 10/1, more preferably from 1/2 to 2/1, as the molar ratio [P$_2$O$_5$/Mg], or the ratio of the additive component (ac) as P$_2$O$_5$ to the additive component (ab) as Mg.

For adjusting the ratio of the additive component (ac) to the additive component (ab) in the acidic aqueous solution for forming the composite oxide coating, it is preferable to use an aqueous solution of primary magnesium phosphate or the like which is prepared by limiting the molar ratio of the magnesium component to the phosphoric acid component, in advance, because other anionic components are prevented from existing in the treatment liquid.

On applying the aqueous solution of primary magnesium phosphate, however, lowered molar ratio [P$_2$O$_5$/Mg] degrades the stability of the compound in the aqueous solution. Accordingly, a suitable molar ratio [P$_2$O$_5$/Mg] is not less than 1/2.

On the other hand, increased molar ratio [P$_2$O$_5$/Mg] in the aqueous solution of primary magnesium phosphate decreases the pH of treatment liquid, which increases the reactivity with the plating base material, which then induces irregular coating caused by non-uniform reaction to give an influence to corrosion resistance. Consequently, when an aqueous solution of primary magnesium phosphate which is prepared by limiting the molar ratio of the magnesium component to the phosphoric acid component, the molar ratio [P$_2$O$_5$/Mg] is preferably set to not more than 2/1.

To attain the most excellent corrosion resistance, it is preferred that the ratio of the component ($\beta$) to the component ($\alpha$) in the composite oxide coating is adjusted to a range of from 1/100 to 100/1 as the molar ratio [Mg/SiO$_2$], or the component ($\beta$) as Mg to the component ($\alpha$) as SiO$_2$, more preferably from 1/10 to 10/1, most preferably from 1/2 to 5/1. And, to adjust the ratio of the component ($\gamma$) to the component ($\beta$) in the composite oxide coating to a range of from 1/100 to 100/1 as the molar ratio [P$_2$O$_5$/Mg], or the component (γ) as $P_2O_5$ to the component (β) as Mg in the composite oxide coating, more preferably from 1/10 to 10/1, and most preferably from 1/2 to 2/1, it is preferred that the ratio of the additive component (ab) to the additive component (aa) in the acidic aqueous solution for forming the composite oxide coating is adjusted to a range of from 1/100 to 100/1 as the molar ratio [$Mg/SiO_2$], or the additive component (ab) as Mg to the additive component (aa) as $SiO_2$, more preferably from 1/10 to 10/1, and most preferably from 1/2 to 5/1, and further the ratio of the additive component (ac) to the additive component (b) is adjusted to a range of from 1/100 to 100/1 as the molar ratio [$P_2O_5/Mg$], or the additive component (ac) as $P_2O_5$ to the additive component (ab) as Mg, preferably from 1/10 to 10/1, more preferably from 1/2 to 2/1.

The treatment liquid may further include an adequate amount of an additive component (ad) which is one or more ions selected from the group consisting of: either one metallic ion of Ni, Fe, and Co; and water-soluble ion containing at least one of the above-described listed metals. By adding that kind of iron group metal, blackening phenomenon is avoided. The blackening phenomenon occurs in the case of non-addition of iron group metals caused from corrosion on the plating polar surface layer under a humid environment. Among these iron group metals, Ni provides particularly strong effect even with a slight amount thereof. Since, however, excessive addition of iron group metals such as Ni and Co induces degradation of corrosion resistance, the added amount should be kept at an adequate level.

A preferred range of the added amount of the above-described additive component (ad) is from 1/10,000 to 1 mole as metal per one mole of the additive component (ac), more preferably from 1/10,000 to 1/100. If the added amount of the additive component (ad) is less than 1/10,000 mole to one mole of the additive component (ac), the effect of the addition is not satisfactory. If the added amount of the additive component (ad) exceeds 1 mole, the corrosion resistance degrades as described above.

Adding to the above-described additive components (aa) through (ad), the treatment liquid may further contain an adequate amount of additive components to the coating, which are described before.

A preferable range of pH of the treatment liquid is from 0.5 to 5, more preferably from 2 to 4. If the pH of treatment liquid is less than 0.5, the reactivity of the treatment liquid becomes excessively strong so that micro-defects appear on the surface of the coating to degrade the corrosion resistance. If the pH of the treatment liquid exceeds 5, the reactivity of the treatment liquid becomes poor, and the bonding at interface between the plating face and the coating becomes insufficient, as described above, thus degrading the corrosion resistance.

The methods for applying the treatment liquid onto the plating steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

Although there is no specific limitation on the temperature of the treatment liquid, a preferable range thereof is from normal temperature to around 60° C. Below the normal temperature is uneconomical because a cooling unit or other additional facilities are required. On the other hand, temperatures above 60° C. enhances the vaporization of water, which makes the control of the treatment liquid difficult.

After the coating of treatment liquid as described above, generally the plate is heated to dry without rinsing with water. The treatment liquid according to the present invention forms a slightly soluble salt by a reaction with the substrate plating steel sheet, so that rinsing with water may be applied after the treatment.

Method for heating to dry the coated treatment liquid is not limited. For example, dryer, hot air oven, high frequency induction heating furnace, infrared heating furnace may be applied.

The heating and drying treatment is preferably conducted at reaching temperatures of from 50 to 300° C., more preferably from 80 to 200° C., and most preferably from 80 to 160° C. If the heating temperature is less than 50° C., excess amount of water is left in the coating, which results in insufficient corrosion resistance. If the heating temperature exceeds 300° C., the operation becomes uneconomical and defects likely appear in the coating to degrade the corrosion resistance.

After forming the composite oxide coating on the surface of the zinc base plating steel sheet or the aluminum base plating steel sheet, as described above, a paint composition for forming an organic coating is applied on the composite oxide coating. Method for applying the paint composition is not limited, and examples of the method are coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, generally the plate is heated to dry without rinsing with water. After applying the paint composition, however, water-rinse step may be given.

Method for heating to dry the paint composition is not limited. For example, dryer, hot air oven, high frequency induction heating furnace, infrared heating furnace may be applied. The heating treatment is preferably conducted at reaching temperatures of from 50 to 350° C., more preferably from 80 to 250° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

As described above, the present invention includes a steel sheet having an organic coating on both sides or on side thereof. Accordingly, modes of the steel sheet according to the present invention include, for example, the followings.

(1) "Plating film—Composite oxide coating—Organic coating" on one side of the steel sheet, and "Plating film" on other side of the steel sheet;

(2) "Plating film—Composite oxide coating—Organic coating" on one side of the steel sheet, and "Plating film—Known coating treated by phosphoric acid, or the like" on other side of the steel sheet;

(3) "Plating film—Composite oxide coating—Organic coating" on both sides of the steel sheet;

(4) "Plating film—Composite oxide coating—Organic coating" on one side of the steel sheet, and "Plating film—Composite oxide coating" on other side of the steel sheet;

(5) "Plating film—Composite oxide coating—Organic coating" on one side of the steel sheet, and "Plating film—Organic coating" on other side of the steel sheet.

Embodiments

Treatment liquids (coating compositions) for forming the primary layer coating, which are listed in Tables 140 through 155, and resin compositions for forming the secondary layer coating, which are listed in Table 156, were prepared.

To the resin compositions shown in Table 156, an ion-exchanged silica, a fine particle silica shown in Table 157, and a solid lubricant shown in Table 158 were added at respective adequate amount, which additives were dispersed in the resin composition for a necessary time using a paint dispersion apparatus (a sand grinder) to prepare respective desired paint compositions. As the above-described ion-exchanged silica, SHIELDEX C303 (average particle sizes of from 2.5 to 4.5 $\mu$m, Ca concentration of 3 wt. %) which is a Ca-exchanged silica produced by W.R. Grace & Co. was used.

To obtain organic coating steel sheets for household electric appliances, building materials, and automobile parts, the plating steel sheets shown in Table 139 were used as the target base plates, which plates were prepared by applying zinc base plating or aluminum base plating on the cold-rolled steel sheets having a plate thickness of 0.8 mm and a surface roughness Ra of 1.0 $\mu$m. The surface of the plating steel sheet was treated by alkaline degreasing and water washing, then the treatment liquids (coating compositions) shown in Tables 140 through 155 were applied to the surface using a roll coater, followed by heating to dry to form the first layer coating. The thickness of the first layer coating was adjusted by the solid content in the treatment liquid (heating residue) or applying conditions (roll pressing force, rotational speed, and other variables). Then, the paint composition given in Table 156 was applied using a roll coater, which was then heated to dry to form the secondary layer coating, thus manufactured the organic coating steel sheets as Examples and Comparative Examples. The thickness of the second layer coating was adjusted by the solid content in the treatment liquid (heating residue) or applying conditions (roll pressing force, rotational speed, and other variables).

In the Table 156, each of *1 through *7 appeared in the table expresses the following.

*1: A butylcellove-cellosolve solution of epoxy resin (solid 40%) produced by Yuka Shell Epoxy Co., Ltd.

*2: A urea resin (solid 60%) produced by Dainippon Ink & Chemicals, Inc.

*3: A diethanol-modified epoxy resin (solid 50%) produced by Kansai Paint Co., Ltd.

*4: A block-polyurethane resin (solid 60t) produced by Asahi Chemical Industry Co., Ltd.

*5 A high molecular weight oil-free alkyd resin (solid 60t) produced by Dainippon Ink & Chemicals, Inc.

*6: A melamine resin (solid 80%) produced by Mitsui Sytech Co.

*7 A high molecular weight oil-free alkyd resin (solid 40%) produced by Toyobo Co., Ltd.

To each of thus obtained organic coating steel sheets, evaluation was given in terms of quality performance (appearance of coating, white-rust resistance, white-rust resistance after alkaline degreasing, paint adhesiveness, and workability). The results are given in Tables 159 through 190 along with the structure of primary layer coating and of secondary layer coating. In the Tables 159 through 190, each of *1 through *13 appeared in the table expresses the following.

*1: Corresponding to No. given in Table 139.

*2: Corresponding to No. given in Tables 140 through 155.

*3: Corresponding to No. given in Table 156.

*4: Coating weight of $SiO_2$ fine particles ($\alpha$)=Coating weight of $SiO_2$ fine particles converted to $SiO_2$ : Coating weight of Mg component ($\gamma$)=Coating weight of one ore more substances selected from the group consisting of Mg, compound containing Mg, composite compound containing Mg, converted to Mg.

: Coating weight of $P_2O_5$ component ($\gamma$)=Coating weight of phosphoric acid and/or phosphoric acid compound, converted to $P_2O_5$.

: Total coating weight=($\alpha$)+($\beta$)+($\gamma$)

*5: Molar ratio of Mg component ($\beta$) as Mg to $SiO_2$ fine particles ($\alpha$) as $SiO_2$.

*6: Molar ratio of $P_2O_5$ component ($\gamma$) as $P_2O_5$ to Mg component ($\beta$) as Mg.

*7: Blending ratio (weight parts) of solid portion of ion-exchanged silica to 100 parts by weight of solid portion of resin composition.

*8: Corresponding to No. given in Table 157.

*9: Blending ratio (weight parts) of solid portion of fine particle silica to 100 parts by weight of solid portion of resin composition.

*10: Blending ratio (weight parts) of solid portion of the sum of ion-exchanged silica (a) and fine particle silica (b) to 100 parts by weight of solid portion of resin composition.

*11: Weight ratio of solid portion of ion-exchanged silica (a) to fine particle silica (b).

*12: Corresponding to No. given in Table 158.

*13: Blending ratio (weight parts) of solid portion of solid lubricant to 100 parts by weight of solid portion of resin composition.

As the conventional reaction type chromate steel sheet treatment liquid, a solution containing 30 g/l of anhydrous chromic acid, 10 g/l of phosphoric acid, 0.5 g/l of NaF, and 4 g/l of $K_2TiF_6$ was used. After spray treatment at a bath temperature of 40° C., the steel sheet was washed with water and was dried, thus a chromated steel sheet having a chromium coating weight of 20 mg/m$^2$ as metallic chromium as prepared. Thus obtained steel sheet was subjected to the salt spray test under the same condition that applied to Examples, and the plate generated white-rust within about 24 hours. Consequently, the results of Examples show that the organic coating steel sheets according to the present invention provide remarkably superior corrosion resistance to the conventional type chromate treated steel sheets.

TABLE 139

| No. | Kind | Coating weight (mg/m$^2$) |
|---|---|---|
| 1 | Electrolytically galvanized steel plate | 20 |
| 2 | Hot dip galvanized steel plate | 60 |
| 3 | Alloyed hot dip galvanized steel plate (Fe: 10 wt %) | 60 |
| 4 | Zn—Ni alloy plating steel plate (Ni: 12 wt %) | 20 |
| 5 | Zn—Co alloy plating steel plate (Co: 0.5 wt %) | 20 |
| 6 | Zn—Cr alloy plating steel plate (Cr: 12 wt %) | 20 |
| 7 | Hot dip Zn—Al alloy plating steel plate (Al: 55 wt %) | 90 |
| 8 | Hot dip Zn-5 wt % Al-0.5 wt % Mg alloy plating steel plate | 90 |
| 9 | Electrolytically Zn—SiO2 composite plating steel plate | 20 |
| 10 | Hot dip aluminized steel plate (Al-6 wt % Si ally plating) | 60 |
| 11 | Electrolytically Al-Mn alloy plating steel plate (Mn: 30 wt %) | 40 |

TABLE 139-continued

| No. | Kind | Coating weight (mg/m²) |
|---|---|---|
| 12 | Electrolytically aluminized steel plate | 40 |
| 13 | Hot dip Zn—Mg alloy plating steel plate (Mg: 0.5 wt %) | 150 |

TABLE 140

Composition of primary layer coating

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L)*1 | Type | Concentration (g/l) |
| 1 | Colloidal silica | Nissan Chemical Industries, Ltd. SNOWTEX-O | 12 to 14 | 0.11 | Mg²⁺ | 0.20 | orthophosphoric acid | 0.42 | — | — |
| 2 | Colloidal silica | Nissan Chemical Industries, Ltd. SNOWTEX-O | 12 to 14 | 0.18 | Mg²⁺ | 0.17 | orthophosphoric acid | 0.36 | — | — |
| 3 | Colloidal silica | Nissan Chemical Industries, Ltd. SNOWTEX-O | 12 to 14 | 0.40 | Mg²⁻ | 0.40 | orthophosphoric acid | 0.80 | — | — |
| 4 | Colloidal silica | Nissan Chemical Industries, Ltd. SNOWTEX-OS | 8 to 10 | 0.18 | Mg²⁻ | 0.17 | orthophosphoric acid | 0.36 | — | — |
| 5 | Colloidal silica | Nissan Chemical Industries, Ltd. SNOWTEX-OXS | 6 to 8 | 0.11 | Mg²⁺ | 0.20 | orthophosphoric acid | 0.42 | — | — |
| 6 | Alumina sol | Nissan Chemical Industries, Ltd. Alumina sol 200 | ✕ | 0.20 | Mg²⁺ | 0.30 | orthophosphoric acid | 0.60 | — | — |
| 7 | Zirconia sol | Nissan Chemical Industries, Ltd. NZS-30A | 60 to 70 | 0.40 | Mg²⁺ | 0.40 | orthophosphoric acid | 0.80 | — | — |
| 8 | Colloidal silica | Nissan Chemical Industries, Ltd. SNOWTEX-O | 12 to 14 | 0.30 | Mg²⁺ | 0.10 | orthophosphoric acid | 0.20 | Acrylic-styrene base water-dispersible resin | 180 |

*1 Converted to $P_2O_5$
✕ Feather-shape particles (10 nm × 100 nm)

TABLE 141

| No. | Molar ratio (ab)/(aa) | Molar ratio (ac)/(ab) | Composition pH | Adaptability to the condition of the invention*2 |
|---|---|---|---|---|
| 1 | 1.82 | 2.10 | 3.1 | ○ |
| 2 | 0.94 | 2.12 | 3.1 | ○ |
| 3 | 1.00 | 2.00 | 2.7 | ○ |
| 4 | 0.94 | 2.12 | 3.1 | ○ |
| 5 | 1.82 | 2.10 | 3.0 | ○ |
| 6 | 1.50 | 2.00 | 3.5 | ○ |
| 7 | 1.00 | 2.00 | 3.2 | ○ |
| 8 | 0.33 | 2.00 | 2.5 | ○ |

*2 ○: Satisfies the conditions of the invention
X: Dissatisfies the conditions of the invention

TABLE 142

Composition of primary layer coating

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L)*1 | Type | Concentration (g/l) |
| 9 | Colloidal silica | Nissan Chemical Industries, Ltd. SNOWTEX-O | 12 to 14 | 0.20 | $Ca^{2+}$ | 0.20 | orthophosphoric acid | 0.40 | — | — |
| 10 | Colloidal silica | Nissan Chemical Industries, Ltd. SNOWTEX-O | 12 to 14 | 0.10 | $Sr^{2-}$ | 0.10 | orthophosphoric acid | 0.20 | — | — |
| 11 | Colloidal silica | Nissan Chemical Industries, Ltd. SNOWTEX-O | 12 to 14 | 0.05 | $Ba^{2+}$ | 0.10 | orthophosphoric acid | 0.20 | — | — |
| 12 | — | — | — | — | $Mg^{2-}$ | 0.30 | orthophosphoric acid | 0.60 | — | — |
| 13 | Colloidal silica | Nissan Chemical Industries, Ltd. SNOWTEX-O | 12 to 14 | 0.40 | — | — | orthophosphoric acid | 0.30 | — | — |
| 14 | Colloidal silica | Nissan Chemical Industries, Ltd. SNOWTEX-O | 12 to 14 | 0.40 | $Mg^{2+}$ | 0.20 | — | — | — | — |
| 15 | Lithium silicate | Nissan Chemical Industries, Ltd. LSS-35 | — | 1.00 | — | — | — | — | — | — |

*1 Converted to $P_2O_5$

TABLE 143

| No. | Molar ratio (ab)/(aa) | Molar ratio (ac)/(ab) | Composition pH | Adaptability to the condition of the invention*2 |
|---|---|---|---|---|
| 9 | 1.00 | 2.00 | 3.0 | ○ |
| 10 | 1.00 | 2.00 | 3.1 | ○ |
| 11 | 2.00 | 2.00 | 3.2 | ○ |
| 12 | — | 2.00 | 2.8 | X |
| 13 | — | — | 3.0 | X |
| 14 | 0.50 | — | 2.1 | X |
| 15 | — | — | 11 | X |

*2 ○: Satisfies the conditions of the invention
X: Dissatisfies the conditions of the invention

TABLE 144

Composition of primary layer coating

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L)*1 | Type | Concentration (g/l) |
| 16 | Colloidal silica | Nissan Chemical Industries, Ltd. SNOWTEX-OS | 8 to 10 | 0.2 | $Mg^{2+}$ | 0.4 | orthophosphoric acid | 0.46 | — | — |
| 17 | Colloidal silica | Nissan Chemical Industries, Ltd. SNOWTEX-OS | 8 to 10 | 0.1 | $Mg^{2-}$ | 0.2 | orthophosphoric acid | 0.23 | — | — |
| 18 | Colloidal silica | Nissan Chemical Industries, Ltd. SNOWTEX-OS | 8 to 10 | 0.3 | $Mg^{2+}$ | 0.3 | orthophosphoric acid | 0.31 | — | — |
| 19 | Colloidal silica | Nissan Chemical Industries, Ltd. SNOWTEX-OS | 8 to 10 | 0.15 | $Mg^{2+}$ | 0.2 | orthophosphoric acid | 0.4 | — | — |
| 20 | Colloidal silica | Nissan Chemical Industries, Ltd. SNOWTEX-OS | 8 to 10 | 0.3 | $Mg^{2+}$ | 0.35 | orthophosphoric acid | 0.4 | — | — |
| 21 | Alumina sol | Nissan Chemical Industries, Ltd. SNOWTEX-OS | 8 to 10 | 0.1 | $Mg^{2+}$ | 0.5 | orthophosphoric acid | 0.5 | — | — |
| 22 | Zirconia sol | Nissan Chemical Industries, Ltd. SNOWTEX-OS | 8 to 10 | 0.3 | $Mg^{2+}$ | 0.15 | orthophosphoric acid | 0.16 | — | — |
| 23 | Colloidal silica | Nissan Chemical Industries, Ltd. SNOWTEX-OS | 8 to 10 | 0.3 | $Mg^{2+}$ | 0.4 | orthophosphoric acid | 0.2 | — | — |

*1 Converted to $P_2O_5$

TABLE 145

| No. | Molar ratio (ab)/(aa) | Molar ratio (ac)/(ab) | Composition pH | Adaptability to the condition of the invention*[2] |
|---|---|---|---|---|
| 16 | 2.00 | 1.2 | 2.7 | ◯ |
| 16 | 2.00 | 1.2 | 2.7 | ◯ |
| 17 | 2.00 | 1.2 | 2.8 | ◯ |
| 18 | 1.00 | 1.0 | 3.0 | ◯ |
| 19 | 1.33 | 2.0 | 1.9 | ◯ |
| 20 | 1.17 | 1.1 | 2.8 | ◯ |
| 21 | 5.00 | 1.0 | 3.1 | ◯ |
| 22 | 0.50 | 1.1 | 3.3 | ◯ |
| 23 | 1.33 | 0.5 | 3.0 | ◯ |

*[2] ◯: Satisfies the conditions of the invention
X: Dissatisfies the conditions of the invention

TABLE 146

| | [Composition of primary layer coating] | | | | | | | |
|---|---|---|---|---|---|---|---|---|
| | Oxide fine particles (aa) | | | | Alkali earth metal (ab) | | Phosphoric acid, phosphoric acid compound (ac) | | Organic resin | |
| No. | Type | Trade name | Particle size (nm) | Concentration (M/L) | Type | Concentration (M/L) | Type | Concentration (M/L) *1 | Type | Concentration (g/l) |
| 24 | Colloidal silica | Nissan Chemical Industries, Ltd. SNOWTEX-OXS | 6 to 8 | 0.2 | $Mg^{2+}$ | 0.4 | orthophosphoric acid | 0.4 | — | — |
| 25 | Colloidal silica | Nissan Chemical Industries, Ltd. SNOWTEX-OXS | 6 to 8 | 0.2 | $Mg^{2+}$ | 0.4 | orthophosphoric acid | 0.4 | — | — |
| 26 | Colloidal silica | Nissan Chemical Industries, Ltd. SNOWTEX-O | 12 to 14 | 0.2 | $Mg^{2+}$ | 0.4 | orthophosphoric acid | 0.4 | — | — |
| 27 | Colloidal silica | Nissan Chemical Industries, Ltd. SNOWTEX-OS | 8 to 10 | 0.5 | $Mg^{2-}$ | 0.05 | orthophosphoric acid | 0.1 | — | — |
| 28 | Colloidal silica | Nissan Chemical Industries, Ltd. SNOWTEX-OS | 8 to 10 | 0.05 | $Mg^{2+}$ | 0.5 | orthophosphoric acid | 0.6 | — | — |
| 29 | Colloidal silica | Nissan Chemical Industries, Ltd. SNOWTEX-OS | 8 to 10 | 0.2 | $Mg^{2+}$ | 0.3 | orthophosphoric acid | 0.03 | — | — |
| 30 | Colloidal silica | Nissan Chemical Industries, Ltd. SNOWTEX-OS | 8 to 10 | 0.1 | $Mg^{2+}$ | 0.1 | orthophosphoric acid | 1.0 | — | — |
| 31 | Colloidal silica | Nissan Chemical Industries, Ltd. SNOWTEX-OS | 8 to 10 | 0.04 | $Mg^{2-}$ | 0.3 | orthophosphoric acid | 0.32 | — | — |

*1: Converted to $P_2O_5$

TABLE 147

| No. | Molar ratio (ab)/(aa) | Molar ratio (ac)/(ab) | Composition pH | Adaptability to the condition of the invention*[2] |
|---|---|---|---|---|
| 24 | 2.00 | 1.0 | 2.9 | ◯ |
| 25 | 2.00 | 1.0 | 2.9 | ◯ |
| 26 | 2.00 | 1.0 | 2.9 | ◯ |
| 27 | 0.10 | 2.0 | 2.5 | ◯ |
| 28 | 10.00 | 1.2 | 1.8 | ◯ |
| 29 | 1.50 | 0.1 | 3.0 | ◯ |
| 30 | 1.00 | 10.0 | 1.5 | ◯ |
| 31 | 7.50 | 1.1 | 2.6 | ◯ |

*[2] ◯: Satisfies the conditions of the invention
X: Dissatisfies the conditions of the invention

TABLE 148

[Composition of primary layer coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 32 | Colloidal silica | Nissan Chemical Industries, Ltd. SNOWTEX-OS | 8 to 10 | 0.01 | $Mg^{2+}$ | 0.5 | orthophosphoric acid | 0.51 | — | — |
| 33 | Colloidal silica | Nissan Chemical Industries, Ltd. SNOWTEX-OS | 8 to 10 | 0.5 | $Mg^{2+}$ | 0.01 | orthophosphoric acid | 0.3 | — | — |
| 34 | Colloidal silica | Nissan Chemical Industries, Ltd. SNOWTEX-OS | 8 to 10 | 1.0 | $Mg^{2-}$ | 0.01 | orthophosphoric acid | 0.5 | — | — |
| 35 | Colloidal silica | Nissan Chemical Industries, Ltd. SNOWTEX-OS | 8 to 10 | 0.02 | $Mg^{2-}$ | 2.0 | orthophosphoric acid | 0.5 | — | — |
| 36 | Colloidal silica | Nissan Chemical Industries, Ltd. SNOWTEX-OS | 8 to 10 | 0.01 | $Mg^{2+}$ | 2.0 | orthophosphoric acid | 0.5 | — | — |
| 37 | Colloidal silica | Nissan Chemical Industries, Ltd. SNOWTEX-OS | 8 to 10 | 2.0 | $Mg^{2+}$ | 0.01 | orthophosphoric acid | 0.5 | — | — |
| 38 | Colloidal silica | Nissan Chemical Industries, Ltd. SNOWTEX-OS | 8 to 10 | 2.0 | $Mg^{2+}$ | 0.01 | orthophosphoric acid | 2.5 | — | — |
| 39 | Colloidal silica | Nissan Chemical Industries, Ltd. SNOWTEX-OS | 8 to 10 | 0.02 | $Mg^{2-}$ | 2.5 | orthophosphoric acid | 0.01 | — | — |

*1: Converted to $P_2O_5$

TABLE 149

| No. | Molar ratio (ab)/(aa) | Molar ratio (ac)/(ab) | Composition pH | Adaptability to the condition of the invention*2 |
|---|---|---|---|---|
| 32 | 50 | 1.0 | 2.0 | ○ |
| 33 | 0.02 | 30.0 | 2.5 | ○ |
| 34 | 0.01 | 50.0 | 2.2 | ○ |
| 35 | 100 | 0.3 | 2.0 | ○ |
| 36 | 200 | 0.3 | 1.9 | ○ |
| 37 | 0.005 | 50.0 | 2.1 | ○ |
| 38 | 0.005 | 250.0 | 1.6 | ○ |
| 39 | 125 | 0.004 | 2.5 | ○ |

*2 ○: Satisfies the conditions of the invention
X: Dissatisfies the conditions of the invention

TABLE 150

[Composition of primary layer coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 40 | Colloidal silica | Nissan Chemical Industries, Ltd. SNOWTEX-OS | 8 to 10 | 0.001 | $Mg^{2-}$ | 2.0 | orthophosphoric acid | 0.5 | — | — |
| 41 | Colloidal silica | Nissan Chemical Industries, Ltd. SNOWTEX-OS | 8 to 10 | 0.002 | $Mg^{2+}$ | 3.0 | orthophosphoric acid | 0.5 | — | — |
| 42 | Colloidal silica | Nissan Chemical Industries, Ltd. SNOWTEX-OS | 8 to 10 | 2.5 | $Mg^{2+}$ | 0.02 | orthophosphoric acid | 0.5 | — | — |
| 43 | Colloidal silica | Nissan Chemical Industries, Ltd. SNOWTEX-OS | 8 to 10 | 3.0 | $Mg^{2+}$ | 0.05 | orthophosphoric acid | 0.3 | — | — |
| 44 | Colloidal silica | Nissan Chemical Industries, Ltd. SNOWTEX-OS | 8 to 10 | 0.5 | $Mg^{2-}$ | 0.001 | orthophosphoric acid | 0.6 | — | — |
| 45 | Colloidal silica | Nissan Chemical Industries, Ltd. SNOWTEX-OS | 8 to 10 | 0.2 | $Mg^{2+}$ | 0.6 | orthophosphoric acid | 0.001 | — | — |

TABLE 150-continued

| | | [Composition of primary layer coating] | | | | | | | | |
|---|---|---|---|---|---|---|---|---|---|---|
| | | Oxide fine particles (aa) | | | Alkali earth metal (ab) | | Phosphoric acid, phosphoric acid compound (ac) | | Organic resin | |
| No. | Type | Trade name | Particle size (nm) | Concentration (M/L) | Type | Concentration (M/L) | Type | Concentration (M/L) *1 | Type | Concentration (g/l) |
| 46 | Colloidal silica | Nissan Chemical Industries, Ltd. SNOWTEX-OS | 8 to 10 | 0.5 | $Mg^{2+}$ | 2.0 | orthophosphoric acid | 4.0 | — | — |
| 47 | Colloidal silica | Nissan Chemical Industries, Ltd. SNOWTEX-OS | 8 to 10 | 0.001 | $Mg^{2-}$ | 3.0 | orthophosphoric acid | 6.0 | — | — |

*1: Converted to $P_2O_5$

TABLE 151

| No. | Molar ratio (ab)/(aa) | Molar ratio (ac)/(ab) | Composition pH | Adaptability to the condition of the invention*² |
|---|---|---|---|---|
| 40 | 2000 | 0.3 | 1.9 | ○ |
| 41 | 1500 | 0.2 | 1.9 | ○ |
| 42 | 0.008 | 25.0 | 2.0 | ○ |
| 43 | 0.017 | 6.0 | 2.2 | ○ |
| 44 | 0.002 | 600.0 | 1.9 | ○ |
| 45 | 3 | 0.002 | 3.2 | ○ |
| 46 | 4 | 2.0 | 0.51 | ○ |
| 47 | 3000 | 2.0 | 0.5 | ○ |

*² ○: Satisfies the conditions of the invention
X: Dissatisfies the conditions of the invention

TABLE 152

| | | [Composition of primary layer coating] | | | | | | | | |
|---|---|---|---|---|---|---|---|---|---|---|
| | | Oxide fine particles (aa) | | | Alkali earth metal (ab) | | Phosphoric acid, phosphoric acid compound (ac) | | Organic resin | |
| No. | Type | Trade name | Particle size (nm) | Concentration (M/L) | Type | Concentration (M/L) | Type | Concentration (M/L) *1 | Type | Concentration (g/l) |
| 48 | Colloidal silica | Nissan Chemical Industries, Ltd. SNOWTEX-OS | 8 to 10 | 0.01 | $Mg^{2+}$ | 0.02 | orthophosphoric acid | 0.02 | — | — |
| 49 | Colloidal silica | Nissan Chemical Industries, Ltd. SNOWTEX-OS | 8 to 10 | 0.05 | $Mg^{2+}$ | 0.1 | orthophosphoric acid | 0.1 | — | — |
| 50 | Colloidal silica | Nissan Chemical Industries, Ltd. SNOWTEX-OS | 8 to 10 | 2.0 | $Mg^{2+}$ | 3.0 | orthophosphoric acid | 4.2 | — | — |
| 51 | Colloidal silica | Nissan Chemical Industries, Ltd. SNOWTEX-OS | 8 to 10 | 0.3 | $Mg^{2+}$ | 0.001 | orthophosphoric acid | 0.2 | Acrylic-styrene base water-dispersible resin | 180 |
| 52 | Colloidal silica | Nissan Chemical Industries, Ltd. SNOWTEX-OS | 8 to 10 | 0.3 | $Mg^{2-}$ | 0.4 | orthophosphoric acid | 0.42 | Acrylic-styrene base water-dispersible resin | 180 |
| 53 | Colloidal silica | Nissan Chemical Industries, Ltd. SNOWTEX-OS | 8 to 10 | 0.3 | $Mg^{2+}$ | 0.02 | orthophosphoric acid | 0.2 | Acrylic-styrene base water-dispersible resin | 180 |

*1: Converted to $P_2O_5$

TABLE 153

| No. | Molar ratio (ab)/(aa) | Molar ratio (ac)/(ab) | Composition pH | Adaptability to the condition of the invention*2 |
|---|---|---|---|---|
| 48 | 2 | 1.0 | 4.0 | ○ |
| 49 | 2 | 1.0 | 3.3 | ○ |
| 50 | 1.5 | 1.4 | 0.8 | ○ |
| 51 | 0.003 | 200 | 2.5 | ○ |
| 52 | 1.3 | 1.1 | 2.2 | ○ |
| 53 | 0.1 | 10 | 2.5 | ○ |

*2 ○: Satisfies the conditions of the invention
X: Dissatisfies the conditions of the invention

TABLE 154

[Composition of primary layer coating]

| | Oxide fine particles (aa) | | | | Alkali earth metal (ab) | | Phosphoric acid, phosphoric acid compound (ac) | | Organic resin | |
|---|---|---|---|---|---|---|---|---|---|---|
| No. | Type | Trade name | Particle size (nm) | Concentration (M/L) | Type | Concentration (M/L) | Type | Concentration (M/L) *1 | Type | Concentration (g/l) |
| 54 | Colloidal silica | Nissan Chemical Industries, Ltd. SNOWTEX-OS | 8 to 10 | 3.2 | $Mg^{2+}$ | 0.1 | orthophosphoric acid | 0.3 | — | — |
| 55 | — | — | — | — | $Mg^{2+}$ | 0.5 | orthophosphoric acid | 2.0 | — | — |
| 56 | Colloidal silica | Nissan Chemical Industries, Ltd. SNOWTEX-OS | 8 to 10 | 0.2 | $Mg^{2-}$ | 4.0 | orthophosphoric acid | 0.5 | — | — |
| 57 | Colloidal silica | Nissan Chemical Industries, Ltd. SNOWTEX-OS | 8 to 10 | 3.0 | $Mg^{2+}$ | — | orthophosphoric acid | 0.5 | — | — |
| 58 | Colloidal silica | Nissan Chemical Industries, Ltd. SNOWTEX-OS | 8 to 10 | 0.02 | $Mg^{2+}$ | 3.0 | orthophosphoric acid | 6.5 | — | — |
| 59 | Colloidal silica | Nissan Chemical Industries, Ltd. SNOWTEX-OS | 8 to 10 | 0.5 | $Mg^{2+}$ | 0.2 | orthophosphoric acid | — | — | — |
| 60 | Colloidal silica | Nissan Chemical Industries, Ltd. SNOWTEX-OS | 8 to 10 | 0.001 | $Mg^{2-}$ | 0.02 | orthophosphoric acid | 0.001 | — | — |
| 61 | Colloidal silica | Nissan Chemical Industries, Ltd. SNOWTEX-OS | 8 to 10 | 0.5 | $Mg^{2+}$ | 3.0 | orthophosphoric acid | 6.0 | — | — |

*1: Converted to $P_2O_5$

TABLE 155

| No. | Molar ratio (ab)/(aa) | Molar ratio (ac)/(ab) | Composition pH | Adaptability to the condition of the invention*2 |
|---|---|---|---|---|
| 54 | 0.03 | 3.0 | 3.5 | X |
| 55 | — | 4.0 | 1.5 | X |
| 56 | 20 | 0.1 | 2.0 | X |
| 57 | — | — | 2.2 | X |
| 58 | 150 | 2.2 | 0.4 | X |
| 59 | 0.4 | — | 2.2 | X |
| 60 | 20 | 0.05 | 5.2 | X |
| 61 | 6 | 2.0 | 0.4 | X |

*2 ○: Satisfies the conditions of the invention
X: Dissatisfies the conditions of the invention

TABLE 156

| No. | Group | Type (main component/curing agent) | Base resin |
|---|---|---|---|
| 1 | Thermosettting resin | Epoxy resin/ureea resin | Epicoat E-1009 (*1)/BECKAMINE P196M (*2) = 85/15 |
| 2 | Thermosetting resin | Diethanol-modified epoxy resin/block-urethane resin | ER-007 (*3)/Duranate NF-K60X (*4) = 90/10 |
| 3 | Thermosetting resin | High molecular weight oil-free alkyd resin/melamine resin | BECKOLITE M-6206 (*5)/CYMEL 352 (*6) = 85/15 |
| 4 | Thermosetting resin | High molecular weight oil-free alkyd resin/melamine resin | BYRON GK-19CS (*7)/CYMEL 325 (*6) = 85/15 |
| 5 | Water-type resin | Ethylene ionomer resin | Mitsui Petrochemical Industries, Ltd. CHEMIPEARL S-650 (solid 27%) |
| 6 | Water-type resin | Polyurethane dispersion | Dai-ichi Kogyo Seiyaku Co., Ltd. SUPERFLEX 150 (solid 30%) |
| 7 | Water-type resin | Epoxy dispersion | EPOMIC WR-942 (solid 27%) produced by Mitsui Chemical Industry Co. |
| 8 | Water-type resin | Vinylidene chloride latex | Kurcha Chemical Industry Co. KUREHALON LATEX AO (solid 48%) |

TABLE 157

[Fine particle silica]

| No. | Type | Trade name |
|---|---|---|
| 1 | Dry silica | AEROSIL R811 produced by Japan Aerosil Co., Ltd. |

TABLE 158

[Solid lubricant]

| No. | Type | Trade name |
|---|---|---|
| 1 | Polyethylene wax | LUVAX 1151 produced by Nippon Seiro Co. |

TABLE 159

| | Primary layer coating | | | | | | | | | |
|---|---|---|---|---|---|---|---|---|---|---|
| | | | | | Coating weight *4 | | | | Molar ratio of coating components | |
| No. | Plating steel plate *1 | Coating composition *2 | Drying temperature (° C.) | Coating thickness ($\mu$m) | Total coating weight (mg/m$^2$) | SiO$_2$ fine particles ($\alpha$) (mg/m$^2$) | Mg component ($\beta$) (mg/m$^2$) | P$_2$O$_5$ component ($\gamma$) (mg/m$^2$) | Mg/SiO$_2$ *5 | P$_2$O$_5$/Mg *6 |
| 1 | 1 | 1 | 140 | 0.3 | 366 | 34 | 25 | 307 | 1.82 | 2.1 |
| 2 | 1 | 1 | 140 | 0.3 | 366 | 34 | 25 | 307 | 1.82 | 2.1 |
| 3 | 1 | 1 | 140 | 0.3 | 366 | 34 | 25 | 307 | 1.82 | 2.1 |
| 4 | 1 | 1 | 140 | 0.3 | 366 | 34 | 25 | 307 | 1.82 | 2.1 |
| 5 | 1 | 1 | 140 | 0.3 | 366 | 34 | 25 | 307 | 1.82 | 2.1 |
| 6 | 1 | 1 | 140 | 0.3 | 366 | 34 | 25 | 307 | 1.82 | 2.1 |
| 7 | 1 | 1 | 140 | 0.3 | 366 | 34 | 25 | 307 | 1.82 | 2.1 |
| 8 | 1 | 1 | 140 | 0.3 | 366 | 34 | 25 | 307 | 1.82 | 2.1 |

| | Secondary layer coating | | | | | |
|---|---|---|---|---|---|---|
| | | Fine particles silica (b) | | | | |
| No. | Resin composition *3 | Type *8 | Blending rate *9 | Drying temperature (° C.) | Coating thickness ($\mu$m) | Classification |
| 1 | 1 | 1 | 10 | 230 | 1 | Example |
| 2 | 2 | 1 | 10 | 230 | 1 | Example |
| 3 | 3 | 1 | 10 | 230 | 1 | Example |
| 4 | 4 | 1 | 10 | 230 | 1 | Example |
| 5 | 5 | 9 | 10 | 140 | 1 | Example |
| 6 | 6 | 9 | 10 | 140 | 1 | Example |
| 7 | 7 | 9 | 10 | 140 | 1 | Example |
| 8 | 8 | 9 | 10 | 140 | 1 | Example |

TABLE 160

| No. | Appearance | White-rust resistance: SST 72 hrs | White-rust resistance after alkaline degreasing: SST 72 hrs | Paint adhesiveness | Classification |
|---|---|---|---|---|---|
| 1 | ○ | ⊙ | ⊙ | ⊙ | Example |
| 2 | ○ | ⊙ | ⊙ | ⊙ | Example |
| 3 | ○ | ○+ | ○ | ⊙ | Example |
| 4 | ○ | ○+ | ○ | ⊙ | Example |
| 5 | ○ | ○ | ○− | ⊙ | Example |
| 6 | ○ | ○ | ○− | ⊙ | Example |
| 7 | ○ | ○ | ○− | ⊙ | Example |
| 8 | ○ | ○ | ○− | ⊙ | Example |

TABLE 161

| | Primary layer coating | | | | | | | | | |
|---|---|---|---|---|---|---|---|---|---|---|
| | | | | | Coating weight *4 | | | | Molar ratio of coating components | |
| No. | Plating steel plate *1 | Coating composition *2 | Drying temperature (°C.) | Coating thickness (μm) | Total coating weight (mg/m²) | $SiO_2$ fine particles (α) (mg/m²) | Mg component (β) (mg/m²) | $P_2O_5$ component (γ) (mg/m²) | $Mg/SiO_2$ *5 | $P_2O_5/Mg$ *6 |
| 43 | 1 | 1 | 140 | 0.3 | 366 | 34 | 25 | 307 | 1.82 | 2.1 |
| 44 | 1 | 1 | 140 | 0.3 | 366 | 34 | 25 | 307 | 1.82 | 2.1 |
| 45 | 1 | 1 | 140 | 0.3 | 366 | 34 | 25 | 307 | 1.82 | 2.1 |
| 46 | 1 | 1 | 140 | 0.3 | 366 | 34 | 25 | 307 | 1.82 | 2.1 |
| 47 | 1 | 1 | 140 | 0.3 | 366 | 34 | 25 | 307 | 1.82 | 2.1 |
| 48 | 1 | 1 | 140 | 0.3 | 366 | 34 | 25 | 307 | 1.82 | 2.1 |
| 49 | 1 | 1 | 140 | 0.3 | 366 | 34 | 25 | 307 | 1.82 | 2.1 |
| 50 | 1 | 1 | 140 | 0.3 | 366 | 34 | 25 | 307 | 1.82 | 2.1 |
| 51 | 1 | 1 | 140 | 0.3 | 366 | 34 | 25 | 307 | 1.82 | 2.1 |
| 52 | 1 | 1 | 140 | 0.3 | 366 | 34 | 25 | 307 | 1.82 | 2.1 |

| | Secondary layer coating | | | | | |
|---|---|---|---|---|---|---|
| | | Fine particles silica (b) | | | | |
| No. | Resin composition *3 | Type *8 | Blending rate *9 | Drying temperature (°C.) | Coating thickness (μm) | Classification |
| 43 | 1 | 1 | 10 | 230 | 0.01 | Comparative example |
| 44 | 1 | 1 | 10 | 230 | 0.1 | Example |
| 45 | 1 | 1 | 10 | 230 | 0.5 | Example |
| 46 | 1 | 1 | 10 | 230 | 0.5 | Example |
| 47 | 1 | 1 | 10 | 230 | 2 | Example |
| 48 | 1 | 1 | 10 | 230 | 2.5 | Example |
| 49 | 1 | 1 | 10 | 230 | 3 | Example |
| 50 | 1 | 1 | 10 | 230 | 4 | Example |
| 51 | 1 | 1 | 10 | 230 | 5 | Example |
| 52 | 1 | 1 | 10 | 230 | 20 | Comparative example |

TABLE 162

| No. | Appearance | White-rust resistance: SST 72 hrs | White-rust resistance after alkaline degreasing: SST 72 hrs | adhesiveness | Classification |
|---|---|---|---|---|---|
| 43 | ○ | × | × | ⊙ | Comparative example |
| 44 | ○ | ○− | ○− | ⊙ | Example |
| 45 | ○ | ○ | ○− | ⊙ | Example |
| 46 | ○ | ○+ | ○+ | ⊙ | Example |
| 47 | ○ | ⊙ | ⊙ | ⊙ | Example |

TABLE 162-continued

| | | Performance | | | |
|---|---|---|---|---|---|
| No. | Appearance | White-rust resistance: SST 72 hrs | White-rust resistance after alkaline degreasing: SST 72 hrs | adhesiveness | Classification |
| 48 | ○ | ◉ | ◉ | ◉ | Example |
| 49 | ○ | ◉ | ◉ | ◉ | Example |
| 50 | ○ | ◉ | ◉ | ◉ | Example |
| 51 | ○ | ◉ | ◉ | ◉ | Example |
| 52 | ○ | ◉ | ◉ | ◉ | Comparative example ※1 |

※1: Unable to weld

TABLE 163

| | | | | Primary layer coating | | | | | | |
|---|---|---|---|---|---|---|---|---|---|---|
| | | | | Coating weight *4 | | | | Molar ratio of coating components | | |
| No. | Plating steel plate *1 | Coating composition *2 | Drying temperature (°C.) | Coating thickness (μm) | Total coating weight (mg/m²) | $SiO_2$ fine particles (α) (mg/m²) | Mg component (β) (mg/m²) | $P_2O_5$ component (γ) (mg/m²) | Mg/$SiO_2$ *5 | $P_2O_5$/Mg *6 | Classification |
| 63 | 1 | 1 | 140 | 0.3 | 366 | 34 | 25 | 307 | 1.82 | 2.1 | Example |

TABLE 164

| | | Secondary layer coating | | | | | |
|---|---|---|---|---|---|---|---|
| | | Fine particles silica (b) | | Solid lubricant (c) | | Drying | Coating |
| No. | Resin composition *3 | Type *8 | Blending rate *9 | Type *12 | Blending rate *13 | temperature (°C.) | thickness (μm) | Classification |
| 63 | 1 | 1 | 10 | 1 | 5 | 230 | 1 | Example |

TABLE 165

| | | Performance | | | | |
|---|---|---|---|---|---|---|
| No. | Appearance | White-rust resistance: SST 72 hrs | White-rust resistance after alkaline degreasing: SST 72 hrs | Paint adhesiveness | Workability | Classification |
| 63 | ○ | ◉ | ◉ | ◉ | ◉ | Example |

TABLE 166

| | | | | Primary layer coating | | | | | | |
|---|---|---|---|---|---|---|---|---|---|---|
| | | | | Coating weight *4 | | | | Molar ratio of coating components | | |
| No. | Plating steel plate *1 | Coating composition *2 | Drying temperature (°C.) | Coating thickness (μm) | Total coating weight (mg/m²) | $SiO_2$ fine particles (α) (mg/m²) | Mg component (β) (mg/m²) | $P_2O_5$ component (γ) (mg/m²) | Mg/$SiO_2$ *5 | $P_2O_5$/Mg *6 | Classification |
| 91 | 1 | 1 | 140 | 0.3 | 366 | 34 | 25 | 307 | 1.82 | 2.1 | Example |

TABLE 167

| | | Secondary layer coating | | | | | | | | |
|---|---|---|---|---|---|---|---|---|---|---|
| | Resin | Ion-exchanged silica (a) | Fine particles silica (b) | | (a) + (b) | (a)/(b) Weight | Solid lubricant (c) | | Drying | Coating |
| No. | composition *3 | Blending rate *7 | Type *8 | Blending rate *9 | Blending rate *10 | ratio *11 | Type *12 | Blending rate *13 | temperature (° C.) | thickness (μm) | Classification |
| 91 | 1 | 30 | — | — | — | — | — | — | 230 | 1 | Example |

TABLE 168

| | | Performance | | | | |
|---|---|---|---|---|---|---|
| No. | Appearance | White-rust resistance: SST 72 hrs | White-rust resistance after alkaline degreasing: SST 72 hrs | Paint adhesiveness | Workability | Classification |
| 91 | ○ | ⊚ | ⊚ | ⊚ | — | Example |

TABLE 169

| | | | | | Primary layer coating | | | | | | |
|---|---|---|---|---|---|---|---|---|---|---|---|
| | | | | | Coating weight *4 | | | | Molar ratio of coating components | | |
| | Plating | Coating | Drying | Coating | Total coating | SiO$_2$ fine particles | Mg component | P$_2$O$_5$ component | | | |
| No. | steel plate *1 | composition *2 | temperature (° C.) | thickness (μm) | weight (mg/m$^2$) | (α) (mg/m$^2$) | (β) (mg/m$^2$) | (γ) (mg/m$^2$) | Mg/SiO$_2$ *5 | P$_2$O$_5$/Mg *6 | Classicication |
| 141 | 1 | 1 | 140 | 0.3 | 366 | 34 | 25 | 307 | 1.82 | 2.1 | Example |
| 142 | 1 | 1 | 140 | 0.3 | 366 | 34 | 25 | 307 | 1.82 | 2.1 | Example |
| 143 | 1 | 1 | 140 | 0.3 | 366 | 34 | 25 | 307 | 1.82 | 2.1 | Example |
| 144 | 1 | 1 | 140 | 0.3 | 366 | 34 | 25 | 307 | 1.82 | 2.1 | Example |
| 145 | 1 | 1 | 140 | 0.3 | 366 | 34 | 25 | 307 | 1.82 | 2.1 | Example |
| 146 | 1 | 1 | 140 | 0.3 | 366 | 34 | 25 | 307 | 1.82 | 2.1 | Example |
| 147 | 1 | 1 | 140 | 0.3 | 366 | 34 | 25 | 307 | 1.82 | 2.1 | Example |
| 148 | 1 | 1 | 140 | 0.3 | 366 | 34 | 25 | 307 | 1.82 | 2.1 | Example |
| 149 | 1 | 1 | 140 | 0.3 | 366 | 34 | 25 | 307 | 1.82 | 2.1 | Example |
| 150 | 1 | 1 | 140 | 0.3 | 366 | 34 | 25 | 307 | 1.82 | 2.1 | Example |
| 151 | 1 | 1 | 140 | 0.3 | 366 | 34 | 25 | 307 | 1.82 | 2.1 | Example |
| 152 | 1 | 1 | 140 | 0.3 | 366 | 34 | 25 | 307 | 1.82 | 2.1 | Example |
| 153 | 1 | 1 | 140 | 0.3 | 366 | 34 | 25 | 307 | 1.82 | 2.1 | Example |
| 154 | 1 | 1 | 140 | 0.3 | 366 | 34 | 25 | 307 | 1.82 | 2.1 | Example |

TABLE 170

| | | Secondary layer coating | | | | | | | | | |
|---|---|---|---|---|---|---|---|---|---|---|---|
| | Resin | Ion-exchanged silica (a) | Fine particles silica (b) | | (a) + (b) | (a)/(b) Weight | Solid lubricant (c) | | Drying | Coating | |
| No. | composition *3 | Blending rate *7 | Type *8 | Blending rate *9 | Blending rate *10 | ratio *11 | Type *12 | Blending rate *13 | temperature (° C.) | thickness (μm) | Classification |
| 141 | 1 | 30 | 1 | 5 | 35 | 6/1 | — | — | 230 | 1.5 | Example |
| 142 | 1 | 30 | 1 | 5 | 35 | 6/1 | — | — | 230 | 1.5 | Example |
| 143 | 1 | 30 | 1 | 5 | 35 | 6/1 | — | — | 230 | 1.5 | Example |
| 144 | 1 | 30 | 1 | 5 | 35 | 6/1 | — | — | 230 | 1.5 | Example |
| 145 | 1 | 30 | 1 | 5 | 35 | 6/1 | — | — | 230 | 1.5 | Example |
| 146 | 1 | 30 | 1 | 5 | 35 | 6/1 | — | — | 230 | 1.5 | Example |
| 147 | 1 | 30 | 1 | 5 | 35 | 6/1 | — | — | 230 | 1.5 | Example |
| 148 | 1 | 30 | 1 | 5 | 35 | 6/1 | — | — | 230 | 1.5 | Example |
| 149 | 1 | 30 | — | — | 30 | 30/0 | — | — | 230 | 1.5 | Example |
| 150 | 1 | 29.9 | 1 | 0.1 | 30 | 299/1 | — | — | 230 | 1.5 | Example |
| 151 | 1 | 29 | 1 | 1 | 30 | 29/1 | — | — | 230 | 1.5 | Example |
| 152 | 1 | 20 | 1 | 10 | 30 | 2/1 | — | — | 230 | 1.5 | Example |
| 153 | 1 | 15 | 1 | 15 | 30 | 1/1 | — | — | 230 | 1.5 | Example |
| 154 | 1 | 10 | 1 | 20 | 30 | 1/2 | — | — | 230 | 1.5 | Example |

TABLE 171

| | | Performance | | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 141 | ○ | ◎ | ◎ | ◎ | — | Example |
| 142 | ○ | ◎ | ◎ | ◎ | — | Example |
| 143 | ○ | ○ + | ○ | ◎ | — | Example |
| 144 | ○ | ○ + | ○ | ◎ | — | Example |
| 145 | ○ | ○ | ○ - | ◎ | — | Example |
| 146 | ○ | ○ | ○ - | ◎ | — | Example |
| 147 | ○ | ○ | ○ - | ◎ | — | Example |
| 148 | ○ | ○ | ○ - | ◎ | — | Example |
| 149 | ○ | ○ | ○ | ◎ | — | Example |
| 150 | ○ | ○ | ○ | ◎ | — | Example |
| 151 | ○ | ○ + | ○ + | ◎ | — | Example |
| 152 | ○ | ◎ | ◎ | ◎ | — | Example |
| 153 | ○ | ◎ | ◎ | ◎ | — | Example |
| 154 | ○ | ○ | ○ | ◎ | — | Example |

TABLE 172

| | | | | | Primary layer coating | | | | | | |
|---|---|---|---|---|---|---|---|---|---|---|---|
| | | | | | | Coating weight *4 | | | | | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Molar ratio of coating components Mg/SiO₂ *5 | P₂O₅/Mg *6 | Classiciation |
| 155 | 1 | 1 | 140 | 0.3 | 366 | 34 | 25 | 307 | 1.82 | 2.1 | Example |
| 156 | 1 | 1 | 140 | 0.3 | 366 | 34 | 25 | 307 | 1.82 | 2.1 | Example |

TABLE 173

| | | | | | | | Secondary layer coating | | | | |
|---|---|---|---|---|---|---|---|---|---|---|---|
| No. | Resin composition *3 | Ion-exchanged silica (a) Blending rate *7 | Fine particles silica (b) Type *8 | Fine particles silica (b) Blending rate *9 | (a) + (b) Blending rate *10 | (a)/(b) Weight ratio *11 | Solid lubricant (c) Type *12 | Solid lubricant (c) Blending rate *13 | Drying temperature (° C.) | Coating thickness (μm) | Classification |
| 155 | 1 | 1 | 1 | 29 | 30 | 1/29 | — | — | 230 | 1 | Example |
| 156 | 1 | 0.1 | 1 | 29.9 | 30 | 1/299 | — | — | 230 | 1 | Example |

TABLE 174

| | | Performance | | | | |
|---|---|---|---|---|---|---|
| No. | Appearance | White-rust resistance: SST 120 hrs | White-rust resistance after alkaline degreasing: SST 120 hrs | Paint adhesiveness | Workability | Classification |
| 155 | ○ | ○ | ○ | ◎ | — | Example |
| 156 | ○ | ○ - | ○ - | ◎ | — | Example |

TABLE 175

Primary layer coating

| | | | | Coating weight *4 | | | | Molar ratio of coating components | | |
| | | | | Total | SiO₂ fine | Mg | P₂O₅ | | | |
| | Plating | Coating | Drying | Coating | coating | particles | component | component | | | |
| | steel plate | composition | temperature | thickness | weight | (α) | (β) | (γ) | Mg/SiO₂ | P₂O₅/Mg | |
| No. | *1 | *2 | (° C.) | (μm) | (mg/m²) | (mg/m²) | (mg/m²) | (mg/m²) | *5 | *6 | Classiciation |
| 181 | 1 | 1 | 140 | 0.3 | 366 | 34 | 25 | 307 | 1.82 | 2.1 | Example |

TABLE 176

Secondary layer coating

| | Resin | Ion-exchanged silica (a) | Fine particles silica (b) | | (a) + (b) | (a)/(b) Weight | Solid lubricant (c) | | Drying | Coating | |
| No. | composition *3 | Blending rate *7 | Type *8 | Blending rate *9 | Blending rate *10 | ratio *11 | Type *12 | Blending rate *13 | temperature (° C.) | thickness (μm) | Classification |
| 181 | 1 | 30 | — | — | — | — | 1 | 10 | 230 | 1 | Example |

TABLE 177

Performance

| No. | Appearance | White-rust resistance: SST 96 hrs | White-rust resistance after alkaline degreasing: SST 96 hrs | Paint adhesiveness | Workability | Classification |
| 181 | ○ | ◉ | ◉ | ◉ | ◉ | Example |

TABLE 178

Primary layer coating

| | | | | | Coating weight *4 | | | | Molar ratio of coating components | | |
| | Plating steel | Coating | Drying | Coating | Total coating | SiO₂ fine particles | Mg component | P₂O₅ component | | | |
| | plate | composition | temperature | thickness | weight | (α) | (β) | (γ) | Mg/SiO₂ | P₂O₅/Mg | |
| No. | *1 | *2 | (° C.) | (μm) | (mg/m²) | (mg/m²) | (mg/m²) | (mg/m²) | *5 | *6 | ification |
| 203 | 1 | 1 | 140 | 0.001 | 1 | 0.14 | 0.1 | 1 | 1.82 | 2.1 | Comparative example |
| 204 | 1 | 1 | 140 | 0.005 | 5.9 | 0.54 | 0.4 | 5 | 1.82 | 2.1 | Example |
| 205 | 1 | 1 | 140 | 0.01 | 15 | 1.4 | 1 | 12 | 1.82 | 2.1 | Example |
| 206 | 1 | 1 | 140 | 0.1 | 146 | 14 | 10 | 123 | 1.82 | 2.1 | Example |
| 207 | 1 | 1 | 140 | 0.5 | 585 | 54 | 40 | 491 | 1.82 | 2.1 | Example |
| 208 | 1 | 1 | 140 | 1 | 1170 | 109 | 80 | 982 | 1.82 | 2.1 | Example |
| 209 | 1 | 1 | 140 | 2 | 2341 | 217 | 160 | 1963 | 1.82 | 2.1 | Example |
| 210 | 1 | 1 | 140 | 3 | 3511 | 326 | 240 | 2945 | 1.82 | 2.1 | Example |
| 211 | 1 | 1 | 140 | 5 | 5851 | 543 | 400 | 4909 | 1.82 | 2.1 | Comparative example |

TABLE 179

Secondary layer coating

| | Resin | Ion-exchanged silica (a) | Fine particles silica (b) | | (a) + (b) | (a)/(b) Weight | Solid lubricant (c) | | Drying | Coating | |
| No. | composition *3 | Blending rate *7 | Type *8 | Blending rate *9 | Blending rate *10 | ratio *11 | Type *12 | Blending rate *13 | temperature (° C.) | thickness (μm) | Classification |
| 203 | 1 | 30 | — | — | — | — | — | — | 230 | 1 | Example example |

TABLE 179-continued

| | | Secondary layer coating | | | | | | | | | |
|---|---|---|---|---|---|---|---|---|---|---|---|
| | Resin | Ion-exchanged silica (a) | Fine particles silica (b) | | (a) + (b) | (a)/(b) Weight | Solid lubricant (c) | | Drying | Coating | |
| No. | composition *3 | Blending rate *7 | Type *8 | Blending rate *9 | Blending rate *10 | ratio *11 | Type *12 | Blending rate *13 | temperature (° C.) | thickness (μm) | Classification |
| 204 | 1 | 30 | — | — | — | — | — | — | 230 | 1 | Example |
| 205 | 1 | 30 | — | — | — | — | — | — | 230 | 1 | Example |
| 206 | 1 | 30 | — | — | — | — | — | — | 230 | 1 | Example |
| 207 | 1 | 30 | — | — | — | — | — | — | 230 | 1 | Example |
| 208 | 1 | 30 | — | — | — | — | — | — | 230 | 1 | Example |
| 209 | 1 | 30 | — | — | — | — | — | — | 230 | 1 | Example |
| 210 | 1 | 30 | — | — | — | — | — | — | 230 | 1 | Example |
| 211 | 1 | 30 | — | — | — | — | — | — | 230 | 1 | Comparative example |

TABLE 180

| | | | Performance | | | |
|---|---|---|---|---|---|---|
| No. | Appearance | White-rust resistance: SST 96 hrs | White-rust resistance after alkaline degreasing: SST 96 hrs | Paint adhesiveness | Workability | Classification |
| 203 | ○ | × | × | ⊚ | — | Comparative example |
| 204 | ○ | ○- | ○- | ⊚ | — | Example |
| 205 | ○ | ○ | ○ | ⊚ | — | Example |
| 206 | ○ | ○+ | ○+ | ⊚ | — | Example |
| 207 | ○ | ⊚ | ⊚ | ⊚ | — | Example |
| 208 | ○ | ⊚ | ⊚ | ⊚ | — | Example |
| 209 | ○ | ⊚ | ⊚ | ⊚ | — | Example |
| 210 | ○ | ⊚ | ⊚ | ⊚ | — | Example |
| 211 | ○ | ⊚ | ⊚ | ⊚ | — | Comparative example ※1 |

※1: Unable to weld

TABLE 181

| | | | | Primary layer coating | | | | | | |
|---|---|---|---|---|---|---|---|---|---|---|
| | | | | | Coating weight *4 | | | | Molar ratio of coating components | |
| | Plating | Coating | Drying | Coating | Total coating | SiO₂ fine particles | Mg component | P₂O₅ component | | |
| No. | steel plate *1 | composition *2 | temperature (° C.) | thickness (μm) | weight (mg/m²) | (α) (mg/m²) | (β) (mg/m²) | (γ) (mg/m²) | Mg/SiO₂ *5 | P₂O₅/Mg *6 |
| 220 | 1 | 2 | 140 | 0.3 | 400 | 66 | 25 | 310 | 0.94 | 2.12 |
| 221 | 1 | 3 | 140 | 0.3 | 303 | 49 | 20 | 234 | 1 | 2 |
| 222 | 1 | 4 | 140 | 0.3 | 320 | 53 | 20 | 248 | 0.94 | 2.12 |
| 223 | 1 | 5 | 140 | 0.3 | 293 | 27 | 20 | 245 | 1.82 | 2.1 |
| 224 | 1 | 6 | 140 | 0.3 | 317 | (Al₂O₃) | 25 | 292 | 1.5 | 2 |
| 225 | 1 | 7 | 140 | 0.3 | 317 | (ZrO₂) | 25 | 292 | 1.5 | 2 |
| 226 | 1 | 8 | 140 | 0.3 | 403 | 150 | 20 | 234 | 0.33 | 2 |
| 227 | 1 | 9 | 140 | 0.3 | 320 | 95 | (ca) | 225 | — | — |
| 228 | 1 | 10 | 140 | 0.3 | 320 | 90 | (Sr) | 230 | — | — |
| 229 | 1 | 11 | 140 | 0.3 | 329 | 89 | (Ba) | 240 | 2 | 8 |
| 230 | 1 | 12 | 140 | 0.3 | 320 | — | 40 | 280 | — | 1.2 |
| 231 | 1 | 13 | 140 | 0.3 | 300 | 50 | — | 250 | — | — |
| 232 | 1 | 14 | 140 | 0.3 | 416 | 346 | 70 | 0 | 0.5 | — |
| 233 | 1 | 15 | 140 | 0.3 | 500 | — | — | 0 | — | — |

TABLE 181-continued

| | | Secondary layer coating | | | |
|---|---|---|---|---|---|
| | No. | Resin composition *3 | Drying temperature (° C.) | Coating thickness (μm) | Classification |
| | 220 | 1 | 230 | 1 | Example |
| | 221 | 1 | 230 | 1 | Example |
| | 222 | 1 | 230 | 1 | Example |
| | 223 | 1 | 230 | 1 | Example |
| | 224 | 1 | 230 | 1 | Example |
| | 225 | 1 | 230 | 1 | Example |
| | 226 | 1 | 230 | 1 | Example |
| | 227 | 1 | 230 | 1 | Example |
| | 228 | 1 | 230 | 1 | Example |
| | 229 | 1 | 230 | 1 | Example |
| | 230 | 1 | 230 | 1 | Comparative example |
| | 231 | 1 | 230 | 1 | Comparative example |
| | 232 | 1 | 230 | 1 | Comparative example |
| | 233 | 1 | 230 | 1 | Comparative example |

TABLE 182

| | | Performance | | | |
|---|---|---|---|---|---|
| No. | Appearance | White-rust resistance: SST 48 hrs | White-rust resistance White-rust resistance after alkaline degreasing: SST 48 hrs | Paint adhesiveness | Classification |
| 220 | ○ | ⊙ | ⊙ | ⊙ | Example |
| 221 | ○ | ⊙ | ⊙ | ⊙ | Example |
| 222 | ○ | ⊙ | ⊙ | ⊙ | Example |
| 223 | ○ | ⊙ | ⊙ | ⊙ | Example |
| 224 | ○ | ○ | ○ | ⊙ | Example |
| 225 | ○ | ○ | ○ | ⊙ | Example |
| 226 | ○ | ⊙ | ⊙ | ⊙ | Example |
| 227 | ○ | ○ + | ○ + | ⊙ | Example |
| 228 | ○ | ○ | ○ | ⊙ | Example |
| 229 | ○ | ○ | ○ | ⊙ | Example |
| 230 | ○ | Δ | Δ | ⊙ | Example |
| 231 | ○ | Δ | Δ | ⊙ | Comparative example |
| 232 | ○ | Δ | Δ | ⊙ | Comparative example |
| 233 | ○ | × | Δ | ⊙ | Comparative example |

TABLE 183

| | | | | | Primary layer coating | | | | | |
|---|---|---|---|---|---|---|---|---|---|---|
| | | | | | | Coating weight *4 | | | Molar ratio of coating components | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 234 | 1 | 16 | 140 | 0.3 | 324 | 43.2 | 35 | 245.4 | 2 | 1.2 |
| 235 | 1 | 17 | 140 | 0.3 | 324 | 43.2 | 35 | 245.4 | 2 | 1.2 |
| 236 | 1 | 18 | 140 | 0.3 | 335 | 88.9 | 36 | 210.4 | 1 | 1 |
| 237 | 1 | 19 | 140 | 0.3 | 292 | 38.0 | 20 | 233.7 | 1.3 | 2 |
| 238 | 1 | 20 | 140 | 0.3 | 332 | 72.0 | 35 | 225.0 | 1.2 | 1.1 |
| 239 | 1 | 21 | 140 | 0.3 | 330 | 22.2 | 45 | 263.0 | 5 | 1 |
| 240 | 1 | 22 | 140 | 0.3 | 371 | 148.1 | 30 | 192.8 | 0.5 | 1.1 |
| 241 | 1 | 23 | 140 | 0.3 | 349 | 114.0 | 60 | 175.3 | 1.3 | 0.5 |
| 242 | 1 | 24 | 140 | 0.3 | 323 | 49.4 | 40 | 233.7 | 2.0 | 1.0 |
| 243 | 1 | 25 | 140 | 0.3 | 323 | 49.4 | 40 | 233.7 | 2.0 | 1.0 |

TABLE 183-continued

| | | | | | | | | | |
|---|---|---|---|---|---|---|---|---|---|
| 244 | 1 | 26 | 140 | 0.3 | 323 | 49.4 | 40 | 233.7 | 2.0 | 1.0 |
| 245 | 1 | 27 | 140 | 0.3 | 374 | 246.9 | 10 | 116.9 | 0.1 | 2.0 |

| | Secondary layer coating | | | |
|---|---|---|---|---|
| No. | Resin composition *3 | Drying temperature (° C.) | Coating thickness (μm) | Classification |
| 234 | 1 | 230 | 1 | Example |
| 235 | 1 | 230 | 1 | Example |
| 236 | 1 | 230 | 1 | Example |
| 237 | 1 | 230 | 1 | Example |
| 238 | 1 | 230 | 1 | Example |
| 239 | 1 | 230 | 1 | Example |
| 240 | 1 | 230 | 1 | Example |
| 241 | 1 | 230 | 1 | Example |
| 242 | 1 | 230 | 1 | Example |
| 243 | 1 | 230 | 1 | Example |
| 244 | 1 | 230 | 1 | Example |
| 245 | 1 | 230 | 1 | Example |

TABLE 184

| | Performance | | | | |
|---|---|---|---|---|---|
| No. | Appearance | White-rust resistance: SST 48 hrs | White-rust resistance after alkaline degreasing: SST 48 hrs | Paint adhesiveness | Classification |
| 234 | ○ | ⊙ | ⊙ | ⊙ | Example |
| 235 | ○ | ⊙ | ⊙ | ⊙ | Example |
| 236 | ○ | ⊙ | ⊙ | ⊙ | Example |
| 237 | ○ | ⊙ | ⊙ | ⊙ | Example |
| 238 | ○ | ⊙ | ⊙ | ⊙ | Example |
| 239 | ○ | ⊙ | ⊙ | ⊙ | Example |
| 240 | ○ | ⊙ | ⊙ | ⊙ | Example |
| 241 | ○ | ⊙ | ⊙ | ⊙ | Example |
| 242 | ○ | ⊙ | ⊙ | ⊙ | Example |
| 243 | ○ | ⊙ | ⊙ | ⊙ | Example |
| 244 | ○ | ⊙ | ○ + | ⊙ | Example |
| 245 | ○ | ⊙ | ○ + | ⊙ | Example |

TABLE 185

| | | | | | Primary layer coating | | | | | |
|---|---|---|---|---|---|---|---|---|---|---|
| | | | | | Coating weight *4 | | | | Molar ratio of coating components | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 246 | 1 | 28 | 140 | 0.3 | 330 | 9.9 | 40 | 280.5 | 10.0 | 1.2 |
| 247 | 1 | 29 | 140 | 0.3 | 323 | 164.6 | 100 | 58.4 | 1.5 | 0.1 |
| 248 | 1 | 30 | 140 | 0.3 | 310 | 12.3 | 5 | 292.2 | 1.0 | 10.0 |
| 249 | 1 | 31 | 140 | 0.3 | 310 | 13.2 | 40 | 257.1 | 7.5 | 1.1 |
| 250 | 1 | 32 | 140 | 0.3 | 310 | 2.2 | 45 | 263.0 | 50.0 | 1.0 |
| 251 | 1 | 33 | 140 | 0.3 | 300 | 123.5 | 1 | 175.3 | 0.02 | 30 |
| 252 | 1 | 34 | 140 | 0.3 | 324 | 148.1 | 0.6 | 175.3 | 0.01 | 50 |
| 253 | 1 | 35 | 140 | 0.3 | 389 | 3.5 | 140 | 245.4 | 100 | 0.3 |
| 254 | 1 | 36 | 140 | 0.3 | 401 | 1.8 | 145 | 254.2 | 100 | 0.3 |
| 255 | 1 | 37 | 140 | 0.3 | 394 | 246.9 | 0.5 | 146.1 | 0.005 | 50 |
| 256 | 1 | 38 | 140 | 0.3 | 293 | 74.1 | 0.15 | 219.1 | 0.005 | 250 |
| 257 | 1 | 39 | 140 | 0.3 | 365 | 6.9 | 350 | 8.2 | 125 | 0.004 |

TABLE 185-continued

| | Secondary layer coating | | | |
|---|---|---|---|---|
| No. | Resin composition *3 | Drying temperature (° C.) | Coating thickness (μm) | Classification |
| 246 | 1 | 230 | 1 | Example |
| 247 | 1 | 230 | 1 | Example |
| 248 | 1 | 230 | 1 | Example |
| 249 | 1 | 230 | 1 | Example |
| 250 | 1 | 230 | 1 | Example |
| 251 | 1 | 230 | 1 | Example |
| 252 | 1 | 230 | 1 | Example |
| 253 | 1 | 230 | 1 | Example |
| 254 | 1 | 230 | 1 | Example |
| 255 | 1 | 230 | 1 | Example |
| 256 | 1 | 230 | 1 | Example |
| 257 | 1 | 230 | 1 | Example |

TABLE 186

| | Performance | | | | |
|---|---|---|---|---|---|
| No. | Appearance | White-rust resistance: SST 48 hrs | White-rust resistance after alkaline degreasing: SST 48 hrs | Paint adhesiveness | Classification |
| 246 | ○ | ⊚ | ○ + | ⊚ | Example |
| 247 | ○ | ⊚ | ○ + | ⊚ | Example |
| 248 | ○ | ⊚ | ○ + | ⊚ | Example |
| 249 | ○ | ⊚ | ○ + | ⊚ | Example |
| 250 | ○ | ⊚ | ○ | ⊚ | Example |
| 251 | ○ | ⊚ | ○ | ⊚ | Example |
| 252 | ○ | ⊚ | ○ | ⊚ | Example |
| 253 | ○ | ⊚ | ○ | ⊚ | Example |
| 254 | ○ | ⊚ | ○ - | ⊚ | Example |
| 255 | ○ | ⊚ | ○ - | ⊚ | Example |
| 256 | ○ | ○ + | ○ + | ⊚ | Example |
| 257 | ○ | ○ + | ○ + | ⊚ | Example |

TABLE 187

| | Primary layer coating | | | | | | | | | |
|---|---|---|---|---|---|---|---|---|---|---|
| | | | | | Coating weight *4 | | | | Molar ratio of coating components | |
| No. | Plating steel plate *1 | Coating composition *2 | Drying temperature (° C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 258 | 1 | 40 | 140 | 0.3 | 394 | 0.2 | 160 | 233.7 | 2000 | 0.25 |
| 259 | 1 | 41 | 140 | 0.3 | 391 | 0.3 | 180 | 210.4 | 1500 | 0.2 |
| 260 | 1 | 42 | 140 | 0.3 | 365 | 246.9 | 0.8 | 116.9 | 0.008 | 25 |
| 261 | 1 | 43 | 140 | 0.3 | 399 | 319.5 | 2.2 | 77.1 | 0.017 | 6 |
| 262 | 1 | 44 | 140 | 0.3 | 379 | 98.8 | 0.08 | 280.5 | 0.002 | 600 |
| 263 | 1 | 45 | 140 | 0.3 | 404 | 181.1 | 220 | 2.6 | 3 | 0.002 |
| 264 | 1 | 46 | 140 | 0.3 | 399 | 18.5 | 30 | 350.6 | 4 | 2 |
| 265 | 1 | 47 | 140 | 0.3 | 321 | 0.03 | 40 | 280.5 | 3000 | 1.2 |
| 266 | 1 | 48 | 140 | 0.3 | 323 | 49.4 | 40 | 233.7 | 2 | 1 |
| 267 | 1 | 49 | 140 | 0.3 | 323 | 49.4 | 40 | 233.7 | 2 | 1 |
| 268 | 1 | 50 | 140 | 0.3 | 379 | 57.6 | 35 | 286.3 | 1.5 | 1.4 |

| | Secondary layer coating | | | |
|---|---|---|---|---|
| No. | Resin composition *3 | Drying temperature (° C.) | Coating thickness (μm) | Classification |
| 258 | 1 | 230 | 1 | Example |
| 259 | 1 | 230 | 1 | Example |
| 260 | 1 | 230 | 1 | Example |
| 261 | 1 | 230 | 1 | Example |

TABLE 187-continued

| | | | | |
|---|---|---|---|---|
| 262 | 1 | 230 | 1 | Example |
| 263 | 1 | 230 | 1 | Example |
| 264 | 1 | 230 | 1 | Example |
| 265 | 1 | 230 | 1 | Example |
| 266 | 1 | 230 | 1 | Example |
| 267 | 1 | 230 | 1 | Example |
| 268 | 1 | 230 | 1 | Example |

TABLE 188

| | | Performance | | | |
|---|---|---|---|---|---|
| No. | Appearance | White-rust resistance: SST 48 hrs | White-rust resistance after alkaline degreasing: SST 48 hrs | Paint adhesiveness | Classification |
| 258 | ○ | ○+ | ○+ | ◉ | Example |
| 259 | ○ | ○+ | ○+ | ◉ | Example |
| 260 | ○ | ○+ | ○+ | ◉ | Example |
| 261 | ○ | ○+ | ○+ | ◉ | Example |
| 262 | ○ | ○+ | ○+ | ◉ | Example |
| 263 | ○ | ○+ | ○+ | ◉ | Example |
| 264 | ○ | ○+ | ○+ | ◉ | Example |
| 265 | ○ | ○+ | ○+ | ◉ | Example |
| 266 | ○ | ◉ | ○+ | ◉ | Example |
| 267 | ○ | ◉ | ○+ | ◉ | Example |
| 268 | ○ | ◉ | ◉ | ◉ | Example |

TABLE 189

| | | | | | Primary layer coating | | | | | |
|---|---|---|---|---|---|---|---|---|---|---|
| | | | | | | Coating weight *4 | | | Molar ratio of coating components | |
| No. | Plating steel plate *1 | Coating composition *2 | Drying temperature (°C.) | Coating thickness (μm) | Total coating weight (mg/m²) | SiO₂ fine particles (α) (mg/m²) | Mg component (β) (mg/m²) | P₂O₅ component (γ) (mg/m²) | Mg/SiO₂ *5 | P₂O₅/Mg *6 |
| 269 | 1 | 51 | 140 | 0.3 | 399 | 164.6 | 0.2 | 233.7 | 0.003 | 200 |
| 270 | 1 | 52 | 140 | 0.3 | 326 | 66.5 | 35 | 225.0 | 1.3 | 1.1 |
| 271 | 1 | 53 | 140 | 0.3 | 337 | 98.8 | 4 | 233.7 | 0.1 | 10 |
| 272 | 1 | 54 | 140 | 0.3 | 393 | 318.6 | 4 | 70.1 | 0.031 | 3 |
| 273 | 1 | 55 | 140 | 0.3 | 366 | 0.0 | 15 | 350.6 | — | 4 |
| 274 | 1 | 56 | 140 | 0.3 | 359 | 25.9 | 210 | 122.7 | 20 | 0.1 |
| 275 | 1 | 57 | 140 | 0.3 | 400 | 280.0 | 0 | 120.0 | — | — |
| 276 | 1 | 58 | 140 | 0.3 | 347 | 0.40 | 25 | 321.4 | 150 | 2.2 |
| 277 | 1 | 59 | 140 | 0.3 | 359 | 308.6 | 50 | 0.0 | 0.4 | — |
| 278 | 1 | 60 | 140 | 0.3 | 297 | 25.9 | 210 | 61.4 | 20 | 0.05 |
| 279 | 1 | 61 | 140 | 0.3 | 327 | 10.3 | 25 | 292.2 | 6 | 2 |

| | Secondary layer coating | | | |
|---|---|---|---|---|
| No. | Resin composition *3 | Drying temperature (°C.) | Coating thickness (μm) | Classification |
| 269 | 1 | 230 | 1 | Example |
| 270 | 1 | 230 | 1 | Example |
| 271 | 1 | 230 | 1 | Example |
| 272 | 1 | 230 | 1 | Example |
| 273 | 1 | 230 | 1 | Example |
| 274 | 1 | 230 | 1 | Example |
| 275 | 1 | 230 | 1 | Example |
| 276 | 1 | 230 | 1 | Example |
| 277 | 1 | 230 | 1 | Example |
| 278 | 1 | 230 | 1 | Example |
| 279 | 1 | 230 | 1 | Example |

TABLE 190

| No. | Appearance | White-rust resistance: SST 48 hrs | White-rust resistance after alkaline degreasing: SST 48 hrs | Paint adhesiveness | Classification |
|---|---|---|---|---|---|
| 269 | ○ | ◎ | ◎ | ◎ | Example |
| 270 | ○ | ◎ | ◎ | ◎ | Example |
| 271 | ○ | ◎ | ◎ | ◎ | Example |
| 272 | ○ | ○ | Δ | Δ | Comparative example |
| 273 | ○ | × | × | ◎ | Comparative example |
| 274 | × | Δ | ○ | ◎ | Comparative example |
| 275 | ○ | Δ | × | ◎ | Comparative example |
| 276 | × | Δ | Δ | ◎ | Comparative example |
| 277 | ○ | Δ | Δ | ◎ | Comparative example |
| 278 | ○ | × | Δ | ◎ | Comparative example |
| 279 | ○ | ○ | ○ | × | Comparative example |

Best Mode 7

According to a finding of the inventors of the present invention, an organic coating steel sheet inducing no pollution problem and providing excellent corrosion resistance is obtained without applying chromate treatment which may give bad influence to environment and human body, through the steps of: forming a specific composite oxide coating as the primary layer coating on the surface of a zinc base plating steel sheet or an aluminum base plating steel sheet; then, on the primary layer coating, further forming an organic resin as the secondary layer coating comprising a specific organic polymer resin as the base resin.

The organic coating steel sheet according to the present invention is basically characterized in that a composite oxide coating is formed on a zinc base plating steel sheet or an aluminum base steel sheet as the primary layer coating comprising (α) fine particles of oxide and (β) phosphoric acid and/or phosphoric acid compound, and at need, further comprising one or more of metal selected from the group consisting of Li, Mn, Fe, Co, Ni, Zn, Al, La, and Ce, and that, further on the primary layer coating, an organic coating as the secondary layer coating with a base resin of an organic polymer resin (A) containing OH group and/or COOH group, (preferably a thermosetting resin, more preferably an epoxy resin and/or a modified epoxy resin).

According to the present invention, there provided a dual-layer coating structure in which the primary layer is the lower layer, and the secondary layer is the upper layer of the coating. Owing to the synergy effect of the dual-layer structure, even a thin coating provides corrosion resistance equivalent to that of chromate coating. Although the mechanism of corrosion resistance in the dual layer coating structure consisting of a specific composite oxide coating and a specific organic coating is not fully analyzed, the corrosion-preventive effect of the dual layer coating structure presumably comes from the combination of corrosion-suppression actions of individual coatings, which is described below.

The corrosion preventive mechanism of the composite oxide coating as the primary layer coating is not fully understood. The excellent corrosion-preventive performance, supposedly, owes to that the dense and slightly soluble composite oxide coating acts as a barrier coating to shut-off corrosion causes, that the fine particles of oxide such as silicon oxide form a stable and dense barrier coating along with phosphoric acid and/or phosphoric acid compound, and that, when the fine particles of oxide are those of silicon oxide, the silicic acid ion emitted from the silicon oxide forms basic zinc chloride under a corrosive environment to improve the barrier performance. Also it is assumed that phosphoric acid and/or phosphoric acid compound contributes to the improvement of denseness of the composite oxide coating, further that the phosphoric acid component catches the zinc ion which is eluted during an anodic reaction as a corrosion reaction in the coating-defect section, then the phosphoric acid component is converted to a slightly soluble zinc phosphate compound to form a precipitate at that place.

When the composite oxide further contains one or more of elements selected from the group consisting of Li, Mn, Fe, Co, Ni, Zn, Al, La, and Ce, the corrosion resistance further improves. Although the reason that these elements further improves the corrosion resistance, presumably the effect comes from that any of these substances likely form a slightly soluble salt with phosphate in alkaline region, and generates OH ion resulted from cathodic reaction of oxygen in a corrosion reaction, which then seals the corrosion sites when the environment becomes alkaline state, thus providing high barrier effect.

Among these elements, Mn and Ni gave particularly excellent corrosion resistance. The reason of providing excellent corrosion resistance of Mn and Ni is not fully understood, the presumable cause is that these phosphates are difficult to be dissolved under alkaline environments.

Although the corrosion-preventive mechanism of the organic coating as the above-described secondary layer is not fully analyzed, the mechanism is speculated as follows.

The corrosion-preventive mechanism of the organic coating as the above-described secondary layer coating is also not fully analyzed. The mechanism is, however, presumably the following. An organic polymer resin (A) having OH group or COOH group, (preferably a thermosetting resin, more preferably an epoxy resin and/or a modified epoxy resin) reacts with a cross-linking agent to form a dense barrier coating. The barrier coating has excellent penetration-suppression performance against corrosion causes such as oxygen, and provides strong bonding force to the base material owing to the OH group and COOH group in the molecule. As a result, particular superior corrosion resistance would be obtained.

As described above, the corrosion-preventive effects of the primary layer, and the corrosion-preventive effects of the secondary layer totally function in combining and synergetic effects, thus the excellent corrosion resistance has been attained without using chromium even with a thin coating film.

The following is the detail description of the present invention and the reasons of specified conditions thereof.

Examples of the zinc base plating steel sheet as the base of the organic coating steel sheet according to the present invention are, galvanized steel sheet, Zn—Ni alloy plating steel sheet, Zn—Fe alloy plating steel sheet (electroplating steel sheet and alloyed hot dip galvanized steel sheet), Zn—Cr alloy plating steel sheet, Zn—Mn alloy plating steel sheet, Zn—Co alloy plating steel sheet, Zn—Co—Cr alloy plating steel sheet, Zn—Cr—Ni alloy plating steel sheet, Zn—Cr—Fe alloy plating steel sheet, Zn—Al alloy plating steel sheet (for example, Zn—5%Al alloy plating steel sheet and Zn—55%Al alloy plating steel sheet), Zn—Mg alloy plating steel sheet, Zn—Al—Mg plating steel sheet, zinc base composite plating steel sheet (for example, Zn—SiO$_2$ dispersion plating steel sheet) which is prepared by dispersing a metallic oxide, a polymer, or the like in the plating film of these plating steel sheets.

Among the platings described above, the same kind or different kinds of them may be plated into two or more layers to form a multi-layered plating steel sheet.

The aluminum base plating steel sheet which is a base of the organic coating steel sheet of the present invention may be an aluminum plating steel sheet, an Al—Si alloy plating steel sheet, or the like.

The plating steel sheet may be prepared from a steel sheet by applying plating of Ni or the like thereon at a small coating weight in advance, followed by the above-described various kinds of platings.

The plating method may be either applicable one of electrolytic method (electrolysis in an aqueous solution or in a non-aqueous solvent) and vapor phase method.

To prevent occurrence of coating defects and nonuniformity during the step for forming the dual layer coating on the surface of the plating film, there may be applied at need, alkaline degreasing, solvent degreasing, surface-adjustment treatment (alkaline surface-adjustment treatment or acidic surface-adjustment treatment) and the like to the surface of plating film in advance. To prevent blackening (a kind of oxidization on the plating surface) of organic coating steel sheet under the use conditions, the surface of plating film may be subjected to, at need, surface-adjustment treatment using acidic or alkaline aqueous solution containing iron group metal ion(s) (Ni ion, Co ion, Fe ion) in advance. When an electrolytically galvanized steel sheet is used as the base steel sheet, the electroplating bath may contain 1 ppm or more of iron group metal ion(s) (Ni ion, Co ion, Fe ion), thus letting these metals in the plating film perform to prevent blackening. In that case, there is no specific limitation on the upper limit of iron group metal concentration in the plating film.

The following is the description of the composite oxide coating as the primary layer coating which is formed on the surface of zinc base plating steel sheet or aluminum base plating steel sheet.

Quite different from conventional alkali silicate treatment coating which is represented by the coating composition consisting of lithium oxide and silicon oxide, the composite oxide coating according to the present invention comprises (α) fine particles of oxide (preferably SiO$_2$ fine particles) and (β) phosphoric acid and/or phosphoric acid compound, and at need, further comprises (γ) at least one element selected from the group consisting of Li, Mn, Fe, Co, Ni, Zn, Al, La, and Ce.

Particularly preferable oxide fine particles as the above-described component (α) are those of silicon oxide (fine particles of SiO$_2$), and most preferable one among the silicon oxides is colloidal silica.

Among these silica oxides (SiO$_2$ fine particles), the ones having particle sizes of 14 nm or less, more preferably 8 nm or less are preferred from the viewpoint of corrosion resistance.

The silicon oxide may be used by dispersing dry silica fine particles in a coating composition solution. Examples of the dry silica are AEROSIL 200, AEROSIL 3000, AEROSIL 300CF, AEROSIL 380, (these are trade names) manufactured by Japan Aerosil Co., Ltd., and particularly the ones having particle sizes of 12 nm or less, more preferably 7 nm or less are preferred.

Other than above-described silicon oxides, the oxide fine particles may be colloidal liquid and fine particles of aluminum oxide, zirconium oxide, titanium oxide, cerium oxide, and antimony oxide.

The phosphoric acid and/or phosphoric acid compound as the above-described component (β) may be blended by adding orthophosphoric acid, pyrophosphoric acid, polyphosphoric acid, methaphosphoric acid, or metallic salt or compound of them to the coating composition. The target composition may include organic phosphoric acid and salt thereof (for example, phytic acid, phytiate, phosphonic acid, phosphonate, their metal salt). Among them, primary phosphonic acid is preferable from the point of stability of the coating composition. When primary ammonium phosphate, secondary ammonium phosphate, or ternary ammonium phosphate was added as the phosphate to the coating composition solution, the corrosion resistance was improved. Although the reason is not fully analyzed, the presumable reason is that, when those kinds of ammonium salts are used, the liquid does not gel even at high pH region of the coating composition solution. Since generally metallic salts become insoluble in alkaline region, when the metallic salts are formed from a composition solution of high pH, compounds of further difficult to dissolve are generated during the drying step.

There is no specific limitation on the form of existing phosphoric acid and phosphoric acid compound in the coating, and they may be crystals or non-crystals. Also there is no specific limitation on the ionicity and solubility of phosphoric acid and phosphoric acid compound in the coating.

The form of the above-described component (γ) existing in the coating is not specifically limited, and it may be metal, or compound or composite compound such as oxide, hydroxide, hydrated oxide, phosphoric acid compound, or composite compound or metal. The ionicity and solubility of these compound, hydroxide, hydrated oxide, phosphoric acid compound, coordination compound, or the like are not specifically limited.

There is no specific limitation on introducing the component (γ) into the coating, and the component (γ) may be added to the coating composition in a form of phosphate, sulfate, nitrate, and chloride of Li, Mn, Fe, Co, Ni, Zn, Al, La, and Ce. A preferable range of coating weight of the composite oxide is, when the oxide fine particles ($\alpha$) and the above-described composition ($\beta$) as $P_2O_5$, and further the component ($\gamma$) exist, from 5 to 4,000 mg/m$^2$ as the sum of ($\alpha$), ($\beta$), and ($\gamma$) as metal, more preferably from 50 to 1,000 mg/m$^2$, further preferably from 100 to 500 mg/m2, and most preferably from 200 to 400 mg/m$^2$. If the coating weight is less than 5 mg/m$^2$, the corrosion resistance degrades. If the coating weight exceeds 4,000 mg/m$^2$, the conductive performance degrades and the weldability degrades. To attain particularly superior corrosion resistance, it is preferred to select the ratio of silicon oxide as the component ($\alpha$), converted to $SiO_2$, to the total composite oxide coating to a range of from 5 to 95 wt. %, more preferably from 10 to 60 wt. %.

The reason of giving particularly superior corrosion resistance when the ratio of the silicon oxide is selected to the range given above is not fully analyzed. It is, however, speculated that the phosphoric acid component supports the barrier effect which cannot be attained solely by silicon oxide, thus contributing to forming a dense film, further that the synergy effect of corrosion-suppression actions of each of phosphoric acid component and silicon oxide component, resulting in obtaining the excellent corrosion resistance.

From the similar viewpoint, it is preferred to select the ratio of the phosphoric acid and/or phosphoric acid compound as the component ($\beta$) to the metallic component as the component ($\gamma$) (if there are two or more metals, the sum of each of them converted to respective metals) in the composite oxide coating to a range of from 1/2 to 2/1 as the molar ratio of the component ($\beta$) as $P_2O_5$ to the component ($\gamma$) as metal, or $[P_2O_5/Me]$ for attaining further excellent corrosion resistance.

The reason of giving particularly superior corrosion resistance when the ratio of phosphoric acid component to metallic component is selected to the range given above is not fully analyzed. It is, however, speculated that, since the solubility of phosphoric component varies with the ratio of phosphoric acid to metal, the corrosion resistance becomes particularly high when the coating non-soluble property stays within the range given above, so that the barrier performance of the coating increases.

For further improving the workability and the corrosion resistance of the coating, the composite oxide coating may further contain organic resins. Examples of the organic resin are epoxy resin, polyurethane resin, polyacrylic resin, acrylic-ethylene copolymer resin, acrylic-styrene copolymer resin, alkyd resin, polyester resin, polyethylene resin. These resins may be introduced into the coating in a form of water-soluble resin or water-dispersible resin.

Adding to these water-dispersible resins, it is effective to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

For further improving the corrosion resistance, the composite oxide coating may further contain polyphosphate, phosphate (for example, zinc phosphate, aluminum dihydrogen phosphate, and zinc phosphate), molybdate, phospho molybdate (for example, aluminum phosphomolybdate), organic phosphate and its salt (for example, phytic acid, phytiate, phosphonic acid, phosphonate, their metal salt and alkali metal salt), organic inhibitor (for example, hydrazine derivative, thiol compound, dithiocarbamate), organic compound (polyethyleneglycol), and the like.

Other applicable additives include organic coloring pigments (for example, condensing polycyclic organic pigments, phthalocyanine base organic pigments), coloring dyes (for example, azo dye soluble in organic solvent, azo metal dye soluble in water), inorganic pigments (titanium oxide), chelating agents (for example, thiol), conductive pigments (for example, metallic powder of zinc, aluminum, nickel, or the like, iron phosphide, antimony-dope type tin oxide), coupling agents (for example, silane coupling agent and titanium coupling agent), melamine-cyanuric acid additives.

The following is the description about the organic coating formed as the secondary layer coating on the above-described oxide coating.

As the base resin of the organic coating, organic polymer resins (A) having OH group and/or COOH group are used. As of these resins, thermosetting resins are preferred, and epoxy resins or modified epoxy resins are particularly preferred.

Examples of the organic polymer resin containing OH group and/or COOH group are epoxy resin, polyhydroxy-polyether resin, acrylic copolymer resin, ethylene-acrylic acid copolymer resin, alkyd resin, polybutadiene resin, phenol resin, polyurethane resin, polyamine resin, polyphenylene resin, and mixture or addition polymerization product of two or more of these resins.

(1) Epoxy Resin

Examples of epoxy resin are: epoxy resins which are prepared by glycidyl-etherifying bisphenol A, bisphenol F, novorak and the like; epoxy resins which are prepared by adding propyleneoxide, ethyleneoxide, or polyalkyleneglycol to bisphenol A, followed by glycidyl-etherifying; aliphatic epoxy resins, alicyclic epoxy resins, and polyether base epoxy resins.

As for these epoxy resins, particularly when they are necessary to be cured in low temperatures, preferably the number-average molecular weight of them is 1,500 or more. These epoxy resins may be used separately or mixing two or more of them.

The modified epoxy resins include the ones in which various types of modifiers are reacted with epoxy group or hydroxyl group in the above-given epoxy resins. Examples of these modified epoxy resins are an epoxy-ester resin prepared by reacting carboxylic group in the drying oil fatty acid, an epoxy-acrylate resin prepared by modifying thereof using acrylic acid, methacrylic acid, or the like; a urethane-modified epoxy resin prepared by reacting with an isocyanate compound; and an amine-added-urethane-modified epoxy resin prepared by reacting an epoxy resin with an isocyanate compound to form a urethane-modified epoxy resin, followed by adding an alkanol amine to the urethane-modified epoxy resin.

The above-described hydroxypolyether resins are polymers prepared by polycondensation of a divalent phenol of a mononuclear or dinuclear divalent phenol or a mixture of mononuclear and dinuclear divalent phenols with a nearly equal moles of epihalohydrin under the presence of an alkali catalyst. Typical examples of the mononuclear divalent phenol are resorcin, hydroquinone, and catechol. Typical example of the dinuclear divalent phenol is bisphenol A. These divalent phenols may be used separately or two or more of them simultaneously.

(2) Polyurethane Resin

Examples of polyurethane resin are oil-modified polyurethane resin, alkyd base polyurethane resin, polyester base polyurethane resin, polyether base polyurethane resin, and polycarbonate base polyurethane resin.

(3) Alkyd Resin

Examples of alkyd resin are oil-modified alkyd resin, resin-modified alkyd resin, phenol-modified alkyd resin, styrenated alkyd resin, silicon-modified alkyd resin, acrylic-modified alkyd resin, oil-free alkyd resin, and high molecular weight oil-free alkyd resin.

(4) Polyacrylic Resin

Examples of polyacrylic resin are polyacrylic acid and its copolymer, polyacrylic ester and its copolymer, polymethacrylic acid ester and its copolymer, polymethacrylic acid ester and its copolymer, urethane-acrylic acid copolymer (or urethane-modified polyacrylic resin), styrene-acrylic acid copolymer. Further these resins may be modified by other alkyd resin, epoxy resin, phenol resin, and the like.

(5) Polyethylene Resin (Polyolefin Resin)

Examples of polyethylene resin are: ethylene base copolymers such as ethylene-acrylic acid copolymer, ethylene-methacrylic acid copolymer, carboxylic-modified polyolefin resin; ethylene-unsaturated carboxylic acid copolymers, and ethylene base ionomers. Further these resins may be modified by other alkyd resin, epoxy resin, and phenol resin.

(6) Acrylic Silicon Resin

Examples of acrylic silicon resin are the one which contains an acrylic base copolymer as a main component having hydrolyzable alcoxysilyl group at side chain or terminal of the acrylic base copolymer, further contains a curing agent. When that kind of acrylic silicon resin is used, superior weather-resistance is obtained.

(7) Fluororesin

Example of fluororesin is a fluoro-olefin base copolymer including a copolymer of a fluorine monomer (fluoro-olefin) with a monomer such as alkylvinylether, Syncro-alkylvinylether, carboxylic acid modified vinylester, hydroxy-alkylallylether, tetrafluoropropylvinylether. When that kind of fluororesin is used, superior weather-resistance and hydrophobic property.

Aiming at reduction of resin drying temperature, there may be applied a resin having difference in resin kinds between the core and the shell of the resin particle, or a core-shell type water-dispersible resin comprising resins having different glass transition temperatures to each other.

By using a water-dispersible resin having self-cross-linking property, and by adding, for example, alkoxysilane group to the resin particles to generate silanol group by hydrolysis of alkoxysilane during the heating and drying process of the resin, and to utilize cross-linking between particles using the dehydration condensation reaction of the silanol group between the resin particles.

As a resin to use for the organic coating, an organic composite silicate which is prepared by compositing an organic resin with a silane coupling agent is preferable.

According to the present invention, aiming at the improvement of corrosion resistance and workability of the organic coating, particularly the thermosetting resins are preferred. In this case, there may be added curing agent such as amino resins including urea resin (butylated urea resin, and the like), melamine resin (butylated melamine resin), butylated urea-melamine resin, and benzoguanamine resin, block isocyanate, oxazoline compound, and phenol resin.

Among these organic resins, epoxy resin and polyethylene base resin are preferable from the viewpoint of corrosion resistance, workability, and paintability, and, particularly preferred ones are thermosetting epoxy resin and modified epoxy resin which have excellent shut-off performance against corrosive causes such as oxygen. Examples of these thermosetting resins are thermosetting epoxy resin, thermosetting modified epoxy resin, acrylic base copolymer resin copolymerized with an epoxy-group-laden monomer, epoxy-group-laden polybutadiene resin, epoxy-group-laden polyurethane resin, and their adducts or condensates. These epoxy-group-laden resins may be used separately or mixing two or more of them.

According to the present invention, the organic coating further includes an inorganic rust-preventive pigment (a).

Examples of the inorganic rust-preventive pigment are: silica compound such as ion-exchanged silica and fine particle silica; celium oxide; aluminum oxide; zirconium oxide; antimonium oxide; polyphosphoric acid (for example, aluminum polyphosphate, TAICA K-WHITE 80, 84, 105, G105, 90, 90, (produced by TAYCA CORPORATION); molybdenate; phospho-molybdenate (such as aluminum-phosphomolybdenate). Particularly improved corrosion resistance is obtained when the system includes at least one of silica compound such as ion-exchanged silica (c), fine particle silica (d), phosphate such as zinc phosphate (e) and aluminum phosphate (f), and calcium compound.

The adding amount of inorganic rust-preventive pigment is in a range of from 1 to 100 parts by weight (solid matter) as the total inorganic rust-preventive pigment to 100 parts by weight of the reaction product as the resin composition for forming coating (the product of reaction between the film-forming organic resin (A) and the active-hydrogen-laden compound (B) a part or whole of which compound (B) consists of a hydrazine derivative (C) containing active hydrogen), preferably from 5 to 80 parts by weight (solid matter).

The ion-exchanged silica is prepared by fixing metallic ion such as calcium and magnesium ions on the surface of porous silica gel powder. Under a corrosive environment, the metallic ion is released to form a deposit film. Among these ion-exchanged silicas, Ca ion-exchanged silica is most preferable.

The corrosion-preventive mechanism obtained by blending ion-exchanged silica (a) in the organic coating is presumably the following. That is, when cation such as Na ion enters under the corrosion environment, the iron exchange action emits Ca ion and Mg ion from the surface of silica. Furthermore, when OH ion is generated by the cathode reaction under the corrosive environment to increase pH value near the plating interface, the Ca ion (or Mg ion) emitted from the ion-exchanged silica precipitates in the vicinity of the plating interface in a form of $Ca(OH)_2$ or $Mg(OH)_2$, respectively. The precipitate seals defects as a dense and slightly soluble product to suppress the corrosion reactions. Furthermore, the eluted Zn ion exchanges Ca ion (or Mg ion) to be fixed onto the surface of silica.

Any type of Ca-exchanged silica may be used, and a preferred one has an average particle size not more than 6 $\mu$m, more preferably not more than 4 $\mu$m. For example, Ca-exchanged silica having average particle sizes of from 2 to 4 $\mu$m may be used. If the average particle size of the Ca-exchanged silica exceeds 6 $\mu$m, the corrosion resistance degrades, and the dispersion stability in a paint composition degrades.

A preferred range of the Ca concentration in the Ca-exchanged silica is 1 wt. % or more, more preferably from 2 to 8 wt. %. Ca content of less than 1 wt. % fails to obtain satisfactory rust-preventive effect under the Ca emission.

There is no specific limitation on the surface area, pH, and oil absorbing capacity of Ca-exchanged silica.

The corrosion-preventive mechanism in the case that ion-exchanged silica (c) is added to the organic coating is described before. In particular, according to the present invention, when an ion-exchanged silica is blended with an organic coating consisting of a specific chelate-modified resin, the corrosion-preventive effect at anode reaction section owing to the chelate-modified resin and the corrosion-preventive effect at cathode reaction section owing to the ion-exchanged silica are combined to suppress both the anode and the cathode corrosion reactions, which should provide markedly strong corrosion-preventive effect.

The adding amount of ion-exchanged silica (c) in the organic resin coating is in a range of from 1 to 100 parts by weight (solid matter) to 100 parts by weight of the reaction product as the resin composition for forming coating (the product of reaction between the film-forming organic resin (A) and the active-hydrogen-laden compound (B) a part or whole of which compound (B) consists of a hydrazine derivative (C) containing active hydrogen), preferably from 5 to 80 parts by weight (solid matter), more preferably from 10 to 50 parts by weight (solid matter). When the amount of ion-exchanged silica (c) is less than 1 part by weight, the effect to improve the corrosion resistance after alkaline degreasing becomes small. If the amount of ion-exchanged silica (c) exceeds 100 parts by weight, the corrosion resistance degrades, which is unfavorable.

The fine particle silica (d) may be either colloidal silica or fumed silica.

Particularly an organic solvent dispersible silica sol has superior dispersibility, and shows superior corrosion resistance to fumed silica.

Fine particle silica is supposed to contribute to forming dense and stable zinc corrosion products under a corrosive environment. Thus formed corrosion products cover the plating surface in a dense mode, thus presumably suppressing the development of corrosion.

From the viewpoint of corrosion resistance, the fine particle silica preferably has particle sizes of from 5 to 50 nm, more preferably from 5 to 20 nm, and most preferably from 5 to 15 nm.

The adding amount of fine particle silica (d) in the organic resin coating is in a range of from 1 to 100 parts by weight (solid matter) to 100 parts by weight of the reaction product as the resin composition for forming coating (the product of reaction between the film-forming organic resin (A) and the active-hydrogen-laden compound (B) a part or whole of which compound (B) consists of a hydrazine derivative (C) containing active hydrogen), preferably from 5 to 80 parts by weight (solid matter), more preferably from 10 to 30 parts by weight (solid matter). When the amount of fine particle silica (d) is less than 1 part by weight, the effect to improve the corrosion resistance after alkaline degreasing becomes small. If the amount of fine particle silica (d) exceeds 100 parts by weight, the corrosion resistance degrades, which is unfavorable.

According to the present invention, combined addition of ion-exchanged silica (c) and fine particle silica (d) to the organic coating provides particularly excellent corrosion resistance. That is, the combined addition of ion-exchanged silica (c) and fine particle silica (d) induces combined rust-preventive mechanism of both components as described before to give particularly excellent corrosion-preventive effect.

A preferred range of ratio of combined blend of ion-exchanged silica (c) and fine particle silica (d) in the organic resin coating is 1 to 100 parts by weight (solid matter) of the sum of the ion-exchanged silica (c) and the fine particle silica (d) to 100 parts by weight (solid matter) of the base resin, more preferably from 5 to 80 parts by weight (solid matter), and a preferred range of blending ratio of the ion-exchanged silica (c) to the fine particle silica (d), (solid matter), or (c)/(d), is from 99/1 to 1/99, more preferably from 95/5 to 40/60, and most preferably from 90/10 to 16/40.

If the blending ratio of the sum of the ion-exchanged silica (c) and the fine particle silica (d) becomes less than 1 part by weight, the effect of improved corrosion resistance after alkaline degreasing becomes small. If the blending ratio of the sum of the ion-exchanged silica (c) and the fine particle silica (d) exceeds 100 parts by weight, the paintability and the workability degrade, which is unfavorable.

If the weight ratio of the ion-exchanged silica (c) to the fine particle silica (d), (c)/(d), is less than 1/99, the corrosion resistance degrades. If the weight ratio of the ion-exchanged silica (c) to the fine particle silica (d), (c)/(d), exceeds 99/1, the effect of combined addition of the ion-exchanged silica (c) and the fine particle silica (d) cannot fully be attained.

There is no specific limitation on the skeleton and degree of condensation of phosphoric acid ions for the zinc phosphate (e) and the aluminum phosphate (f) blended in the organic coating. They may be normal salt, dihydrogen salt, monohydrogen salt, or phosphate. The normal salt includes orthophosphoric acid and all the condensed phosphates such as polyphosphate. For example, zinc phosphate may be LF-BOSEI ZP-DL produced by Kikuchi Color Co., and aluminum phosphate may be K-WHITE produced by TAYCA CORPORATION.

These zinc phosphates and aluminum phosphates dissociate to phosphoric acid ion by hydrolysis under a corrosive environment, and form a protective coating through the complex-forming reaction with the eluted metals.

A preferred range of blending amount of zinc phosphate and/or aluminum phosphate (e, f) in the organic resin coating is from 1 to 100 parts by weight to 100 parts by weight (solid matter) of the film-forming organic resin (A), more preferably from 5 to 80 parts by weight (solid matter), and most preferably from 10 to 50 parts by weight. If the blending amount of the zinc phosphate and/or aluminum phosphate (e, f) is less than 1 part by weight, the improved effect of corrosion resistance after alkaline degreasing becomes small. If the blending amount of the zinc phosphate and/or aluminum phosphate (e, f) exceeds 100 parts by weight, the corrosion resistance degrades, which is unfavorable.

According to the present invention, combined addition of zinc phosphate and/or aluminum phosphate (e, f) and calcium compound (g) to the organic coating provides particularly excellent corrosion resistance. That is, the combined addition of zinc phosphate and/or aluminum phosphate (e, f) and calcium compound (g) to the organic coating provides particularly excellent corrosion resistance which induces combined rust-preventive mechanism of both components as described before to give particularly excellent corrosion-preventive effect.

Calcium compound (g) may be either one of calcium oxide, calcium hydroxide, and calcium salt, and at least one of them is adopted. There is no specific limitation on the kind of calcium salt, and the salt may be a single salt containing only calcium as cation, for example, calcium silicate, calcium carbonate, and calcium phosphate, and may be complex salt containing cation other than calcium cation, for example, zinc calcium phosphate, magnesium calcium phosphate.

Since calcium compounds elute preferentially to metals under a corrosive environment, it presumably induces a complex-forming reaction with phosphoric acid ion without triggering the elution of plating metal, thus forming a dense and slightly-soluble protective coating to suppress the corrosion reactions.

A preferred blending ratio of combined addition of zinc phosphate and/or aluminum phosphate (e, f) and calcium compound (g) to the organic resin coating is from 1 to 100 parts by weight (solid matter) to 100 parts by weight (solid matter) of the film-forming organic resin (A), more preferably from 5 to 80 parts by weight (solid matter), and a preferred blending weight ratio (solid matter) of the zinc phosphate and/or aluminum phosphate (e, f) and the calcium compound (g), (e, f)/(g), is from 99/1 to 1/99, more preferably from 95/5 to 40/60, and most preferably from 90/10 to 60/40.

If the blending amount of the sum of zinc phosphate and/or aluminum phosphate (e, f) and calcium compound (g) is less than 1 part by weight, the improved effect of corrosion resistance after alkaline degreasing becomes small. If the blending amount of the sum of zinc phosphate and/or aluminum phosphate (e, f) and calcium compound (g) exceeds 100 parts by weight, the corrosion resistance degrades, which is unfavorable. If the blending ratio (solid matter) of zinc phosphate and/or aluminum phosphate (e, f) to calcium compound (g), or (e, f)/(g), is less than 1/99, the corrosion resistance is inferior. If the blending ratio (solid matter) of zinc phosphate and/or aluminum phosphate (e, f) to calcium compound (g), or (g, f)/(g), exceeds 99/1, the effect of combined addition of zinc phosphate and/or aluminum phosphate (e, f) and calcium compound (g) cannot be fully attained.

The organic coating may further contain, adding to the above-described inorganic rust-preventive pigments, corrosion-suppression agents such as organic inhibitors including organic phosphate and its salt (for example, phytic acid, phytiate, phosphonic acid, phosphonate, their metal salt, alkali metal salt, and alkali earth metal salt), hydrazine derivative, thiol compound, dithiocarbamate.

The organic coating may, at need, further include a solid lubricant (b) to improve the workability of the coating.

Examples of applicable solid lubricant according to the present invention are the following.
(1) Polyolefin wax, paraffin wax: for example, polyethylene wax, synthetic paraffin, natural paraffin, microwax, chlorinated hydrocarbon;
(2) Fluororesin fine particles: for example, polyfluoroethylene resin (such as poly-tetrafluoroethylene resin), polyvinylfluoride resin, polyvinylidenefluoride resin.

In addition, there may be applied fatty acid amide base compound (such as stearic acid amide, palmitic acid amide, methylene bis-stearoamide, ethylene bis-stearoamide, oleic acid amide, ethyl acid amide, alkylene bis-fatty acid amide), metallic soap (such as calcium stearate, lead stearate, calcium laurate, calcium palmate), metallic sulfide (molybdenum disulfide, tungsten disulfide), graphite, graphite fluoride, boron nitride, polyalkyleneglycol, and alkali metal sulfate.

Among those solid lubricants, particularly preferred ones are polyethylene wax, fluororesin fine particles (particularly poly-tetrafluoroethylene resin fine particles).

Applicable polyethylene wax include: Sheridust 9615A, Sheridust 3715, Sheridust 3620, Sheridust 3910 (trade names) manufactured by Hoechst Co., Ltd.; SUNWAX 131-P, SUNWAX 161-P (trade names) manufactured by Sanyo Chemical Industries, Ltd.; CHEMIPEARL W-100, CHEMIPEARL W-200, CHEMIPEARL W-500, CHEMIPEARL W-800, CHEMIPEARL W-950 (trade names) manufactured by Mitsui Petrochemical Industries, Ltd.

A most preferred fluororesin fine particle is tetrafluoroethylene fine particle. Examples of the fine particles are LUBRON L-2, LUBRON L-5 (trade names) manufactured by Daikin Industries, Ltd.; MP 1100, MP 1200 (trade names; manufactured by Du Pont-Mitsui Company, Ltd.); FLUON DISPERSION AD1, FLUON DISPERSION AD2, FLUON L141J, FLUON L150J, FLUON L155J (trade names) manufactured by Asahi ICI Fluoropolymers Co., Ltd.

As of these compounds, combined use of polyolefin wax and tetrafluoroethylene fine particles is expected to provide particularly excellent lubrication effect.

A preferred range of blending ratio of the solid lubricant (b) in the organic resin coating is from 1 to 80 parts by weight (solid matter) to 100 parts by weight (solid matter) of the reaction product as the resin composition for film-forming (that is, the product of reaction between the film-forming organic resin (A) and the active-hydrogen-laden compound (B) a part of or whole of which consists of a hydrazine derivative (C) containing active hydrogen), more preferably from 3 to 40 parts by weight (solid matter). If the blending ratio of the solid lubricant (b) becomes less than 1 part by weight, the effect of lubrication is small. If the blending ratio of the solid lubricant (b) exceeds 80 parts by weight, the painting performance degrade, which is unfavorable.

The organic coating of the organic coating steel sheet according to the present invention normally consists mainly of a product (resin composition) of reaction between a film-forming organic resin (A) and an active-hydrogen-laden compound (B) a part of or whole of which consists of a hydrazine derivative (C) containing active hydrogen. And, at need, an inorganic rust-preventive pigment (a), a solid lubricant (b), a curing agent, or the like may further be added to the organic coating. Furthermore, at need, there may be added other additives such as organic coloring pigment (for example, condensing polycyclic organic pigment, phthalocyanine base organic pigment), coloring dye (for example, azo dye soluble in organic solvent, azo metal dye soluble in water), inorganic pigment (for example, titanium oxide), chelating agent (for example, thiol), conductive pigment (for example, metallic powder of zinc, aluminum, nickel, or the like, iron phosphide, antimony-dope type tin oxide), coupling agent (for example, silane coupling agent and titanium coupling agent), melamine-cyanuric acid additive.

The paint composition for film-formation containing above-described main component and additive components normally contains solvent (organic solvent and/or water), and, at need, further a neutralizer or the like is added.

The organic coatings described above are formed on the above-described composite oxide coating.

The dry thickness of the organic coating is in a range of from 0.1 to 5 $\mu$m, preferably from 0.3 to 3 $\mu$m, and most preferably from 0.5 to 2 $\mu$m. If the thickness of the organic coating is less than 0.1 $\mu$m, the corrosion resistance becomes insufficient. If the thickness of the organic coating exceeds 5 $\mu$m, the conductivity and the workability degrade.

The following is the description about the method for manufacturing an organic coating steel sheet according to the present invention.

The organic coating steel sheet according to the present invention is manufactured by the steps of: treating the surface (applying a treatment liquid to the surface) of a zinc base plating steel sheet or an aluminum base plating steel sheet using a treatment liquid containing the components of above-described composite oxide coating; heating and drying the plate; applying a paint composition which contains the above-described organic polymer resin (A) as the base resin, and at need, further contains an inorganic rust-preventive pigment (a), a solid lubricant (b) and the like; heating to dry the product.

The surface of the plating steel sheet may be, at need, subjected to alkaline degreasing before applying the above-described treatment liquid, and may further be subjected to preliminary treatment such as surface adjustment treatment for further improving the adhesiveness and corrosion resistance.

For treating the surface of the zinc base plating steel sheet or the aluminum base plating steel sheet with a treatment liquid and for forming a composite oxide coating thereon, it is preferred that the plate is treated by an aqueous solution containing:

(aa) oxide fine particles ranging from 0.001 to 3.0 mole/liter; and (ab) phosphoric acid and/or phosphoric acid compound ranging from 0.001 to 6.0 mole/liter as $P_2O_5$; followed by heating to dry.

The aqueous solution may further contain:

(ac) one or more of the substances selected from the group consisting of either one metallic ion of Li, Mn, Fe, Co, Ni, Zn, Al, La, and Ce; a compound containing at least one metal given above; a composite compound containing at least one metal given above; ranging from 0.001 to 3.0 mole/liter as metal given above.

As the oxide fine particles as an additive component (aa), silicon oxide ($SiO_2$) fine particles are most preferred. The silicon oxide may be commercially available silica sol and water-dispersion type silicic acid oligomer or the like if only the silicon oxide is water-dispersion type $SiO_2$ fine particles which are stable in an acidic aqueous solution. Since, however, fluoride such as hexafluoro silicic acid is strongly corrosive and gives strong effect to human body, that kind of compound should be avoided from the point of influence to work environment.

A preferred range of blending ratio of the fine particle oxide (the blending ratio as $SiO_2$ in the case of silicon oxide) in the treating liquid is from 0.001 to 3.0 mole/liter, more preferably from 0.05 to 1.0 mole/liter, and most preferably from 0.1 to 0.5 mole/liter. If the blending ratio of the fine particle oxide becomes less than 0.001 mole/liter, the effect of addition is not satisfactory. If the blending ratio of the fine particle oxide exceeds 3.0 mole/liter, the water-resistance of coating degrades, resulting in degradation of corrosion resistance.

The phosphoric acid and/or phosphoric acid compound as the additive component (ab) includes: a mode of aqueous solution in which a compound specific to phosphoric acid, such as polyphosphoric acid such as orthophosphoric acid, pyrophosphoric acid, and tripolyphosphoric acid, methaphosphoric acid, inorganic salt of these acids (for example, primary aluminum phosphate), phosphorous acid, phosphate, phosphinic acid, phosphinate, exists in a form of anion or complex ion combined with a metallic cation which are generated by dissolving the compound in the aqueous solution; and a mode of aqueous solution in which that kind of compound exists in a form of inorganic salt dispersed therein. The amount of phosphoric acid component according to the present invention is specified by the sum of all these modes of acidic aqueous solution thereof as converted to $P_2O_5$ mount.

A preferred range of blending ratio of the phosphoric acid and/or phosphoric acid compound as $P_2O_5$ is from 0.001 to 6.0 mole/liter, more preferably from 0.02 to 1.0 mole/liter, and most preferably from 0.1 to 0.8 mole/liter. If the blending ratio of the phosphoric acid and/or phosphoric acid compound becomes less than 0.001 mole/liter, the effect of addition is not satisfactory and the corrosion resistance degrades. If the blending ratio of the phosphoric acid and/or phosphoric acid compound exceeds 6.0 mole/liter, excess amount of phosphoric acid ion reacts with the plating film under a humid environment, which enhances the corrosion of plating base material to cause discoloration and stain-rusting under some corrosive environments.

As the component (ab), use of ammonium phosphate is also effective because the compound provides a highly anti-corrosive composite oxide. As for the ammonium phosphate, primary ammonium phosphate and secondary ammonium phosphate are preferred.

The added components (ac) in the treatment liquid is in a range of from 0.001 to 3.0 mole/liter as metal, preferably from 0.01 to 0.5 mole/liter. If the sum of the added amount of these components is less than 0.001 mole/liter, the effect of addition cannot be fully attained. If the sum of the added amount of these components exceeds 3.0 mole/liter, these components become soluble cations to interfere the network of coating.

For supplying ion of the additive components (ac) in a form of metallic salt, the treatment liquid may contain anion such as chlorine ion, nitric acid ion, sulfuric acid ion, acetic acid ion, and boric acid ion.

The treatment liquid may further contain an organic resin (ad) for improving workability and corrosion resistance of the composite oxide coating. Examples of the organic resin are water-soluble resins and/or water-dispersible resins such as epoxy resin, polyurethane resin, polyacrylic resin, acrylic-ethylene copolymer, acrylic-styrene copolymer, alkyd resin, polyester resin, polyethylene resin.

Adding to these water-dispersible resins, it is also possible to use water-soluble epoxy resin, water-soluble phenol resin, water-soluble polybutadiene rubber (SBR, NBR, MBR), melamine resin, block-polyisocyanate compound, oxazolane compound, and the like as the cross-linking agent.

Adding to the above-described additive components (aa) through (ad), the treatment liquid may further contain an adequate amount of additive components to the coating, which are described before.

The methods for applying the treatment liquid onto the plating steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

Although there is no specific limitation on the temperature of the treatment liquid, a preferable range thereof is from normal temperature to around 60° C. Below the normal temperature is uneconomical because a cooling unit or other additional facilities are required. On the other hand, temperatures above 60° C. enhances the vaporization of water, which makes the control of the treatment liquid difficult.

After the coating of treatment liquid as described above, generally the plate is heated to dry without rinsing with water. The treatment liquid according to the present invention forms a slightly soluble salt by a reaction with the substrate plating steel sheet, so that rinsing with water may be applied after the treatment.

Method for heating to dry the coated treatment liquid is not limited. For example, dryer, hot air oven, high frequency induction heating furnace, infrared heating furnace may be applied.

The heating and drying treatment is preferably conducted at reaching temperatures of from 50 to 300° C., more preferably from 80 to 200° C., and most preferably from 80 to 160° C. If the heating temperature is less than 50° C., excess amount of water is left in the coating, which results in insufficient corrosion resistance. If the heating temperature exceeds 300° C., the operation becomes uneconomical and defects likely appear in the coating to degrade the corrosion resistance.

After forming the composite oxide coating on the surface of the zinc base plating steel sheet or the aluminum base plating steel sheet, as described above, a paint composition for forming an organic coating is applied on the composite oxide coating. Method for applying the paint composition is not limited, and examples of the method are coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

After applying the paint composition, generally the plate is heated to dry without rinsing with water. After applying the paint composition, however, water-rinse step may be given.

Method for heating to dry the paint composition is not limited. For example, dryer, hot air oven, high frequency induction heating furnace, infrared heating furnace may be applied. The heating treatment is preferably conducted at reaching temperatures of from 50 to 350° C., more preferably from 80 to 250° C. If the heating temperature is less than 50° C., excess amount of water is left in the coating, which results in insufficient corrosion resistance. If the heating temperature exceeds 350° C., the operation becomes uneconomical and defects likely appear in the coating to degrade the corrosion resistance.

As described above, the present invention includes a steel sheet having an organic coating on both sides or on side thereof. Accordingly, modes of the steel sheet according to the present invention include, for example, the followings.

(1) "Plating film—Composite oxide coating—Organic coating" on one side of the steel sheet, and "Plating film" on other side of the steel sheet;

(2) "Plating film—Composite oxide coating—Organic coating" on one side of the steel sheet, and "Plating film—Known coating treated by phosphoric acid, or the like" on other side of the steel sheet;

(3) "Plating film—Composite oxide coating—Organic coating" on both sides of the steel sheet;

(4) "Plating film—Composite oxide coating—Organic coating" on one side of the steel sheet, and "Plating film—Composite oxide coating" on other side of the steel sheet;

(5) "Plating film—Composite oxide coating—Organic coating" on one side of the steel sheet, and "Plating film—Organic coating" on other side of the steel sheet.

Embodiments

Treatment liquids (coating compositions) for forming the primary layer coating, which are listed in Tables 192 and 194, and resin compositions for forming the secondary layer coating, which are listed in Table 195, were prepared.

To the resin compositions shown in Table 195, inorganic rust-preventive pigments shown in Tables 196 through 198, and solid lubricants shown in Table 199 were added at respective adequate amount, which additives were dispersed in the resin compositions for a necessary time using a paint dispersion apparatus (a sand grinder) to prepare respective desired paint compositions.

To obtain organic coating steel sheets for household electric appliances, building materials, and automobile parts, the plating steel sheets shown in Table 1 were used as the target base plates, which plates were prepared by applying zinc base plating or aluminum base plating on the cold-rolled steel sheets having a plate thickness of 0.8 mm and a surface roughness Ra of 1.0 $\mu$m. The surface of the plating steel sheet was treated by alkaline degreasing and water washing, then the treatment liquids (coating compositions) shown in Tables 192 through 194 were applied to the surface using a roll coater, followed by heating to dry to form the first layer coating. The thickness of the first layer coating was adjusted by the solid content in the treatment liquid (heating residue) or applying conditions (roll pressing force, rotational speed, and other variables). Then, the paint composition given in Table 195 was applied using a roll coater, which was then heated to dry to form the secondary layer coating, thus manufactured the organic coating steel sheets as Examples and Comparative Examples. The thickness of the second layer coating was adjusted by the solid content in the treatment liquid (heating residue) or applying conditions (roll pressing force, rotational speed, and other variables).

To each of thus obtained organic coating steel sheets, evaluation was given in terms of quality performance (appearance of coating, white-rust resistance, white-rust resistance after alkaline degreasing, paint adhesiveness, and workability). The results are given in Tables 200 through 205 along with the structure of primary layer coating and of secondary layer coating.

In the Tables 200 through 205, each of *1 through *11 appeared in the table expresses the following.

*1: Corresponding to No. given in Table 191.

*2: Corresponding to No. given in Tables 192 through 194.

*3: Weight ratio to the total weight of the primary layer (composite oxide).

*4: Ratio of the sum of moles of the component ($\gamma$) converted to metal concerned to moles of the phosphoric acid and/or phosphoric acid compound ($\beta$) converted to $P_2O_5$ weight.

*5: Total coating weight=($\alpha$)+($\beta$)+($\gamma$)

*6: Corresponding to No. given in Table 195.

*7: Corresponding to No. given in Tables 196 through 198.

*8: Blending ratio (weight parts) of solid portion to 100 parts by weight of solid portion of resin composition.

*9: Weight amount of solid portion of inorganic rust-preventive pigment 1 to inorganic rust-preventive pigment 2.

*10: Weight ratio of solid portion of inorganic rust-preventive pigment 1 to inorganic rust-preventive pigment 2.

*11: Corresponding to No. given in Table 199.

*12: Blending ratio (weight parts) of solid portion of solid lubricant to 100 parts by weight of solid portion of resin composition.

TABLE 191

| No. | Plating steel plate | Coating weight (g/m²) |
|---|---|---|
| 1 | Electrolytically galvanized steel plate | 20 |

TABLE 192

| | Oxide fine particles (α) | | | | Phosphoric acid/phosphoric acid compound (β) | | |
|---|---|---|---|---|---|---|---|
| No. | Type | Thickness | Particle size (nm) | Concentration *1 (mol/L) | Type | Concentration *2 (mol/L) | Molar ratio (β)/(γ) |
| 1 | Silicic acid | SNOWTEX-OS produced by Nissan Chemical Industries, Ltd. | 6 to 8 | 0.33 | orthophosphoric acid | 0.30 | 1.00 |
| 2 | Silicic acid | SNOWTEX-OS produced by Nissan Chemical Industries, Ltd. | 6 to 8 | 0.33 | orthophosphoric acid | 0.06 | 1.47 |
| 3 | Silic acid | SNOWTEX-OS produced by Nissan Chemical Industries, Ltd. | 6 to 8 | 0.40 | orthophosphoric acid | 0.13 | 1.30 |
| 4 | Silicic acid | SNOWTEX-OS produced by Nissan Chemical Industries, Ltd. | 6 to 8 | 0.30 | orthophosphoric acid | 0.22 | 1.21 |
| 5 | Silicic acid | SNOWTEX-OS produced by Nissan Chemical Industries, Ltd. | 6 to 8 | 0.33 | orthophosphoric acid | 0.15 | 1.21 |
| 6 | Silicic acid | SNOWTEX-OS produced by Nissan Chemical Industries, Ltd. | 6 to 8 | 0.33 | orthophosphoric acid | 0.22 | 1.10 |
| 7 | Silicic acid | SNOWTEX-OS produced by Nissan Chemical Industries, Ltd. | 6 to 8 | 0.33 | orthophosphoric acid | 0.15 | 1.50 |
| 8 | Silicic acid | SNOWTEX-OS produced by Nissan Chemical Industries, Ltd. | 6 to 8 | 0.33 | orthophosphoric acid | 0.09 | 1.80 |
| 9 | Silicic acid | SNOWTEX-OS produced by Nissan Chemical Industries, Ltd. | 6 to 8 | 0.33 | orthophosphoric acid | 0.09 | 1.80 |
| 10 | Silicic acid | AEROSIL 200 produced by Japan Aerosil Co., Ltd. | 12 | 0.50 | orthophosphoric acid | 0.15 | 1.47 |
| 11 | Silicic acid | AEROSIL 201 produced by Japan Aerosil Co., Ltd. | 12 | 0.50 | orthophosphoric acid | 0.10 | 1.20 |

| | Metal component (γ) | | | | Organic resin (δ) | | | Adaptability to the conditions of the invention *3 |
|---|---|---|---|---|---|---|---|---|
| | Component 1 | | Component 2 | | | | | |
| No. | Type | Concentration (mol/L) | Type | Concentration (mol/L) | Total moles | Type | Concentration (g/l) | Composition pH |
| 1 | Li | 0.30 | | | 0.30 | | | 4.3 | ○ |
| 2 | Mn | 0.04 | | | 0.04 | | | 2.6 | ○ |
| 3 | Fe | 0.10 | | | 0.10 | | | 0.8 | ○ |
| 4 | Co | 0.18 | | | 0.18 | | | 1.3 | ○ |
| 5 | Ni | 0.12 | | | 0.12 | | | 3 | ○ |
| 6 | Zn | 0.20 | | | 0.20 | | | 2.4 | ○ |
| 7 | Al | 0.10 | | | 0.10 | | | 2.1 | ○ |
| 8 | La | 0.05 | | | 0.05 | | | 1.5 | ○ |
| 9 | Ce | 0.05 | | | 0.05 | | | 2 | ○ |
| 10 | Mn | 0.10 | | | 0.10 | | | 2.6 | ○ |
| 11 | Ni | 0.08 | | | 0.08 | | | 3 | ○ |

*1 Converted to $SiO_2$
*2 Converted to $P_2O_5$
*3 ○ : Satisfies the conditions of the invention
x: Dissatisfies the conditions of the invention

TABLE 193

| | Oxide fine particles (α) | | | | Phosphoric acid/phosphoric acid compound (β) | | |
|---|---|---|---|---|---|---|---|
| No. | Type | Trade name | Particle size (nm) | Concentration *1 (mol/L) | Type | Con-Centration *2 (mol/L) | Molar ratio (β)/(γ) |
| 12 | Silicic acid | AEROSIL 200 produced by Japan Aerosil Co., Ltd. | 12 | 0.33 | orthophosphoric acid | 0.10 | 1.21 |
| 13 | Silicia acid | AEROSIL 200 produced by Japan Aerosil Co., Ltd. | 12 | 0.33 | orthophosphoric acid | 0.12 | 1.50 |
| 14 | Silicic acid | SNOWTEX-OUP produced by Nissan Chemical Industries, Ltd. | 12 to 14 | 0.20 | orthophosphoric acid | 0.12 | 1.20 |
| 15 | Silicic acid | SNOWTEX-OUP produced by Nissan Chemical Industries, Ltd. | 12 to 14 | 0.20 | orthophosphoric acid | 0.12 | 1.20 |
| 16 | Aluminum acid | Alumina sol 200 produced by Nissan Chemical Industries, Ltd. | | | orthophosphoric acid | 0.10 | 1.03 |
| 17 | Zirconium oxide | NZS-30A produced by Nissan Chemical Industries, Ltd. | 60 to 70 | | orthophosphoric acid | 0.15 | 1.47 |
| 18 | Silicic acid | SNOWTEX-N produced by Nissan Chemical Industries, Ltd. | 12 to 14 | 0.33 | Phosphoric acid ammonium | 0.15 | |
| 19 | Silicic acid | AEROSIL 200 produced by Jpana Aerosil Co., Ltd. | 12 | 0.33 | orthophosphoric acid | 0.12 | 1.20 |
| 20 | Silicic acid | AEROSIL 200 produced by Japan Aerosil Co., Ltd. | 12 | 0.33 | orthophosphoric acid | 0.12 | 1.05 |
| 21 | Silicic acid | AEROSIL 200 produced by Japan Aerosil Co., Ltd. | 6 to 8 | 0.33 | orthophosphoric acid | 0.25 | 2.50 |

| | Metal component (γ) | | | | Organic resin (δ) | | | |
|---|---|---|---|---|---|---|---|---|
| | Component 1 | | Component 2 | | | | | |
| No. | Type | Con-tration (mol/L) | Type | Con-tration (mol/L) | Total moles | Type | Con-tration (g/l) | Composition pH | Adaptability to the conditions of the invention *3 |
| 12 | Co | 0.08 | | | 0.08 | | | 2.8 | ○ |
| 13 | Al | 0.08 | | | 0.08 | | | 2.9 | ○ |
| 14 | Ni | 0.10 | | | 0.10 | | | 1.5 | ○ |
| 15 | Al | 0.10 | | | 0.10 | | | 2 | ○ |
| 16 | Mn | 0.10 | | | 0.10 | | | 3.1 | ○ |
| 17 | Mn | 0.10 | | | 0.10 | | | 2.6 | ○ |
| 18 | | | | | | | | 8 | ○ |
| 19 | Ni | 0.08 | Mn | 0.02 | 0.10 | | | 2.8 | ○ |
| 20 | Al | 0.08 | Mg | 0.03 | 0.11 | | | 2.9 | ○ |
| 21 | Ni | 0.10 | | | 0.10 | | | 2.1 | ○ |

*1 Converted to SiO$_2$
*2 Converted to P$_2$O$_5$
*3 ○: Satisfies the conditions of the invention
x: Dissatisfies the conditions of the invention
*Feather-shape particles (10 nm × 100 nm)

TABLE 194

| | Oxide fine particles (α) | | | | Phosphoric acid/phosphoric acid compound (β) | | |
|---|---|---|---|---|---|---|---|
| No. | Type | Trade name | Particle size (nm) | Concentration *1 (mol/L) | Type | Con-Centration *2 (mol/L) | Molar ratio (β)/(γ) |
| 22 | Silicic acid | SNOWTEX-OS produced by Nissan Chemical Industries, Ltd. | 6 to 8 | 0.90 | orthophosphoric acid | 0.01 | 1.03 |
| 23 | Silicic acid | SNOWTEX-OS produced by Nissan Chemical Industries, Ltd. | 6 to 8 | 0.005 | orthophosphoric acid | 0.240 | 1.200 |
| 24 | Silicic acid | SNOWTEX-OS produced by Nissan Chemical Industries, Ltd. | 6 to 8 | 0.16 | orthophosphoric acid | 0.08 | 1.33 |

TABLE 194-continued

| No. | | | | | | | |
|---|---|---|---|---|---|---|---|
| 25 | Silicic acid | SNOWTEX-N produced by Nissan Chemical Industries, Ltd. | 12 to 14 | 0.33 | diphosphoric acid | 0.20 | 1.00 |
| 26 | Silicic acid | SNOWTEX-N produced by Nissan Chemical Industries, Ltd. | 12 to 14 | 0.33 | orthophosphoric | 0.13 | |
| 27 | Silicic acid | SNOWTEX-OS produced by Nissan Chemical Industries, Ltd. | 6 to 8 | 1.00 | orthophosphoric acid | 0.72 | 1.20 |
| 28 | | | | | orthophosphoric acid | 0.22 | 1.10 |
| 29 | Silicic acid | SNOWTEX-OS produced by Nissan Chemical Industries, Ltd. | 6 to 8 | 0.3 | diphosphoric acid | 0.3 | |
| 30 | Silicic acid | SNOWTEX-OS produced by Nissan Chemical Industries, Ltd. | 6 to 8 | 0.50 | | | |

| | Metal component ($\gamma$) | | | | Organic resin ($\delta$) | | |
|---|---|---|---|---|---|---|---|
| | Component 1 | | Component 2 | | | | |
| No. | Type | Concentration (mol/L) | Type | Concentration (mol/L) | Total moles | Type | Concentration (g/l) | Composition pH | Adaptability to the conditions of the invention *3 |
| 22 | Ni | 0.005 | | | 0.01 | | | 3.5 | ○ |
| 23 | Ni | 0.20 | | | 0.20 | Acrylic-styrene resin | | 2 | ○ |
| 24 | Ni | 0.06 | | | 0.06 | | 90 | 3.5 | ○ |
| 25 | Li | 0.20 | | | 0.20 | | | 4 | ○ |
| 26 | | | | | | | | 2.9 | ○ |
| 27 | Ni | 0.60 | | | 0.60 | | | 2.1 | ○ |
| 28 | | 0.200 | | | 0.20 | | | 3.5 | × |
| 29 | | | | | | | | 2 | ○ |
| 30 | Ni | 0.20 | | | 0.20 | | | 2.2 | × |

*1 Converted to $SiO_2$
*2 Converted to $P_2O_5$
*3 ○ : Satisfies the conditions of the invention
×: Dissatisfies the conditions of the invention

TABLE 195

| No. | Group | Type (main component/curing agent) | Base resin |
|---|---|---|---|
| 1 | Thermosetting resin | Epoxy resin/urea resin | Epicoat E-1009 (*1)/BECKAMINE P196M (*2) = 85/15 |

*1 A butycelob solution of epoxy resin (30% solid), produced by Yuka Shell Epoxy Co., Ltd.
*2 Urea resin (20% solid) produced by Dainippon Ink & Chemicals, Inc.

TABLE 196

(Ion-exchanged silica, fine particle silica)

| No. | Type | Trade name |
|---|---|---|
| 1 | Ca-exchanged silica | SHIELDEX C303 (average particle size 2.5–3.5 μm, Ca Conc. 3 wt. %) produced by W. R. Graco & Co. |

TABLE 197

(Zinc phosphate, aluminum phosphate)

| No. | Type and composition |
|---|---|
| 13 | Orthophosphoric acid |

TABLE 198

(Calcium compound)

| No. | Type and composition |
|---|---|
| 28 | Calcium carbonate (60 wt. %) + calcium silicate (40 wt. %) |

TABLE 199

[Solid lubricant]

| No. | Type | Trade name |
|---|---|---|
| 1 | Polyethylene wax | LUVAX 1151 produced by Nippon Seira Co. |

TABLE 200

| | | Primary layer coating | | | | | |
|---|---|---|---|---|---|---|---|
| No. | Plating steel plate *1 | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 |
| 1 | 1 | 5 | 120 | 40 | Ni | 1.2 | 300 |

| | | Secondary layer coating | | | | | | | | |
|---|---|---|---|---|---|---|---|---|---|---|
| | | Inorganic rust-preventive pigment | | | | | | Solid lubricant | | |
| | | (Pigment 1) | | (Pigment 2) | | (Pigment 1) + (Pigment 2) | (Pigment 1)/ (Pigment 2) | | | |
| No. | Resin composition *6 | Type *7 | Blending ratio *8 | Type *7 | Blending ratio *8 | Total amount *9 | Ratio *10 | Type *11 | Blending ratio *12 | Drying temperature (° C.) | Coating thickness (μm) |
| 1 | 1 | 1 | 30 | | | | | | | 230 | 1 |

| | Performance | | | | | | |
|---|---|---|---|---|---|---|---|
| No. | Appearance | White-rust resistance: SST 96 hrs | White-rust resistance after alkaline degreasing: SST 96 hrs | Paint adhesiveness | Workability | Remark | Classification Example/ Comparative Example |
| 1 | ○ | ⊙ | ⊙ | ⊙ | | | Example |

TABLE 201

| | | Primary layer coating | | | | | |
|---|---|---|---|---|---|---|---|
| No. | Plating steel plate *1 | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 |
| 15 | 1 | 1 | 120 | 40 | Li | 1 | 320 |
| 16 | 1 | 2 | 120 | 40 | Mn | 1.47 | 290 |
| 17 | 1 | 3 | 120 | 40 | Fe | 1.3 | 320 |
| 18 | 1 | 4 | 120 | 40 | Co | 1.21 | 315 |
| 19 | 1 | 6 | 120 | 40 | Zn | 1.1 | 280 |
| 20 | 1 | 7 | 120 | 40 | Al | 1.5 | 350 |
| 21 | 1 | 8 | 120 | 40 | La | 1.8 | 350 |
| 22 | 1 | 9 | 120 | 40 | Ce | 1.8 | 350 |
| 23 | 1 | 10 | 120 | 60 | Mn | 1.47 | 360 |
| 24 | 1 | 11 | 120 | 60 | Ni | 1.2 | 290 |
| 25 | 1 | 12 | 120 | 40 | Co | 1.2 | 290 |
| 26 | 1 | 13 | 120 | 40 | Al | 1.5 | 280 |
| 27 | 1 | 14 | 120 | 20 | Ni | 1.2 | 320 |
| 28 | 1 | 15 | 120 | 20 | Al | 1.2 | 330 |

| | | Secondary layer coating | | | | | | | | | |
|---|---|---|---|---|---|---|---|---|---|---|---|
| | | Inorganic rust-preventive pigment | | | | | | Solid lubricant | | | |
| | | (Pigment 1) | | (Pigment 2) | | (Pigment 1) + (Pigment 2) | (Pigment 1)/ (Pigment 2) | | | | |
| No. | Resin composition *6 | Type *7 | Blending ratio *8 | Type *7 | Blending ratio *8 | Total amount *9 | Ratio *10 | Type *11 | Blending ratio *12 | Drying temperature (° C.) | Coating thickness (μm) |
| 15 | 1 | 1 | 30 | | | | | | | 230 | 1 |
| 16 | 1 | 1 | 30 | | | | | | | 230 | 1 |
| 17 | 1 | 1 | 30 | | | | | | | 230 | 1 |
| 18 | 1 | 1 | 30 | | | | | | | 230 | 1 |
| 19 | 1 | 1 | 30 | | | | | | | 230 | 1 |
| 20 | 1 | 1 | 30 | | | | | | | 230 | 1 |
| 21 | 1 | 1 | 30 | | | | | | | 230 | 1 |
| 22 | 1 | 1 | 30 | | | | | | | 230 | 1 |
| 23 | 1 | 1 | 30 | | | | | | | 230 | 1 |
| 24 | 1 | 1 | 30 | | | | | | | 230 | 1 |
| 25 | 1 | 1 | 30 | | | | | | | 230 | 1 |
| 26 | 1 | 1 | 30 | | | | | | | 230 | 1 |
| 27 | 1 | 1 | 30 | | | | | | | 230 | 1 |
| 28 | 1 | 1 | 30 | | | | | | | 230 | 1 |

TABLE 201-continued

| | | | Performance | | | | |
|---|---|---|---|---|---|---|---|
| No. | Appearance | White-rust resistance: SST 96 hrs | White-rust resistance after alkaline degreasing: SST 96 hrs | Paint adhesiveness | Workability | Remark | Classification Example/ Comparative Example |
| 15 | ○ | ○ | ○ | ◉ | | | Example |
| 16 | ○ | ◉ | ◉ | ◉ | | | Example |
| 17 | ○ | ◉ | ○ | ◉ | | | Example |
| 18 | ○ | ◉ | ○ + | ◉ | | | Example |
| 19 | ○ | ◉ | ○ | ◉ | | | Example |
| 20 | ○ | ◉ | ○ + | ◉ | | | Example |
| 21 | ○ | ◉ | ○ | ◉ | | | Example |
| 22 | ○ | ◉ | ○ | ◉ | | | Example |
| 23 | ○ | ◉ | ◉ | ◉ | | | Example |
| 24 | ○ | ◉ | ◉ | ◉ | | | Example |
| 25 | ○ | ◉ | ○ + | ◉ | | | Example |
| 26 | ○ | ◉ | ○ + | ◉ | | | Example |
| 27 | ○ | ◉ | ◉ | ◉ | | | Example |
| 28 | ○ | ◉ | ○ + | ◉ | | | Example |

TABLE 202

| | Primary layer coating | | | | | | |
|---|---|---|---|---|---|---|---|
| No. | Plating steel plate *1 | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 |
| 29 | 1 | 16 | 120 | | Mn | 1.03 | 290 |
| 30 | 1 | 17 | 120 | | Mn | 1.47 | 320 |
| 31 | 1 | 18 | 120 | 40 | | | 320 |
| 32 | 1 | 19 | 120 | 40 | Ni, Mn | 1.2 | 290 |
| 33 | 1 | 20 | 120 | 40 | Al, Mg | 1.05 | 300 |
| 34 | 1 | 21 | 120 | 40 | Ni | 2.5 | 320 |
| 35 | 1 | 22 | 120 | 98 | Ni | 1.03 | 280 |
| 36 | 1 | 23 | 120 | 4 | Ni | 1.2 | 320 |
| 37 | 1 | 24 | 120 | 40 | Ni | 1.33 | 350 |
| 38 | 1 | 25 | 120 | 40 | Li | 1 | 280 |
| 39 | 1 | 26 | 120 | 40 | | | 500 |
| 40 | 1 | 27 | 120 | 40 | Ni | 1.2 | 4200 |
| 41 | 1 | 28 | 120 | 0 | Ni | 1.1 | 360 |
| 42 | 1 | 29 | 120 | 60 | | | 290 |
| 43 | 1 | 30 | 120 | 60 | Ni | 0 | 290 |

| | | Secondary layer coating | | | | | | | | |
|---|---|---|---|---|---|---|---|---|---|---|
| | | Inorganic rust-preventive pigment | | | | | Solid lubricant | | | |
| | | (Pigment 1) | | (Pigment 2) | | (Pigment 1) + (Pigment 2) Total amount *9 | (Pigment 1)/ (Pigment 2) Ratio *10 | | | |
| No. | Resin composition *6 | Type *7 | Blending ratio *8 | Type *7 | Blending ratio *8 | | | Type *11 | Blending ratio *12 | Drying temperature (° C.) | Coating thickness (μm) |
| 29 | 1 | 1 | 30 | | | | | | | 230 | 1 |
| 30 | 1 | 1 | 30 | | | | | | | 230 | 1 |
| 31 | 1 | 1 | 30 | | | | | | | 230 | 1 |
| 32 | 1 | 1 | 30 | | | | | | | 230 | 1 |
| 33 | 1 | 1 | 30 | | | | | | | 230 | 1 |
| 34 | 1 | 1 | 30 | | | | | | | 230 | 1 |
| 35 | 1 | 1 | 30 | | | | | | | 230 | 1 |
| 36 | 1 | 1 | 30 | | | | | | | 230 | 1 |
| 37 | 1 | 1 | 30 | | | | | | | 230 | 1 |
| 38 | 1 | 1 | 30 | | | | | | | 230 | 1 |
| 39 | 1 | 1 | 30 | | | | | | | 230 | 1 |
| 40 | 1 | 1 | 30 | | | | | | | 230 | 1 |
| 41 | 1 | 1 | 30 | | | | | | | 230 | 1 |
| 42 | 1 | 1 | 30 | | | | | | | 230 | 1 |
| 43 | 1 | 1 | 30 | | | | | | | 230 | 1 |

TABLE 202-continued

| | | | Performance | | | | Classification |
|---|---|---|---|---|---|---|---|
| No. | Appearance | White-rust resistance: SST 96 hrs | White-rust resistance after alkaline degreasing: SST 96 hrs | Paint adhesiveness | Workability | Remark | Example/ Comparative Example |
| 29 | ○ | ⊚ | ⊚ | ⊚ | | | Example |
| 30 | ○ | ⊚ | ⊚ | ⊚ | | | Example |
| 31 | ○ | ⊚ | ○ | ⊚ | | | Example |
| 32 | ○ | ⊚ | ⊚ | ⊚ | | | Example |
| 33 | ○ | ⊚ | ○+ | ⊚ | | | Example |
| 34 | ○ | ⊚ | ⊚ | ⊚ | | | Example |
| 35 | ○ | ⊚ | ○− | ⊚ | | | Example |
| 36 | ○ | ⊚ | ○− | ⊚ | | | Example |
| 37 | ○ | ⊚ | ⊚ | ⊚ | | | Example |
| 38 | ○ | ⊚ | ○+ | ⊚ | | | Example |
| 39 | ○ | ⊚ | ○+ | ⊚ | | | Example |
| 40 | × | ⊚ | ⊚ | × | | | Comparative Example |
| 41 | ○ | Δ | Δ | Δ | | | Comparative Example |
| 42 | ○ | ⊚ | ○+ | ⊚ | | | Example |
| 43 | ○ | × | × | × | | | Comparative Example |

TABLE 203

| No. | Plating steel plate *1 | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 |
|---|---|---|---|---|---|---|---|
| 73 | 1 | 5 | 120 | 40 | Ni | 1.2 | 300 |

Primary layer coating

| | | Secondary layer coating | | | | | | | | |
|---|---|---|---|---|---|---|---|---|---|---|
| | | Inorganic rust-preventive pigment | | | | | Solid lubricant | | | |
| | | (Pigment 1) | | (Pigment 2) | | (Pigment 1) + (Pigment 2) Total amount *9 | (Pigment 1)/ (Pigment 2) Ratio *10 | | | |
| No. | Resin composition *6 | Type *7 | Blending ratio *8 | Type *7 | Blending ratio *8 | | | Type *11 | Blending ratio *12 | Drying temperature (° C.) | Coating thickness (μm) |
| 73 | 1 | 13 | 30 | | | | | | | 230 | 1 |

| | | | Performance | | | | Classification |
|---|---|---|---|---|---|---|---|
| No. | Appearance | White-rust resistance: SST 96 hrs | White-rust resistance after alkaline degreasing: SST 96 hrs | Paint adhesiveness | Workability | Remark | Example/ Comparative Example |
| 73 | ○ | ⊚ | ⊚ | ⊚ | | | Example |

TABLE 204

Primary layer coating

| No. | Plating steel plate *1 | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 |
|---|---|---|---|---|---|---|---|
| 81 | 1 | 5 | 120 | 40 | Ni | 1.2 | 300 |

TABLE 204-continued

| | | Secondary layer coating | | | | | | | | | |
|---|---|---|---|---|---|---|---|---|---|---|---|
| | | Inorganic rust-preventive pigment | | | | | | Solid lubricant | | | |
| | | (Pigment 1) | | (Pigment 2) | | (Pigment 1) + | (Pigment 1)/ | | | | |
| No. | Resin composition *6 | Type *7 | Blending ratio *8 | Type *7 | Blending ratio *8 | (Pigment 2) Total amount *9 | (Pigment 2) Ratio *10 | Type *11 | Blending ratio *12 | Drying temperature (° C.) | Coating thickness (µm) |
| 81 | 1 | 13 | 30 | 28 | 20 | 50 | 3/2 | | | 230 | 1 |

| | | Performance | | | | | |
|---|---|---|---|---|---|---|---|
| No. | Appearance | White-rust resistance: SST 96 hrs | White-rust resistance after alkaline degreasing: SST 96 hrs | Paint adhesiveness | Workability | Remark | Classification Example/ Comparative Example |
| 81 | ○ | ⊚ | ⊚ | ⊚ | | | Example |

TABLE 205

| | | Primary layer coating | | | | | |
|---|---|---|---|---|---|---|---|
| No. | Plating steel plate *1 | Coating composition *2 | Drying temperature (° C.) | Blending ratio converted to SiO$_2$ (wt %) *3 | (γ) Component | Molar ratio of phosphoric acid component (β)/(γ) *4 | Total coating weight (mg/m$^2$) *5 |
| 134 | 1 | 5 | 120 | 40 | Ni | 1.2 | 300 |

| | | Secondary layer coating | | | | | | | | | |
|---|---|---|---|---|---|---|---|---|---|---|---|
| | | Inorganic rust-preventive pigment | | | | | | Solid lubricant | | | |
| | | (Pigment 1) | | (Pigment 2) | | (Pigment 1) + | (Pigment 1)/ | | | | |
| No. | Resin composition *6 | Type *7 | Blending ratio *8 | Type *7 | Blending ratio *8 | (Pigment 2) Total amount *9 | (Pigment 2) Ratio *10 | Type *11 | Blending ratio *12 | Drying temperature (° C.) | Coating thickness (µm) |
| 1 | 1 | 13 | 30 | 28 | 20 | 50 | 3/2 | 1 | 10 | 230 | 1 |

| | | Performance | | | | | |
|---|---|---|---|---|---|---|---|
| No. | Appearance | White-rust resistance: SST 120 hrs | White-rust resistance after alkaline degreasing: SST 120 hrs | Paint adhesiveness | Workability | Remark | Classification Example/ Comparative Example |
| 134 | ○ | ⊚ | ⊚ | ⊚ | ⊚ | | Example |

Best Mode 8

The method for manufacturing a surf ace-treated steel sheet comprises the steps of: preparing a zinc base plating steel sheet or an aluminum base plating steel sheet; treating thus prepared plating steel sheet in an acidic aqueous solution within a pH range of from 0.5 to 5; and forming a chemical conversion treatment coating having a thickness in a range of from 0.005 to 2 µm on the surface of the plating steel sheet by heating and drying thereof.

The treatment liquid for applying chemical conversion treatment to the plating steel sheet according to the present invention is an acidic aqueous solution within a pH range of from 0.5 to 5, containing (a) silica and/or silica sol in a range of from 0.001 to 3 mole/liter as SiO$_2$, (b) phosphoric acid ion and/or phosphoric acid compound in a range of from 0.001 to 6 mole/liter as P$_2$O$_5$, and (c) one or more substances selected from the group consisting of: either one metallic ion selected from the group consisting of Al, Mg, Ca, Sr, Ba, Hf, Ti, Y, Sc, Ce, La, Pr, Nd, Sm, Eu, Gd, Tb, Dy, Ho, Er, Yb, Lu, Ni, Co, Fe, and Mn; a water-soluble ion containing at least one of the above-given metals; an oxide containing at least one of the above-given metals; and a hydroxide containing at least one of the above-given metals, in a range of from 0.001 to 3 mole/liter as the total of above-given metals converted to the metal concerned.

Even when a plating steel sheet is treated by a treatment liquid containing solely silica or silica sol, the obtained coating cannot have satisfactory corrosion resistance. The reason is presumably that, during the process of drying the silica or silica sol from wet state, the dehydration condensation of the silica occurs only in local positions, which fails to form a coating. To the contrary, when phosphoric acid coexists with silica or silica sol in the treatment liquid, significant improvement in the corrosion resistance appears compared with a treatment liquid containing solely silica or silica sol. Although the reason of significant improvement in corrosion resistance is not fully analyzed, the reason is presumably that the phosphoric acid ion or the phosphoric acid compound forms a slightly soluble salt with the plating composition (for example, zinc) in the plating steel sheet, which salt holds the silica fine particles.

The above-described coating of phosphoric acid base, containing silica or silica sol, gives, however, not a fully satisfactory level of corrosion resistance, though the corrosion resistance is superior to the case of treatment with a treatment liquid containing solely silica or silica sol. To this point, a study was given on, adding to the two components of silica and/or silica sol, further additives. The study revealed that the corrosion resistance is further improved by adding an adequate amount of above-described component (c) further improves the corrosion resistance, which component (c) is one or more substances selected from the group consisting of: either one metallic ion selected from the group consisting of Al, Mg, Ca, Sr, Ba, Hf, Ti, Y, Sc, Ce, La, Pr, Nd, Sm, Eu, Gd, Tb, Dy, Ho, Er, Yb, Lu, Ni, Co, Fe, and Mn; a water-soluble ion containing at least one of the above-given metals; an oxide containing at least one of the above-given metals; and a hydroxide containing at least one of the above-given metals.

Although the reason of improving the corrosion resistance by adding the additive component (c) is not fully analyzed, metals structuring the additive component (c) have their stable domain in alkaline side, and further their solubility is relatively low and they likely form slightly soluble salts, so that presumably these components existing in the coating deposit as hydroxides at the sites where pH increases during the corrosion process, thus contribute to the suppression of corrosion reactions.

The sum of the added amount of above-described additive components (c) in the treatment liquid is in a range of from 0.01 to 3 mole/liter as metal concerned, preferably from 0.01 to 0.5 mole/liter. If the added total amount is less than 0.001 mole/liter, the effect of addition is not fully obtained. If the added total amount exceeds 3 mole/liter, these component s interfere the network of the coating, which makes the forming of dense coating difficult, and the metallic components tend to be eluted from the coating, which induces defects such as discoloration of appearance depending on environment.

Furthermore, it was found that, among the above-described additive components (c), alkali earth metals (Mg, Ca, Sr, Ba) are particularly effective for improving the corrosion resistance, and that, as of these alkali earth metals, Mg most significantly improves the corrosion resistance. The reason that Mg addition improves the corrosion resistance most effectively is presumably that Mg has lower solubility of its hydroxide than hydroxide of other alkali earth metals and that Mg likely forms slightly soluble salts. In addition, the form of these alkali earth metals such as Mg in the treatment liquid may be oxide or hydroxide. To attain particularly excellent corrosion resistance, a form of metallic ion or a water-soluble ion containing Mg is particularly preferred.

When the additive components (c) contain one or more of substances selected from the group consisting of Mg ion, water-soluble ion containing Mg, oxide containing Mg, and hydroxide containing Mg, particularly when one or more of the substances selected from the group consisting of Mg ion and water-soluble ion containing Mg, the relation between the molar ratio of Mg to silica sol and the corrosion resistance was investigated. The investigation revealed that particularly excellent corrosion resistance is attained in a range of the molecular ratio of Mg as metal to silica and/or silica sol as Si in the additive components (c), or [Mg/Si], from 100/1 to 1/10.

FIG. 1 shows the state of white-rust generation in terms of area percentage of white-rust. FIG. 1 was plotted under the conditions given below. Treatment liquid of different molar ratios of primary magnesium phosphate (Mg content 3%, manufactured by Taihei Chemicals Co., Ltd.) to silica sol (SNOWTEX-O, manufactured by Nissan Chemical Industries, Ltd.), or [Mg/Si], were applied onto electrolytically galvanized steel sheets (coating weight of 20 g/m$^2$) separately, which applied plates were then dry-baked at reaching temperature of 140° C. to prepare chemical conversion treatment steel sheets having the coatings (thickness of about 0.4 μm, Mg coating weights of from 0.01 to 200 mg/m$^2$). Thus prepared steel sheets were tested by salt spray test (JIS Z2371) for 96 hours. The horizontal axis of FIG. 1 is expressed by logarithmic unit of molar ratio [Mg/Si] in the treatment liquid.

FIG. 1 shows that the corrosion resistance of the coating becomes favorable when the molar ratio [Mg/Si] is in a range of from 100/1 to 1/10, or within a range of (1) given in the figure. Further excellent corrosion resistance is attained when the ratio is in a range of from 10/1 to 1/5, or within a range of (2) given in the figure, and when the ratio is in a range of from 5/1 to 1/2, or within a range of (3) given in the figure. The reason of giving these results is not fully analyzed. According to a speculation on the reason, when the molar ratio [Mg/Si] is less than 1/10, the Mg effect cannot be fully attained, or the existing excess amount of SiO$_2$ degrades the barrier performance of the coating, which reduces the corrosion resistance. The degradation of corrosion resistance observed in the case that the molar ratio [Mg/Si] exceeds 100/1 presumably owes to insufficient corrosion-suppression effect of Zn by silica, (for example, inhibitor effect of silicic acid ion).

Consequently, when Mg exists as an additive component (c), it is preferred to set the molar ratio of Mg as metal to silica and/or silica sol as Si, [Mg/Si], to a range of from 100/1 to 1/10. Further preferred range of the molar ratio [Mg/Si] is from 10/1 to 1/5, and most preferable range is from 5/1 to 1/2.

The form of metals structuring the additive components (c) in the treatment liquid is not limited, and may be hydrated ion, complex ion, oxide sol, and hydroxide sol, if only they are in a state to be dissolved or dispersed in water. From the point of corrosion resistance, existence in a form of hydrated ion or complex ion is preferable.

In that case, when the ion of additive component (c) is supplied as hydrated ion or complex ion, supply as a phosphate such as primary phosphate is preferable. The reason is presumably that, when the ion is supplied from a phosphate, phosphoric acid and a part of metallic cation form a complex ion even in an acidic aqueous solution, so that the bonding of metallic cation with phosphoric acid relatively easily proceeds even in the process of forming the coating.

The ion of the additive components (c) may be supplied in other metallic salt. For example, anion such as chlorine ion, nitric acid ion, sulfuric acid ion, acetic acid ion, and boric acid ion may be added to the treatment liquid.

It should be emphasized that the treatment liquid according to the present invention is an acidic aqueous solution. That is, by bringing the treatment liquid to acidic, the plating components such as zinc are readily dissolved. As a result, at the interface between the chemical conversion treatment film and the plating, a phosphoric acid compound layer containing plating components such as zinc is presumably formed, which layer strengthens the interface bonding of both sides to structure a coating having excellent corrosion resistance.

The following is the description on the additive components (a) and (b).

The silica and/or silica sol as an additive component (a) may be commercially available silica sol and water-dispersion type silicic acid oligomer or the like if only the silicon oxide is water-dispersion type silica fine particles which are stable in an acidic aqueous solution. Since, however, fluoride such as hexafluoro silicic acid is strongly corrosive and gives strong effect to human body, that kind of compound should be avoided from the point of influence to work environment.

A preferred range of added amount of silica and/or silica sol as $SiO_2$ is from 0.001 to 3 mole/liter. If the added amount of silica and/or silica sol becomes less than 0.001 mole/liter, the effect of addition is not satisfactory. If the added amount of silica and/or silica sol exceeds 3 mole/liter, the water-resistance of coating degrades, resulting in degradation of corrosion resistance.

The effect of the present invention is acquired only when silica fine particles having a specified size exist in the coating. Although the reason is not fully analyzed, the corrosion resistance depends on the sizes of the silica.

A preferable range of silica particle sizes is from 5 to 20 nm, more preferably from 5 to 14 nm, and most preferably from 5 to 10 nm. If the silica particle size is less than 5 nm, the stability of the treatment liquid degrades, and the liquid tends to gel. If the silica particle size exceeds 20 nm, the corrosion resistance degrades.

Regarding phosphoric acid ion and/or phosphoric acid compound as the additive component (b), all kinds of modes thereof are included: for example, a mode of aqueous solution in which a compound specific to phosphoric acid, such as polyphosphoric acid such as orthophosphoric acid, pyrophosphoric acid, and tripolyphosphoric acid, methaphosphoric acid, inorganic salt of these acids (for example, primary aluminum phosphate), phosphorous acid, phosphate, phosphinic acid, phosphinate, exists in a form of anion or complex ion combined with a metallic cation which are generated by dissolving the compound in the aqueous solution; a mode of aqueous solution in which that kind of compound exists as free acids; and a mode of aqueous solution in which that kind of compound exists in a form of inorganic salt dispersed therein. The amount of phosphoric acid component according to the present invention is specified by the sum of all these modes of acidic aqueous solution thereof as converted to $P_2O_5$ amount.

A preferred range of blending ratio of the phosphoric acid ion and/or phosphoric acid compound as $P_2O_5$ is from 0.001 to 6 mole/liter, and more preferably from 0.02 to 1.0 mole/liter. If the blending ratio of the phosphoric acid ion and/or phosphoric acid compound becomes less than 0.001 mole/liter, the effect of addition is not satisfactory and the corrosion resistance degrades. If the blending ratio of the phosphoric acid ion and/or phosphoric acid compound exceeds 6 mole/liter, excess amount of phosphoric acid ion reacts with the plating film under a humid environment, which enhances the corrosion of plating base material to cause discoloration and stain-rusting under some corrosive environments.

When the additive component (c) is one or more of the substances selected from the group consisting of Mg ion, water-soluble ion containing Mg, oxide containing Mg, and hydroxide containing Mg, and particularly when the additive component (c) is one or more of Mg ion and water-soluble ion containing Mg, an adequate amount of one or more of the substances selected from the group consisting of either one metallic ion of Ni, Fe, and Co, and a water-soluble ion containing at least one of the above-given metals may be applied as the additive component (d). By adding that kind of iron group metal, blackening phenomenon is avoided. The blackening phenomenon occurs in the case of non-addition of iron group metals caused from corrosion on the plating polar surface layer under a humid environment. Among these iron group metals, Ni provides particularly strong effect even with a slight amount thereof. Since, however, excessive addition of iron group metals such as Ni and Co induces degradation of corrosion resistance, the added amount should be kept at an adequate level.

A preferred range of the added amount of the above-described additive component (d) is from 1/10,000 to 1 mole as metal per one mole of the additive component (c), more preferably from 1/10,000 to 1/100. If the added amount of the additive component (d) is less than 1/10,000 mole to one mole of the additive component (c), the effect of the addition is not satisfactory. If the added amount of the additive component (d) exceeds 1 mole, the corrosion resistance degrades as described above.

Similar effect is also obtained by surface adjustment treatment (treatment to make iron group metals substitute to deposit on the surface of plating) applied before the chemical conversion treatment, which surface adjustment treatment is described later.

The treatment liquid may, adding to the above-described additive components (a) through (d), further contain: water-soluble or water-dispersible resins such as acrylic base resin, polyethylene resin (polyolefin resin), alkydresin, epoxy resin, and polyurethane resin; water-soluble polymers such as high molecular weight polyol; coloring dyes such as water-soluble azo metallic dyes; chelating agents such as tannic acid and thiol; and silane coupling agent, in order to improve the denseness of coating, improve the corrosion resistance, improve the paintability, and add flexibility, and the like. Furthermore, the treatment liquid may contain components such as other metal additive compounds such as Zn and Mn, nitric acid ion, sulfuric acid ion, chloride ion, acetic acid ion; and boric acid ion, and etching assistant such as oxidation agent, at adequate amounts not giving bad effect to corrosion resistance.

The range of pH of the treatment liquid (acidic aqueous solution) is from 0.5 to 5. If the pH of the treatment liquid is less than 0.5, the reactivity of the treatment liquid becomes excessively strong, and micro-defects appear on the coating, thus degrading the corrosion resistance. If the pH of the treatment liquid exceeds 5, the reactivity of the treatment liquid becomes low, and the bonding between the plating face and the coating at the interface becomes insufficient, which also degrades the corrosion resistance.

According to the present invention, the plating steel sheets are treated by the treatment liquid of above-described acidic aqueous solution, then heating and drying are applied to the plates to form chemical conversion treatment coating having thicknesses of from 0.005 to 2 $\mu$m onto the surface of the plating steel sheets.

If the thickness of the chemical conversion treatment coating is less than 0.005 $\mu$m, the coating fails to uniformly cover the plating surface, and local defects occur on the coating, which results in insufficient corrosion resistance. If the thickness of the coating exceeds 2 µm, performance other than corrosion resistance, such as weldability and coating adhesiveness, degrades.

The plating steel sheets which are the base material to form the chemical conversion treatment coating according to the present invention are zinc base plating steel sheets or aluminum base plating steel sheets.

The plating method may be either applicable one of electrolytic method (electrolysis in an aqueous solution or in a non-aqueous solvent) and vapor phase method.

The methods for applying the treatment liquid onto the plating steel sheet may be either one of coating method, dipping method, and spray method. The coating method may adopt any type such as roll coater (three-roll type, two-roll type, etc.), squeeze coater, die coater. After the coating step using squeeze coater and the like, the dipping step, or the spray step, it is possible to adjust the coating weight, the uniformizing appearance, and the uniformizing the film-thickness using air-knife method and roll-squeezing method.

Although there is no specific limitation on the temperature of the treatment liquid, a preferable range thereof is from normal temperature to around 60° C. Below the normal temperature is uneconomical because a cooling unit or other additional facilities are required. On the other hand, temperatures above 60° C. enhances the vaporization of water, which makes the control of the treatment liquid difficult.

After the coating of treatment liquid as described above, generally the plate is heated to dry without rinsing with water. The treatment liquid according to the present invention forms a slightly soluble salt by a reaction with the substrate plating steel sheet, so that rinsing with water may be applied after the treatment. The present invention also includes the case that rinsing with water after the treatment.

Method for heating to dry the coated treatment liquid is not limited. For example, dryer, hot air oven, high frequency induction heating furnace, infrared heating furnace may be applied. In particular, the high frequency induction heating furnace is preferred because the furnace dries the work within a short time while effectively heating the base materials and the coating interface. The heating and drying treatment is preferably conducted at reaching temperatures of from 50 to 300° C., more preferably from 80 to 200° C. If the heating temperature is less than 50° C., excess amount of water is left in the coating, which results in insufficient corrosion resistance. If the heating temperature exceeds 300° C., the operation becomes uneconomical and defects likely appear in the coating to degrade the corrosion resistance.

Before the above-described chemical conversion treatment using an acidic aqueous solution, the surface of the plating steel sheet is brought to contact with an aqueous solution (acidic or alkaline aqueous solution) which contains adequate amount of one or more substances selected from the group consisting of either one of metallic ions of iron group metals, and water-soluble ion containing at least one of the iron group metals, and the surface of the plating film is subjected to surface adjustment treatment that deposits iron group metals onto the surface of the plating film. Thus, blackening phenomenon caused from the corrosion of the plating polar surface layer under a humid environment is avoided.

The added amount of the iron group metal (water-soluble ion containing at least one of iron group metal ion and/or iron group metal) in the treatment liquid (aqueous solution) used to the surface adjustment treatment is preferably in a range of from 0.001 to 10 g/liter. If the added amount of iron group metal is less than 0.001 g/liter, the effect of addition is not satisfactory. If the added amount of iron group metal exceeds 10 g/liter, the plating surface and the treatment liquid react nonuniformly, thus likely inducing problems such as insufficient appearance.

The deposition of iron group metal on the surface of plating film by the surface adjustment treatment is preferably in a rang e of from 0.01 to 100 mg/m$^2$ as the sum of metal. If the deposition of iron group metal on the surface of plating film is less than 0.01 mg/m the effect of addition is not satisfactory. If the deposition of iron group metal on the surface of plating film exceeds 100 mg/m$^2$, problems such as insufficient appearance likely occur.

As for the iron group metal ions add ed to the treatment liquid, Ni most significantly improves the blackening resistance.

Similar improvement effect to blackening resistance is attained also by coexisting Ni, Co, and other components as ions in the plating bath for manufacturing plating steel sheets by electroplating or the like, and by u sing a plating steel sheet in which Ni, Co, or the like is co-deposited into the plating film at rates of from 1 to 5,000 ppm, (for example, zinc base plating steel sheet).

The surface treated steel sheet manufactured conforming to the present invention has sufficiently favorable corrosion resistance as it is. However, to improve corrosion resistance and paintability after the alkaline degreasing, the formed chemical conversion treatment coating may be coated by an organic resin coating or an organic composite silicate coating as the upper layer. The upper layer coating may contain rust-preventive pigment such as silica, and solid lubricant of, for example, hydrocarbon compound, fluororesin base compound, fatty acid amide base compound, molybdenum disulfide, metallic soap, graphite fluoride, boron nitride, polyalkyleneglycol.

A preferred thickness of the upper layer coating (dry thickness) is in a range of approximately from 0.1 to 5 µm, and more preferably from 0.5 to 3 µm. If the thickness of the upper layer coating is less than 0.1 µm, the effect of improved corrosion resistance and of improved paintability after the alkaline degreasing is not satisfactory. If the thickness of the upper layer coating exceeds 5 µm, the product cannot be used to portions which need spot welding.

As described above, the present invention includes a steel sheet having an organic coating on both sides or on side thereof. Accordingly, modes of the steel sheet according to the present invention include, for example, the followings.

(1) "Plating film—Chemical conversion treatment coating according to the present invention—Upper layer coating" on one side of the steel sheet, and "Plating film" on other side of the steel sheet;

(2) "Plating film—Chemical conversion treatment coating according to the present invention—Upper layer coating" on one side of the steel sheet, and "Known coating treated by phosphoric acid, or the like" on other side of the steel sheet;

(3) "Plating film—Chemical conversion treatment coating according to the present invention" on both sides of the steel sheet;

(4) "Plating film—Chemical conversion treatment coating according to the present invention" on one side of the steel sheet, and "Plating film" on other side of the steel sheet;

(5) "Plating film—Chemical conversion treatment coating according to the present invention—Upper layer coating" on one side of the steel sheet, and "Plating film—Chemical conversion treatment coating according to the present invention" on other side of the steel sheet;

(6) "Plating film—Chemical conversion treatment coating according to the present invention: on both sides of the steel sheet.

EXAMPLE 1

To obtain organic coating steel sheets for household electric appliances, building materials, and automobile parts, the surface-treated steel sheets described below were prepared.

The surface of each of the plating steel sheets was treated by alkaline degreasing and water washing, followed by drying. Then, each of the treatment liquids for chemical conversion treatment which was adjusted in composition and pH shown in Tables 206 through 208 was applied to the surface using a roll coater, followed by heating to dry in a hot air oven. The thickness of the chemical conversion treatment coating was adjusted by the concentration of the treatment liquid and applying conditions (roll pressing force, rotational speed, and other variables). The drying temperature was determined by direct measurement of the plate temperature using thermocouples.

In Tables 206 through 208, * and *1 through *4 mean the following.
  *: A silica gel "SNOWTEX-0" produced by Nissan Chemical Industries, Ltd.
  *1: $SiO_2$ amount
  *2: Converted to $P_2O_5$
  *3: Converted to metal.
  *4: Examples and Comparative Examples.

For thus obtained surface-treated steel sheets, the corrosion resistance and the coating adhesiveness were evaluated by the following-given procedures. The results are shown in Tables 209 through 212 along with the kind, coating weight, chemical conversion treatment condition, and thickness of chemical conversion treatment coating of the plating steel sheets used as the target base plates. In Tables 209 through 212, *1 through *4 mean the following.
  *1: Corresponding to treatment liquid No. in Tables 206 through 208.
  *2: EG: Electrolytically galvanized steel sheet GI: Hot dip galvanized steel sheet GF: Hot dip Zn-55wt. %Al-0.1 wt. %misch metal alloy plating steel sheet GL: Hot dip Zn—55%Al alloy plating steel sheet EN: Electrolytically Zn—Ni alloy plating steel sheet
  *3: Coating weight per single side of the plate
  *4: Reaching temperature (1) Corrosion Resistance (White-rust Resistance)

For each sample, the salt spray test (JIS Z2371) was applied, and the evaluation was given by the area percentage of white-rust after 48 hours have passed.

The criteria for evaluation are the following.
  ⊚: White-rust area less than 5%
  ○: White-rust area not less than 5% and less than 10%
  Δ: White-rust area not less than 10% and less than 50%
  X: White-rust area not less than 50%

(2) Adhesiveness (Coating Adhesiveness)

For each sample, a 0T bending was applied, and the bent section was observed by SEM. The adhesiveness of the chemical conversion treatment coating was evaluated by the criteria given below.
  ○: Peeled area is slight
  X: Lack of chemical conversion treatment coating is significant resulted from peeling According to Examples given in Tables 209 through 212, all the surface-treated steel sheets obtained by the method according to the present invention have superior performance to the surface-treated steel sheets in Comparative Examples.

EXAMPLE 2

To obtain surface-treated steel sheets for household electric appliances, building materials, and automobile parts, the following-described surface-treated steel sheets were prepared.

Plating steel sheets shown in Table 213 were used as the target base plates, which plates were prepared by applying various kinds of platting on cold-rolled steel sheets having a plate thickness of 0.8 mm and a surface roughness Ra of 1.0 μm. The surface of the plating steel sheet was treated by alkaline degreasing and water rinsing. For some of these plating steel sheets, surface adjustment treatment (spray treatment or immersion treatment) using the treatment liquids shown in Table 214 to let iron group metals substitute-deposit onto the surface of the plating film. Then, the treatment liquids for chemical conversion treatment adjusted to specific compositions and pH values given in Tables 215 through 217 were applied to the surface using a roll coater, followed by heating to dry in a hot air oven or a high frequency induction heating furnace. The drying temperature was directly determined using thermocouples.

In Tables 215 through 217, *1 through *6 express the following.
  *1: $SiO_2$ amount.
  *2: Converted to metal concerned.
  *3: Molar ratio of [Mg as metal]/[Silica gel as Si].
  *4: Converted to $P_2O_5$.
  *5: Molar ratio of [Additive component (d)]/[Additive component (c) as metal].
  *6: Examples and Comparative Examples.

After that, some of the surface-treated steel sheets were subjected to form an organic resin coating on the chemical conversion treatment coating.

To each of thus obtained surface-treated steel sheets, evaluation was given in terms of appearance of coating, white-rust resistance, white-rust resistance after alkaline degreasing, paintability, blackening resistance, and coating adhesiveness. The results are given in Tables 218 through 227 along with the kinds, surface adjustment treatment conditions, chemical conversion treatment conditions, and thickness of chemical conversion treatment coating.

In Tables 218, 220, 222, 224, and 226, *1 through *3 express the following.
  *1: Plating steel sheets given in Table 213.
  *2: Corresponding to the treatment liquid Nos. given in Table 214.
  *3: Corresponding to the treatment liquid composition Nos. given in Tables 215 through 217.

(1) Appearrance of Coating

For each sample, visual observation was given on the uniformity of coating appearance (presence/absence of irregular appearance.). The criteria for evaluation are the following.
  ○: No irregularity appeared
  X: Irregularity appeared (2) White-rust Resistance For each sample, the salt spray test (JIS Z2371) was applied, and the evaluation was given by the area percentage of white-rust after 48 hours and 72 hours have passed, respectively.

The criteria for evaluation are the following.
⊚: White-rust area less than 5%
◯: White-rust area not less than 5% and less than 10%
Δ: White-rust area not less than 10% and less than 50%
X: White-rust area not less than 50%

(3) White-rust Resistance After Alkaline Degreasing

For each sample, alkaline degreasing was applied (using the alkali treatment liquid CLN-364S, produced by Nihon Parkerizing Co.), followed by salt spray test (JIS Z2371). The result was evaluated by the white-rust area percentage after 48 hours and 72 hours have past, respectively.

The criteria for evaluation are the following.
⊚: White-rust area less than 5%
◯: White-rust area not less than 5% and less than 25%
Δ: White-rust area not less than 25% and less than 50%
X: White-rust area not less than 50%

(4) Paintability (Paint Adhesiveness)

For each sample, a melamine base paint (film thickness of 30 μm) was applied and baked, and the sample was dipped in a boiling water for 2 hours. Immediately after 2 hours of dipping, cross-cut (10×10 squares with 10 mm of spacing) was given to the surface of the sample. Then the test of attaching and peeling of adhesive tapes was given to the sample to evaluate the paint adhesiveness by the peeled paint film area percentage.

The criteria for evaluation are the following.
⊚: No peeling occurred
◯: Peeled area less than 5%
Δ: Peeled area not less than 5% and less than 20%
X: Peeled area not less than 20%

(5) Blackening Resistance

Each sample was held under a humid environment at 95% or higher relative humidity for 24 hours. The degree of discoloration of whiteness of the sample was determined before and after the humid test, thus giving the evaluation on the blackening resistance.

The criteria for evaluation are the following.
◯: Excellent (change in L value $\geq -2$)
Δ: Poor (change in L value $< -2$)

(6) Adhesiveness (Coating Adhesiveness)

For each sample, 0T bending was applied, and the bent section was observed by SEM. The adhesiveness of chemical conversion treatment coating was evaluated in accordance with the criteria given below.
◯: Peeled area is slight
X: Lack of chemical conversion treatment coating is significant resulted from peeling.

The results of Examples given in Tables 218 through 227 show that the surface-treated steel sheets according to the present invention provide superior performance to the surface-treated steel sheets of Comparative Examples.

TABLE 206

[Treatment liquid for chemical conversion coating]

| | Silica sol | Phosphoric acid/ phosphoric | Water-soluble ion, oxide, hydroxide of specific metal | | | | Treatment | |
|---|---|---|---|---|---|---|---|---|
| No. | concentration (mol/L) *1 | acid (mol/L) *2 | Metal species | Mode of addition | Added amount (mol/L) *3 | Added reagent | liquid pH | Classification *4 |
| 1 | 0.20 | 0.40 | Al | Hydrated ion | 0.20 | Primary aluminum phosphate | 2.1 | Example |
| 2 | 0.40 | 0.20 | Al | Hydrated ion | 0.02 | Aluminum sulfate | 2.8 | Example |
| 3 | 0.15 | 0.02 | Al | Hydroxide sol | 0.15 | Alumina sol | 3.0 | Example |
| 4 | 0.15 | 0.30 | Mg | Hydrated ion | 0.20 | Primary magnesium phosphate | 2.6 | Example |
| 5 | 0.50 | 0.50 | Mg | Hydrated ion | 0.002 | Magnesium sulfate | 2.5 | Example |
| 6 | 0.20 | 0.25 | Al, Mg | Hydrated ion | Al = 0.15, Mg = 0.05 | Primary phosphate | 1.5 | Example |
| 7 | 0.20 | 0.25 | Al, Sr | Hydrated ion | Al = 0.15, Sr = 0.05 | Primary phosphate | 2.2 | Example |
| 8 | 0.20 | 0.20 | Al, Ca | Hydrated ion | Al = 0.15, Ca = 0.05 | Primary phosphate | 2.2 | Example |
| 9 | 0.30 | 0.30 | Ba | Hydrated ion | 0.001 | Barium sulfate | 1.8 | Example |
| 10 | 0.30 | 0.25 | Hf | Oxide | 0.02 | Hafnium oxide powder | 2.0 | Example |
| 11 | 0.30 | 0.25 | Ti | Oxide sol | 0.05 | Titania sol | 1.2 | Example |
| 12 | 0.30 | 0.25 | Se | Hydrated ion | 0.05 | Scandium nitrate | 2.2 | Example |
| 13 | 0.30 | 0.25 | Ce | Oxide sol | 0.05 | Cerium oxide sol | 2.2 | Example |
| 14 | 0.30 | 0.05 | La | Hydrated ion | 0.01 | Lanthanum nitrate | 3.5 | Example |

TABLE 207

[Treatment liquid for chemical conversion coating]

| | Silica sol | Phosphoric acid/ phosphoric | Water-soluble ion, oxide, hydroxide of specific metal | | | | Treatment | |
|---|---|---|---|---|---|---|---|---|
| No. | concentration (mol/L) *1 | acid (mol/L) *2 | Metal species | Mode of addition | Added amount (mol/L) *3 | Added reagent | liquid pH | Classification *4 |
| 15 | 0.30 | 0.20 | Pr | Hydrated ion | 0.002 | Praseodymium chloride | 2.5 | Example |
| 16 | 0.30 | 0.20 | Nd | Hydrated ion | 0.001 | Neodymium fluoride | 2.5 | Example |
| 17 | 0.35 | 0.20 | Sm | Hydrated ion | 0.005 | Samarium chloride | 2.5 | Example |
| 18 | 0.30 | 0.20 | Eu | Hydrated ion | 0.05 | Europium chloride | 2.2 | Example |
| 19 | 0.40 | 0.20 | Al, Gd | Hydrated ion | Al = 0.15, Gd = 0.001 | Phosphate, gadolinium fluoride | 2.2 | Example |

TABLE 207-continued

[Treatment liquid for chemical conversion coating]

| No. | Silica sol concentration (mol/L) *1 | Phosphoric acid/ phosphoric acid (mol/L) *2 | Water-soluble ion, oxide, hydroxide of specific metal | | | | Treatment liquid pH | Classification *4 |
|---|---|---|---|---|---|---|---|---|
| | | | Metal species | Mode of addition | Added amount (mol/L) *3 | Added reagent | | |
| 20 | 0.30 | 0.25 | Al, Tb | Hydrated ion | Al = 0.15, Tb = 0.001 | Phosphate, terbium nitride | 2.2 | Example |
| 21 | 0.30 | 0.25 | Dy | Hydrated ion | 0.005 | Dysprosium nitride | 2.2 | Example |
| 22 | 0.30 | 0.25 | Ho | Hydrated ion | 0.005 | Holmium chloride | 2.2 | Example |
| 23 | 0.30 | 0.25 | Er | Hydrated ion | 0.005 | Erbium carbonate | 2.2 | Example |
| 24 | 0.30 | 0.25 | Yb | Hydrated ion | 0.005 | Ytterbium nitride | 2.2 | Example |
| 25 | 0.30 | 0.25 | Lu | Hydrated ion | 0.005 | Lutetium nitride | 2.2 | Example |
| 26 | 0.15 | 0.25 | Al, Ni | Hydrated ion | Al = 0.15, Ni = 0.05 | Primary phosphate | 2.3 | Example |
| 27 | 0.15 | 0.20 | Mg, Co | Hydrated ion | Mg = 0.15, Co = 0.05 | Primary phosphate | 1.8 | Example |

TABLE 208

[Treatment liquid for chemical conversion coating]

| No. | Silica sol concentration (mol/L) *1 | Phosphoric acid/ phosphoric acid (mol/L) *2 | Water-soluble ion, oxide, hydroxide of specific metal | | | | Treatment liquid pH | Classification *4 |
|---|---|---|---|---|---|---|---|---|
| | | | Metal species | Mode of addition | Added amount (mol/L) *3 | Added reagent | | |
| 28 | 0.15 | 0.25 | Fe | Hydrated ion | 0.20 | Primary phosphate | 1.5 | Example |
| 29 | 0.15 | 0.25 | Mg, Fe | Hydrated ion | Mg = 0.15, Fe = 0.05 | Primary phosphate | 2.1 | Example |
| 30 | 0.15 | 0.25 | Mn | Hydrated ion | 0.10 | Primary phosphate | 2.5 | Example |
| 31 | 0.15 | 0.25 | Al, Fe | Hydrated ion | Al = 0.15, Fe = 0.05 | Primary phosphate | 1.7 | Example |
| 32 | 2.50 | 3.00 | Al | Hydrated ion | 1.80 | Primary phosphate | 3.1 | Example |
| 33 | 0.02 | 0.01 | Al | Hydrated ion | 0.05 | Primary phosphate | 4.0 | Example |
| 34 | — | 0.30 | Al | Hydrated ion | 0.20 | Primary phosphate | 2.0 | Comparative example |
| 35 | 3.20 | 0.10 | Al | Hydrated ion | 0.05 | Primary phosphate | 3.5 | Comparative example |
| 36 | 0.20 | 0.20 | — | — | — | — | 3.5 | Comparative example |
| 37 | 0.30 | 7.00 | Al | Hydrated ion | 2.0 | Primary phosphate | 0.5 | Comparative example |
| 38 | 0.20 | — | Mg | Hydrated ion | 0.20 | Nitrate | 2.0 | Comparative example |
| 39 | 0.20 | 0.20 | Al | Hydrated ion | 3.5 | Primary phosphate, sulfate | 2.0 | Comparative example |
| 40 | 0.20 | 3.90 | Al | Hydrated ion | 0.50 | Primary phosphate | 0.4 | Comparative example |
| 41 | 0.05 | 0.002 | Sr | Hydrated ion | 0.01 | Primary phosphate | 5.2 | Comparative example |

TABLE 209

| No. | Treatment liquid No. *1 | Target treatment substrate Type *2 | Coating weight (g/m$^2$) *3 | Drying temperature *4 (° C.) | Coating thickness (μm) | Corrosion resistance | Adhesiveness | Classification |
|---|---|---|---|---|---|---|---|---|
| 1 | 1 | EG | 20 | 110 | 0.20 | ⊚ | ○ | Example |
| 2 | 2 | EG | 20 | 130 | 0.40 | ⊚ | ○ | Example |
| 3 | 3 | EG | 20 | 110 | 0.20 | ⊚ | ○ | Example |
| 4 | 3 | GI | 90 | 90 | 0.20 | ⊚ | ○ | Example |
| 5 | 4 | EG | 20 | 110 | 0.15 | ⊚ | ○ | Example |
| 6 | 4 | EG | 20 | 120 | 0.20 | ⊚ | ○ | Example |
| 7 | 4 | EG | 20 | 230 | 0.20 | ⊚ | ○ | Example |
| 8 | 4 | GI | 120 | 120 | 0.15 | ⊚ | ○ | Example |
| 9 | 4 | GL | 85 | 120 | 0.20 | ⊚ | ○ | Example |
| 10 | 4 | EN | 30 | 110 | 0.20 | ⊚ | ○ | Example |

TABLE 209-continued

| No. | Treatment liquid No. *1 | Target treatment substrate Type *2 | Coating weight (g/m²) *3 | Drying temperature *4 (° C.) | Coating thickness (μm) | Corrosion resistance | Adhesiveness | Classification |
|---|---|---|---|---|---|---|---|---|
| 11 | 5 | EG | 20 | 110 | 0.40 | ◎ | ○ | Example |
| 12 | 5 | EG | 20 | 110 | 0.40 | ◎ | ○ | Example |
| 13 | 5 | EG | 20 | 110 | 0.10 | ◎ | ○ | Example |

TABLE 210

| No. | Treatment liquid No. *1 | Target treatment substrate Type *2 | Coating weight (g/m²) *3 | Drying temperature *4 (° C.) | Coating thickness (μm) | Corrosion resistance | Adhesiveness | Classification |
|---|---|---|---|---|---|---|---|---|
| 14 | 6 | EG | 20 | 120 | 0.35 | ◎ | ○ | Example |
| 15 | 7 | EG | 20 | 110 | 0.30 | ◎ | ○ | Example |
| 16 | 8 | EG | 20 | 80 | 0.35 | ◎ | ○ | Example |
| 17 | 9 | EG | 20 | 110 | 0.30 | ◎ | ○ | Example |
| 18 | 10 | EG | 20 | 120 | 0.30 | ◎ | ○ | Example |
| 19 | 11 | EG | 20 | 140 | 0.30 | ◎ | ○ | Example |
| 20 | 12 | EG | 20 | 110 | 0.30 | ◎ | ○ | Example |
| 21 | 13 | EG | 20 | 110 | 0.30 | ◎ | ○ | Example |
| 22 | 14 | EG | 20 | 120 | 0.30 | ◎ | ○ | Example |
| 23 | 15 | EG | 20 | 110 | 0.30 | ◎ | ○ | Example |
| 24 | 16 | EG | 10 | 110 | 0.30 | ◎ | ○ | Example |
| 25 | 17 | EG | 10 | 110 | 0.30 | ◎ | ○ | Example |
| 26 | 18 | EG | 20 | 120 | 0.30 | ◎ | ○ | Example |

TABLE 211

| No. | Treatment liquid No. *1 | Target treatment substrate Type *2 | Coating weight (g/m²) *3 | Treatment temperature *4 (° C.) | Coating thickness (μm) | Corrosion resistance | Adhesiveness | Classification |
|---|---|---|---|---|---|---|---|---|
| 27 | 19 | EG | 20 | 110 | 0.20 | ◎ | ○ | Example |
| 28 | 20 | EG | 20 | 110 | 0.30 | ◎ | ○ | Example |
| 29 | 21 | EG | 20 | 120 | 0.35 | ◎ | ○ | Example |
| 30 | 22 | EG | 20 | 120 | 0.30 | ◎ | ○ | Example |
| 31 | 23 | EG | 20 | 150 | 0.30 | ◎ | ○ | Example |
| 32 | 24 | EG | 20 | 100 | 0.25 | ◎ | ○ | Example |
| 33 | 25 | EG | 20 | 100 | 0.30 | ◎ | ○ | Example |
| 34 | 25 | EG | 20 | 100 | 1.0 | ◎ | ○ | Example |
| 35 | 26 | EG | 20 | 100 | 0.50 | ◎ | ○ | Example |
| 36 | 27 | EG | 20 | 110 | 0.20 | ◎ | ○ | Example |
| 37 | 28 | EG | 20 | 110 | 0.20 | ◎ | ○ | Example |
| 38 | 29 | EG | 20 | 110 | 0.20 | ◎ | ○ | Example |
| 39 | 30 | EG | 20 | 110 | 0.20 | ◎ | ○ | Example |

TABLE 212

| No. | Treatment liquid No. *1 | Target treatment substrate Type *2 | Coating weight (g/m²) *3 | Drying temperature *4 (° C.) | Coating thickness (μm) | Corrosion resistance | Adhesiveness | Classification |
|---|---|---|---|---|---|---|---|---|
| 40 | 31 | EG | 20 | 110 | 0.20 | ◎ | ○ | Example |
| 41 | 32 | EG | 20 | 110 | 2.2 | ◎ | × | Comparative example |
| 42 | 33 | EG | 20 | 110 | 0.003 | × | ○ | Comparative example |

TABLE 212-continued

| No. | Treatment liquid No. *1 | Target treatment substrate Type *2 | Coating weight (g/m²) *3 | Drying temperature *4 (° C.) | Coating thickness (μm) | Corrosion resistance | Adhesiveness | Classification |
|---|---|---|---|---|---|---|---|---|
| 43 | 34 | EG | 20 | 110 | 0.30 | × | ○ | Comparative example |
| 44 | 35 | EG | 20 | 110 | 0.20 | Δ | ○ | Comparative example |
| 45 | 36 | EG | 20 | 110 | 0.20 | × | ○ | Comparative example |
| 46 | 37 | EG | 20 | 100 | 0.30 | × | ○ | Comparative example |
| 47 | 38 | EG | 20 | 110 | 0.20 | × | ○ | Comparative example |
| 48 | 39 | EG | 20 | 120 | 0.20 | × | ○ | Comparative example |
| 49 | 40 | EG | 20 | 110 | 0.20 | × | ○ | Comparative example |
| 50 | 41 | EG | 20 | 110 | 0.20 | × | ○ | Comparative example |

TABLE 213

[Plating steel plate]

| No. | Type | Coating weight (g/m²) |
|---|---|---|
| 1 | Electrolytically galvanized steel plate | 20 |

TABLE 214

[Treatment liquid for surface adjustment]

| No. | Composition (1) Type | Concentration (g/l) | Composition (2) Type | Concentration (g/l) | Ion group metal Type | Concentration (g/l) | pH |
|---|---|---|---|---|---|---|---|
| 1 | $Na_4P_2O_7 \cdot 10H_2O$ | 10 | $NiSO_4 \cdot 6H_2O$ | 0.05 | Ni | 0.01 | 10 |
| 2 | $Na_4P_2O_7 \cdot 10H_2O$ | 10 | $NiSO_4 \cdot 6H_{3O}$ | 0.10 | Ni | 0.02 | 10 |
| 3 | $Na_4P_2O_7 \cdot 10H_2O$ | 10 | $NiSO_4 \cdot 6H_{4O}$ | 1.0 | Ni | 0.22 | 10 |
| 4 | — | — | $NiSO_4 \cdot 6H_{5O}$ | 5.0 | Ni | 1.12 | 5 |
| 5 | Commercial Na base pyrophosphoric acid degreasing agent* | 10 | $NiSO_4 \cdot 6H_{6O}$ | 0.05 | Ni | 0.01 | 10 |
| 6 | $Na_4P_2O_7 \cdot 10H_2O$ | 10 | $NiSO_4 \cdot 6H_{7O}$ | 0.20 | Co | 0.07 | 10 |

*CL-342 produced by Nihon Parkerizing Co.

TABLE 215

[Treatment liquid for chemical conversion coating]

| No. | Silica sol (a) Type | Trade name | Particle size (nm) | Concentration (mol/L) *1 | Alkali earth metal (c) Type | Concentration (mol/L) *2 | Mg/Si *3 | Phosphoric acid/phosphoric acid compound (b) Type | Concentration (mol/L) *4 |
|---|---|---|---|---|---|---|---|---|---|
| 1 | Colloidal silica | Nissan Chemical Industries, Ltd. SNOWTEX-O | 12 to 14 | 0.1 | $Mg^{2+}$ | 0.20 | 1.82 | orthophosphoric acid | 0.21 |

TABLE 215-continued

[Treatment liquid for chemical conversion coating]

| | | | | | | | | | |
|---|---|---|---|---|---|---|---|---|---|
| 2 | Colloidal silica | Nissan Chemical Industries, Ltd. SNOWTEX-O | 12 to 14 | 0.2 | $Mg^{2+}$ | 0.17 | 0.94 | orthophosphoric acid | 0.18 |
| 3 | Colloidal silica | Nissan Chemical Industries, Ltd. SNOWTEX-O | 13 to 14 | 0.4 | $Mg^{2+}$ | 0.40 | 1.00 | orthophosphoric acid | 0.40 |
| 4 | Colloidal silica | Nissan Chemical Industries, Ltd. SNOWTEX-O | 8 to 10 | 0.2 | $Mg^{2+}$ | 0.17 | 0.94 | orthophosphoric acid | 0.18 |
| 5 | Colloidal silica | Nissan Chemical Industries, Ltd. SNOWTEX-O | 6 to 8 | 0.1 | $Mg^{2+}$ | 0.20 | 1.82 | orthophosphoric acid | 0.18 |
| 6 | Colloidal silica | Nissan Chemical Industries, Ltd. SNOWTEX-O | 8 to 10 | 0.2 | $Mg^{2+}$ | 0.30 | 1.50 | orthophosphoric acid | 0.21 |
| 7 | Colloidal silica | Nissan Chemical Industries, Ltd. SNOWTEX-O | 12 to 14 | 0.4 | $Mg^{2+}$ | 0.40 | 1.00 | orthophosphoric acid | 0.30 |
| 8 | Colloidal silica | Catalysts & Chemicals Industries Co., LTD. Cataloid-SN | 10 to 20 | 0.3 | $Mg^{2+}$ | 0.10 | 0.33 | orthophosphoric acid | 0.10 |
| 9 | Colloidal silica | Nissan Chemical Industries, Ltd. SNOWTEX-O | 12 to 14 | 0.2 | $Mg^{2+}$ | 0.30 | 1.50 | orthophosphoric acid | 0.30 |

| | Added metal (d) | | | | |
|---|---|---|---|---|---|
| No. | Type | Concentration | Molar ratio (d)/(c) *5 | Treatment liquid pH | Classification *6 |
| 1 | — | — | — | 3.1 | Example |
| 2 | — | — | — | 3.1 | Example |
| 3 | — | — | — | 2.7 | Example |
| 4 | — | — | — | 3.1 | Example |
| 5 | — | — | — | 3.0 | Example |
| 6 | — | — | — | 3.5 | Example |
| 7 | — | — | — | 3.2 | Example |
| 8 | — | — | — | 2.5 | Example |
| 9 | — | — | — | 3.5 | Example |

TABLE 216

[Treatment liquid for chemical conversion coating]

| | Silica sol (a) | | | | Alkali earth metal (c) | | | Phosphoric acid/phosphoric acid compound (b) | |
|---|---|---|---|---|---|---|---|---|---|
| No. | Type | Trade name | Particle size (nm) | Concentration (mol/L) *1 | Type | Concentration (mol/L) *2 | Mg/Si *3 | Type | Concentration (mol/L) *4 |
| 10 | Colloidal silica | Nissan Chemical Industries, Ltd. SNOWTEX-O | 12 to 14 | 0.4 | $Mg^{2+}$ | 0.40 | 1.00 | orthophosphoric acid | 0.40 |
| 11 | Colloidal silica | Nissan Chemical Industries, Ltd. SNOWTEX-O | 12 to 14 | 0.4 | $Mg^{2+}$ | 1.40 | 1.00 | orthophosphoric acid | 0.40 |
| 12 | Colloidal silica | Nissan Chemical Industries, Ltd. SNOWTEX-O | 8 to 10 | 0.3 | $Mg^{2+}$ | 0.10 | 0.33 | orthophosphoric acid | 0.40 |
| 13 | Colloidal silica | Catalysts & Chemicals Industries, Co., LTD. Cataloid-SN | 10 to 20 | 0.3 | $Mg^{2+}$ | 0.10 | 0.33 | orthophosphoric acid | 0.10 |
| 14 | Colloidal silica | Nissan Chemical Industries, Ltd. SNOWTEX-O | 12 to 14 | 1.0 | $Mg^{2+}$ | 0.05 | 0.05 | orthophosphoric acid | 0.40 |
| 15 | Colloidal silica | Nissan Chemical Industries, Ltd. SNOWTEX-O | 12 to 14 | 0.1 | $Mg^{2+}$ | 1.10 | 110.00 | orthophosphoric acid | 0.40 |
| 16 | Colloidal silica | Nissan Chemical Industries, Ltd. SNOWTEX-O | 12 to 14 | 0.2 | $Ca^{2+}$ | 0.20 | — | orthophosphoric acid | 0.20 |

TABLE 216-continued

[Treatment liquid for chemical conversion coating]

| 17 | Colloidal silica | Nissan Chemical Industries, Ltd. SNOWTEX-O | 12 to 14 | 0.1 | Sr²⁺ | 0.10 | — | orthophosphoric acid | 0.10 |

| | | | | Added metal (d) | | | |
|---|---|---|---|---|---|---|---|
| No. | Type | Concentration | Molar ratio (d)/(c) *5 | Treatment liquid pH | Classification *6 |

| No. | Type | Concentration | Molar ratio (d)/(c) *5 | Treatment liquid pH | Classification *6 |
|---|---|---|---|---|---|
| 10 | Ni²⁺ | 0.001 | 0.0025 | 3.2 | Example |
| 11 | Co²⁺ | 0.02 | 0.05 | 3.2 | Example |
| 12 | — | — | — | 2.5 | Example※ |
| 13 | — | — | — | 2.5 | Example |
| 14 | — | — | — | 3.2 | Example |
| 15 | — | — | — | 3.2 | Example |
| 16 | — | — | — | 3 | Example |
| 17 | — | — | — | 3.1 | Example |

※*Ethyl-styrene type moisture acid resin: 160 g/L added

TABLE 217

[Treatment liquid for chemical conversion coating]

| | Silica sol (a) | | | | Alkali earth metal (c) | | | Phosphoric acid/phosphoric acid compound (b) | |
|---|---|---|---|---|---|---|---|---|---|
| No. | Type | Trade name | Particle size (nm) | Concentration (mol/L) *1 | Type | Concentration (mol/L) *2 | Mg/Si *3 | Type | Concentration (mol/L) *4 |
| 18 | Colloidal silica | Nissan Chemical Industries, Ltd. SNOWTEX-O | 12 to 14 | 0.1 | Ba²⁺ | 0.10 | — | orthophosphoric acid | 0.10 |
| 19 | — | — | — | — | Mg²⁺ | 0.30 | — | orthophosphoric acid | 0.30 |
| 20 | Colloidal silica | Nissan Chemical Industries, Ltd. SNOWTEX-O | 12 to 14 | 3.5 | Mg²⁺ | 0.30 | 0.09 | orthophosphoric acid | 0.30 |
| 21 | Colloidal silica | Nissan Chemical Industries, Ltd. SNOWTEX-O | 12 to 14 | 0.4 | — | — | — | orthophosphoric acid | 0.15 |
| 22 | Colloidal silica | Nissan Chemical Industries, Ltd. SNOWTEX-O | 12 to 14 | 0.4 | Mg²⁺ | 3.50 | 8.75 | orthophosphoric acid | 0.30 |
| 23 | Colloidal silica | Nissan Chemical Industries, Ltd. SNOWTEX-O | 12 to 14 | 0.4 | Mg²⁺ | 0.30 | 0.75 | — | — |
| 24 | Colloidal silica | Nissan Chemical Industries, Ltd. SNOWTEX-O | 12 to 14 | 0.4 | Mg²⁺ | 0.30 | 0.75 | orthophosphoric acid | 6.2 |
| 25 | Colloidal silica | Nissan Chemical Industries, Ltd. SNOWTEX-O | 12 to 14 | 0.4 | Mg²⁺ | 2.50 | 6.25 | orthophosphoric acid | 5.0 |
| 26 | Lithium silicate | Nissan Chemical Industries, Ltd. LSS-35 | — | 1.0 | — | — | — | — | — |

| | | | Added metal (d) | | | |
|---|---|---|---|---|---|---|
| No. | Type | Concentration | Molar ratio (d)/(c) *5 | Treatment liquid pH | Classification *6 |
| 18 | — | — | — | 3.2 | Example |
| 19 | — | — | — | 2.8 | Comparative example |
| 20 | — | — | — | 2.5 | Comparative example |
| 21 | — | — | — | 3.0 | Comparative example |

TABLE 217-continued

[Treatment liquid for chemical conversion coating]

| | | | | | |
|---|---|---|---|---|---|
| | 22 | — | — | — | 2.5 | Comparative example |
| | 23 | — | — | — | 2.8 | Comparative example |
| | 24 | — | — | — | 2.1 | Comparative example |
| | 25 | — | — | — | 0.4 | Comparative example |
| | 26 | — | — | — | 11 | Comparative example |

TABLE 218

| | | Surface adjustment | | | | Chemical conversion treatment conditions | | | Upper layer organic resin coating | | |
|---|---|---|---|---|---|---|---|---|---|---|---|
| No. | Plating base plate *1 | Treatment liquid *2 | Treatment time (second) | Deposition/ Metal species | Coating weight (mg/m²) | Target composition *3 | Drying temperature (° C.) | Coating thickness (μm) | Presence/ Absence | Coating thickness (μm) | Classification |
| 1 | 1 | — | — | — | — | 1 | 140 | 0.2 | Absence | — | Example |
| 2 | 1 | — | — | — | — | 2 | 140 | 0.2 | Absence | — | Example |
| 3 | 1 | — | — | — | — | 3 | 140 | 0.2 | Absence | — | Example |
| 4 | 1 | — | — | — | — | 4 | 140 | 0.2 | Absence | — | Example |
| 5 | 1 | — | — | — | — | 5 | 140 | 0.2 | Absence | — | Example |
| 6 | 1 | — | — | — | — | 6 | 140 | 0.2 | Abscnce | — | Example |
| 7 | 1 | — | — | — | — | 7 | 140 | 0.2 | Absence | — | Example |
| 8 | 1 | — | — | — | — | 8 | 140 | 0.2 | Absence | — | Example |
| 9 | 1 | — | — | — | — | 9 | 140 | 0.2 | Absence | — | Example |
| 10 | 1 | — | — | — | — | 10 | 140 | 0.2 | Absence | — | Example |
| 11 | 1 | — | — | — | — | 11 | 140 | 0.2 | Absence | — | Example |
| 12 | 1 | — | — | — | — | 12 | 140 | 0.2 | Absence | — | Example |
| 13 | 1 | — | — | — | — | 13 | 140 | 0.2 | Absence | — | Example |
| 14 | 1 | — | — | — | — | 14 | 140 | 0.2 | Absence | — | Example |
| 15 | 1 | — | — | — | — | 15 | 140 | 0.2 | Absence | — | Example |

TABLE 219

| | | Performance | | | | | | | |
|---|---|---|---|---|---|---|---|---|---|
| | | White-rust resistance | | White-rust resistance after alkaline degreasing | | | Resistance to | Coating | |
| No. | Appearance | SST 48 hrs | SST 72 hrs | SST 48 hrs | SST 72 hrs | Paintability | blackening | adhesiveness | Classification |
| 1 | ○ | ⊙ | ○ | Δ | x | Δ | x | ○ | Example |
| 2 | ○ | ⊙ | ○ | Δ | x | Δ | x | ○ | Example |
| 3 | ○ | ⊙ | ⊙ | Δ | x | Δ | x | ○ | Example |
| 4 | ○ | ⊙ | ⊙ | Δ | x | Δ | X | ○ | Example |
| 5 | ○ | ⊙ | ⊙ | Δ | x | Δ | x | ○ | Example |
| 6 | ○ | ⊙ | ⊙ | Δ | x | Δ | x | ○ | Example |
| 7 | ○ | ⊙ | ○ | Δ | X | Δ | x | ○ | Example |
| 8 | ○ | ⊙ | Δ | Δ | x | Δ | x | ○ | Example |
| 9 | ○ | ⊙ | ○ | Δ | x | Δ | x | ○ | Example |
| 10 | ○ | ⊙ | ○ | Δ | x | Δ | ○ | ○ | Example |
| 11 | ○ | ⊙ | ○ | Δ | x | Δ | ○ | ○ | Example |
| 12 | ○ | ⊙ | ⊙ | Δ | x | Δ | x | ○ | Example |
| 13 | ○ | ⊙ | ○ | Δ | x | Δ | x | ○ | Example |
| 14 | ○ | ⊙ | Δ | Δ | x | Δ | x | ○ | Example |
| 15 | ○ | ⊙ | Δ | Δ | x | Δ | x | ○ | Example |

TABLE 220

| No. | Plating base plate *1 | Surface adjustment Treatment liquid *2 | Surface adjustment Treatment time (second) | Surface adjustment Deposition/ Metal species | Surface adjustment Coating weight (mg/m²) | Chemical conversion treatment conditions Target composition *3 | Chemical conversion treatment conditions Drying temperature (° C.) | Chemical conversion treatment conditions Coating thickness (μm) | Upper layer organic resin coating Presence/ Absence | Upper layer organic resin coating Coating thickness (μm) | Classification |
|---|---|---|---|---|---|---|---|---|---|---|---|
| 16 | 1 | — | — | — | — | 16 | 140 | 0.2 | Absence | — | Example |
| 17 | 1 | — | — | — | — | 17 | 140 | 0.2 | Absence | — | Example |
| 18 | 1 | — | — | — | — | 18 | 140 | 0.2 | Absence | — | Example |
| 19 | 1 | — | — | — | — | 19 | 140 | 0.2 | Absence | — | Comparative Example |
| 20 | 1 | — | — | — | — | 20 | 140 | 0.2 | Absence | — | Comparative Example |
| 21 | 1 | — | — | — | — | 21 | 140 | 0.2 | Absence | — | Comparative Example |
| 22 | 1 | — | — | — | — | 22 | 140 | 0.2 | Absence | — | Comparative Example |
| 23 | 1 | — | — | — | — | 23 | 140 | 0.2 | Absence | — | Comparative Example |
| 24 | 1 | — | — | — | — | 24 | 140 | 0.2 | Absence | — | Comparative Example |
| 25 | 1 | — | — | — | — | 25 | 140 | 0.2 | Absence | — | Comparative Example |
| 26 | 1 | — | — | — | — | 26 | 140 | 0.2 | Absence | — | Comparative Example |
| 27 | 1 | 1 | 2 | Ni | 0.1 | 1 | 140 | 0.2 | Absence | — | Example |
| 28 | 1 | 2 | 3 | Ni | 0.2 | 1 | 140 | 0.2 | Absence | — | Example |
| 29 | 1 | 3 | 3 | Ni | 1.0 | 1 | 140 | 0.2 | Absence | — | Example |
| 30 | 1 | 4 | 3 | Ni | 5.0 | 1 | 140 | 0.2 | Absence | — | Example |

TABLE 221

| No. | Appearance | White-rust resistance SST 48 hrs | White-rust resistance SST 72 hrs | White-rust resistance after alkaline degreasing SST 48 hrs | White-rust resistance after alkaline degreasing SST 72 hrs | Paintability | Resistance to blackening | Coating adhesiveness | Classification |
|---|---|---|---|---|---|---|---|---|---|
| 16 | ○ | ⊚ | Δ | Δ | x | Δ | x | ○ | Example |
| 17 | ○ | ⊚ | Δ | Δ | x | Δ | x | ○ | Example |
| 18 | ○ | ⊚ | Δ | Δ | x | Δ | x | ○ | Example |
| 19 | ○ | x | x | x | x | x | x | ○ | Comparative example |
| 20 | x | x | x | x | x | x | x | x | Comparative example |
| 21 | ○ | x | x | x | x | x | x | ○ | Comparative example |
| 22 | ○ | Δ | x | x | x | x | x | x | Comparative example |
| 23 | ○ | x | x | x | x | x | x | ○ | Comparative example |
| 24 | ○ | x | x | x | x | x | x | ○ | Comparative example |
| 25 | ○ | x | x | x | x | x | x | ○ | Comparative example |
| 26 | ○ | x | x | x | x | x | x | ○ | Comparative example |
| 27 | ○ | ⊚ | ○ | Δ | x | Δ | ○ | ○ | Example |
| 28 | ○ | ⊚ | ○ | Δ | x | Δ | ○ | ○ | Example |
| 29 | ○ | ⊚ | ○ | Δ | x | Δ | ○ | ○ | Example |
| 30 | ○ | ⊚ | ○ | Δ | x | Δ | ○ | ○ | Example |

TABLE 222

| No. | Plating base plate *1 | Surface adjustment | | | | Chemical conversion treatment conditions | | | Upper layer organic resin coating | | Classification |
| --- | --- | --- | --- | --- | --- | --- | --- | --- | --- | --- | --- |
| | | Treatment liquid *2 | Treatment time (second) | Deposition/ Metal species | Coating weight (mg/m$^2$) | Target composition *3 | Drying temperature (° C.) | Coating thickness (μm) | Presence/ Absence | Coating thickness (μm) | |
| 31 | 1 | 5 | 3 | Ni | 0.2 | 1 | 140 | 0.2 | Absence | — | Example |
| 32 | 1 | 6 | 3 | Co | 1.0 | 1 | 140 | 0.2 | Absence | — | Example |
| 33 | 1 | 4 | 20 | Ni | 120 | 1 | 140 | 0.2 | Absence | — | Comparative Example |

TABLE 223

| No. | Appearance | White-rust resistance | | White-rust resistance after alkaline degreasing | | Paintability | Resistance to blackening | Coating adhesiveness | Classification |
| --- | --- | --- | --- | --- | --- | --- | --- | --- | --- |
| | | SST 48 hrs | SST 72 hrs | SST 48 hrs | SST 72 hrs | | | | |
| 31 | ○ | ⊙ | ○ | Δ | x | Δ | ○ | ○ | Example |
| 32 | ○ | ⊙ | ○ | Δ | x | Δ | ○ | ○ | Example |
| 33 | x | x | x | x | x | Δ | ○ | ○ | Comparative example |

TABLE 224

| No. | Plating base plate *1 | Surface adjustment | | | | Chemical conversion treatment conditions | | | Upper layer organic resin coating | | Classification |
| --- | --- | --- | --- | --- | --- | --- | --- | --- | --- | --- | --- |
| | | Treatment liquid *2 | Treatment time (second) | Deposition/ Metal species | Coating weight (mg/m$^2$) | Target composition *3 | Drying temperature (° C.) | Coating thickness (μm) | Presence/ Absence | Coating thickness (μm) | |
| 51 | 1 | — | — | — | — | 1 | 80 | 0.1 | Absence | — | Example |
| 52 | 1 | — | — | — | — | 1 | 110 | 0.1 | Absence | — | Example |
| 53 | 1 | — | — | — | — | 1 | 250 | 0.1 | Absence | — | Example |
| 54 | 1 | — | — | — | — | 14 | 140 | 0.002 | Absence | — | Comparative Example |
| 55 | 1 | — | — | — | — | 15 | 140 | 2.5 | Absence | — | Comparative Example |
| 56 | 1 | — | — | — | — | 1 | 140 | 0.2 | Presence | 0.7 | Example |
| 57 | 1 | — | — | — | — | 2 | 140 | 0.2 | Presence | 0.7 | Example |
| 58 | 1 | — | — | — | — | 3 | 140 | 0.2 | Presence | 0.7 | Example |
| 59 | 1 | — | — | — | — | 4 | 140 | 0.2 | Presence | 0.7 | Example |
| 60 | 1 | — | — | — | — | 5 | 140 | 0.2 | Presence | 0.7 | Example |

TABLE 225

| No. | Appearance | White-rust resistance | | White-rust resistance after alkaline degreasing | | Paintability | Resistance to blackening | Coating adhesiveness | Classification |
| --- | --- | --- | --- | --- | --- | --- | --- | --- | --- |
| | | SST 48 hrs | SST 72 hrs | SST 48 hrs | SST 72 hrs | | | | |
| 51 | ○ | ⊙ | Δ | Δ | x | Δ | x | ○ | Example |
| 52 | ○ | ⊙ | ○ | Δ | x | Δ | x | ○ | Example |
| 53 | ○ | ⊙ | ○ | Δ | x | Δ | x | ○ | Example |
| 54 | ○ | x | x | x | x | Δ | x | ○ | Comparative example |
| 55 | ○ | ⊙ | ⊙ | ⊙ | ⊙ | x | x | x | Comparative example |
| 56 | ○ | ⊙ | ⊙ | ⊙ | ⊙ | ⊙ | ○ | ○ | Example |
| 57 | ○ | ⊙ | ⊙ | ⊙ | ⊙ | ⊙ | ○ | ○ | Example |
| 58 | ○ | ⊙ | ⊙ | ⊙ | ⊙ | ⊙ | ○ | ○ | Example |
| 59 | ○ | ⊙ | ⊙ | ⊙ | ⊙ | ⊙ | ○ | ○ | Example |
| 60 | ○ | ⊙ | ⊙ | ⊙ | ⊙ | ⊙ | ○ | ○ | Example |

TABLE 226

| | | Surface adjustment | | | | Chemical conversion treatment conditions | | | Upper layer organic resin coating | | |
|---|---|---|---|---|---|---|---|---|---|---|---|
| No. | Plating base plate *1 | Treatment liquid *2 | Treatment time (second) | Deposition/ Metal species | Coating weight (mg/m²) | Target composition *3 | Drying temperature (° C.) | Coating thickness (μm) | Presence/ Absence | Coating thickness (μm) | Classi- fication |
| 61 | 1 | — | — | — | — | 6 | 140 | 0.2 | Presence | 0.7 | Example |
| 62 | 1 | — | — | — | — | 7 | 140 | 0.2 | Presence | 0.7 | Example |
| 63 | 1 | — | — | — | — | 8 | 140 | 0.2 | Presence | 0.7 | Example |
| 64 | 1 | — | — | — | — | 9 | 140 | 0.2 | Presence | 0.7 | Example |
| 65 | 1 | — | — | — | — | 10 | 140 | 0.2 | Presence | 0.7 | Example |
| 66 | 1 | — | — | — | — | 11 | 140 | 0.2 | Presence | 0.7 | Example |
| 67 | 1 | — | — | — | — | 12 | 140 | 0.2 | Presence | 0.7 | Example |
| 68 | 1 | — | — | — | — | 13 | 140 | 0.2 | Presence | 0.7 | Example |
| 69 | 1 | — | — | — | — | 14 | 140 | 0.2 | Presence | 0.7 | Example |
| 70 | 1 | — | — | — | — | 15 | 140 | 0.2 | Presence | 0.7 | Example |
| 71 | 1 | — | — | — | — | 16 | 140 | 0.2 | Presence | 0.7 | Example |
| 72 | 1 | — | — | — | — | 17 | 140 | 0.2 | Presence | 0.7 | Example |
| 73 | 1 | — | — | — | — | 18 | 140 | 0.2 | Presence | 0.7 | Example |

TABLE 227

| | Performance | | | | | | | | |
|---|---|---|---|---|---|---|---|---|---|
| | | White-rust resistance | | White-rust resistance after alkaline degreasing | | | Resistance to | | Coating |
| No. | Appearance | SST 48 hrs | SST 72 hrs | SST 48 hrs | SST 72 hrs | Paintability | blackening | adhesiveness | Classification |
| 61 | ○ | ⊚ | ⊚ | ⊚ | ⊚ | ⊚ | ○ | ○ | Example |
| 62 | ○ | ⊚ | ⊚ | ⊚ | ⊚ | ⊚ | ○ | ○ | Example |
| 63 | ○ | ⊚ | ⊚ | ⊚ | ⊚ | ⊚ | ○ | ○ | Example |
| 64 | ○ | ⊚ | ⊚ | ⊚ | ⊚ | ⊚ | ○ | ○ | Example |
| 65 | ○ | ⊚ | ⊚ | ⊚ | ⊚ | ⊚ | ○ | ○ | Example |
| 66 | ○ | ⊚ | ⊚ | ⊚ | ⊚ | ⊚ | ○ | ○ | Example |
| 67 | ○ | ⊚ | ⊚ | ⊚ | ⊚ | ⊚ | ○ | ○ | Example |
| 68 | ○ | ⊚ | ⊚ | ⊚ | ⊚ | ⊚ | ○ | ○ | Example |
| 69 | ○ | ⊚ | ⊚ | ⊚ | ⊚ | ⊚ | ○ | ○ | Example |
| 70 | ○ | ⊚ | ⊚ | ⊚ | ⊚ | ⊚ | ○ | ○ | Example |
| 71 | ○ | ⊚ | ⊚ | ⊚ | ⊚ | ⊚ | ○ | ○ | Example |
| 72 | ○ | ⊚ | ⊚ | ⊚ | ⊚ | ⊚ | ○ | ○ | Example |
| 73 | ○ | ⊚ | ⊚ | ⊚ | ⊚ | ⊚ | ○ | ○ | Example |

What is claimed is:

1. A coated steel sheet having corrosion resistance comprising:

a zinc or a zinc alloy plated steel sheet or an aluminum or an aluminum alloy plated steel sheet;

a composite oxide coating formed on the surface of the plated steel sheet;

an organic coating formed on the composite oxide coating; said composite oxide coating containing:
   (α) oxide particles;
   (β) at least one metal selected from the group consisting of Mg, Ca, Sr and Ba, or said metal in a form of at least one of a compound and a composite compound; and
   (γ) at least one of a phosphoric acid and a phosphoric acid compound, the composite oxide coating has a thickness of from 0.005 to 3 μm, or has a total coating weight of the component (α), the component (β) converted to said metal, and the component (γ) converted to $P_2O_5$, of from 6 to 3,600 mg/m²;

said organic coating comprising a product of a reaction between a film-forming organic resin (A) and an active-hydrogen-laden compound (B), a part or whole of which compound (B) comprises a hydrazine compound (C) containing active hydrogen, wherein the hydrazine compound (C) containing active hydrogen is at least one compound selected from the group consisting of an active-hydrogen-laden pyrazole compound and an active-hydrogen-laden triazole compound; and the organic coating having a thickness of from 0.1 to 5 μm.

2. The coated steel sheet having corrosion resistance of claim 1, wherein the organic coating contains a product of a reaction between a film-forming organic resin (A) and an active-hydrogen-laden compound (B), a part or whole of which compound (B) comprises a hydrazine compound (C) containing active hydrogen, and an ion-exchanged silica, the ion-exchanged silica being in an amount of from 1 to 100 parts by weight of solid matter to 100 parts by weight of solid matter of the reaction product.

3. The coated steel sheet having corrosion resistance of claim 1, wherein the organic coating contains a product of a reaction between a film-forming organic resin (A) and an active-hydrogen-laden compound (B), a part or whole of which compound (B) comprises a hydrazine compound (C) containing active hydrogen, and silica particles, the silica particles being in an amount of from 1 to 100 parts by weight of solid matter to 100 parts by weight of solid matter of the reaction product.

4. The coated steel sheet having corrosion resistance of claim 1, wherein the organic coating contains a product of a reaction between a film-forming organic resin (A) and an active-hydrogen-laden compound (B), a part or whole of which compound (B) comprises a hydrazine compound (C) containing active hydrogen, an ion-exchanged silica, and silica particles, the sum of the ion-exchanged silica and silica particles is from 1 to 100 parts by weight of solid matter to 100 parts by weight of solid matter of the reaction product, and the weight ratio of the solid matter content of the ion-exchanged silica to the solid matter content of the silica particles is from 1/99 to 99/1.

5. The coated steel sheet having corrosion resistance of claim 1, wherein the organic coating contains a product of reaction between a film-forming organic resin (A) and an active-hydrogen-laden compound (B), a part or whole of which compound (B) comprises a hydrazine compound (C) containing active hydrogen, and a solid lubricant, the solid lubricant being in an amount of from 1 to 80 parts by weight of solid matter to 100 parts by weight of solid matter of the reaction product.

6. The coated steel sheet having corrosion resistance of claim 1, wherein the organic coating contains a product of a reaction between a film-forming organic resin (A) and an active-hydrogen-laden compound (B), a part or whole of which compound (B) comprises a hydrazine compound (C) containing active hydrogen, an ion-exchanged silica, and a solid lubricant, the ion-exchanged silica being in an amount of from 1 to 100 parts by weight of solid matter to 100 parts by weight of solid matter of the reaction product, the solid lubricant being in an amount of from 1 to 80 parts by weight of solid matter to 100 parts by weight of solid matter of the reaction product.

7. The coated steel sheet having corrosion resistance of claim 1, wherein the organic coating contains a product of a reaction between a film-forming organic resin (A) and an active-hydrogen-laden compound (B), a part or whole of which compound (B) comprises a hydrazine compound (C) containing active hydrogen, silica particles, and a solid lubricant, the silica particles being in an amount of from 1 to 100 parts by weight of solid matter to 100 parts by weight of solid matter of the reaction product, the solid lubricant being in an amount of from 1 to 80 parts by weight of solid matter to 100 parts by weight of solid matter of the reaction product.

8. The coated steel sheet having corrosion resistance of claim 1, wherein the organic coating contains a product of a reaction between a film-forming organic resin (A) and an active-hydrogen-laden compound (B), a part or whole of which compound (B) comprises a hydrazine compound (C) containing active hydrogen, an ion-exchanged silica, silica particles, and a solid lubricant, the sum of the ion-exchanged silica and the silica particles is from 1 to 100 parts by weight of solid matter to 100 parts by weight of solid matter of the reaction product, the weight ratio of the solid matter content of the ion-exchanged silica to the solid matter content of the silica particles is from 1/99 to 99/1, the solid lubricant being in an amount of from 1 to 80 parts by weight of solid matter to 100 parts by weight of solid matter of the reaction product.

9. The coated steel sheet having corrosion resistance of claim 1, wherein the oxide particles in the composite oxide coating are $SiO_2$ particles.

10. The coated steel sheet having corrosion resistance of claim 1, wherein the composite oxide coating comprises: ($\alpha$) $SiO_2$ particles; ($\beta$) at least one element selected from the group consisting of Mg, a compound containing Mg and a composite compound containing Mg; and ($\gamma$) at least one of a phosphoric acid and a phosphoric acid compound.

11. The coated steel sheet having corrosion resistance of claim 1, wherein the film-forming organic resin (A) is a epoxy-group-laden resin.

12. The coated steel sheet having corrosion resistance of claim 1, wherein the coated steel sheet does not contain hexavalent chromium.

* * * * *